United States Patent
Wolfe

(10) Patent No.: US 12,154,213 B2
(45) Date of Patent: *Nov. 26, 2024

(54) SPATIO-TEMPORAL NOISE MASKS AND SAMPLING USING VECTORS FOR IMAGE PROCESSING AND LIGHT TRANSPORT SIMULATION SYSTEMS AND APPLICATIONS

(71) Applicant: NVIDIA Corporation, Santa Clara, CA (US)

(72) Inventor: Alan Robert Wolfe, San Clemente, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,233

(22) Filed: Jul. 10, 2023

(65) Prior Publication Data

US 2024/0037838 A1 Feb. 1, 2024

Related U.S. Application Data

(63) Continuation of application No. 17/553,692, filed on Dec. 16, 2021, now Pat. No. 11,727,621.

(60) Provisional application No. 63/196,116, filed on Jun. 2, 2021.

(51) Int. Cl.
*G06T 15/04* (2011.01)
*G06T 5/20* (2006.01)

(52) U.S. Cl.
CPC ............. *G06T 15/04* (2013.01); *G06T 5/20* (2013.01)

(58) Field of Classification Search
CPC ..... G06T 7/40; G06T 7/44; G06T 5/50; G06T 7/0002; G06T 5/002; G06T 15/04; G06T 2207/30168; G06T 2207/20182
See application file for complete search history.

(56) References Cited

U.S. PATENT DOCUMENTS

| | | |
|---|---|---|
| 2016/0063705 A1 | 3/2016 | Xu et al. |
| 2017/0045950 A1 | 2/2017 | El Dokor et al. |
| 2021/0012465 A1 | 1/2021 | Kim et al. |

OTHER PUBLICATIONS

Georgiev et al., "Blue-noise Dithered Sampling," Siggraph, Jul. 24-28, 2016, 1 page.
IEEE, "IEEE Standard 754-2008 (Revision of IEEE Standard 754-1985): IEEE Standard for Floating-Point Arithmetic," Aug. 29, 2008, 70 pages.
Ulichney, "The Void-and-Cluster Method for Dither Array Generation," Digital Equipment Corporation, 1993, 12 pages.
Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.

*Primary Examiner* — Hau H Nguyen
(74) *Attorney, Agent, or Firm* — Davis Wright Tremaine LLP

(57) ABSTRACT

Apparatuses, systems, and techniques to generate blue noise masks for real-time image rendering and enhancement. In at least one embodiment, a vector-valued noise mask is generated and applied to one or more images to generate one or more enhanced images for image processing (e.g., real-time image rendering). In at least one embodiment, the noise mask includes vector values per pixel and is able to handle the temporal domain (e.g., add time to the spatial domain) to improve image quality when rendering images over multiple frames.

20 Claims, 108 Drawing Sheets

|  | Vec1 | Unit Vec1 | Vec2 | Unit Vec2 | Vec3 | Unit Vec3 |
|---|---|---|---|---|---|---|
| XY[0] |  |  |  |  |  |  |
| DFT(XY) |  |  |  |  |  |  |
| DFT(XZ) |  |  |  |  |  |  |

Table 1

FIG. 4

| | Texture[0] | DFT(XY) | DFT(ZY) |
|---|---|---|---|
| Cosine Weighted Hemisphere Unit Vec3 | | | |
| HDR Skybox Importance Sampled Unit Vec3 | | | |

Table 2

FIG. 5

SPATIO-TEMPORAL NOISE MASKS AND SAMPLING USING VECTORS FOR IMAGE PROCESSING AND LIGHT TRANSPORT SIMULATION SYSTEMS AND APPLICATIONS

CROSS-RELATED APPLICATION

This application is a continuation of U.S. patent application Ser. No. 17/553,692, filed Dec. 16, 2021, entitled "SPATIO-TEMPORAL NOISE MASKS AND SAMPLING USING VECTORS FOR IMAGE PROCESSING AND LIGHT TRANSPORT SIMULATION SYSTEMS AND APPLICATIONS," which claims priority to U.S. Provisional Patent Application No. 63/196,116 entitled "NOISE MASKS FOR IMAGE PROCESSING," filed on Jun. 2, 2021, the contents of which are hereby incorporated by reference in their entirety.

TECHNICAL FIELD

At least one embodiment pertains to processing resources used to perform and facilitate real-time image rendering and enhancement. For example, processors or computing systems to generate a blue noise texture that can handle vector values, where the blue noise texture can be used in real-time image rendering and enhancement.

BACKGROUND

Image processing techniques—such as imaging rendering and enhancement—can use significant memory, time, or computing resources, especially when the processing is to be performed in real time. The amount of memory, time, or computing resources used to enhance images can be improved.

BRIEF DESCRIPTION OF DRAWINGS

FIG. 4 illustrates blue-noise masks and their frequency distributions, according to at least one embodiment;

FIG. 5 illustrates blue-noise masks and their frequency distributions using importance sampling, according to at least one embodiment;

DETAILED DESCRIPTION

Figure 1:
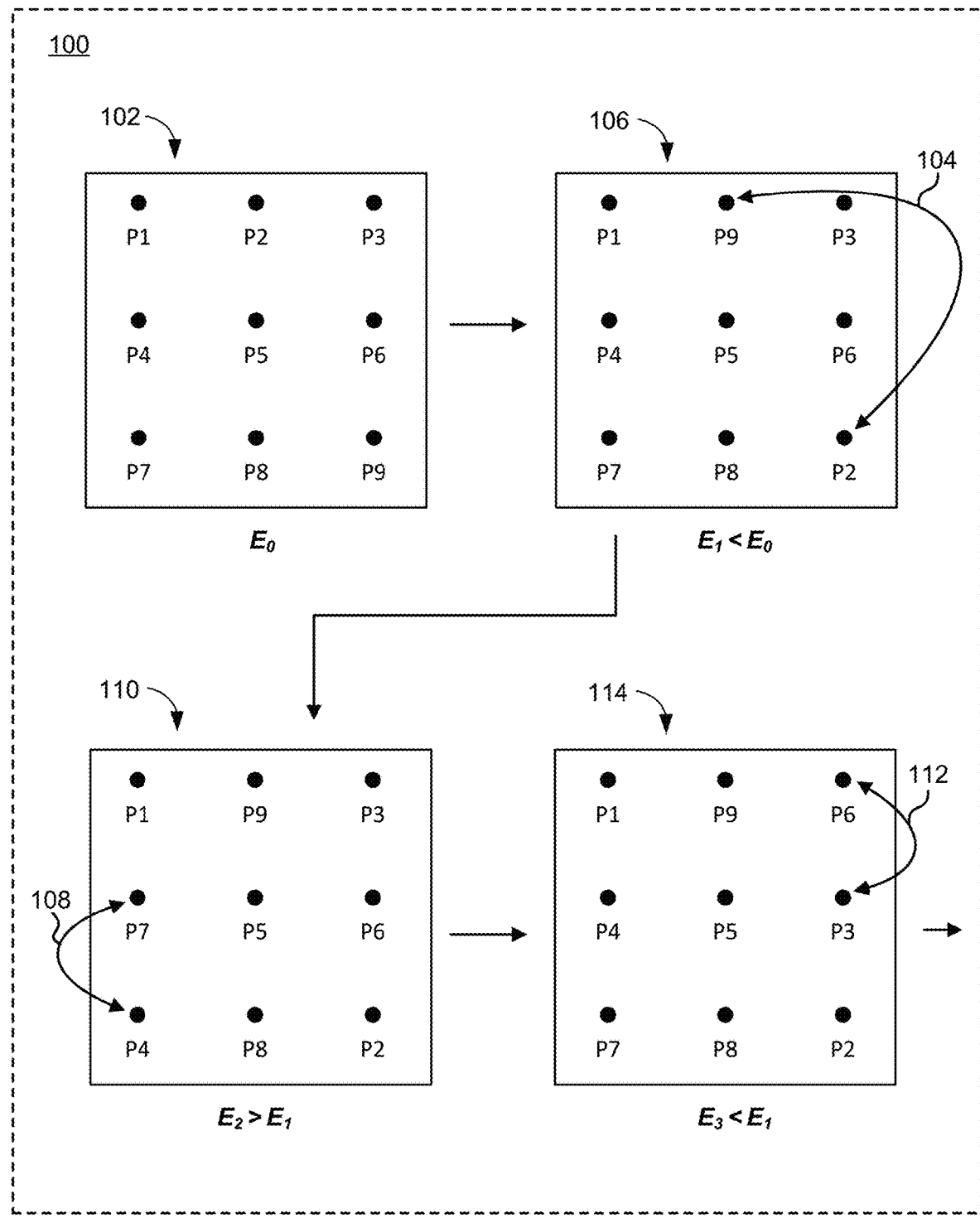
FIG. 1 illustrates an example of a process for pixel swapping during blue noise mask generation, according to at least one embodiment.

In the following description, numerous specific details are set forth to provide a more thorough understanding of at least one embodiment. However, it will be apparent to one skilled in the art that the inventive concepts may be practiced without one or more of these specific details.

Blue noise masks (e.g., blue noise sampling masks, blue noise textures) are used in image rendering algorithms to provide random numbers at a per-pixel level, which result in patterns of random noise that are perceptually better than white noise. Blue noise masks are generally limited to high frequencies such that they can be removed more thoroughly with a low pass filter (such that de-noising with a blur is much more effective).

Conventional techniques for generating noise masks for a frame generally do not consider how time affects the generation and application of masks. Unfortunately, image rendering processes that do not incorporate considerations of pixels over time into generating and applying noise masks (e.g., blue noise masks) can process produces images that are less visually pleasing to an observer.

Accordingly, in real-time image rendering, a time axis should be considered. In some embodiments, improving sampling of an image based on a texture over time improves an image quality when viewed in motion, and is also applicable in temporal filtering methods such as temporal anti-aliasing (TAA), deep learning super sampling (DLSS), and XeSS by INTEL. There are various methods to animate blue noise masks over time, but there exists a tradeoff between the quality on the space axes (e.g., image-space axes, x, and y axes) and the quality on the time axis.

In an embodiment, vector spatio-temporal blue noise masks (e.g., vector-valued blue noise masks) are valuable in any animated situation where blue noise textures are currently used, as they are a solution to a problem of animating blue noise masks. Vector spatio-temporal blue noise masks, as opposed to scalar spatio-temporal blue noise masks, store a vector value (e.g., a vector) for each pixel and has a high-quality blue noise spectrum over space, while also having a blue noise spectrum over time.

In at least one embodiment, one or more circuits (which may be part of one or more processors in a computer system) generate blue noise masks that store vector values per pixel and are optimally blue over space and time. One or more circuits (implementing software operations) can generate these vector spatio-temporal blue noise masks as a set of N blue noise textures such that each texture stores vector values per pixel, is individually suitable blue noise, and demonstrates blue noise over time for each pixel. Suitable blue noise can contain sufficient amounts of higher frequencies and low amounts of lower frequencies.

In an embodiment, the vector spatio-temporal blue noise masks are created by modifying a blue noise dithered sampling (BNDS) algorithm. A BNDS algorithm is an algorithm used to generate N-dimensional blue noise masks (e.g., blue noise masks with multi-dimensional values as pixel values) comprised of vector values. In an embodiment, the BNDS algorithm can be modified to make noise patterns that solve the desired constraints over both space and time simultaneously for real-time image rendering. In an embodiment, the modified BNDS algorithm receives an image or images with pixel data, where pixel data includes data for N-dimensions (e.g., three or more dimensions, where one dimension is time), wherein N represents a number of dimensions. In an embodiment, a number of dimensions is represented by d. In an embodiment, data for an image (e.g., image data) can be treated like a function (e.g., image function) wherein an input (e.g., a pixel value indicating location) produces an output (e.g., a pixel value indicating color, intensity, reflection characteristic). In some embodiments, data for a pixel may be stored as any of a scalar value (e.g., a scalar, a single value), a vector value (e.g., a vector, an array of values), a multi-dimensional value, an N-dimensional value, an N-dimensional vector, a d-dimensional vector, and/or a higher-dimensional value.

Techniques described herein are directed to generate vector spatio-temporal blue noise masks for real-time image rendering and enhancement according to various embodiments. For example, a vector spatio-temporal blue noise mask can be a three-dimensional mask, where two dimensions corresponds to space (e.g., x and y coordinates) and one dimension corresponds to time. In an embodiment, vector spatio-temporal blue noise masks are used to benefit a variety of applications or techniques for image rendering, including dithering, stochastic transparency, area light sampling, and volumetric rendering. Also, the vector spatio-temporal blue noise masks may be applied to a variety of sampling techniques, including, e.g., soft shadows and path tracing, stochastic alpha, and dithering.

Techniques described herein are also directed to generating vector spatio-temporal blue masks that can use vectors as pixel values and can handle the temporal domain, e.g., adding time to the spatial (image) domain to improve image quality when rendering images over multiple frames (e.g., time) and multi-dimensional (e.g., more than one dimension) pixel values. In an embodiment, a vector spatio-temporal blue mask can use vectors or unit vectors. In an embodiment, a vector spatio-temporal blue noise mask is based, at least in part, on a vector value associated with a pixel.

In an embodiment, for image rendering, enhancements to the images can be made by integrating over multiple samples per pixel covering a duration of time or other dimensions, while still maintaining blue noise error properties spatially. Human perception (and some computing displays) performs some amount of implicit integration over time, especially at high frame rates, and these situations typically provide value to good sampling patterns over time, without any explicit filtering. Therefore, two-dimensional (2D) blue noise patterns are used for each frame, which are well distributed over time at each pixel and converge (e.g., rapidly) for Monte Carlo integration (e.g., numerical integration using random numbers, use of random sampling to integrate). As such, the techniques described herein are directed to systems and methods that generate vector spatio-temporal blue noise masks based on vector values. In an embodiment, the vector spatio-temporal blue noise mask is generalized to arbitrary dimensionality for higher dimensional uses.

In at least one embodiment, a time slice corresponds to a specific moment or unit of time. More generally, a slice can also be a specific dimension or multi-dimensional layer (e.g., based on coordinates of the pixels that fall within a plane having the specific dimension or multi-dimensions). In an embodiment, a framework enables each two-dimensional (2D) slice (in the spatial domain) of a three-dimensional image to be associated with blue noise properties so that each pixel comprises one-dimensional sampling properties over the time dimension. In an embodiment, taking a slice from a higher space results an image in a space of lower dimension. So, a 2D slice may be an image taken from a 3D image or object. In an embodiment, 3D images over time may be represented by a 2D slice (e.g., X-Y plane over a spatial domain) and a Z axis representing the time domain.

In an embodiment, the BNDS algorithm has an energy function which is used to find a region of empty space in an image to place the next pixel into. In an embodiment, an energy function is used to determine what vector value or values (e.g., location coordinates, on or off value, color value, intensity, angle, direction) should be assigned to which pixels to better exemplify blue noise. In an embodiment, one or more modifications can be made to the energy function of a BNDS algorithm. This energy function makes it so that pixels only affect each other in the energy field if they are from the same slice (e.g., frame), or if they are the same pixel at a different point in time. This way, a vector-valued blue noise mask is also blue through space and time—each 2D slice of the 3D blue noise will be a good 2D blue noise, and makes each pixel that corresponds to the blue noise mask be 1D blue noise over time. Note that if a single 2D blue noise texture is used for every slice, each pixel may get the same result and may not provide any new samples for integration; on the other hand, if independently generated 2D blue noise textures were used for every frame, each pixel may become a white noise sequence over time. Error may be hidden as blue noise but is also smaller by being able to converge to the correct result better. In an embodiment, a vector spatio-temporal blue noise mask has blue noise over space such that it may provide better image results than white noise over time.

In an embodiment, another modification is to specify which axes should be grouped together into N-dimensional blue noise to extend the application of the BNDS algorithm to higher dimensions. This allows techniques described herein to extend beyond spatio-temporal blue noise into spatio-temporal-depth blue noise, which is four dimensional (4D). This is useful, for example, when rendering fog, but this may also be generalized for any dimensionality and any grouping of those dimensions that may be desired for a specific rendering algorithm. Being able to craft custom random numbers like this provides blue noise error in screen space while getting faster convergence for a rendering algorithm.

Blue noise distributions are well suited to human perception and minimize unwanted low-frequency noise. Blue-noise point-sets are also commonly referred to as blue noise masks or blue noise textures. In image rendering, it often involves integration of samples over multiple frames to amortize rendering costs, or equivalently, multiple samples taken per frame. Hence, in an embodiment, the techniques described herein achieve various technical advantages, including but not limited to using 2D blue noise patterns, that when animated produce samples at a pixel that are well distributed over time, converge (e.g., rapidly) for Monte Carlo integration, while still retaining spatial blue noise properties. Some spatial blue noise methods that are applied at each frame independently produce results that show white noise frequency spectra temporally and are therefore slow to converge for integration across time and are also unstable when filtered temporally.

Accordingly, the techniques described herein can be an extension to the BNDS algorithm involving reformulating its energy function. The vector spatio-temporal blue noise masks disclosed herein may result in visually pleasing error patterns, rapid convergence speeds, and increased stability when filtered temporally. In some embodiments, the techniques described herein can also be extended to higher dimensions as it provides unique sampling characteristics for use in temporal integration. By applying the techniques described herein, improvements in a variety of applications such as dithering, stochastic transparency, low sample count, ambient occlusion and volumetric rendering can be achieved.

In at least one embodiment, techniques described herein achieve various technical advantages, including but not limited to improving real-time image rendering and enhancement in applications using rendering algorithms that need per pixel random vectors, as well as any place quantization because it makes for very good dithering (good perceptually, from a filtering standpoint, and also the average of small regions of pixels over space and time are more accurate to the actual average of the source data un-quantized), which hides the fact that low bit counts were used. This is useful for reducing memory usage of geometry buffers (G-buffers), render targets, textures, etc.

While masks can be generated for two and three dimensions, the techniques described herein can apply to multiple dimensions (e.g., greater than 3, 6, 7, etc.). Also, the techniques are not limited to having one dimension as the time dimension; rather, the techniques described herein can generate a multi-dimensional mask (e.g., 7 dimensions), where one dimension is time, or no dimension is time. For example, a generated mask can relate to a 7 dimensional mask, where the first three axes (e.g., dimensions) refer to 3D blue noise, the next two axes (e.g., dimensions) refer to 2D blue noise, and the last two axes (e.g., dimensions) refer to 1D blue noise. In at least one embodiment, a computer implemented can select the grouping of dimensions when generating the mask.

In at least one embodiment, after one or more circuits generates and applies a blue noise mask in an image rendering process, one or more circuits applies other types of filtering operations to a rendering process such as red noise filtering, band pass filtering, or other types of noise filtering (e.g., frequency attenuating filters or other denoising methods).

In an embodiment, vector spatio-temporal blue noise masks may be a part of an image rendering process that includes other methods of generating spatio-temporal blue noise masks such as scalar spatio-temporal blue noise masks. An image rendering process may use a combination of vector spatio-temporal blue noise masks and other blue noise masks such as scalar blue noise masks or scalar spatio-temporal blue noise masks. Vector spatio-temporal blue noise masks often share the advantages and qualities of other spatio-temporal blue noise masks, including those generated with the use of a modified void and cluster algorithm. In at least one embodiment, a process includes applying a modified BNDS algorithm to generate a blue noise mask that handles vector values, and the process includes separately applying a modified void and cluster algorithm to scalar values (e.g., as part of a different rendering step when a video game provides scalar values as part of a scene rendering operation).

FIG. 1 illustrates a process 100 where pixel swapping is performed on a texture in accordance with at least one embodiment. Pixel swapping is an element of the BNDS algorithm, which creates vector-valued blue noise masks. In an embodiment, blue noise is achieved, in part, when the total energy of a mask is minimized, which is discussed in more detail below. In at least one embodiment, one or more computer systems performs some or all of process 100 (or any other processes described herein, or variations and/or combinations thereof) based on computer-executable instructions and code (e.g., computer-executable instructions, one or more computer programs, or one or more applications, Compute Unified Device Architecture (CUDA) code)) executing collectively on one or more processors, by hardware, software, or combinations thereof, and as further discussed in conjunction with FIG. 9A.

On the upper left side of FIG. 1 is texture 102, which can be referred to as a "3 by 3" texture, and is shown in its initial state (e.g., initial texture, initial version). Texture 102 comprises nine pixels (P1, P2, P3, P4, P5, P6, P7, P8, P9) and total texture energy $E_0$. Each pixel in texture 102 has an energy value (e.g., pixel energy value) determined by its relationship (e.g., distance, similarity of values) to another pixel in the texture. In an embodiment, pixel swapping (e.g., swapping one or more values of one pixel with another pixel's values) is performed to determine whether the total energy of a texture can be lowered, wherein lowering the total energy of a texture is associated with adjusting the texture's characteristics from white to blue noise. In an embodiment, the total energy of a texture is calculated according to equation (1):

$$E(M) = \sum_{p \neq q} E(p, q) = \sum_{p \neq q} \exp\left(-\frac{\|p_i - q_i\|^2}{\sigma_i^2} - \frac{\|p_s - q_s\|^{d/2}}{\sigma_s^2}\right) \quad (1)$$

where E(M) is the total energy of the texture (e.g., mask), p and q are pixels, $p_i$ and $q_i$ are the integer coordinates for those pixels, $p_s$ and $q_s$ are d-dimensional sample values associated with those pixels, $\sigma_i$ and $\sigma_s$ are configurable parameters (e.g., energy falloff parameters, intensity falloff parameters, Gaussian values) that control energy falloff over distance and a Gaussian space (e.g., a uniform distribution of random samples). In an embodiment, $\sigma_i$ controls energy or intensity fall off (e.g., decrease) over distance. In some embodiments, the energy falloff parameter corresponds to a Gaussian blur function, where d refers to the number of dimensions and d/2 is an exponent that corrects for the difference in an average distance between points in the d-dimensional sample space and the image space (e.g., 2D image space). In an embodiment, $\sigma_i=2.1$ and $\sigma_s=1$. In at least an embodiment, the farther apart two pixels are and the more dissimilar they are, the lower the pixel energy for each pixel. In an embodiment, the distance used by the energy function is computed toroidally on all axes, which means that the individual texture slices tile well over space, but the temporal qualities also tile well over time, with no seam when the time starts over at zero.

In an embodiment, the energy function of the BNDS algorithm is used in three dimensions to produce vector spatio-temporal blue noise textures that store a vector value per pixel. In an embodiment, the energy function of the BNDS algorithm is adjusted so that the energy function only returns a nonzero energy value if the pixels used in the energy function come from the same two-dimensional texture slice or if they are the same pixel at different points in time. This adjustment to the energy function results in N textures which are blue (e.g., exhibiting characteristics of blue noise) over space and in each pixel being blue over the z-axis (e.g., time axis). In an embodiment, unit vectors can be used with the energy function of the BNDS algorithm. Unit vectors can be used when direction vectors are required during image rending. Non-unit vectors can be used when an N dimensional random number is required, such as a point in space. In an embodiment, a vector spatio-temporal blue noise texture provides random values (e.g., random vectors representing rays) to be input into a function such as an image function, the details of which may be unknown to an image rendering process, which is discussed further throughout this disclosure and in conjunction with at least FIG. 3.

In at least an embodiment, pixel swap 104 occurs between P2 and P9 to create texture 106. The total texture energy $E_1$ of texture version 106 is calculated by a modified BNDS energy function to be lower than $E_0$, and therefore, pixel swap 104 is accepted. Next, a pixel swap 108 occurs between P4 and P7 to create texture 110. The total texture energy $E_2$ of texture 110 is calculated to be higher than $E_1$, and therefore, pixel swap 108 is rejected. Next, pixel swap 112 occurs between P3 and P6 to create texture version 114. In an example scenario, the total texture energy $E_3$ of texture version 114 is calculated to be lower than $E_1$, and therefore, pixel swap 112 is accepted. In at least an embodiment, pairs of pixels are repeatedly swapped until the total energy of the texture is at a minimum. In at least an embodiment, pairs of pixels are repeatedly randomly picked and swapped until the total energy of the texture is at a minimum. In at least an embodiment, a structure, framework, or algorithm for deciding which pairs of pixels to swap is based on prior pixel swaps. In at least an embodiment, the number of swaps performed, including swaps that were rejected, is determined by formula (2):

Number of swaps=$(W^2 \times H^2 \times D^2)/1000$ (2)

where W is the width of a texture in pixels, H is the height of the texture in pixels, and D is the depth of the texture in pixels. In another embodiment, the number of swaps performed, including swaps that were rejected, is determined by formula (3):

Number of swaps=$(W^2 \times H^2 \times D^2)/100000$ (3)

In an embodiment, determining the minimum possible energy for a texture using pixel swaps begins with a 100% chance of doing a swap that results in a higher total energy for the texture. At the end of the swapping, there is a 0% chance of making a swap that results in a higher total energy for the texture. In an embodiment, a pixel swap may result in no change to the total texture energy.

Figure 2:
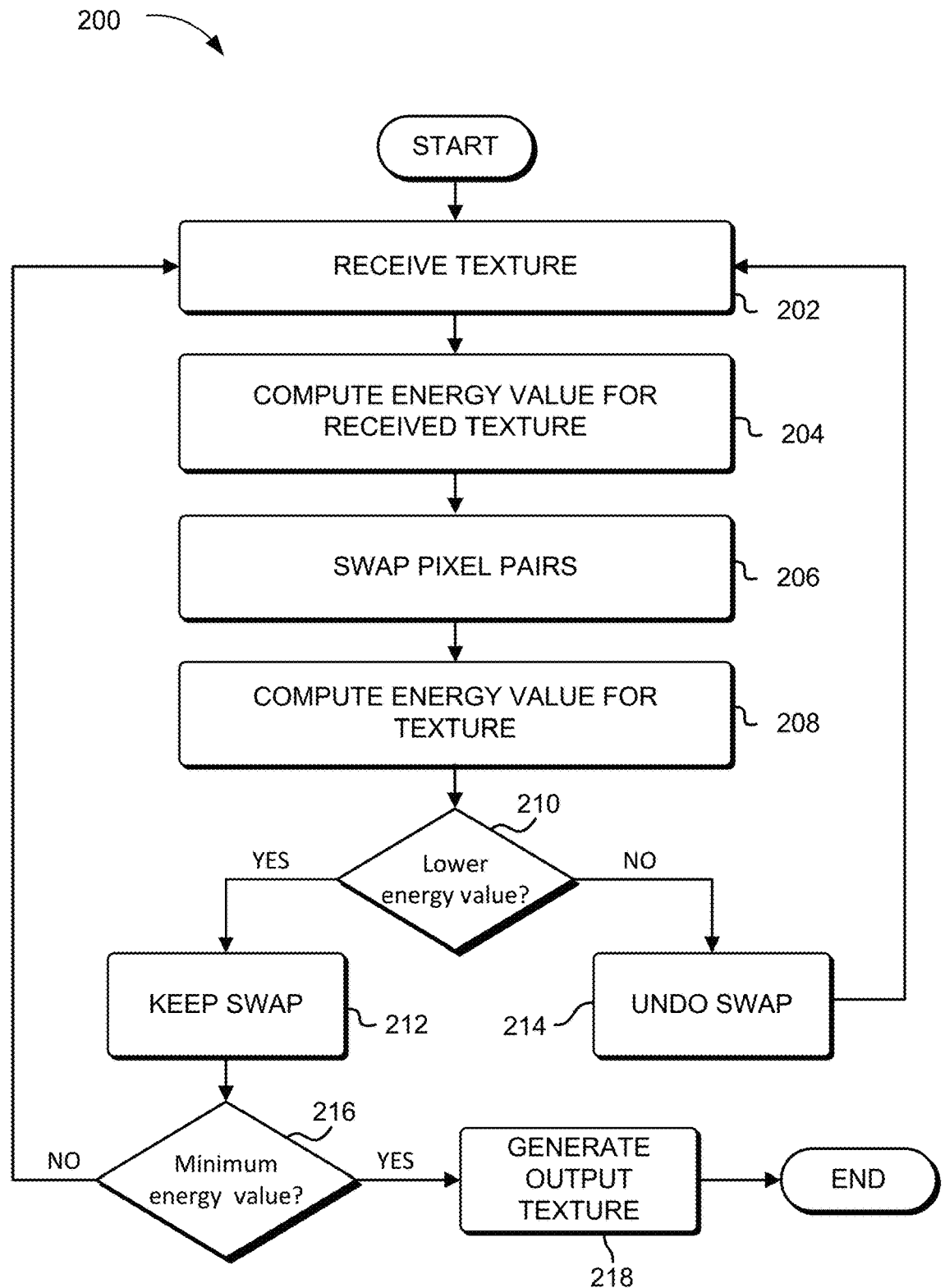
FIG. 2 illustrates a process for generating a blue noise mask, according to at least one embodiment.

FIG. 2 depicts an example process 200 for creating a vector spatio-temporal blue-noise texture using pixel swapping according to an embodiment. One or more circuits or one or more processors can perform part or all of process 200. Process 200 includes receiving a texture 202, computing an energy value for that texture 204, swapping pixel pairs 206, again computing an energy value for that texture 208, computing whether the swap resulted in a lower energy value for the texture 210, and if yes, keeping the swap 212. If no, the swap is undone 214 and the texture is received at step 202 to start the process over again. If keeping the swap 212 is performed, then whether the texture has reached its minimum energy value is computed 216, and if yes, the texture is generated as an output 218 and the process 200 ends. If the texture has not reached it minimum energy value, then the texture received at step 202 to start the process over again.

In an embodiment, a texture received in step 202 may initially be a white noise texture (e.g., a uniform texture, a uniform mask) as discussed throughout this disclosure and in conjunction with at least FIG. 1. In at least one embodiment, a received texture may be a template texture or a base texture, which is a starting texture (or initial) texture for generating a texture that has blue noise, red noise, or other color noise properties. In at least one embodiment, an initial texture can include non-uniform distributions of pixels.

In an embodiment, computing an energy value for a texture 204 includes the application of a modified energy function from the BNDS algorithms, which is discussed further at least in conjunction with FIG. 1.

In an embodiment, swapping pixel pairs 206 comprises swapping the pixel values of two pixels as discussed further in conjunction with FIG. 1. Choosing which two pixels to swap may be performed in a pseudorandom manner.

In an embodiment, computing an energy value for a texture at step 208 is identical to computing an energy value for a texture at step 204 except for two swapped pixels, which is discussed further in conjunction with FIG. 1.

In an embodiment, if at step 210 a lower energy value is determined because of the pixel swap, the texture retains the swap 212. If a higher energy value is determined at step 210 because of the pixel swap, then the texture rejects the swap and reverts the pixel values to what they were prior to the swap 214. Energy values are discussed further at least in conjunction with FIG. 1.

In an embodiment, determining whether a texture has pixels or pixel values arranged so that the texture has the lowest possible energy 216 is similar to a simulated annealing where process 200 has found a global minimum energy for the texture. Determining the minimum possible energy for a texture is discussed further in conjunction with FIG. 1.

When generating an output texture 218, the output texture has its minimum possible energy applied to image data and therefore, exhibits blue noise, which is further discussed throughout this disclosure and in conjunction with at least FIG. 1. The output texture is a vector spatio-temporal blue noise mask. In an embodiment, the output texture can be applied to image data that includes vectors, points on a mesh, or objects with more than three dimensions.

Figure 3:
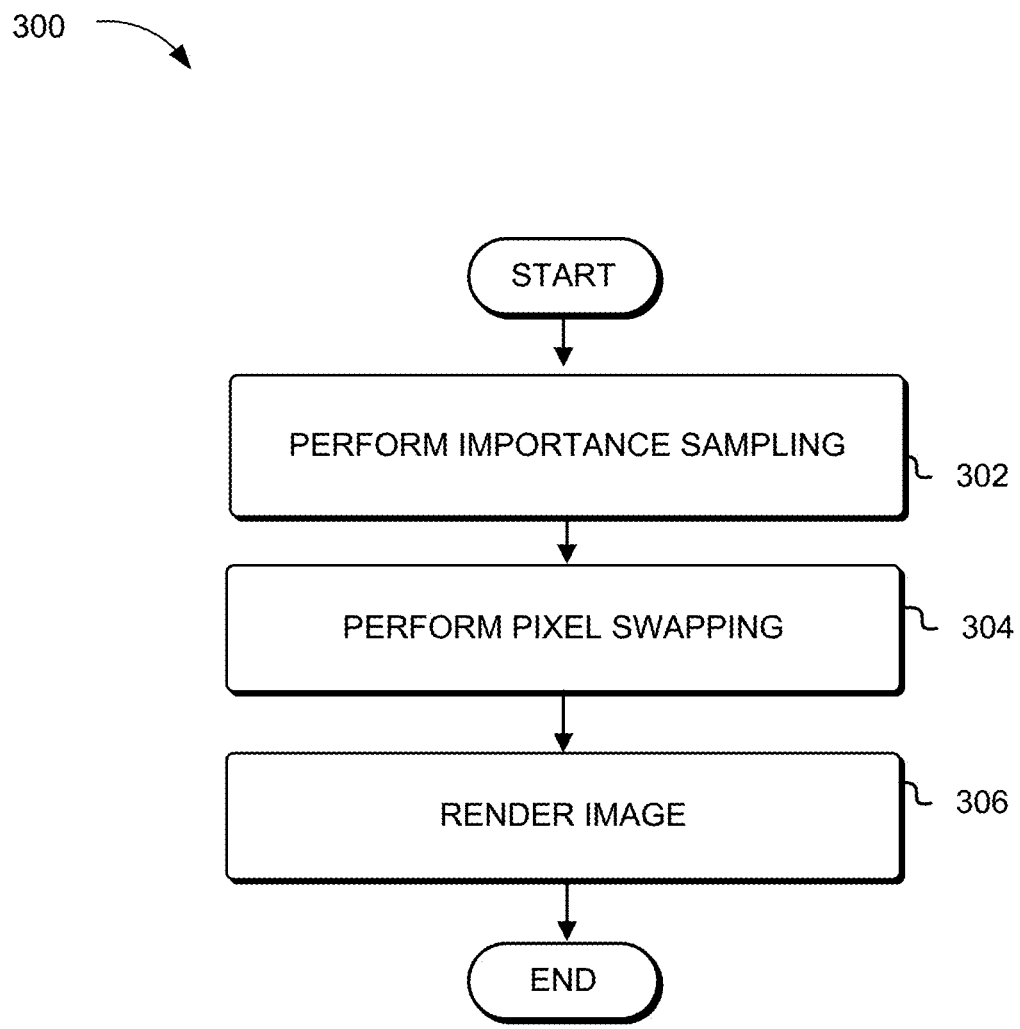
FIG. 3 illustrates a process for generating a blue noise mask including importance sampling, according to at least one embodiment.

FIG. 3 depicts a process 300 for rendering an image (e.g., image function) using importance sampling and a vector spatio-temporal blue noise mask according to an embodiment. In at least one embodiment, importance sampling and vector spatio-temporal blue noise mask generation occur before an image rendering process (e.g., so that a mask is prepared to be applied when an image will be rendered). Process 300 can be performed in combination with process 200 as discussed in conjunction with FIG. 2. One or more circuits or one or more processors can perform part or all of process 300. The process 300 includes the steps of performing importance sampling 302, performing pixel swapping 304, and rendering an image 306. Process 300 uses pixel swapping and modified energy function calculations on a texture that is not initially uniform (e.g., white noise, created with uniform random sampling). Rather, the initial texture is non-uniform (e.g., a texture that has been importance sampled, a texture created with non-uniform random sampling). In an embodiment, spatio-temporal blue noise textures exhibit a non-uniform histogram (e.g., a graphical representation of the intensity of pixels), which allows for importance sampling.

In an embodiment, beginning an image rendering process 302 may be performed to compute for each pixel how much light is reflected toward a virtual camera at a given surface point of an object (e.g., image function). In an embodiment, pixels may correspond to vectors, points on a mesh, or objects with more than three dimensions. Computing all the light reflected toward a virtual camera for each pixel, however, may be too computationally expensive for real-time rendering.

In an embodiment, performing importance sampling 302 determines the directions of light that may best approximate or represent the sum of all light reflected towards a virtual camera. Importance sampling is a type of Monte Carlo integration (e.g., Monte Carlo sampling), which is discussed further, at least in conjunction with FIGS. 4-5, 19, 22, and 25. Importance sampling can be performed in one or more dimensions. In one or more embodiments, importance sampling can be performed in many dimensions by using multi-dimensional integrals and multi-dimensional values. In an embodiment, a probability density function (PDF) is used to produce random values for determining the optimal directions of light during importance sampling. A PDF can provide random scalar or vector values to determine which samples to take during importance sampling. A PDF may be determined in part by knowing from where most light may be reflected off an object to be sampled (e.g., knowing where an object is most reflective). A PDF may contain values for importance sampling that results in an approximate shape of an object (e.g., shape of an image function's output) or that results in determining the approximate location of one or more light sources. In an embodiment, a PDF may include a sample in a low-value region of the PDF (e.g., contributes less light to a pixel) and a sample in a high-value region of the PDF (e.g., contributes more light to a pixel) and weights the samples by multiplying each sample by the inverse of the PDF. In an embodiment, a PDF is associated with each pixel and stored in the alpha channel (e.g., a data component of an image file). In an embodiment, the alpha channel of the textures stores the PDF as a percentage between the minimum and maximum PDF. A PDF may be calculated from a pixel value in a texture, such as by performing a dot product if the importance samples are cosine hemisphere weighted or by dividing a pixel value by a normalization value passed in as a shader constant. Importance sampling may be performed on pixels, wherein each pixel corresponds to a random variable and wherein sampling pixels corresponds to determining a value for a probability density function for a pixel, and wherein the sampling includes reducing a variance of the samples by skewing the samples towards regions of higher energy based on the energy function. In an embodiment, importance sampling may use any combination of techniques including GGX (e.g., distribution of normals of an ellipsoid), bidirectional scattering distribution function (BSDF), bidirectional reflectance distribution function (BRDF), Smith shadow masking, cosine-lobe sampling, or some combination thereof, and as discussed further in conjunction with FIG. 25.

In at least an embodiment, after one or more circuits or one or more processors perform importance sampling operation 302 on an image function (e.g., generating pixel values from regions of higher importance in an image function), one or more circuits or one or more processors perform pixel swapping 304 to ensure or improve blue noise for the pixels generated by the importance sampling. Pixel swapping, including the number of iterations of swapping, is discussed further in conjunction with at least FIGS. 1 and 2. One or more circuits or one or more processors perform pixel swapping in conjunction with a modified BNDS function, also discussed further in conjunction with at least FIGS. 1 and 2.

Once the pixel swapping operation 304 is concluded and produces a vector spatio-temporal blue-noise texture, an image is rendered 306. In an embodiment, when an image is rendered, an image is presented on a display. In at least one embodiment, an image render 306 occurs after importance sampling 302 and after pixel swapping 304, wherein one or more circuits perform importance sampling and pixel swaps to provide a blue noise mask that is importance sampled and then the one or more circuits use that mask to render an image. The image render 306 can occur for multi-dimensional pixels such as vectors (e.g., 2D, 3D, 4D, and the like). The result may be a multi-dimensional photo-realistic image of an image function that represents a multi-dimensional object.

In at least one embodiment, one or more circuits uses process 200 and/or 300 to receive a texture including pixels (e.g., a white noise texture); computing a texture energy value for the texture based on an energy function (e.g., using Equation (1)), wherein the energy function is based on a distance between a pair of pixels, a first configurable parameter and a second configurable parameter, and wherein a pixel energy value for each pixel in the pair of pixels is a non-zero value as a result of the pair of pixels being in a same two-dimensional layer or the pair of pixels having identical coordinates at different temporal slices); swap positions of pixels from pairs of pixels in the texture until the energy value of the texture reaches a minimum energy value based on the energy function (e.g., according to Equation (1)); generate an output texture including output pixels based on the texture with minimum energy value to be applied to image data; and rendering an output image over multiple frames based on applying the texture to the one or more images (e.g., applying the output texture to a video game scene to render frames and images as part of a video game).

FIG. 4 depicts representations of vector-valued spatio-temporal blue noise textures in a table according to an embodiment. The types of representations depicted in FIG. 4 can be the result of a combination of some or all techniques discussed in conjunction with at least FIGS. 1-3. Pixel-swapping using an adjusted energy function from the BNDS algorithm has been applied to a 128×128×64 texture, and slices of those textures as well as their discrete Fourier transforms (DFTs) (e.g., representations of frequency and their components) are depicted in Table 1. DFTs are discussed further in conjunction with at least FIGS. 4 and 6. In an embodiment, DFTs are averaged to show expected frequency spectra except for golden ratio animated blue noise, which highlights two ways it damages spatial frequencies at specific frame numbers. In an embodiment, it is desirable to get blue noise properties in each spatial 2D slice, so as to provide an improved noise sequence than white noise sequence along the time axis. Row XY[0] displays the vector-valued spatio-temporal blue noise texture slices of a one-dimensional vector (Vec1), its unit vector (Unit Vec1), a two-dimensional vector (Vec2), its unit vector (Unit Vec2), a three-dimensional vector (Vec3), and its unit vector (Unit Vec 3). The texture slices depicted in Row XY[0] show blue noise. The types of representations shown in Row XY[0] can be considered as blue noise storing of different dimensional vectors. Row DFT(XY) displays the DFTs in a two-dimensional layer of the corresponding vector-valued spatio-temporal blue noise texture slices shown in row XY[0]. The DFTs depicted in DFT(XY) show lower magnitudes of high frequency (e.g., energy) and higher magnitudes of low frequency, which indicate blue noise. Row DFT(XZ) displays the DFTs of a texture along the z-axis (e.g., time axis) corresponding with the texture slices shown in Row XY[0]. The DFTs depicted in row DFT(XZ) show blue noise over time, with low frequencies showing a higher magnitude. The DFTs of Table 1 were calculated per color channel. The types of representations of blue noise textures shown in Table 1 can be applied to various types and sizes of vectors and can be considered blue noise storing of different dimensional vectors and their DFTs.

FIG. 5 depicts representations of importance-sampled vector spatio-temporal blue noise textures in Table 2 according to an embodiment. The types of representations depicted in FIG. 4 can be the result of a combination of some or all techniques discussed in conjunction with at least FIGS. 1-4. Importance-sampled vector spatio-temporal blue noise textures may also be known as importance-sampled vector-valued spatio-temporal blue noise textures. The first row (Cosine Weighted Hemisphere Unit Vec3) of Table 2 depicts a slice of an importance-sampled vector-valued spatio-temporal texture (in column Texture[0]) including three-dimensional vectors and its corresponding DFTs (DFT(XY) and DFT (ZY)) along different axes. The blue noise texture in the first row is based on an importance-sampled texture of a hemisphere unit, wherein the importance sampling included cosine weighted sampling. In an embodiment, importance sampling may be applied to a texture already adjusted to exhibit blue noise. In an embodiment, importance sampling may be applied to a texture before being adjusted to exhibit blue noise. The texture slice in the first row of Table 2 as well as its corresponding DFTs exhibit blue noise, with the DFTs showing higher magnitudes of low frequencies through space and time.

The second row (HDR Skybox Importance Sampled Unit Vec3) of Table 2 depicts a slice of an importance-sample vector-valued spatio-temporal texture (in column Texture [0]) including three-dimensional vectors and its corresponding DFTs (DFT(XY) and DFT (ZY)) along different axes. The blue noise texture in the second row is based on an importance-sampled texture of a high-dynamic-range skybox (HDR Skybox) (e.g., representations of a virtual environment stored as a cuboid). The texture slice in the second row of Table 2 as well as its corresponding DFTs exhibit blue noise, with the DFTs showing higher magnitudes of low frequencies through space and time.

Figure 6A:
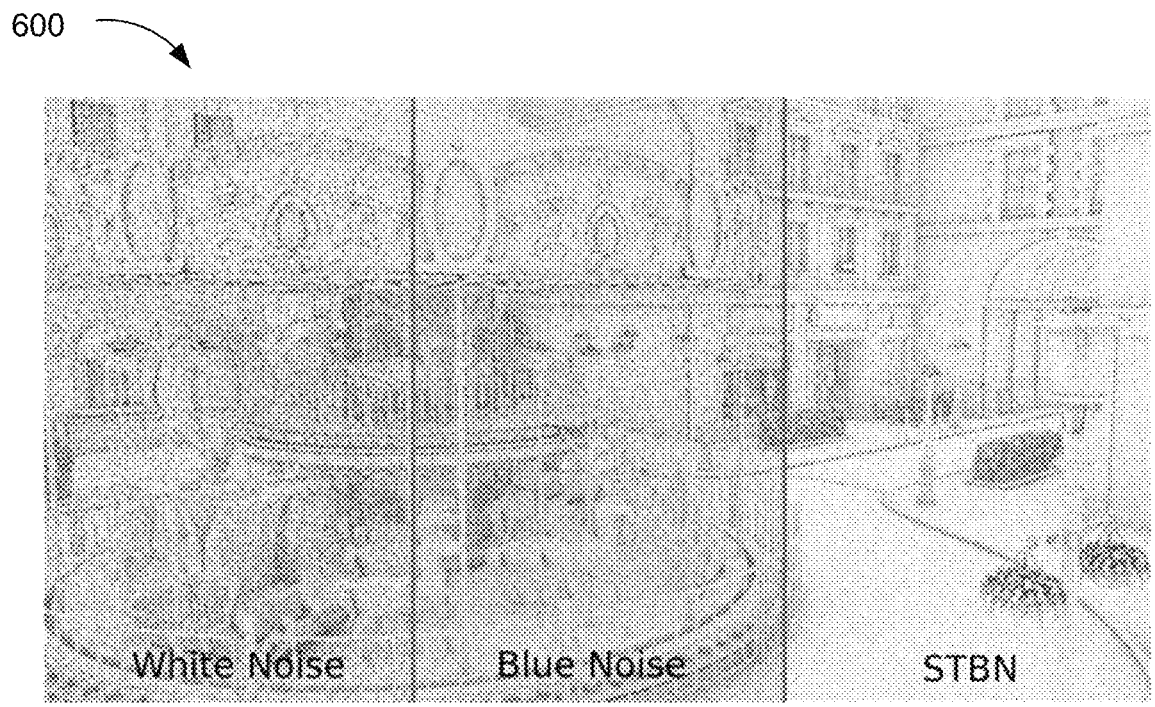
FIG. 6A illustrates ambient occlusion used in conjunction with various noise masks, according to an embodiment.

FIG. 6A depicts images resulting from rendering ambient occlusion effects in a three-dimensional scene using three different types of noise textures according to an embodiment. The images depicted in FIGS. 6A and 6B can be the result of a combination of some or all techniques discussed in in conjunction with at least FIGS. 1-5. In an embodiment, ambient occlusion is a shading a rendering technique used to calculate how much light is reflected from each point when exposed to ambient lighting and which is discussed further below. For the three images depicted in in FIG. 6A, four samples were taken per pixel as part of a uniform-sampled ambient occlusion process, and three different texture sampling techniques were used, one for each image—white noise, blue noise, and spatio-temporal blue noise (STBN). In an embodiment, the spatio-temporal blue noise is vector-valued. Of the three images, the image using white noise produced the worst discernible detail for the scene while the image using STBN produced the best discernible detail for the scene.

Figure 6B:
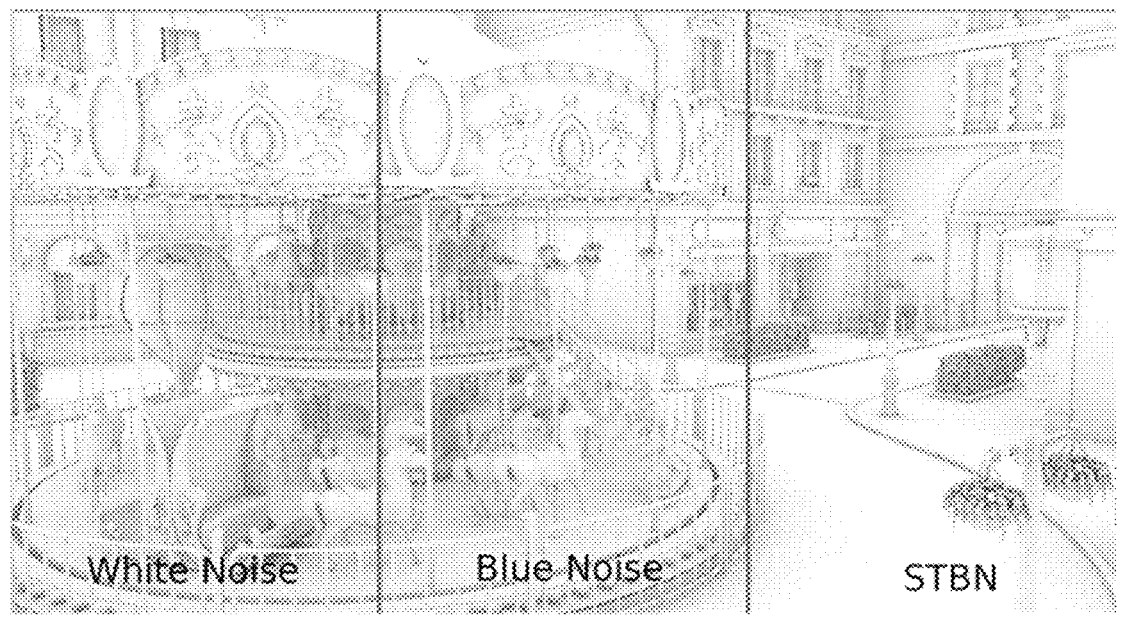
FIG. 6B illustrates ambient occlusion with importance sampling used in conjunction with various noise masks, according to an embodiment.

FIG. 6B depicts images resulting from rendering ambient occlusion effects in a three-dimensional scene using three different types of noise textures as well as importance sampling according to an embodiment. In an embodiment, the spatio-temporal blue noise is vector-valued. For the three images depicted in FIG. 6B, four samples were taken per pixel as part of a uniform-sampled ambient occlusion process while cosine weighted hemisphere importance sampled unit vectors were used (e.g., the more important angles from which to sample are determined, in part by an angle represented by a cosine value). In an embodiment, blue noise and STBN textures have cosine weighted hemispherical vectors stored in their textures which are transformed into a tangent space using a TBN (tangent, bitangent, normal) basis matrix. Of the three images, the image using white noise produced the worst discernible detail for the scene while the image using STBN produced the best discernible detail for the scene.

Figure 7A:
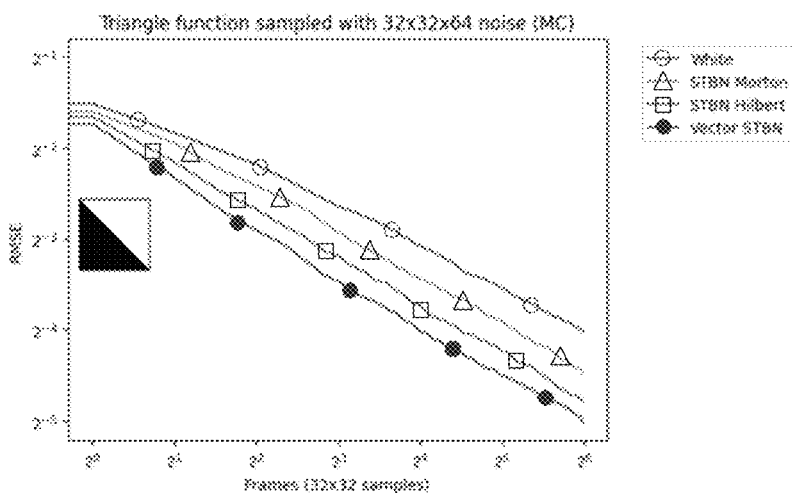
FIG. 7A illustrates the performance of various noise masks including scalar noise masks transformed into vector noise masks, according to an embodiment.
Figure 7B:
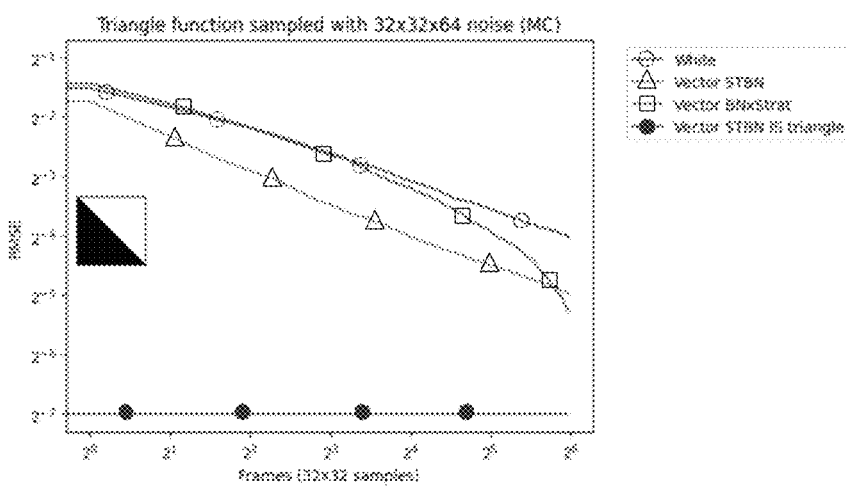
FIG. 7B illustrates the performance of various noise masks including a stratified noise mask, according to an embodiment.
Figure 7C:
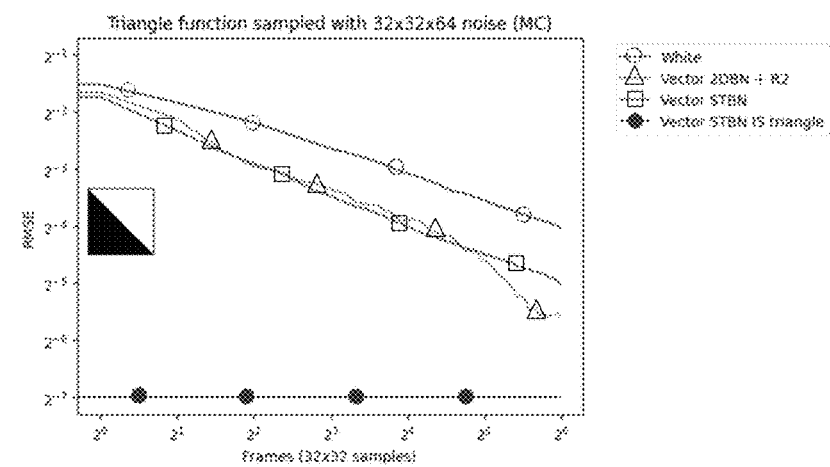
FIG. 7C illustrates the performance of various noise masks including a noise mask with multiple values per pixel, according to an embodiment.

FIG. 7A depicts the performance (e.g., convergence) of various noise masks including a vector spatio-temporal blue noise mask according to an embodiment. As illustrated in FIGS. 7A-7C, an x-axis has frames, a y-axis has root mean square error (RMSE), white noise is represented by open circles, STBN Morton represented by a triangles, STBN Hilbert is represented by squares, and Vector STBN is represented by solid circles. The type of results depicted in FIGS. 7A-C can be the result of a combination of some or all techniques discussed in conjunction with at least FIGS. 1-6A and 6B. In an embodiment, a scalar blue noise mask can be transformed into a vector blue noise mask by inputting scalar values into a space-filling curve function (e.g., a Morton curve, a Hilbert curve) to output pixel values that are vectors (e.g., curve inversion). Applying curve inversion to scalar blue noise masks results in vector-valued masks that retain the same properties as the scalar blue noise masks. Curve inversion can be used with other types of dither masks or other scalar-valued (e.g., grey-scale) noise patterns such as Bayer matrices, interleaved gradient noise, and stylized noise patterns. FIG. 7A is a graph (e.g., convergence graph) depicting a root mean square error (RMSE) (e.g., amount of error a noise mask produces during image rendering) of various noise textures sized 32×32×64, all of which sample a triangle function. The triangle function is sampled with two-dimensional frames sized 32×32. As depicted in the graph, RMSE decreases with an increase in frames sampled. In an embodiment, and as depicted in the graph, a vector spatio-temporal blue noise texture transformed from a scalar noise texture with a Hilbert curve performs better than a scalar noise texture transformed by a Hilbert curve. Neither the STBN produced by a Morton curve or Hilbert curve outperformed the vector spatio-temporal blue noise mask produced by using the BNDS algorithm and modified energy function as discussed further in conjunction with at least FIG. 1.

FIG. 7B depicts the performance (e.g., convergence) of various noise masks including several vector-valued blue-noise masks according to an embodiment. One noise mask is a blue noise mask stratified over time (Vector BN×Strat). Stratification of a texture is discussed further in conjunction with at least FIG. 8. In an embodiment, a noise mask is created by using the pixel swapping as discussed further in conjunction with at least FIG. 1, but the energy function of the BNDS algorithm is modified so that a non-zero value is returned if the two pixels share the same z coordinate (e.g., are located on the same two-dimensional slice of a texture) and a swap between those two pixels does not worsen the stratification of the texture along the z axis. The graph of FIG. 7B, which is similar to the graph discussed in conjunction with FIG. 7, shows that the performance of a noise mask that is blue over space and stratified over time (Vector BN×Strat) performs well once all samples have been taken.

FIG. 7C illustrates a graph showing the performance (e.g., convergence) of various noise masks include a vector spatio-temporal blue noise mask that contains multiple values per pixel. In some cases, having more than one spatio-temporal blue noise value per pixel is desired, such as when rendering multiple samples per pixel. Adding more than one value per pixel can be done by reading a noise texture's pixels and adding a fixed offset value (e.g., a fixed coordinate value in the x-direction, a fixed coordinate value in the y-direction) to yield a new pixel in a new location.

In an embodiment, creating more than one spatio-temporal blue noise value per pixel can be achieved by adding a rank-1 lattice (e.g., a set of points in N dimensional space with a periodic structure, a low discrepancy sequence) to each pixel. In an embodiment, applying a rank-1 lattice to each pixel of a scalar blue noise mask with a path length of the golden ratio value or square root of two achieves optimal results. The graph of FIG. 7C shows that a two-dimensional blue noise mask with an addition of a rank 1 lattice (Vector 2DBN+R2) can perform better, albeit more erratically, than a uniform spatio-temporal blue noise mask.

Figure 8:
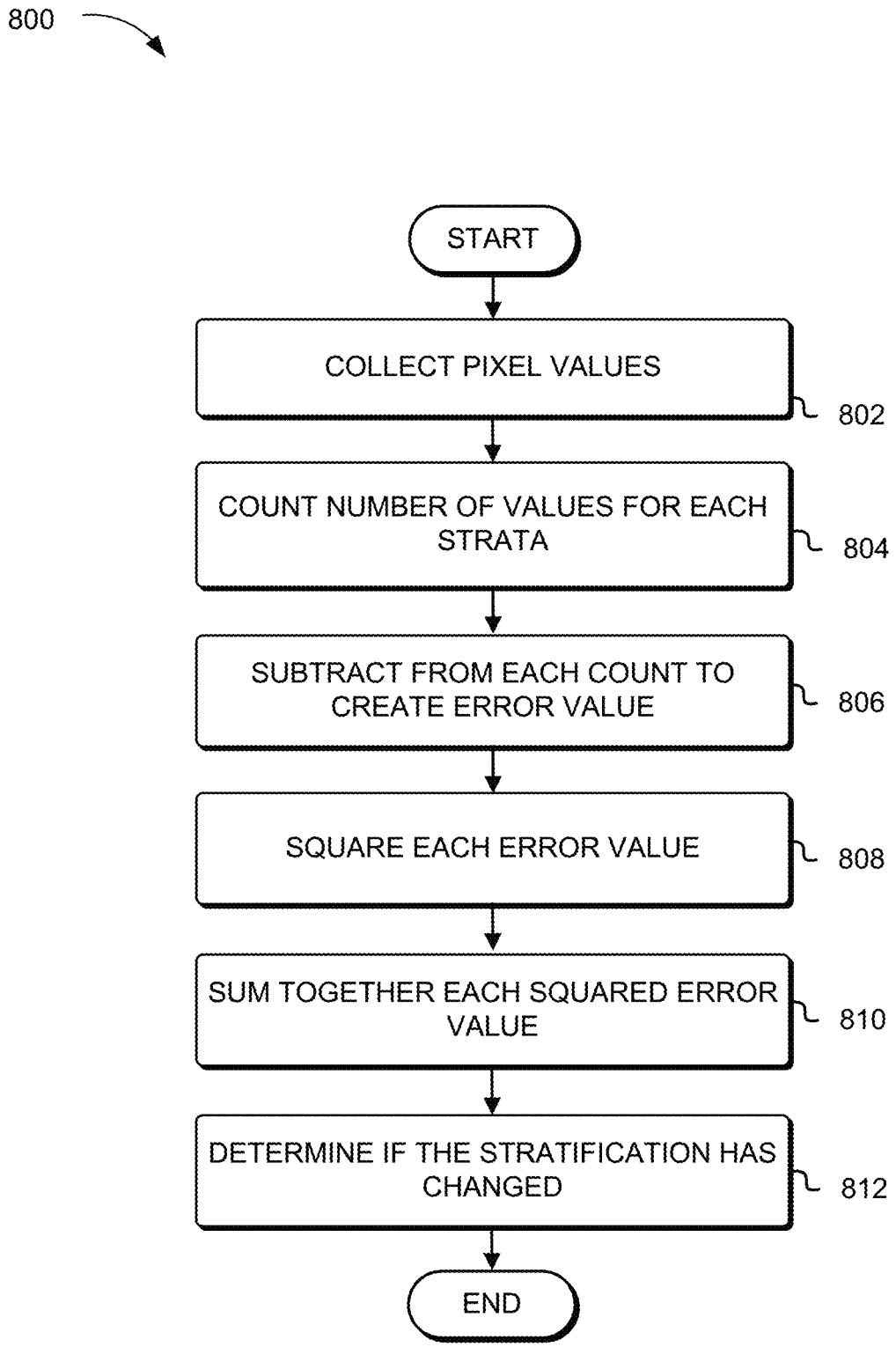
FIG. 8 illustrates a process for analyzing temporal stratification of a noise mask, according to an embodiment.

FIG. 8 depicts a process 800 for determining whether a swap of pixels between strata in should be kept according to an embodiment. Process 800 can be combined with any of the techniques discussed in conjunction with at least FIGS. 1-5, 6A-B, and 7A-C. Process 800 includes a collecting (e.g., gathering) pixel values 802 for pixels located on the same x-y coordinate of each strata of a texture, which are stratifications of a texture along the z-axis.

In step 804, the number of values collected during step 802 is counted. In an embodiment, the ideal number of values collected within each strata is 1. In at least an embodiment, stratification works best when each pixel at a two-dimensional location is located within one stratum if stratification is done over time.

In step 806, the number of values counted in each stratum is subtracted by a number. In an embodiment, if the ideal number of values in each stratum is 1, then the number to be subtracted is 1 and the result of the subtraction is a value that helps determine if a pixel swap between strata should be kept as discussed further in the following steps. In an embodiment, the value resulting from the subtraction is called an error value.

In step 808, each error value is squared. The squaring operation, at least in part, accounts for strata that contain no pixel values when determining whether a pixel swap should be kept in as part of steps 810 and 812 below. In an embodiment, if a stratum contains no pixel value, the error value would be −1 and squaring that value counts towards the sum operation performed in step 810.

In step 810, the squared error values are summed together to create a total error value for the fit of the stratification performed on the texture as it relates to a pixel. In an embodiment, the sum of the squared error values is associated with the number of times a stratum contained more than one pixel value or no pixel value at all.

In step 812, the total error value for a stratification as it relates to a pixel is compared to the total error value for a stratification prior to a pixel swap. In an embodiment, if the total error value has increased following a pixel swap, the stratification has worsened, and the pixel swap is rejected. If the total error value has decreased following a pixel swap, the stratification has improved (e.g., changed). If the total error value remains the same following a pixel swap, the stratification has neither improved or worsened and the swap may be accepted to avoid the computational step or steps of reversing a pixel swap.

In the following discussions made in conjunction with FIG. 9A and the figures that follow can be applied to vector spatio-temporal blue noise masks as disclosed herein and more generally, to other types of spatio-temporal blue noise masks, including scalar spatio-temporal blue noise masks generated, at least in part, by a modified void and cluster algorithm.

Figure 9A:
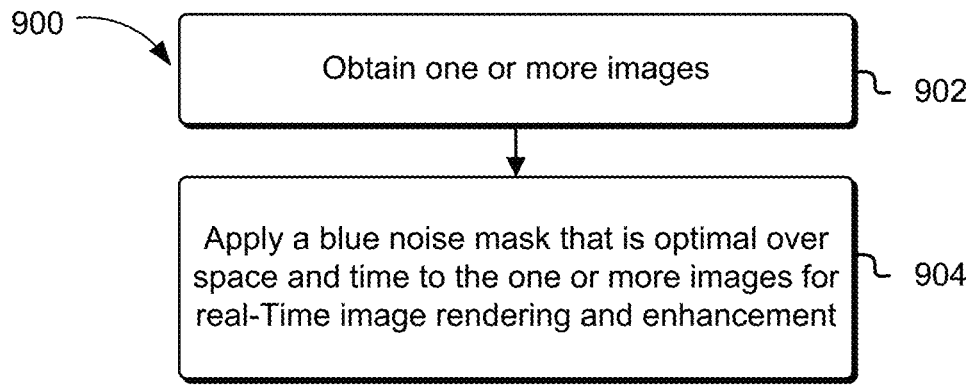
FIG. 9A illustrates an example of a process for a framework to generate blue noise masks optimal for use over both space and time, according to at least one embodiment.

FIG. 9A illustrates an example of a process 900 for a framework to generate blue noise masks optimal for use over both space and time, according to at least one embodiment. In at least one embodiment, some or all of process 900 (or any other processes described herein, including those discussed in conjunction with the BNDS algorithm, importance sampling, lattices, and stratification, or variations and/or combinations thereof) is performed under control of one or more computer systems (e.g., computing devices) configured with computer-executable instructions and is implemented as code (e.g., computer-executable instructions, one or more computer programs, or one or more applications, Compute Unified Device Architecture (CUDA) code)) executing collectively on one or more processors, by hardware, software, or combinations thereof. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 900 are not stored solely using transitory signals (e.g., a propagating transient electric or electromagnetic transmission).

In at least one embodiment, a non-transitory computer-readable medium does not necessarily include non-transitory data storage circuitry (e.g., buffers, caches, and queues) within transceivers of transitory signals. In at least one embodiment, process 900 is performed at least in part on a computer system such as those described elsewhere in this disclosure. In at least one embodiment, process 900 is performed by one or more circuits to calculate motion of one or more pixels in a first region of an image based, at least in part, on motion of one or more pixels in a second region of the image that overlaps the first region.

In at least one embodiment, a system performing at least a part of process 900 includes executable code to generate blue noise masks that are both optimal over space and time (e.g., spatio-temporal blue noise masks). A spatio-temporal blue noise mask may be generated as a set of N blue noise textures where each texture individually has good blue noise (e.g., containing high amounts of higher frequencies and low amounts of lower frequencies) and each pixel individually is also blue noise over time. This may provide the desired qualities of compromising on neither the space axes nor the time axis. In an embodiment, one or more images are obtained 902 from a computing device, a camera, or the like. In an embodiment, the one or more images may be a part of a gaming application where real-time image rendering algorithms are used to display images while the gaming application is being executed by a computing device. The computing device may comprise one or more graphic cards that uses deep learning to upscale lower-resolution images to a higher resolution for display on computing screens. In an example embodiment, a spatio-temporal blue noise mask of $64^3$ (64×64×64) resolution is created. In addition, a $64^3$ 3D blue noise mask and 64 independent 2D blue noise masks of size $64^2$ may also be created. In an embodiment, a spatio-temporal mask is also created by using a single 2D blue noise mask and adding the golden ratio to it each frame for 63 frames to make 64 different masks. In an embodiment, one or more processors of the computing device executes instructions to apply the spatio-temporal blue noise masks to the one or more obtained images for real-time image rendering 904.

In an embodiment, one or more computing devices execute an algorithm that generates a blue noise mask M of dimension $[d_0, d_1, \ldots, d_n]$, the algorithm may require storage per pixel to store a Boolean logic specifying whether the pixel is activated (emits energy to the energy field), and an integer index specifying the order that this pixel was activated in. The ordering that a pixel was activated may define the final output color for that pixel, where the first pixel to be activated is black, and the last pixel to be activated is white.

Figure 9B:
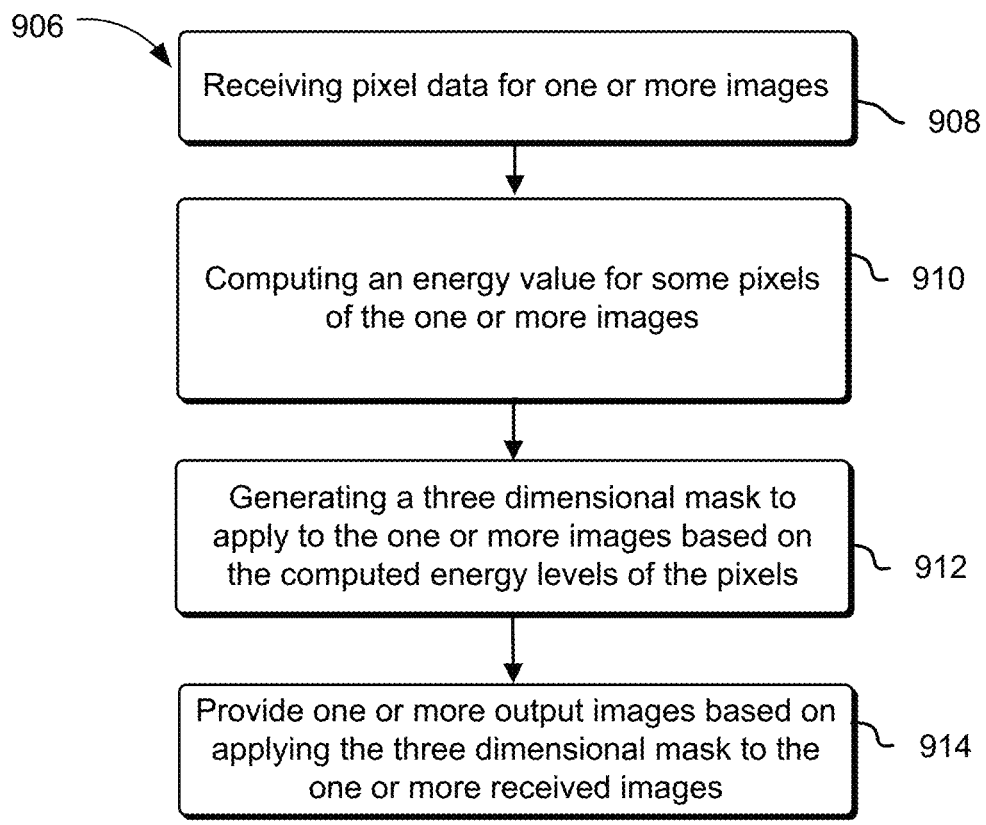
FIG. 9B illustrates an example of a process for a framework to generate a three-dimensional mask for use over both space and time, according to at least one embodiment.

In some instances, multiple two-dimensional blue noise masks may be used for high quality in the spatial domains; however, each pixel individually may also need to have a high-quality sampling sequence over time. As a result, in an embodiment, one or more computing devices may execute one or more algorithms to generate a three-dimensional blue noise mask. In an embodiment, the BNDS algorithm may be reformulated such that it is driven by a novel energy function, as shown in Equation 1 above. In an embodiment, instead of executing that formulation in two dimensions, it is performed in three dimensions and the energy function is constrained in two ways. The energy may be non-zero if the two pixels in the energy function are in the same two-dimensional layer or if the two pixels have the same (x,y)-coordinates. The first condition ensures that each two-dimensional layer may have blue noise properties, and the second condition guarantees that each pixel may have blue noise properties over time. Without the first condition, each pixel would be blue noise on the time axis but would be independent of each other and be white noise over space. Without the second condition, each z plane slice would be independent, and the result would be white noise along the time axis. Without the constraint that one of these conditions must be met, the result would be three-dimensional blue noise which is not well distributed on either the space or time axis (spatio-temporally) but is instead well distributed in a 3D volume. In an embodiment, a pixel in the three-dimensional spatio-temporal blue noise texture is denoted as $p=(p_{xy},p_z)=(p_x,p_y,p_z)$. FIG. 9B illustrates an example of a process 906 for a framework to generate a three-dimensional mask for use over both space and time, wherein two dimensions correspond to space (e.g., x and y coordinates) and one dimension corresponds to time. While a three-dimensional mask can be generated, an N-dimensional mask can also be generated as explained in receiving operation 908. In at least one embodiment, process 906 is integrated into process 900. In at least one embodiment, some, or all of process 906 (or any other processes described herein, or variations and/or combinations thereof) is performed under control of one or more computer systems configured with computer-executable instructions and is implemented as code (e.g., computer-executable instructions, one or more computer programs, or one or more applications, CUDA code) executing collectively on one or more processors, by hardware, software, or combinations thereof. In at least one embodiment, a system comprising a memory storing instructions, which when executed by one or more processors, cause the system to perform instructions to perform process 906. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 906 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 906 is performed at least in part on a computer system such as those described elsewhere in this disclosure. In at least one embodiment, process 906 starts with receive operation 908 and continues to compute operation 910.

At receive operation 908, a system or computing device receives pixel data with three dimensions corresponding to one or more images. In one embodiment, the system or computing device receives the pixel data based on sampling one or more images from obtaining the one or more images in step 902 from process 900. In an embodiment, the system or computer device receives the pixel data from another device or another process (e.g., from an application running on another device). Receiving pixel data can include receiving N dimensions of data for the pixels. For example, receiving pixel data can include receiving spatial pixel data (e.g., x and y coordinates) and time data, where the spatial data corresponds to two dimensions and the time data corresponds to a time dimension for each pixel.

At compute operation 910, a system or computing device performing process 906 computes an energy value for some pixels of the one or more images received in the receive operation 908. In at least one embodiment, energy value for a pixel can be computed according to Equation 1. In at least one embodiment, an energy value corresponds to an intensity value, where an intensity value indicates the intensity of a pixel, e.g., how much a pixel stands out relative to other pixels (e.g., when it is activated). As shown in Equation 1, the energy value is based on coordinates of the at least some pixels (e.g., pixel p and q), a distance between the at least some pixels (e.g., pixel p and q), an energy falloff parameter, and a Gaussian space. When determining a distance between the at least some pixels, a distance between a pair of pixels can be used. In an embodiment, when determining a distance between the at least some pixels, multiple pairs of pixels can be determined (e.g., pixel p and q, where q can be any neighboring pixel for p). When determining an energy value for a pixel, a distance between pixels can be computed toroidally. In one embodiment, an energy value is computed for every pixel. In one embodiment, a system or computing device computes an energy value for some of the pixels based on determining the relevant processing portions for an image.

With a modified Equation 1, there are generally two constraints to determine an energy value, e.g., the energy value may be non-zero if the two pixels in the energy function are in the same two dimensional layer or if the two pixels have the same (x,y) coordinates. The first condition ensures that each two dimensional layer may have blue noise properties, and the second condition guarantees that each pixel may have blue noise properties over time. If a computed pixel energy does not meet these two constraints, the system or computing device can set the energy value to zero. For example, the system or computing device can set the energy value of a pixel in at least some pixels to a zero value if the pixel and another pixel are not in a same two-dimensional layer or do not have identical coordinates (e.g., at different temporal slices).

To generate a three-dimensional mask, in mask operation 912, a system or computing device generates the mask based on the computed energy values from compute operation 910. Generating the three-dimensional mask can be part of another digital image processing algorithm such as the BNDS algorithm, void and cluster algorithm, dithering, or error-diffusion, where image processing algorithms use an energy function and corresponding energy values of the pixel data as determined in the compute operation 910. In an embodiment, because the mask operation 912 considers energy according to Equation 1, the generated mask results in a blue noise mask that provides optimal visual results for human perception, e.g., as part of a video game, video, or other digital video process. The three-dimensional mask can be considered a blue noise vector spatio temporal mask.

At provide operation 914, a system or computing device provides one or more output images based on applying the three-dimensional mask from mask operation 912 to the one or more images, a sample version of the one or more images, or a processed version of the one or more images. In an embodiment, the one or more output images may be a part of a gaming application where real-time image rendering algorithms are used to display images while the gaming application is being executed by a computing device. For example, rendering the output image can be part of an image generation pipeline that includes ray tracing or path tracing. In an embodiment, one or more processors of the computing device executes instructions to apply the three-dimensional mask to the one or more images for real time image rendering.

Process 906 can be integrated with other image processing techniques. In an embodiment, process 906 can be integrated into sampling as part of a processing images in motion and temporal filtering methods such as temporal anti-aliasing (TAA) and deep learning super sampling (DLSS). As part of DLSS, process 906 can include applying a temporal image upscaling to the one or more images, wherein the upscaling is based on a neural network inferring upscaling from a lower resolution image. In at least one embodiment, a spatial-temporal mask is applied before, after, or both before and after image processing related to TAA and DLSS.

Also, process 906 can be integrated into dithering, stochastic transparency, area light sampling, volumetric rendering, path tracing, and/or stochastic alpha image processing techniques. Also, the operations of process 906 can be repeated (e.g., for multiple images) or performed in a different order as part of another digital image processing algorithm. For example, process 906 can be performed as part of a sampling algorithm.

In at least one embodiment, process 900 and processor 906 can be applied to video or video game content. A video or video game comprises a sequence of images (e.g., frames) that can be displayed at a frequency (e.g., frame rate), where a single video frame is an image. Also, a video frame refers to video information, whereas an audio frame refers to audio information, and a video frame can be synchronized with or processed separately from an audio frame.

Figure 10:
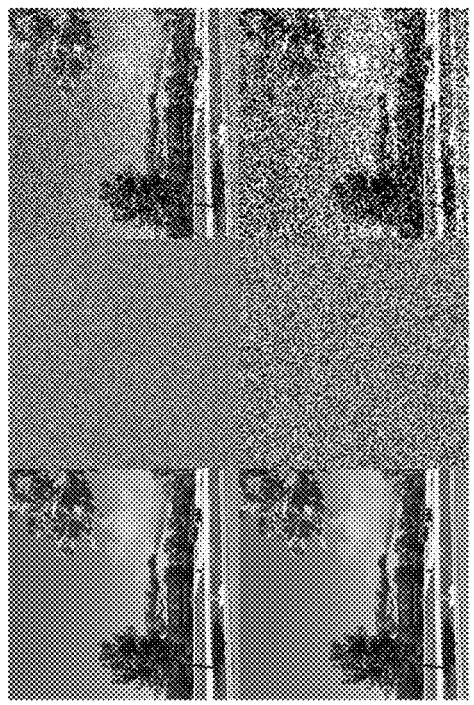
FIG. 10 illustrates exemplary images using blue noise masks optimal for use over both space and time, according to at least one embodiment.
Figure 10:
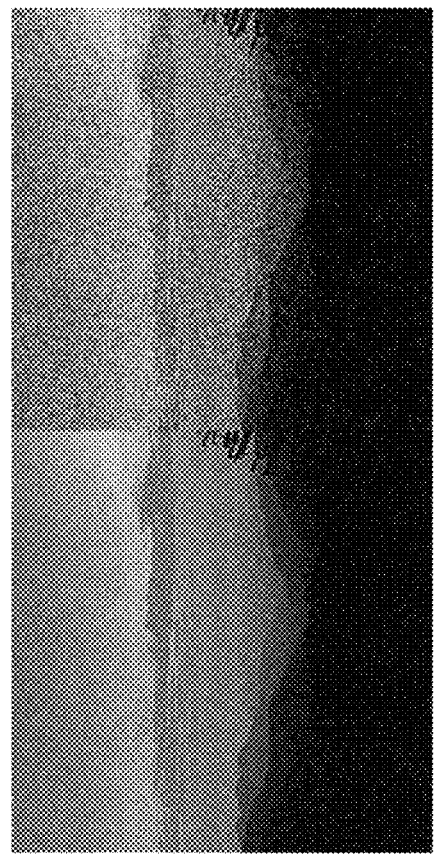

FIG. 10 illustrates exemplary images using blue noise masks optimal for use over both space and time, according to at least one embodiment. In an embodiment, blue noise masks provide systems a way to hide noise and error. This is useful in real time rendering where computing resources are limited to cause the noise to go away completely, which is the motivation for denoising. Although blue noise masks do not create less noise and error than that of white noise, it does arrange it in a way that is more visually pleasing, more difficult to notice, and is also easier to de-noise. For example, a three-dimensional vector blue noise mask can correspond to red, green, and blue (RGB) components of a pixel, and the mask can be applied to an image to produce an output image that has blue noise. There are multiple uses of blue noise in both rasterization and raytracing. As shown in FIG. 10, on the top, blue noise and white noise are used to stipple a greyscale image to black and white. The top blue noise is much less noisy and looks a lot more like the source image, despite having the same amount of error as the white noise image below it. On the bottom, the two noises are used to dither a color image before it's quantized to being one bit per color channel. Both images may contain 8 colors: red, green, blue, yellow, cyan, purple, black, and white, and have the same amount of error from the source image, but the blue noise version on the top has better image quality.

The stippling case may be evident in raytracing and shooting less than one ray per pixel. The black dots could be seen as pixels when selected to shoot rays for and choosing white or blue noise would give the same sorts of results in that 3D render. The dithering case happens when encoding data in buffers. Being able to use a single bit per color channel instead of the usual 8 bits per color channel means 3 bits are used for a color instead of 24, which means the data could be represented using only 12% of the previous number of bits.

Figure 11:
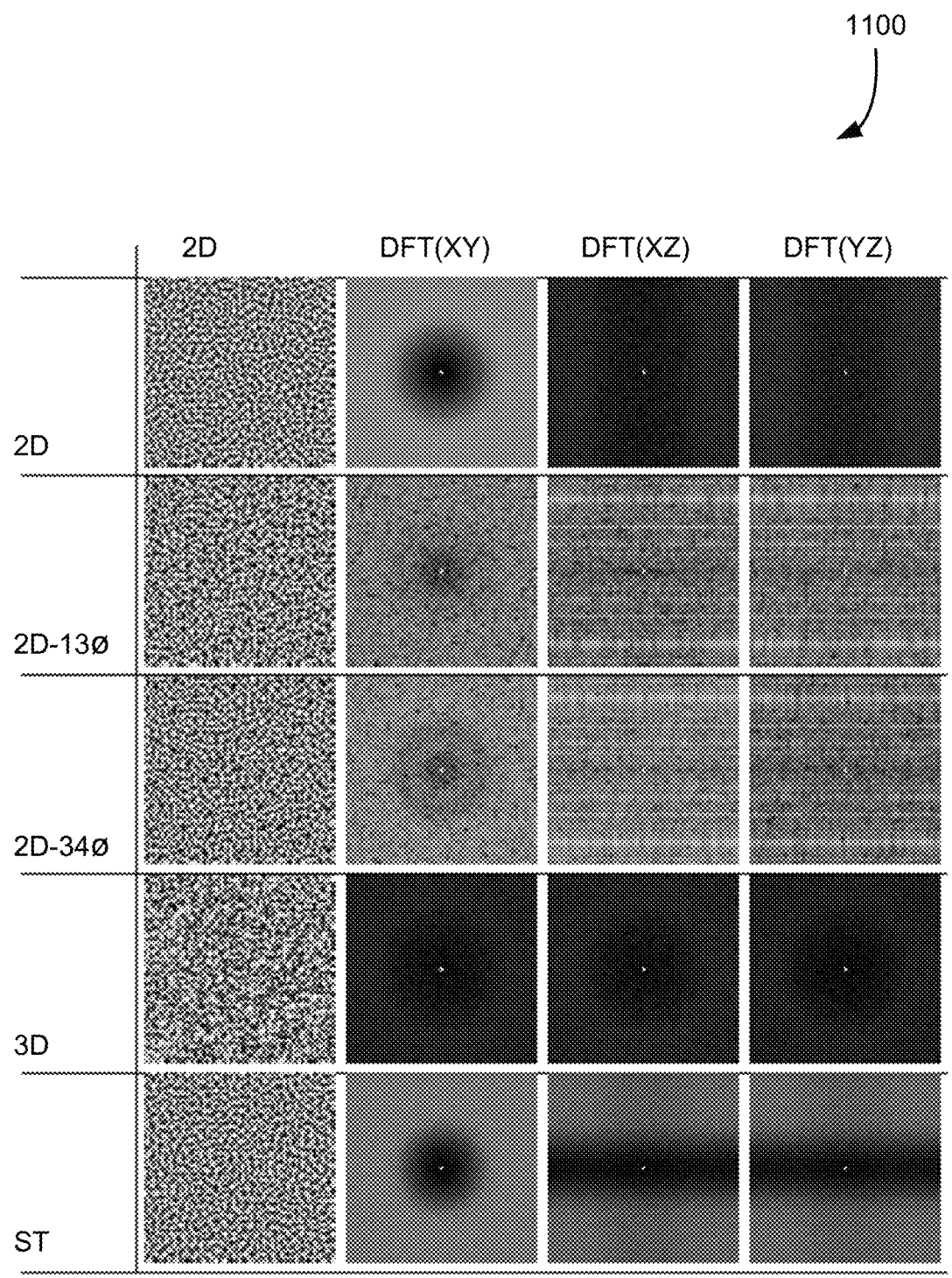
FIG. 11 illustrates comparative frequency results generated using Fourier analysis on the three types of blue noise masks mentioned above in FIG. 3, according to at least one embodiment.
Figure 12A:
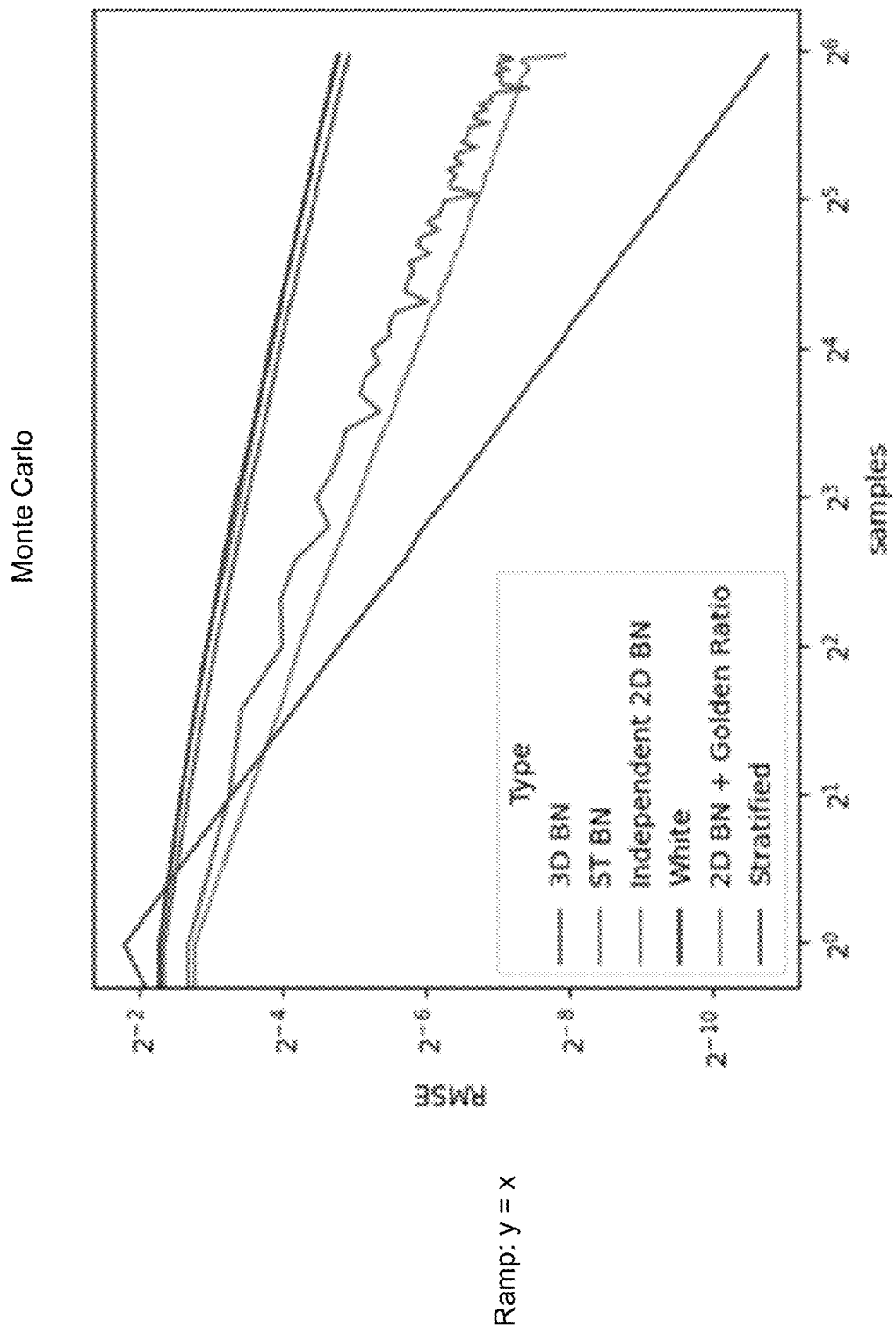
FIGS. 12A, 12B, 12C, 12D, 12E, 12F, 12G, 12H, 12I, 12J, 12K, and 12L illustrate convergence rates for 1D functions, according to at least one embodiment.
Figure 12B:
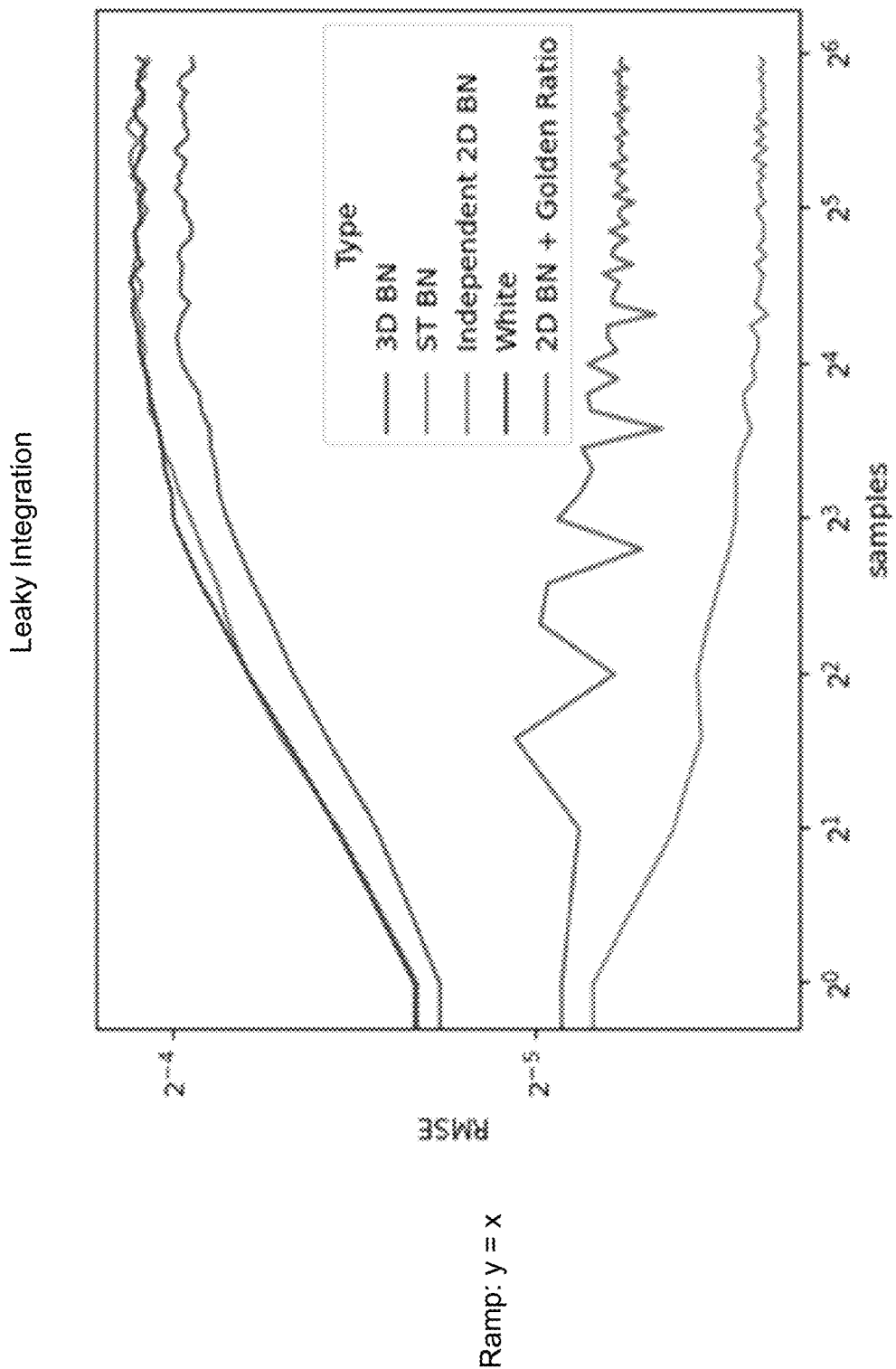
Figure 12C:
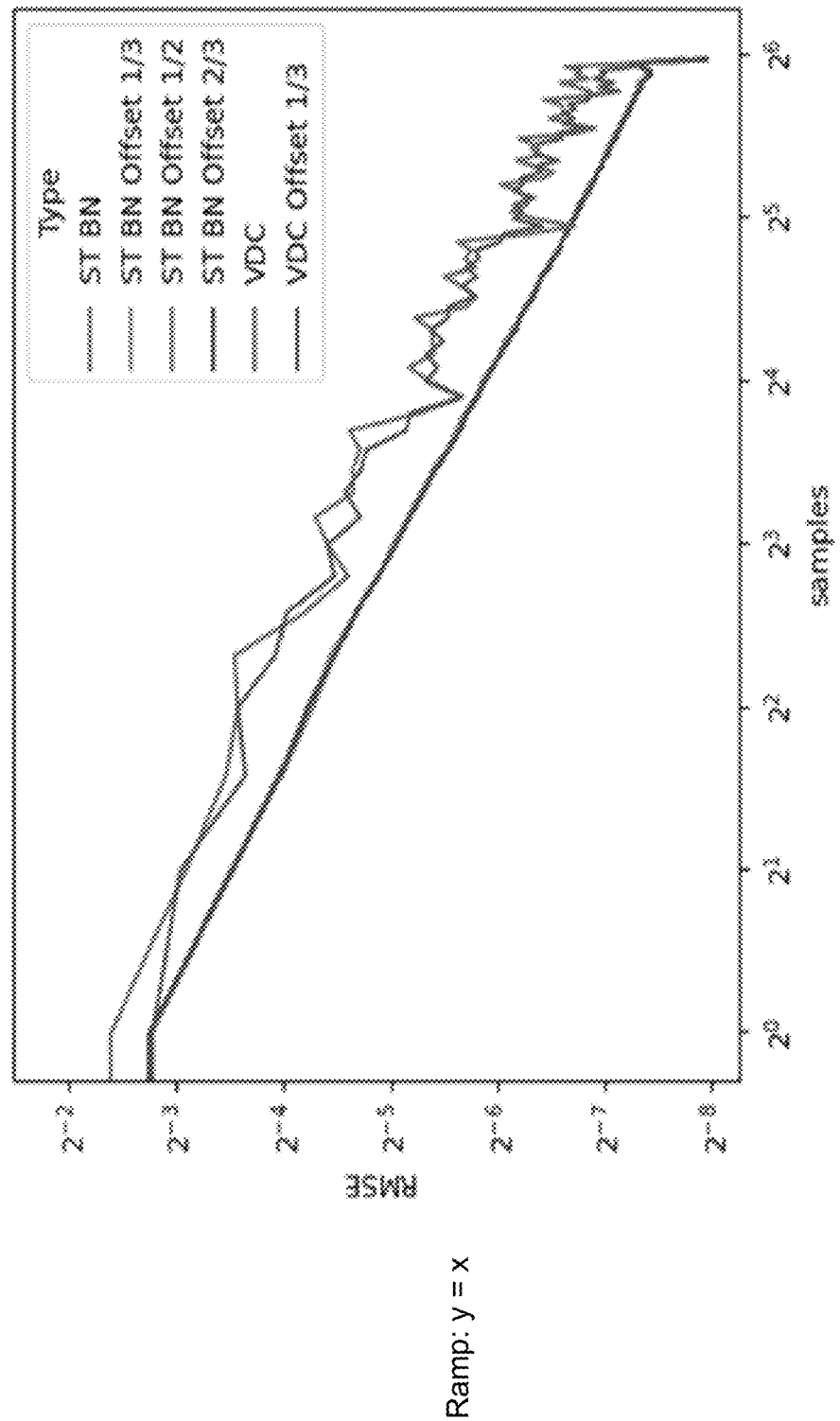
Figure 12D:
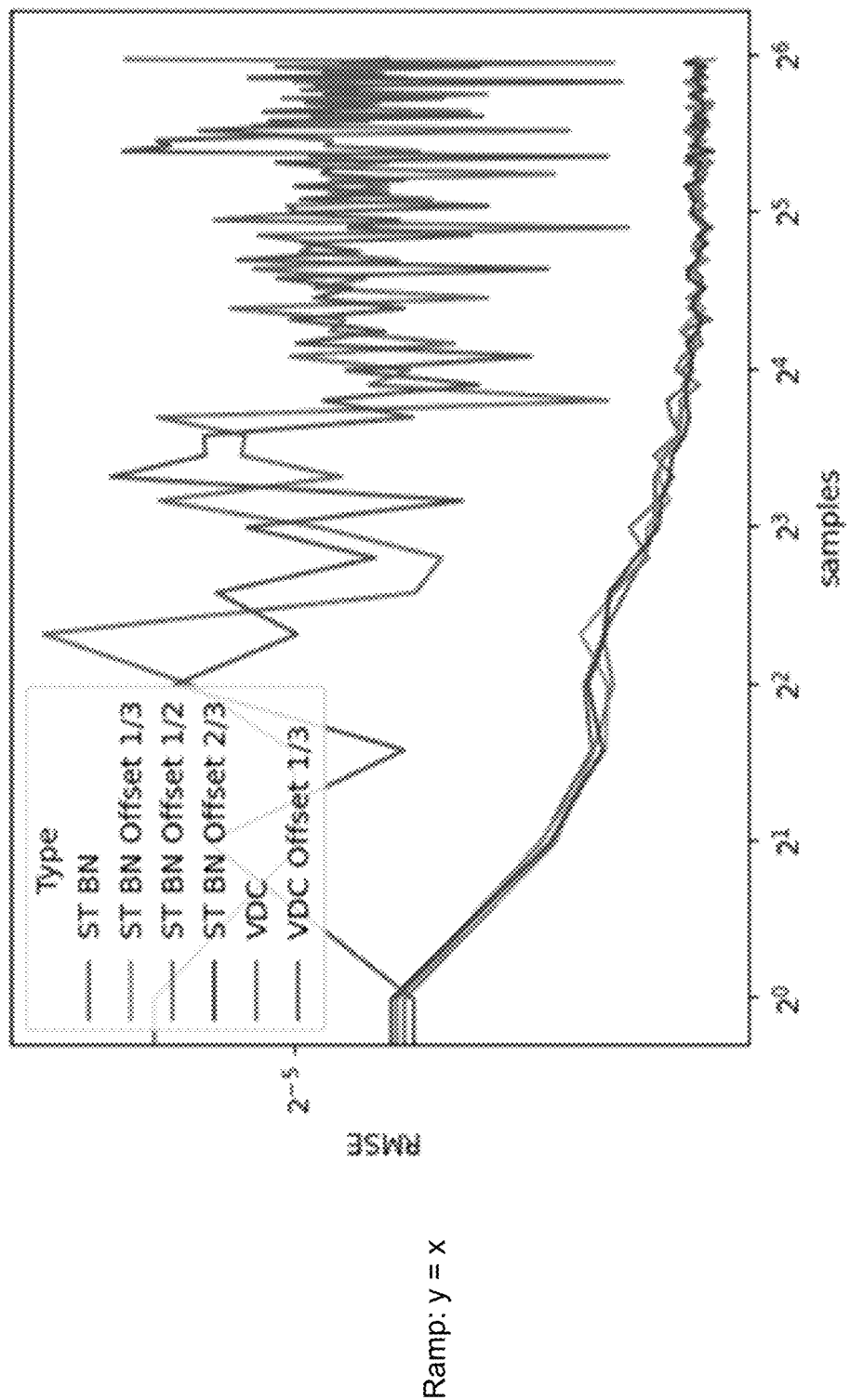
Figure 12E:
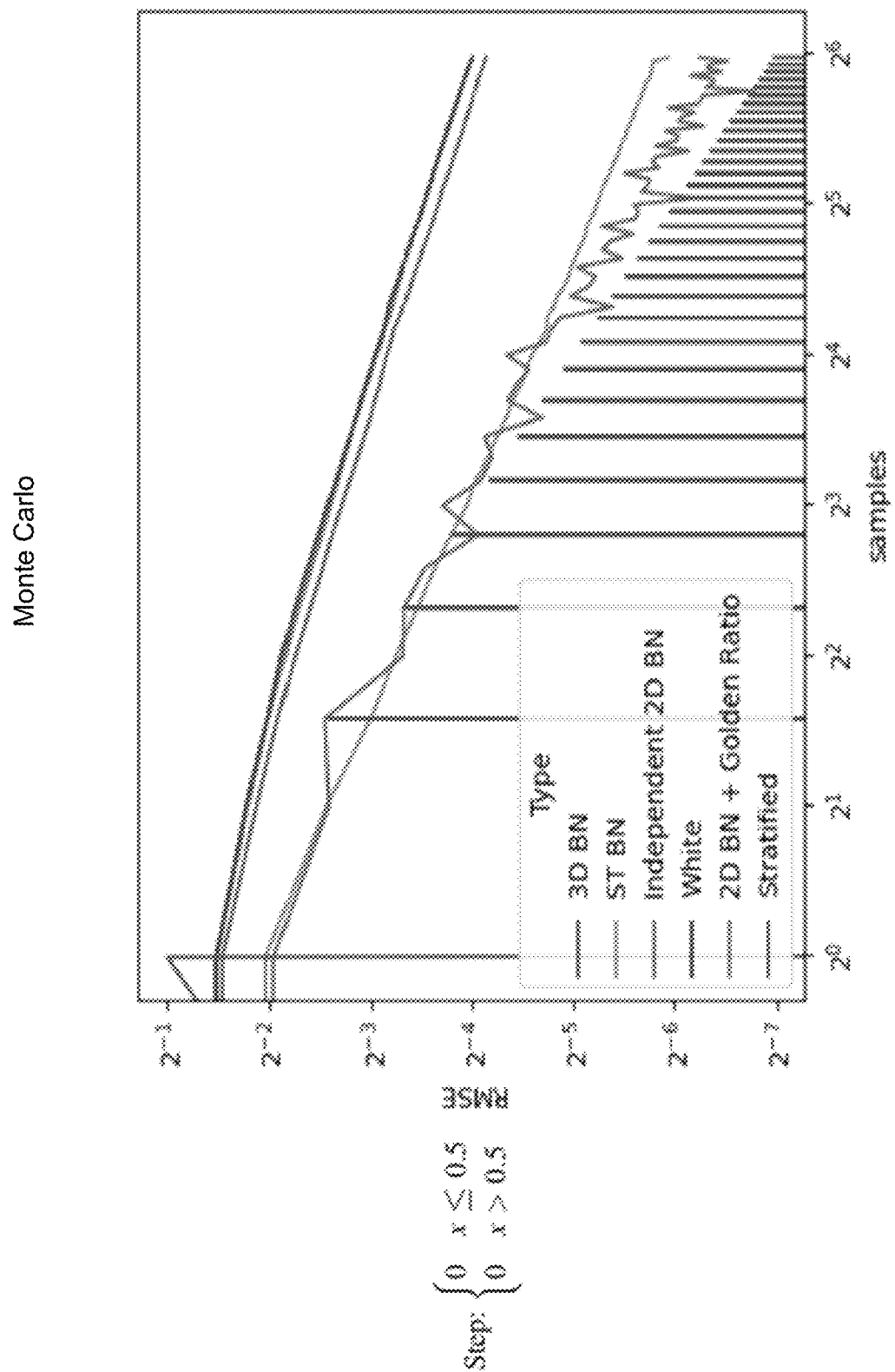
Figure 12F:
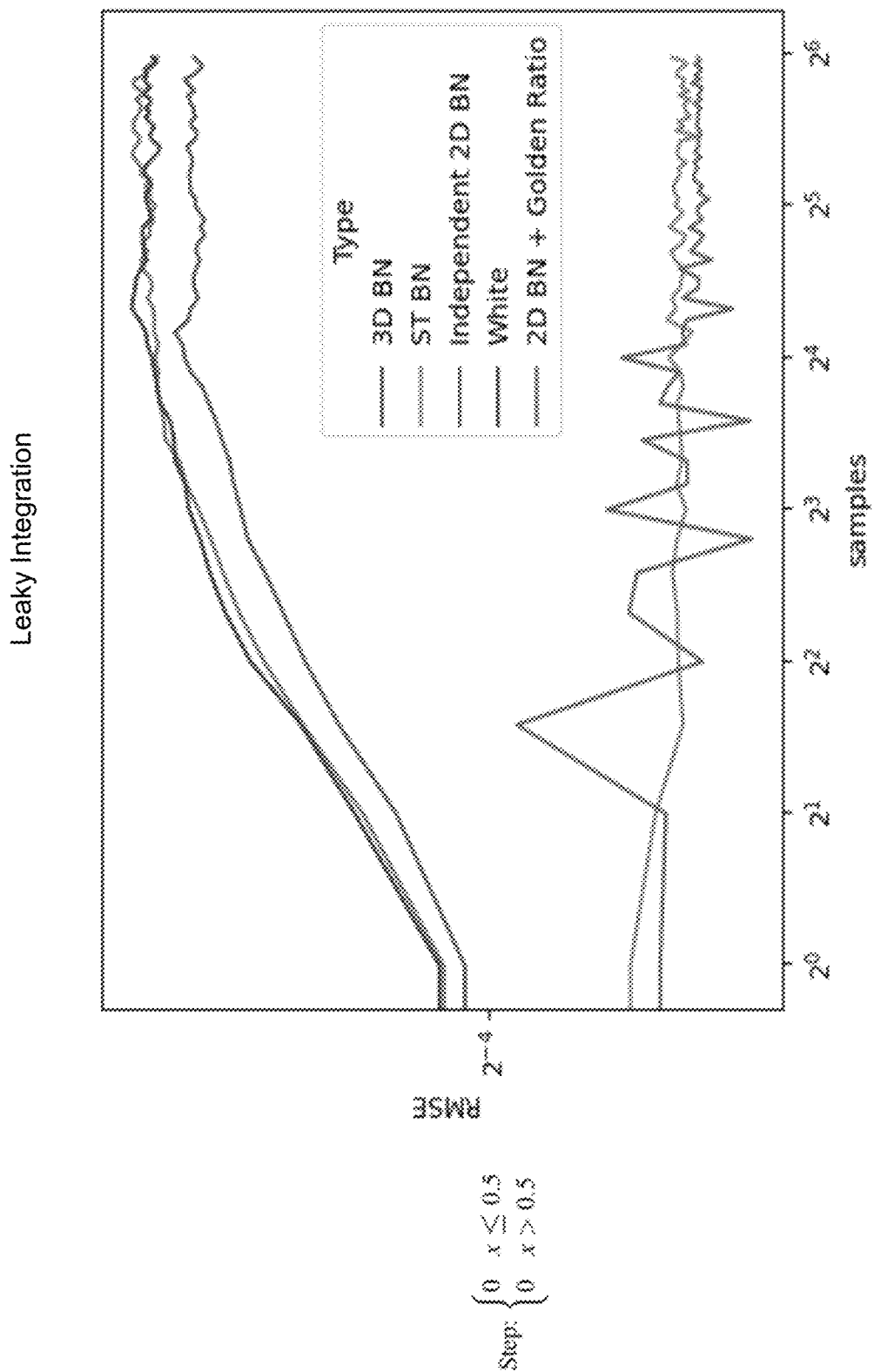
Figure 12G:
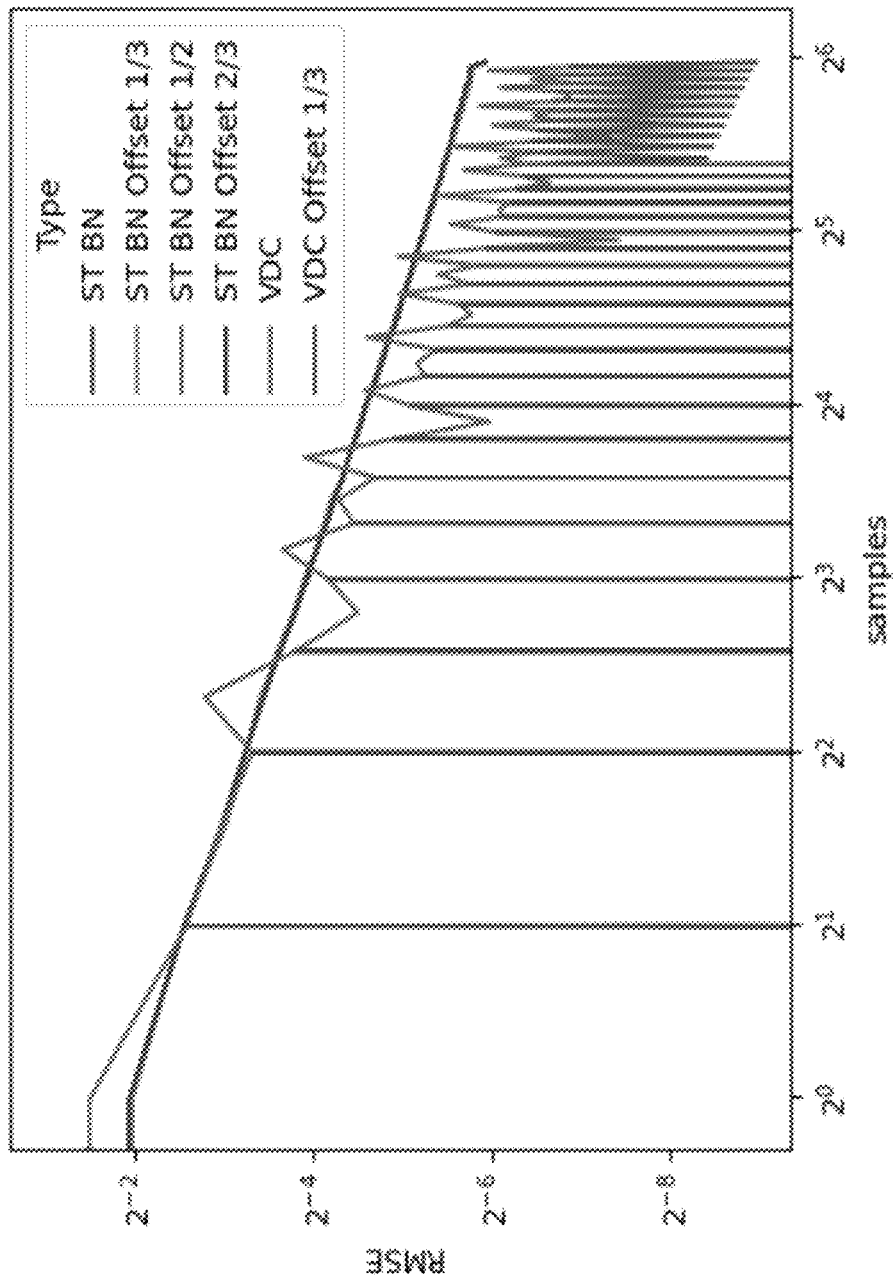
Figure 12H:
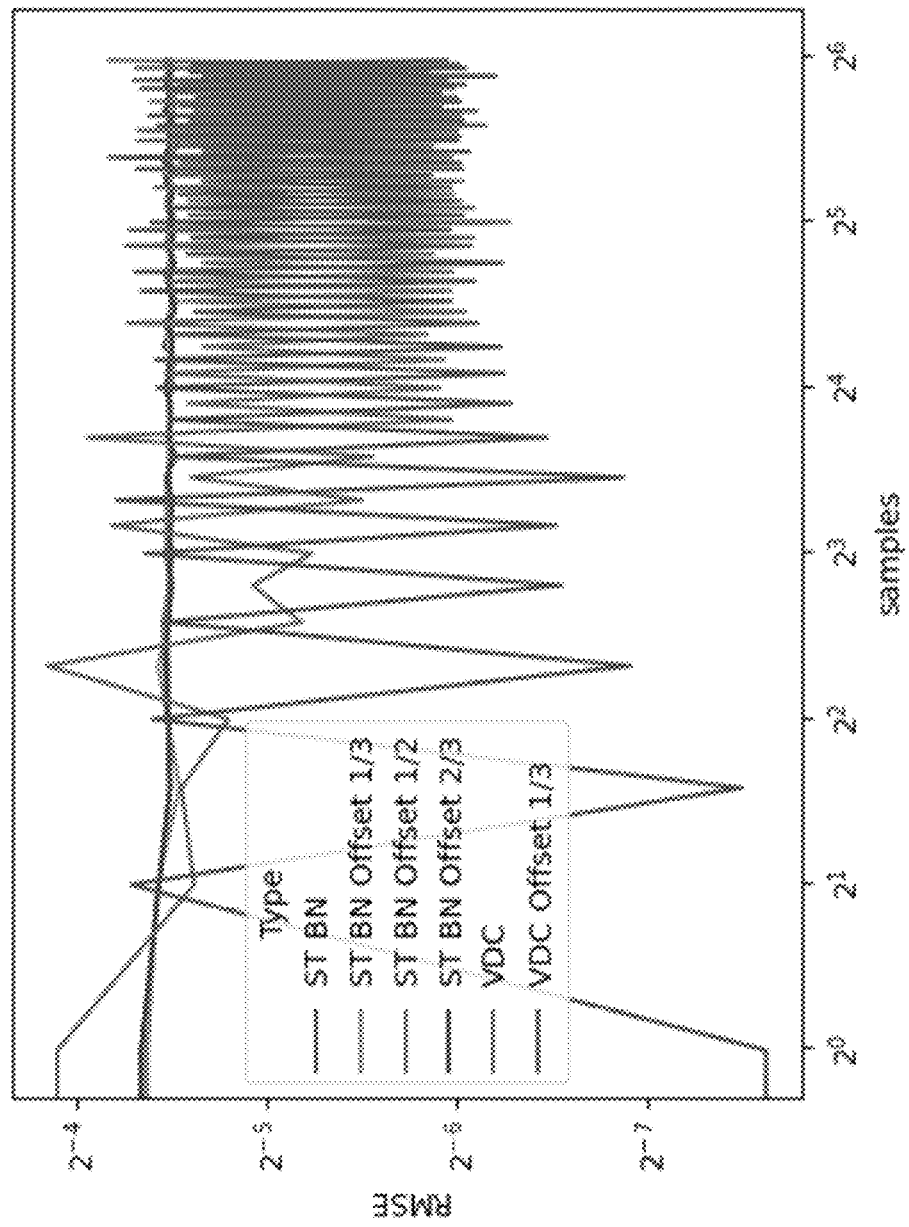
Figure 12I:
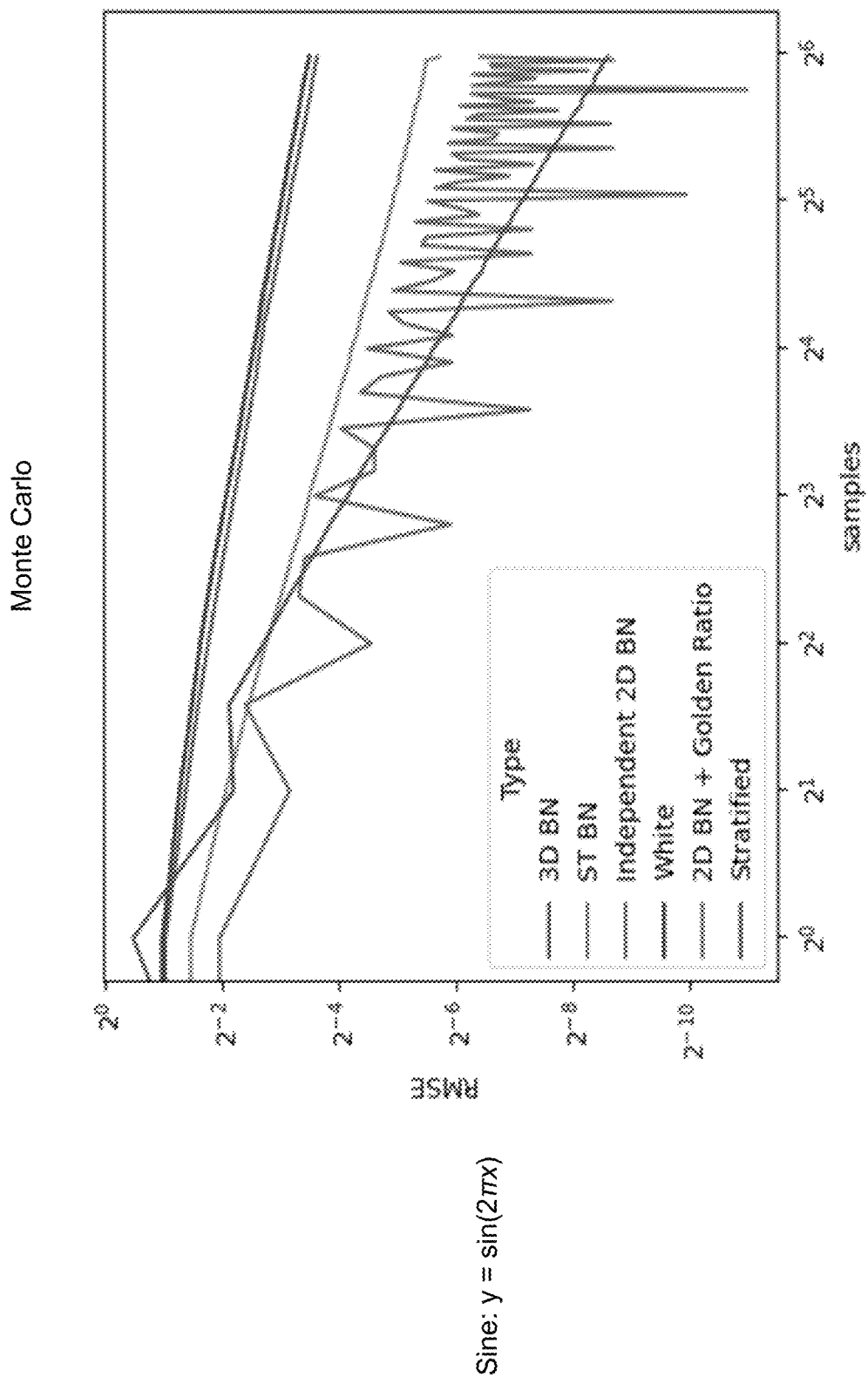
Figure 12J:
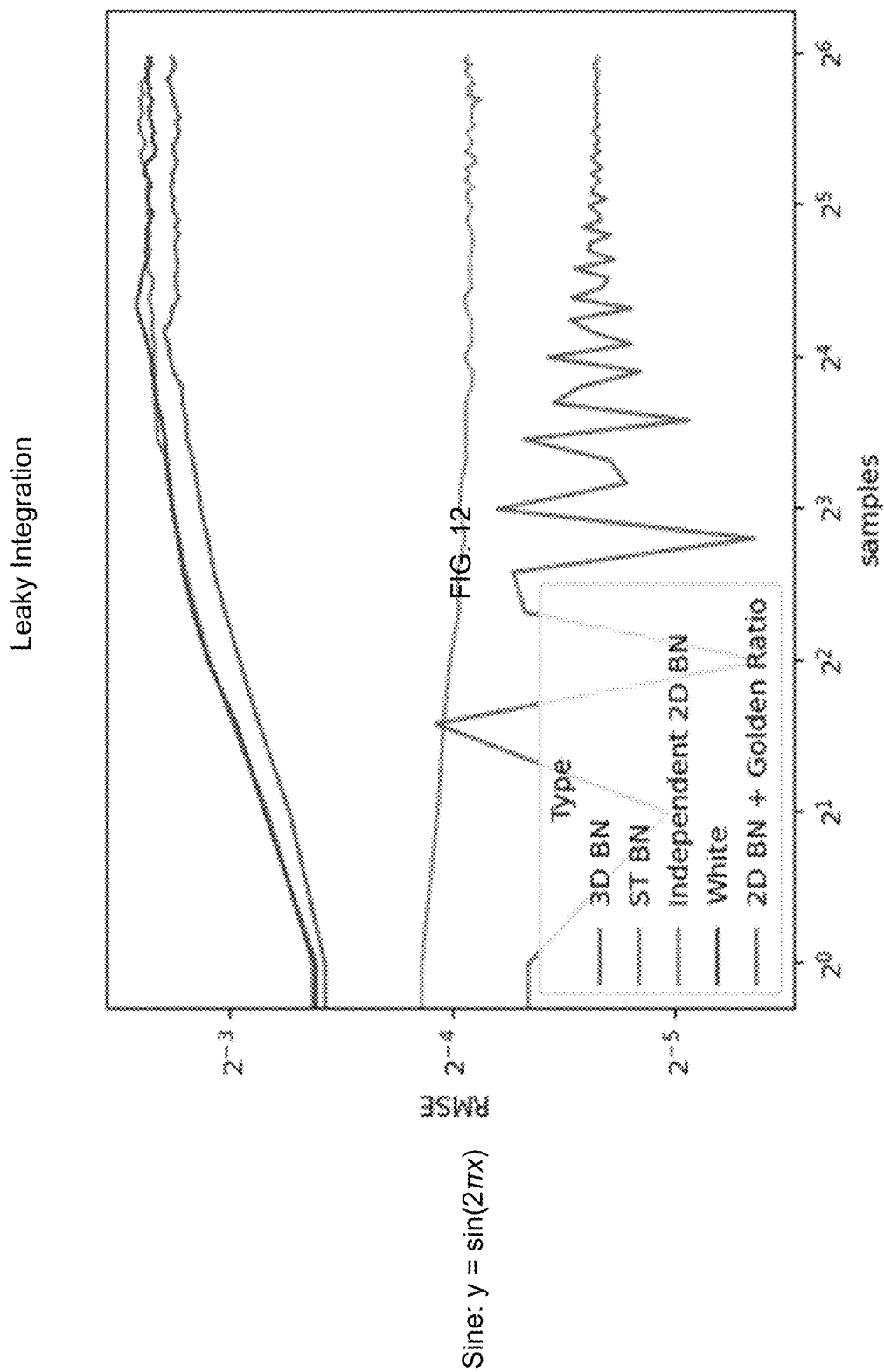
Figure 12K:
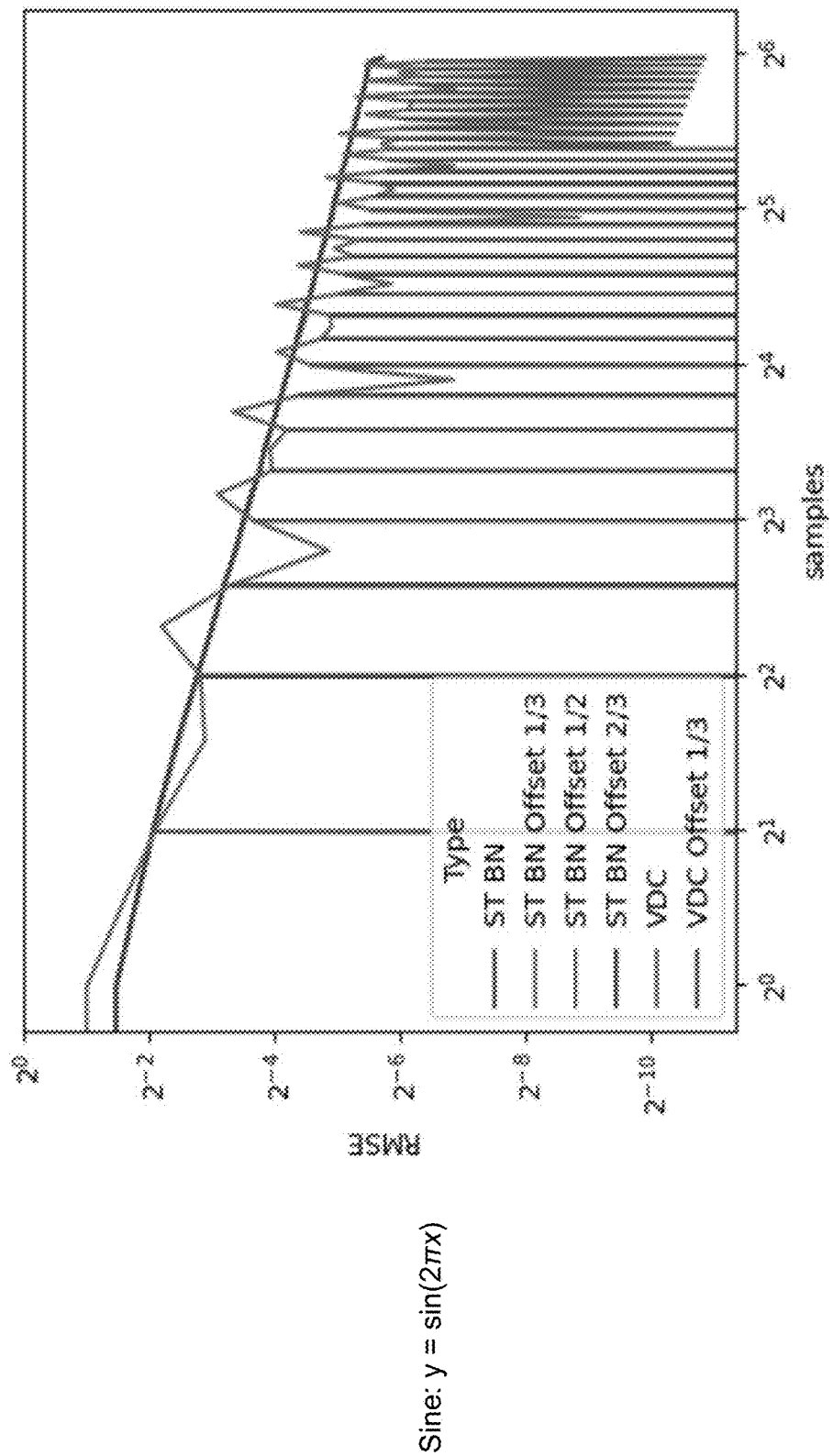
Figure 12L:
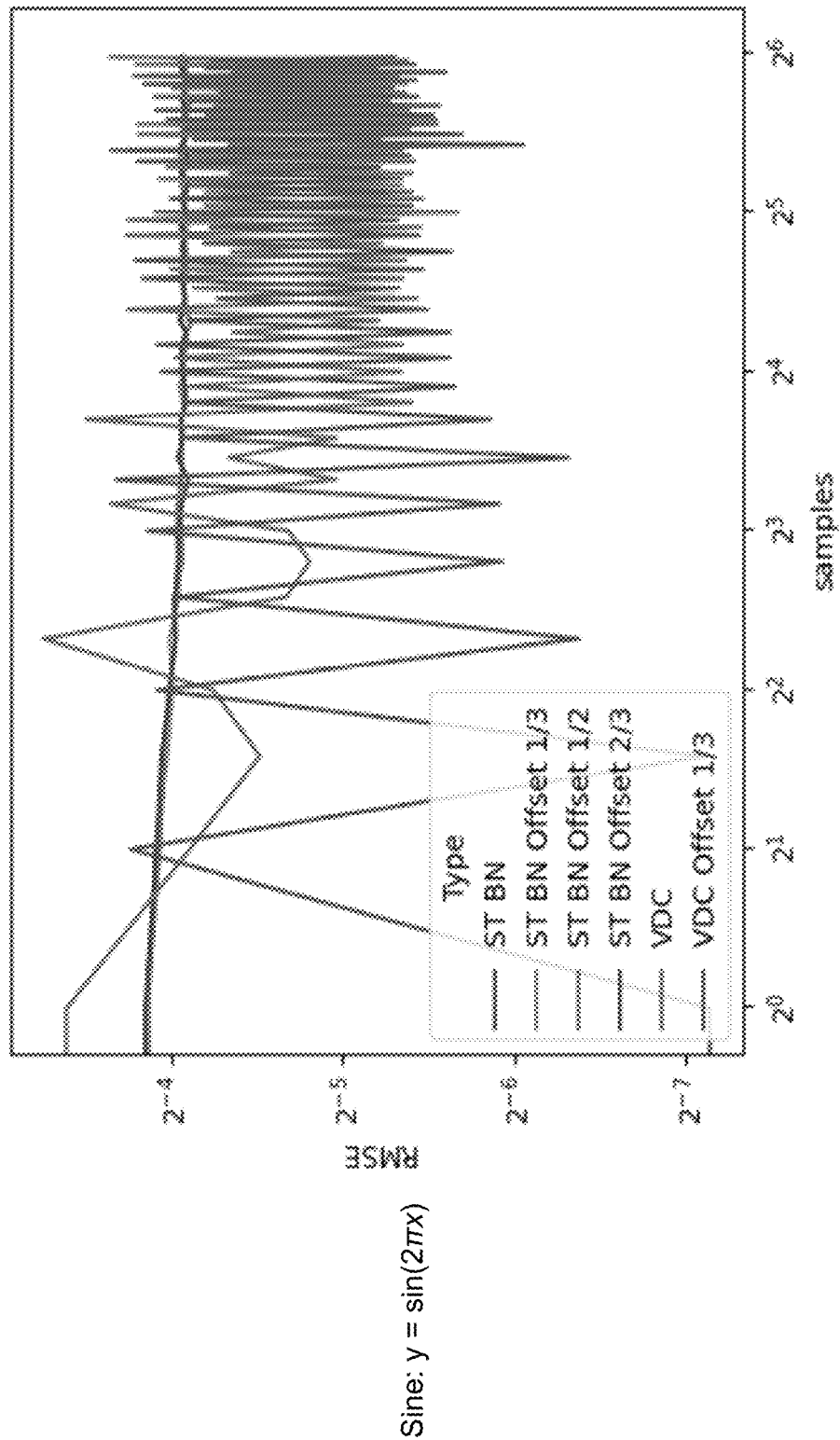

FIG. 11 illustrates comparative frequency results generated using Fourier analysis on the three types of spatio-temporal blue noise masks, according to at least one embodiment. That is, Discrete Fourier Transforms (DFTs) of the 2D projections of various blue noise masks are shown in FIG. 4. The comparative frequency results can be generated using process 100 (see FIG. 1A) and/or process 106 (see FIG. 1B). In an embodiment, a spatio-temporal blue noise mask has blue noise over space such that it may provide better image results than white noise over the z axis (time). In an embodiment, the DFTs are averaged to show expected frequency spectra except for golden ratio animated blue noise which highlights two ways it damages spatial frequencies at specific frame numbers. In an embodiment, it is desired to get blue noise properties in each spatial 2D slice, so as to provide an improved noise sequence than white noise sequence along the time axis. As illustrated in FIG. 4, using a spatio-temporal blue noise mask as described herein provides those two features simultaneously by having 2D blue noise characteristics on the X-Y plane and adding blue noise characteristics to the Z axis.

In an embodiment, while DFTs indicate that using a spatio-temporal blue noise mask as described herein is blue over both space and time, convergence speeds of blue noise over time is increased compared to other alternative methods of animating blue noise (this is shown in more detail in FIG. 5). The problem of integration over time is equivalent to integrating multiple samples within the same frame, so solving it in one domain is equivalent to solving it in the other. Temporal integration often uses a leaky integrator instead of Monte Carlo integration.

As illustrated in FIG. 11, the right two columns also show that, if spatio-temporal blue noise is offset on the time axis, it may have the same convergence characteristics and is in fact progressive starting at any index, while also being toroidally continuous as well. This toroidally continuous/progressiveness of the time axis may be a powerful property for use in temporal anti-aliasing (TAA)-style temporal integration and filtering algorithms. In those algorithms, every pixel is integrating an integrand progressively each frame, but when an individual pixel deems that its history is no longer valid due to occlusion changes or similar, pixels will effectively throw out their history and start the integration over.

Using animated blue noise masks to drive integration for those pixels means that a global sequence is driving all pixels. Most progressive sequences will only give a progressive sequence starting at index 0 (an exception to this is a Sobol sequence, which is progressive for all power of 2 sized sections). This is problematic because with a global sequence driving the sampling for individual pixels throwing their history away at arbitrary points in time, those pixels will be sampling beginning at arbitrary places in the sampling sequence.

With the toroidally continuous/progressiveness of spatio-temporal blue noise on the time axis, each pixel may receive the benefit of starting at the beginning of a progressive sequence after rejecting history at any frame number, without the overhead of having to track an index per pixel to make this happen. Furthermore, history rejection is commonly not a discrete event, but instead, is a continuous operation, such as clamping the history data to a min and max of colors seen in the local neighborhood of the newly rendered pixel value. In some instances, a sampling index is reset and in other cases, it is not. Despite that, a sequence which is progressive from any index means that whether a pixel has rejected its history, taking the next sample is a good thing to do, which means it also handles this continuous history rejection case.

4D Blue Noise Mask Analysis

In an embodiment, two 4D blue noise masks are configured as follows: 2D×1D×1D and 2D×2D, where both are 64×64×16×16 in size. In an embodiment, frequency analysis can be seen in FIG. 13 which shows the desired frequency behaviors for each pair of axes in 2D DFTs. In an embodiment, both masks show 2D blue noise on the X-Y plane but are different under all other projections. The 2D×1D×1D blue noise mask may show 1D blue noise on the Z and W axes under all projections, including the Z-W plane where they are both present and show in a cross pattern. The 2D×2D blue noise on the other hand shows white noise for all other projections except the Z-W plane, where it shows 2D blue noise.

Figure 16:
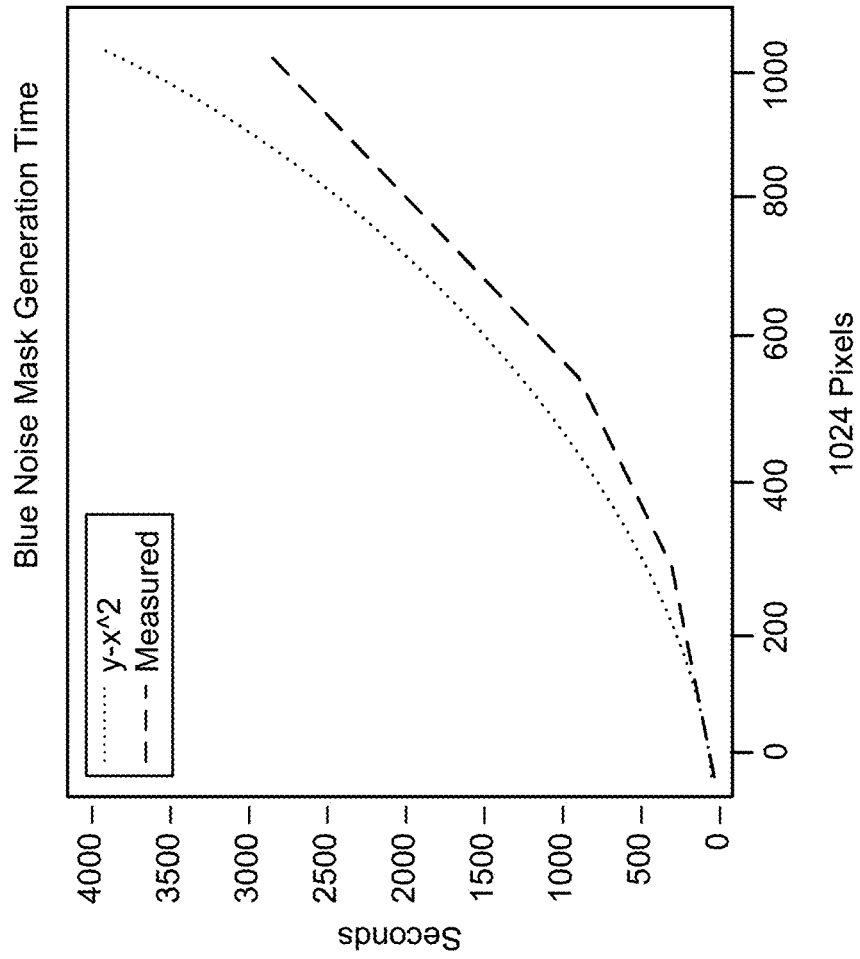
FIG. 16 illustrates a graph that generation time is a function of the number of pixels in the blue noise mask and roughly follows a $y=x^2$ curve, according to at least one embodiment.

From observation, generation time of blue noise masks is a function of the total pixel count, without regard for how those pixels are divided up by between the dimensions as shown in FIG. 16, where n is the number of pixels. Doubling the number of pixels in a blue noise mask will roughly quadruple the time taken to generate that mask. Blue noise masks may be stored as single channel 8-bit textures. The chart below are examples of some texture sizes and their size in bytes. Due to tiling well on each axis, smaller textures such as 64×64×16 (64 KB) for spatio temporal blue noise, and 64×64×16×16 (1 MB) may be sufficient for image rendering. The actual sizes used for spatio-temporal blue noise, and the 4D versions are noted with an asterisk (*) and bolded.

| Dimensions | Size |
| --- | --- |
| 64 × 64 | 4 KB |
| 32 × 32 × 16 | 16 KB* |
| 32 × 32 × 32 | 32 KB |
| 64 × 64 × 16 | 64 KB |
| 256 × 256 | 64 KB |
| 64 × 64 × 64 | 256 KB |
| 64 × 64 × 16 × 16 | 1 MB* |
| 64 × 64 × 64 × 64 | 16 MB |
| 256 × 256 × 256 × 256 | 4 GB |

Figure 15:
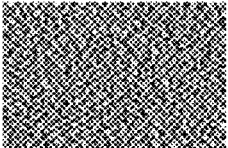
FIG. 15 illustrates 2D×1D spatio-temporal blue noise masks with various sigma's per axis, according to at least one embodiment.

In an embodiment, the algorithm to generate a spatio temporal blue noise mask may be configured to specify different dimensions per axis (see FIG. 13), as well as different energy sigmas (see FIG. 15). Also, while all axes are toroidally continuous, if that was not desired, that is a feature that can be chosen per axis, by calculating distances on that axis non-toroidally instead.

When using blue noise masks, multiple independent masks may be needed. For instance, when used for dithering a diffuse and specular buffer which were later combined via addition, the same blue noise mask may not be used repeatedly for both buffers as it would increase the difference between pixels when they were added together, having used the same dither pattern on each buffer. In some instances, a system may generate and load two independent masks, but that may take more memory than necessary, especially if an independent blue noise mask is needed for every different color buffer in a rendering pipeline. That number may even be dynamic or unbounded, which would be even more problematic.

Figure 14:
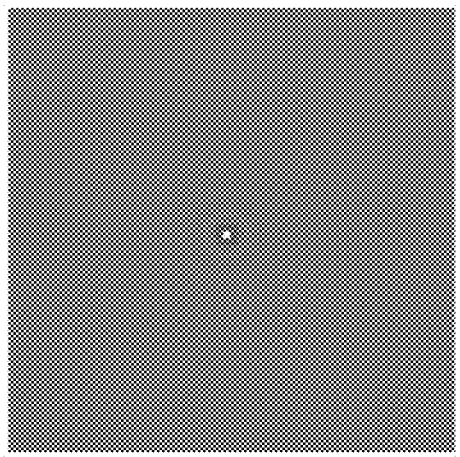
FIG. 14 illustrates images to show the autocorrelation of blue noise textures, according to at least one embodiment.
Figure 14:
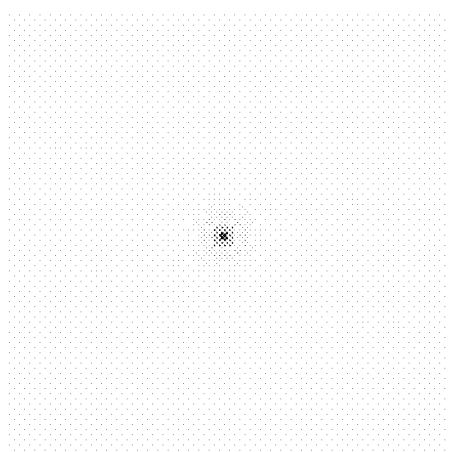
Figure 14:
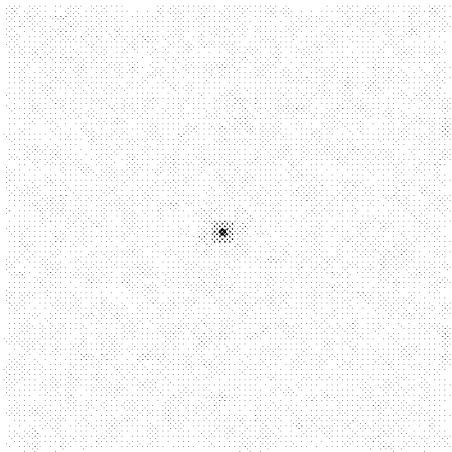

An alternate way of approximately getting independent blue noise sources is to offset where a blue noise mask is read for each independent blue noise source desired. FIG. 14 shows blue noise mask autocorrelation, and shows that small offset reads in a blue noise texture may result in correlation or anti-correlation, but that larger offsets will result in decorrelated values. The reason for this is that blue noise has correlation over small distances but is decorrelated over large distances as show in the autocorrelation.

To generalize this to wanting N different independent data sources, N points on the texture may be needed, which are nearly maximally distant from each other. In other words, these points should be low discrepancy. Where star discrepancy is not measured toroidally, this discrepancy may be measured toroidally. If it is not known in advance how many independent data sources are needed, a progressive, toroidally low discrepancy sequence may provide an arbitrary number of points with this property.

As higher dimensional blue noise masks take longer to compute, and require more memory to store them, to get an N-dimensional mask, a system may first approximately get it by starting with an N−1 dimensional mask, reading the value for the first N−1 axes, and then multiplying the last dimensional index by the golden ratio, adding it to a mask value, and using modulus to keep it between 0 and 1.

$$N(a_0, a_1, \ldots, a_n) = (N(a_0, a_1, \ldots, a_{n-1}) + \Phi a_{n-1}) \bmod 1 \quad (5)$$

This was shown where spatio-temporal blue noise was compared against 2D blue noise animated by the golden ratio, and was also shown where 2D×1D×1D blue noise was compared against spatio-temporal blue noise which used the golden ratio to add on a fourth dimension. While this can hurt frequencies over space, it does show convergence and can help creation time as well as memory usage. While there are other irrational numbers to form other rank 1 lattices that can be used here as well, they are of lesser quality for sampling and this method can only add on groups of 1D axes.

In an embodiment, lower quality higher dimensional groups are be added. For instance, Interleaved Gradient Noise or the z sampler could be used to add on a 2D group since they are a way of converting a 2D integer coordinate into a scalar which has desirable properties on a 2D plane. This scalar could be added to the value read from the blue noise mask, and modulus could once again be used to bring it between 0 and 1.

FIGS. 12A, 12B, 12C, 12D, 12E, 12F, 12G, 12H, 12I, 12J, 12K, and 12L illustrate convergence rates for example functions, according to at least one embodiment. That is, FIGS. 12A, 12B, 12C, 12D, 12E, 12F, 12G, 12H, 12I, 12J, 12K, and 12L illustrate convergence rates for functions with x∈[0, 1] using the time axis of various mask types, showing both Monte Carlo and leaky integration. The functions can be for higher dimensional vectors (e.g., 2D, 3D, 4D, and the like). In at least one embodiment, stratified sampling shows that there are better convergence speeds possible if only considering the 1D axis of time, and not also the 2D plane of screen space. The offset graphs in the right two columns show that beginning the integration from an index other than 0 does not affect the results, showing that spatio-temporal blue noise is progressive from any index and also continuous when reaching the end of the sequence and starting over at index 0. Van Der Corput base 2 (VDC) does not have that property as is shown by erratic accuracy with low numbers of samples.

Figure 13:
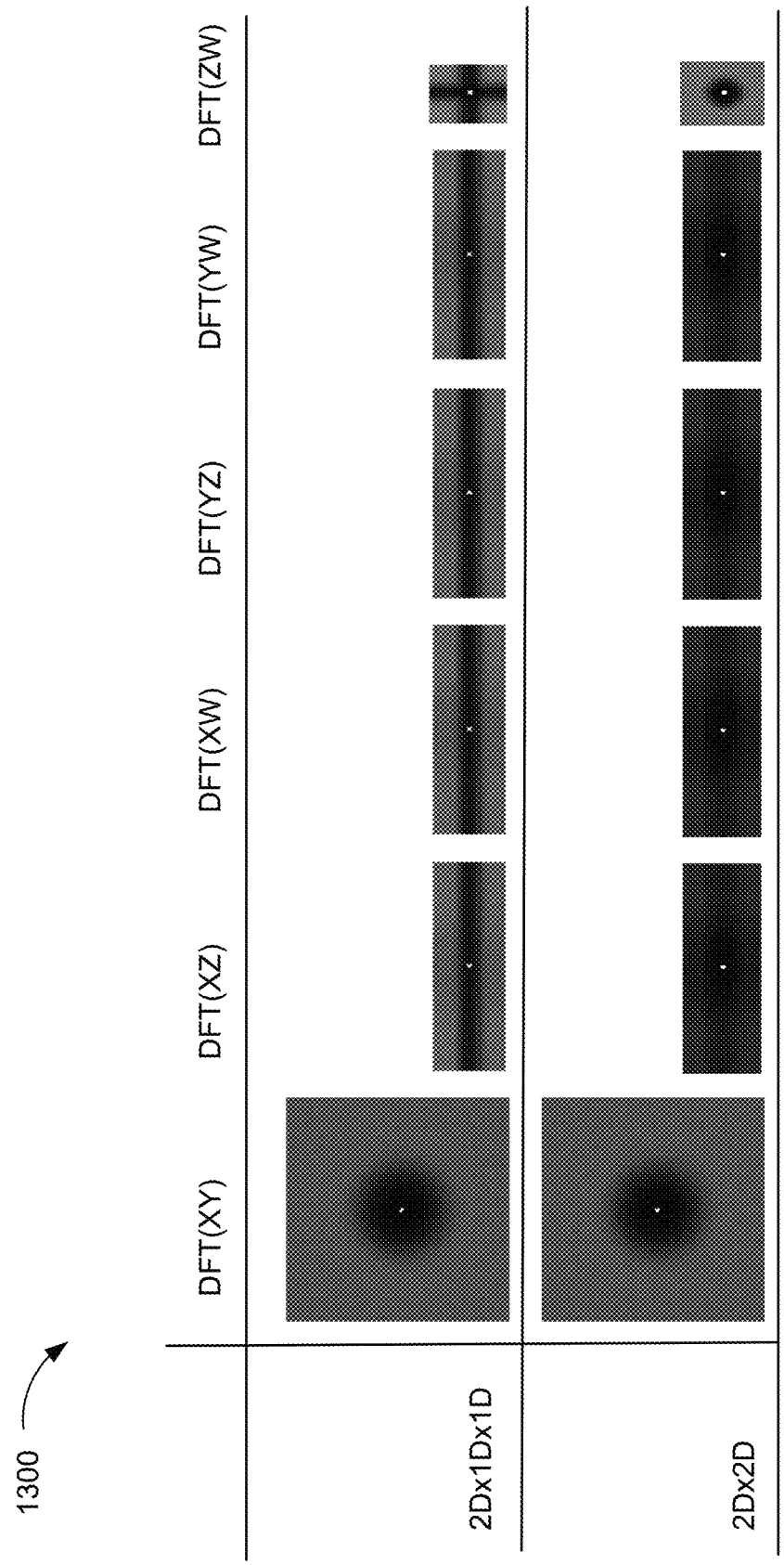
FIG. 13 illustrates DFTs of the 2D projections of 4D blue noise masks that are 64×64×16×16, according to at least one embodiment.

FIG. 13 illustrates DFTs of the 2D projections of 4D blue noise masks that are 64×64×16×16, according to at least one embodiment. For the sake of clarity, projections depicted in FIG. 13 are averaged to show expected frequency spectra. In at least one embodiment, the DFTs can be generated using part of process 900 (see FIG. 9A) or process 906 (see FIG. 9B).

FIG. 14 illustrates images to show the autocorrelation of blue noise textures, according to at least one embodiment. In an embodiment, neighbors may have very different values, which causes a rippling of correlation (red/white) and anti-correlation (blue/black) in the center for small offsets, but rapidly decay to decorrelated values (white/grey).

FIG. 15 illustrates 2D×1D spatio-temporal blue noise masks with various sigmas per axis, according to at least one embodiment.

FIG. 16 illustrates a graph that generation time is a function of the number of pixels in the blue noise mask and roughly follows a $y=x^2$ curve, according to at least one embodiment. Doubling the pixel count may roughly quadruple the processing time.

In an embodiment, stochastic transparency is the process of stochastically choosing whether to take or ignore a sample based on a material's transparency level. Sophisticated algorithms have been developed by alternative methods, but the core idea of stochastically accepting or rejecting a pixel may remain the same. In an embodiment, the spatio-temporal blue noise mask described herein uses very low sample counts and low computational costs (a single texture read and comparison), giving blue noise distributed error in screen space as 2D blue noise does, but converging faster than other methods of 2D blue noise usage. Stochastic transparency is useful in situations such as deferred lighting where information is stored on how to shade a pixel, instead of the shaded result itself, and it is impractical to store multiple or arbitrary numbers of layers to later calculate proper transparency. Stochastic transparency is also useful in the context of path tracing where a single sample per ray vertex is needed, and are only concerned that the average pixel value is correct for things like semi transparency, instead of spending the costs of computation and memory to calculate semi transparency for a single sample. Stochastic transparency works by generating a random number $\xi \in [0, 1]$ and comparing that against the opacity of the material a $\alpha \in [0, 1]$. If $\xi$ is greater than $\alpha$ than the sample is discarded. When using white noise random numbers for $\xi$, the percentage of pixels surviving the test will match a if done an infinite number of times but will have a lot of variance over both space and time for lower numbers of samples. In at least one embodiment, a vector mask (e.g., blue noise mask that can handle vectors) is used to handle multiple depth levels of stochastic transparency.

Using 2D blue noise masks instead will make the surviving pixel percentage be more accurate for lower numbers of samples spatially, which also will make the surviving pixels be randomized, but roughly evenly spaced. As mentioned before, however, the methods for animating blue noise over time either alters the blue noise over space or becomes white noise over time, causing poor convergence when either taking multiple samples per frame, or integrating multiple frames. Using spatio-temporal blue noise masks as described herein where each individual frame is a good blue noise, but each pixel is also a good sampling sequence over time means that individual frames will have surviving pixels being blue noise distributed in space, but also that each frame will have very different surviving pixels, allowing better convergence over time, or over multiple samples within a single frame. Rendering comparisons are shown in FIG. 17 and convergence rates are shown in FIG. 18.

Figure 17:
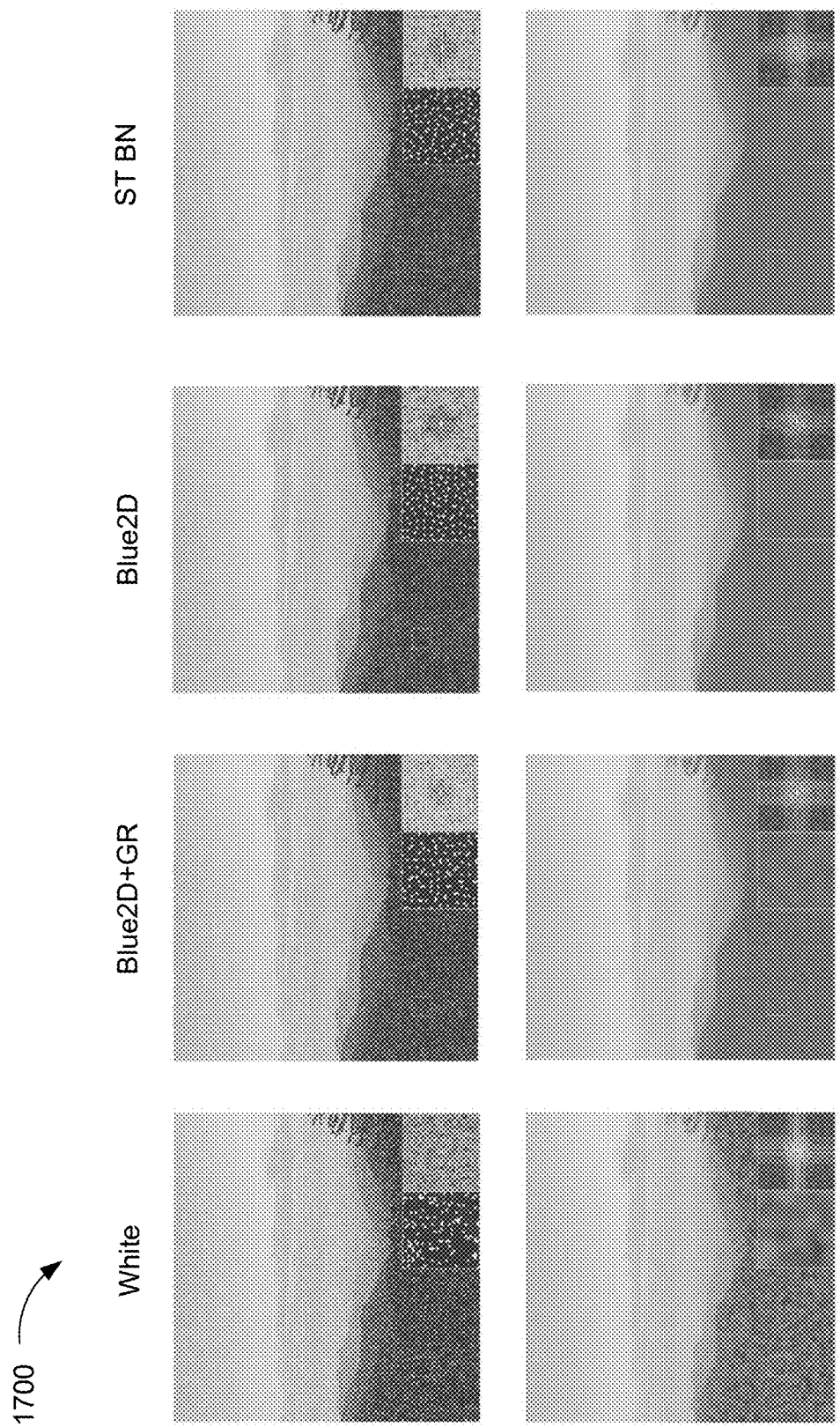
FIG. 17 illustrates stochastic transparency using various types of noise, according to at least one embodiment.
Figure 18:
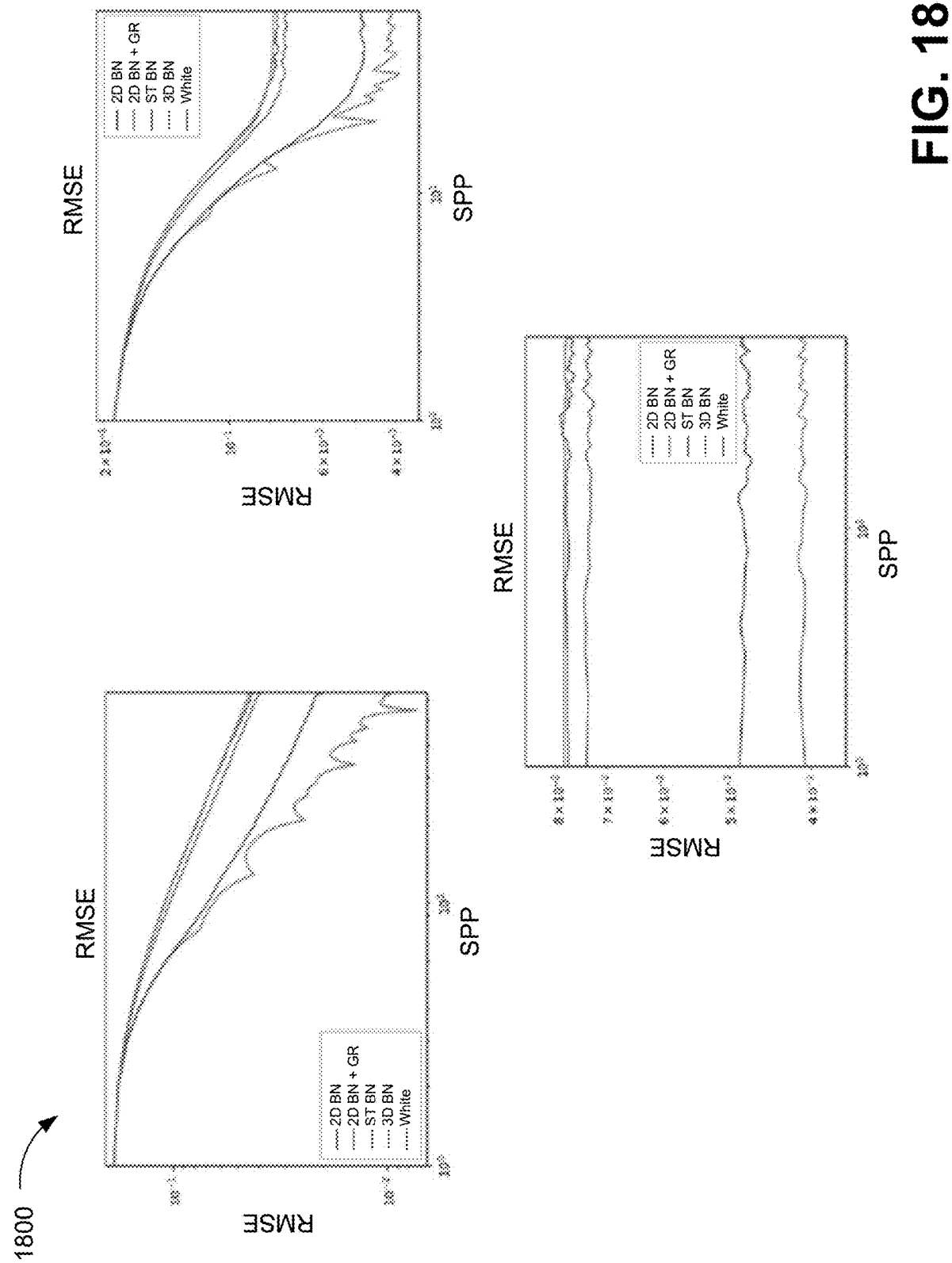
FIG. 18 illustrates convergence rates in stochastic alpha of various types of noise, according to at least one embodiment.

FIG. 17 illustrates stochastic transparency using various types of noise, according to at least one embodiment. In an embodiment, FIG. 17 illustrates one sample per pixel. The top images are a raw frame, where bottom images are Gaussian blurred with a sigma of 2. In an embodiment, spatio-temporal blue noise does as well spatially as 2D blue noise, and better than golden ratio animated blue noise.

Dithering

Dithering is the process of adding a small amount of noise to data before quantizing it to get a noisy result instead of quantization artifacts. This can be used to hide banding artifacts that would otherwise come from decreasing bit depth, allowing less memory to be used while attempting to preserve image quality. Dithering causes pixels to stochastically round up or round down when being quantized, where the probability of rounding towards a quantization level is based on how far the value is from that level. If quantizing a continuous value $x \in [0, 1]$ into n distinct values, to get the quantized value $y \in \mathbb{Z}$, a random number $\xi \in [0, 1)$ may be used in the equation below:

$$y = \lfloor x(n-1) + \xi \rfloor$$

In at least one embodiment, a vector mask (e.g., a blue noise texture that can handle vectors) provides a random number per color channel.

When white noise is used for dithering, the result gives a white noise pattern. If blue noise is used instead, the result is more visually pleasant to a human or on a display while also having more correct averages over small regions of pixels spatially. When spatio-temporal blue noise is used for dithering, the result may be blue noise over space, but also over time, where each pixel may have a more correct average over smaller samples over time when animated. Rendering comparisons are shown in FIG. 11 and convergence rates are shown in are shown in FIG. 20.

Figure 19:
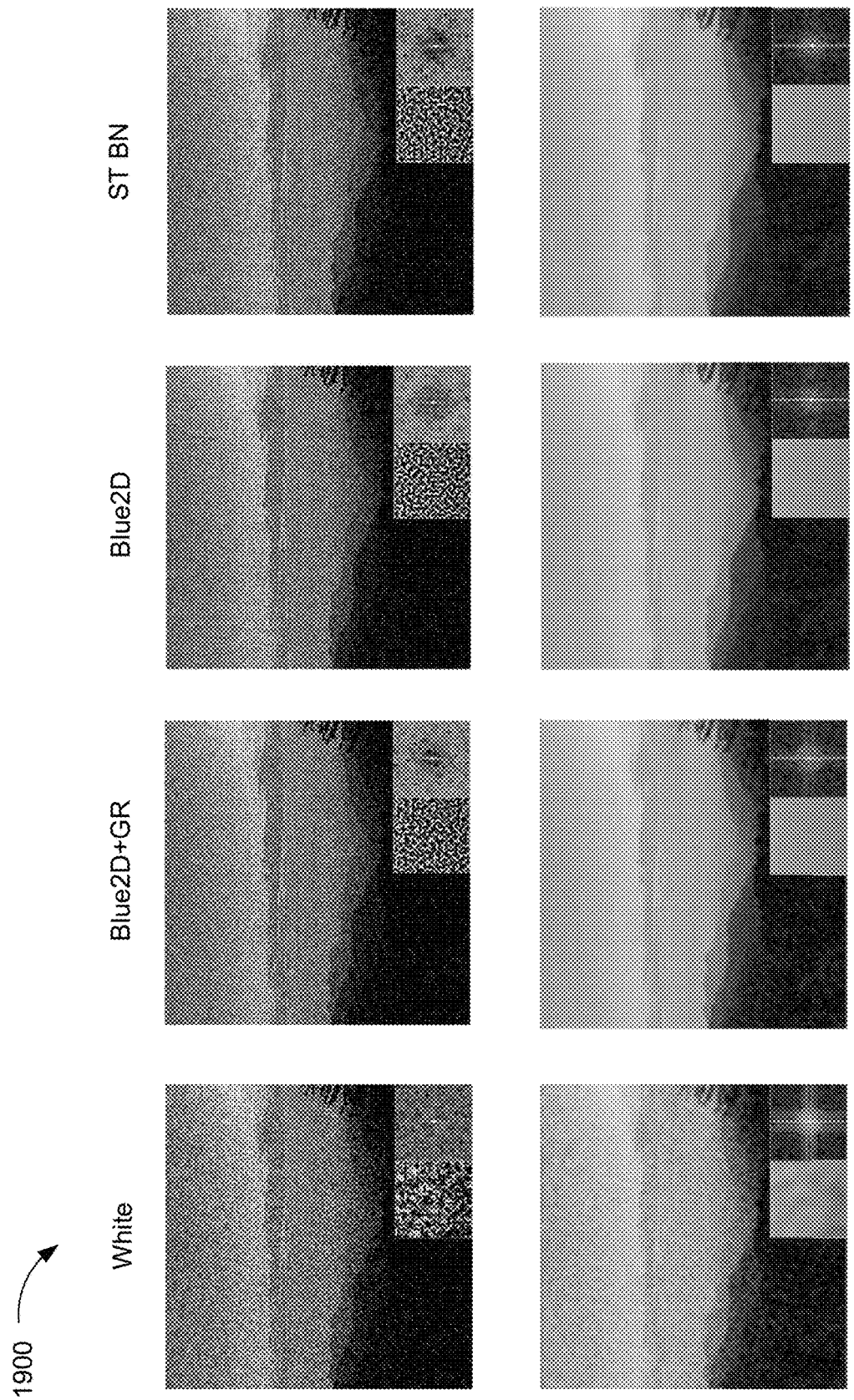
FIG. 19 illustrates dithering before quantizing to 1 bit per color channel using various types of noise, according to at least one embodiment.

FIG. 19 illustrates dithering before quantizing to 1 bit per color channel using various types of noise, according to at least one embodiment. The top images are a raw frame, bottom images are Gaussian blurred with a sigma of 2. As shown in FIG. 19, the spatio-temporal blue noise does as well spatially as 2D blue noise, and is improved compared to golden ratio animated blue noise.

Figure 20:
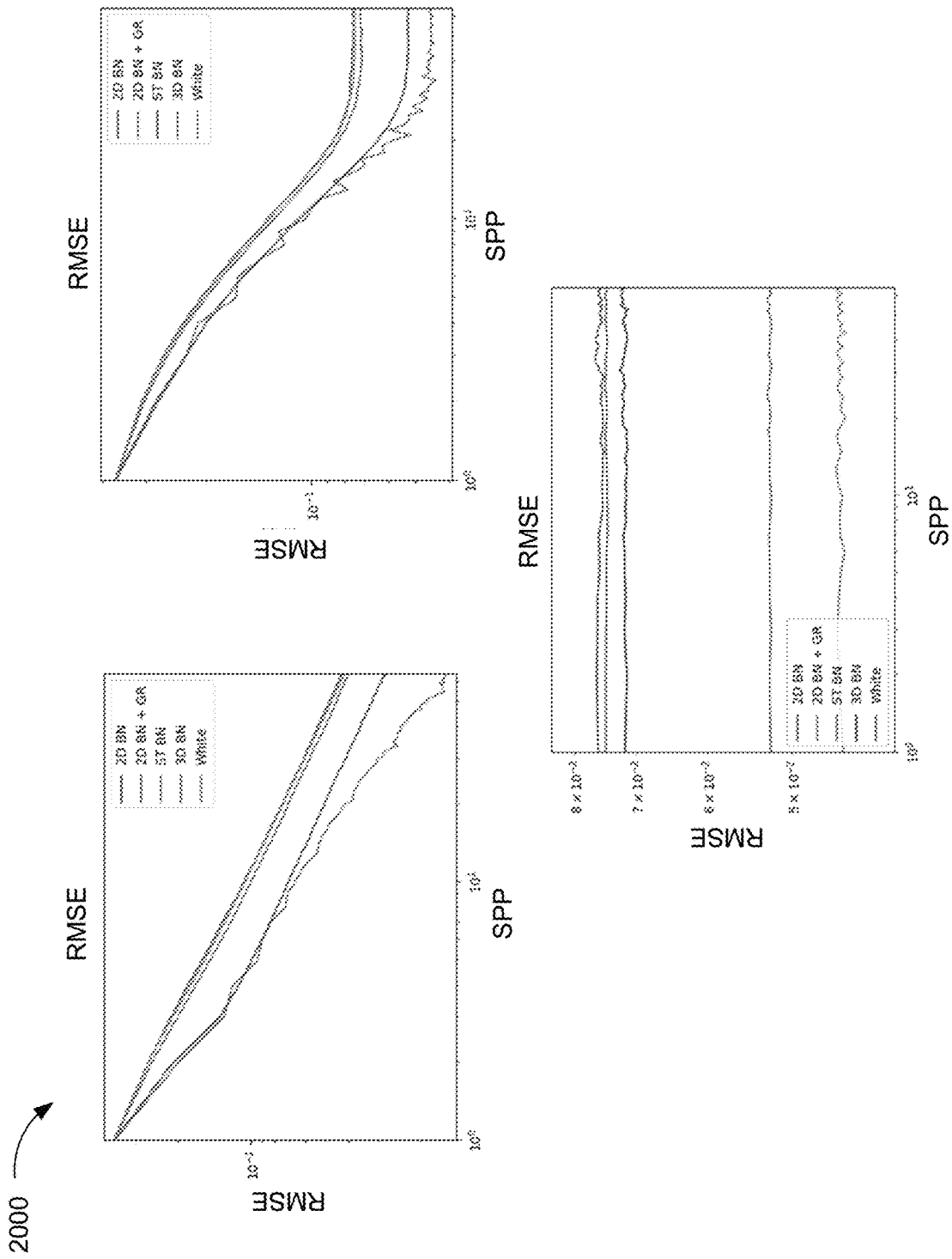
FIG. 20 illustrates a graph of convergence rates in dithering of various types of noise, according to at least one embodiment.

FIG. 20 illustrates a graph of convergence rates in dithering of various types of noise, according to at least one embodiment. In an embodiment, golden ratio animated blue noise converges faster than spatio-temporal blue noise but alters frequencies spatially.

Ray Marched Participating Media With Spatio-Temporal Blue Noise

In an embodiment, one or more computing devices execute an algorithm to render single scattering heterogeneous participating media with very low sample counts. This is a different type of algorithm than stochastic transparency or dithering because it shows how blue noise masks can be applied to arbitrary rendering problems. While there are much more sophisticated algorithms for rendering participating media, the techniques described herein, according to an embodiment, is simple, performant, generates good results at very low sample counts and works with either rasterization or raytracing. In an embodiment, the algorithm is run after the primary hit has been shaded and the surface depth is known. The surface depth d may be the length of the line segment down the camera ray r that must be integrated. In an embodiment, that line segment is sampled at n evenly spaced locations, where the space between each sample is $$\frac{d}{n}$$

units. The location $p_s$ of a sample $s \in Z [0, n-1]$ is then calculated as:

$$p_s = rs\frac{d}{n}$$

At each sample point $p_s$, a fog density field F is sampled to get a density f s. This is assumed to be the density for an entire step length of distance.

$$f_s = F(p_s)$$

A light visibility function Vis also evaluated at $p_s$ to get a visibility value $v_{s,i} \in [0,1]$ for all lights $i \in I$. The visibility value $v_{s,i}$ may either be a binary value which is similar when shooting a single ray towards a light, or it may be a more continuous value which is similar to reading a shadow map using percentage closer filtering, or from taking multiple shadow ray samples.

$$v_{s,i} = V(p_s, i)$$

To calculate the color of an individual sample $c_s$ of fog, shaded fog colors $c_{unlit}$ for fog in shadow and $c_{lit,i}$ for fog lit by light i are determined. The fog colors may either be calculated or provided. The visibility value $v_{s,i}$ may be multiplied by $c_{lit,i}$ to get the contribution of that light. All lighting contributions are summed and $c_{unlit}$ is added to the results to get the final color for the fog at that sample $c_s$.

$$c_s = c_{unlit} + \sum_{i \in I} v_{s,i} c_{lit,i}$$

To calculate the opacity $o_s$ for a sample, the usual Beer's law absorption formula may be used, using the density f and step distance d.

$$o_s = e^{-df}$$

When performing the integration, the cumulative result r may be initialized to the shaded surface color p, and then march backwards from the surface towards the camera, calculating the color and opacity of the fog sample, and applying the usual over alpha blending operation to the cumulative result.

$$r_0 = p$$

$$r_s = r_{s-1}(1 - o_s) + c_s o_s$$

Running the algorithm as is with low values of n samples down the line segment causes noticeable banding. Much like the dithering case, random numbers may be used to replace the banding with noise. In an embodiment, a random value is used $\xi \in [0; 1)$ per primary hit sample (e.g., per pixel), to offset the location of each sample point $p_s$. Note that the sample locations are still evenly spaced, they are just shifted forwards or backwards in depth.

$$p_s = r(s + \xi) \frac{d}{n}$$

Using white noise, screen space white noise results are obtained. Using 2D blue noise, the error pattern is improved. Using spatio-temporal blue noise, screen space blue noise error patterns are obtained, but also, the magnitude of the error is smaller. Rendered results can be seen in FIG. 21, and convergence graphs can be seen in FIG. 22.

Figure 21:
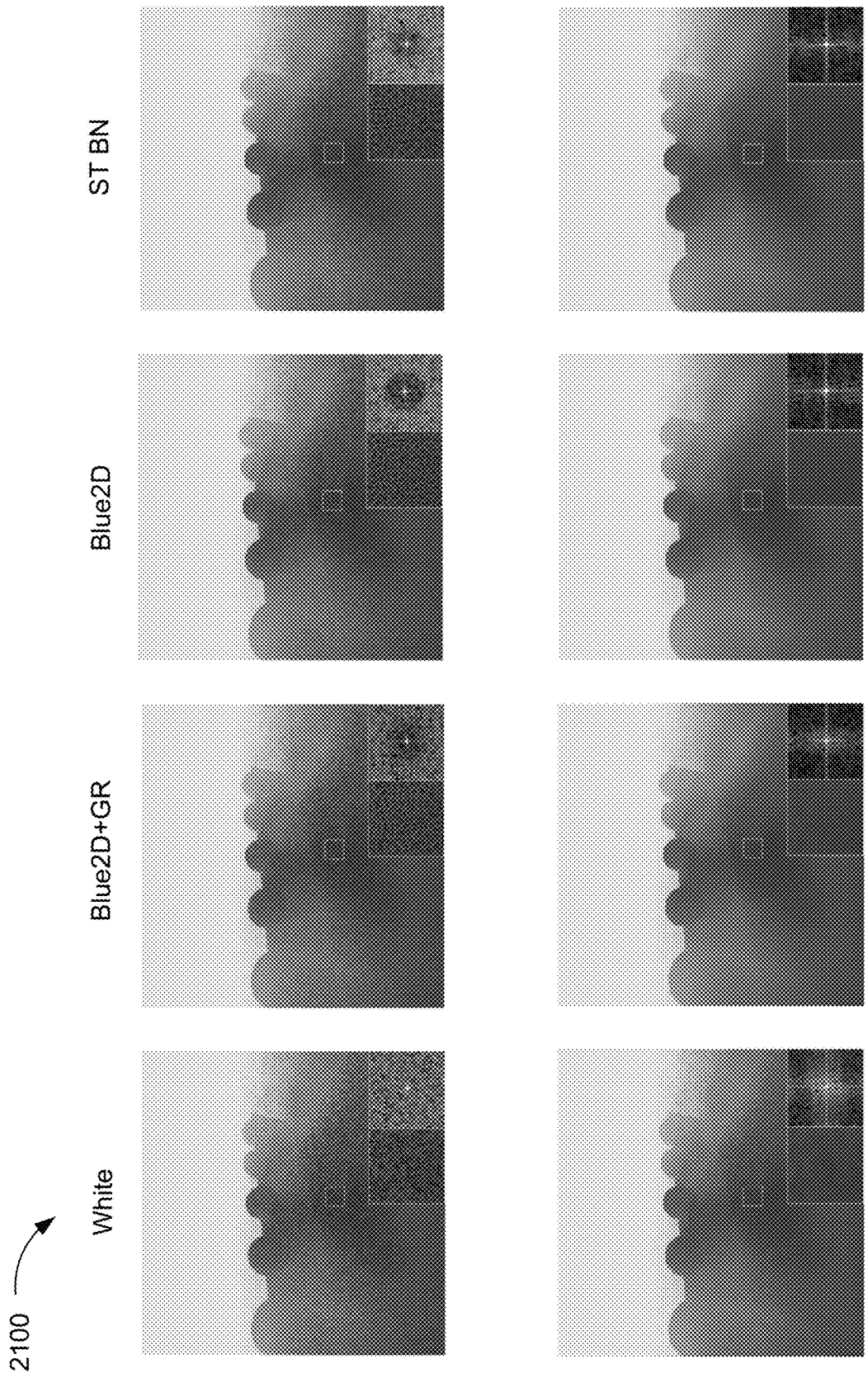
FIG. 21 illustrates using noise to randomly offset ray marching starting portions for 4 steps of raymarching per pixel, accordingly to at least one embodiment.

FIG. 21 illustrates example outputs generated using noise to randomly offset ray marching starting portions for 4 steps of raymarching per pixel, according to at least one embodiment. Top images are a raw frame, bottom images are depth aware Gaussian blurred with a sigma of 2.

Figure 22:
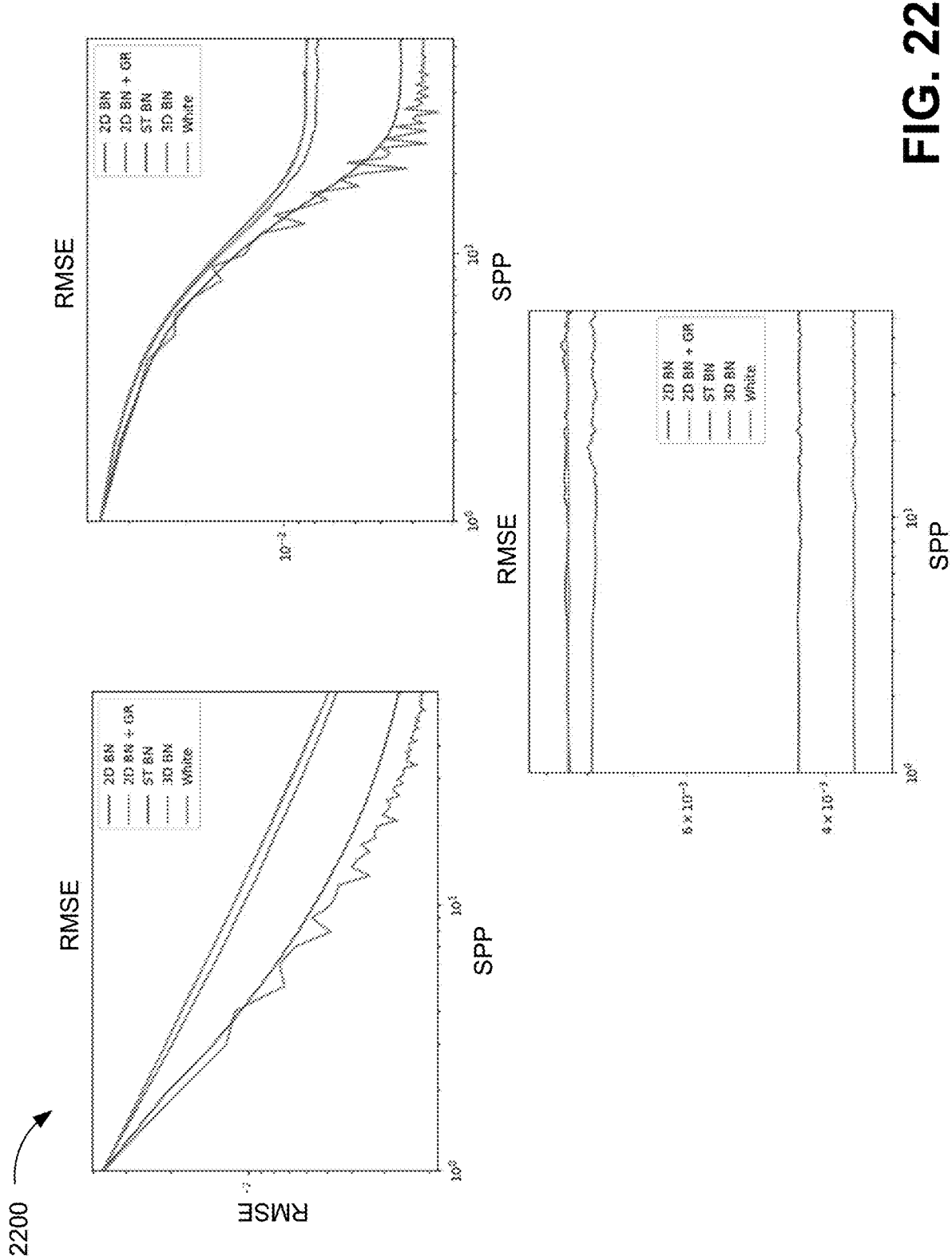
FIG. 22 illustrates a graph of ray marching fog convergence rates with various types of noise, according to at least one embodiment.

FIG. 22 illustrates a graph of ray marching fog convergence rates with various types of noise, according to at least one embodiment. In an embodiment, only 4 steps of ray marching are done per pixel.

Participating Media With 2D×1D×1D Blue Noise

In an embodiment, one or more computing devices may execute an algorithm that makes use of a 2D×1D×1D blue noise mask, where the previous algorithm made use of a 2D×1D spatio-temporal blue noise mask. This algorithm may be used to indicate how higher dimensional blue noise masks can be used in rendering algorithms. In both this algorithm and the previous algorithm, the goal is to integrate single scattering participating media. In the previous algorithm, regularly spaced samples were taken along the line segment, and noise was used to offset the starting point of those samples to trade banding for noise. In this algorithm, the line segment may be broken up into n evenly spaced sections, but instead of using only a single random offset for the whole sampling sequence, the algorithm may read a random offset per sample. Then, n random values will be obtained $\xi_s \in [0, 1)$ and the sampling position $p_s$ may be calculated as follows:

$$p_s = r(s + \xi_s) \frac{d}{n}$$

The rest of the algorithm remains the same. Rendered results can be seen in FIG. 23, and convergence graphs can be seen in FIG. 24. This reformulation changes it from a ray marching technique to a stratified sampling technique, and if comparing this to the spatio-temporal blue noise convergences, it improves for the same sample count.

Figure 23:
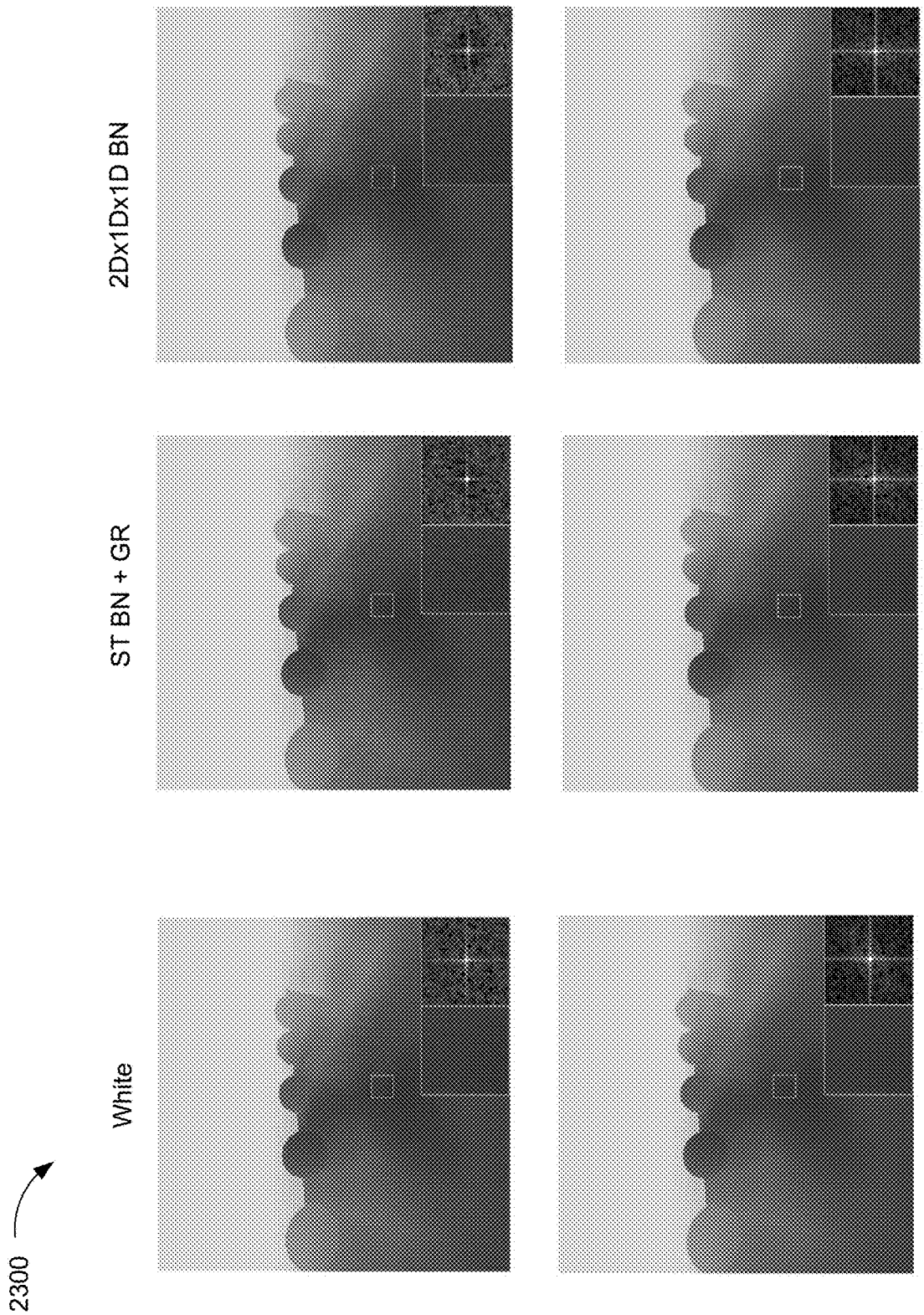
FIG. 23 illustrates using noise to stratify 16 samples of the line segment of each pixel through participating media, according to at least one embodiment.

FIG. 23 illustrates using noise to stratify 16 samples of the line segment of each pixel through participating media, according to at least one embodiment. The top images are a raw frame, bottom imagers are depth aware Gaussian blurred with a sigma of 2.

Figure 24:
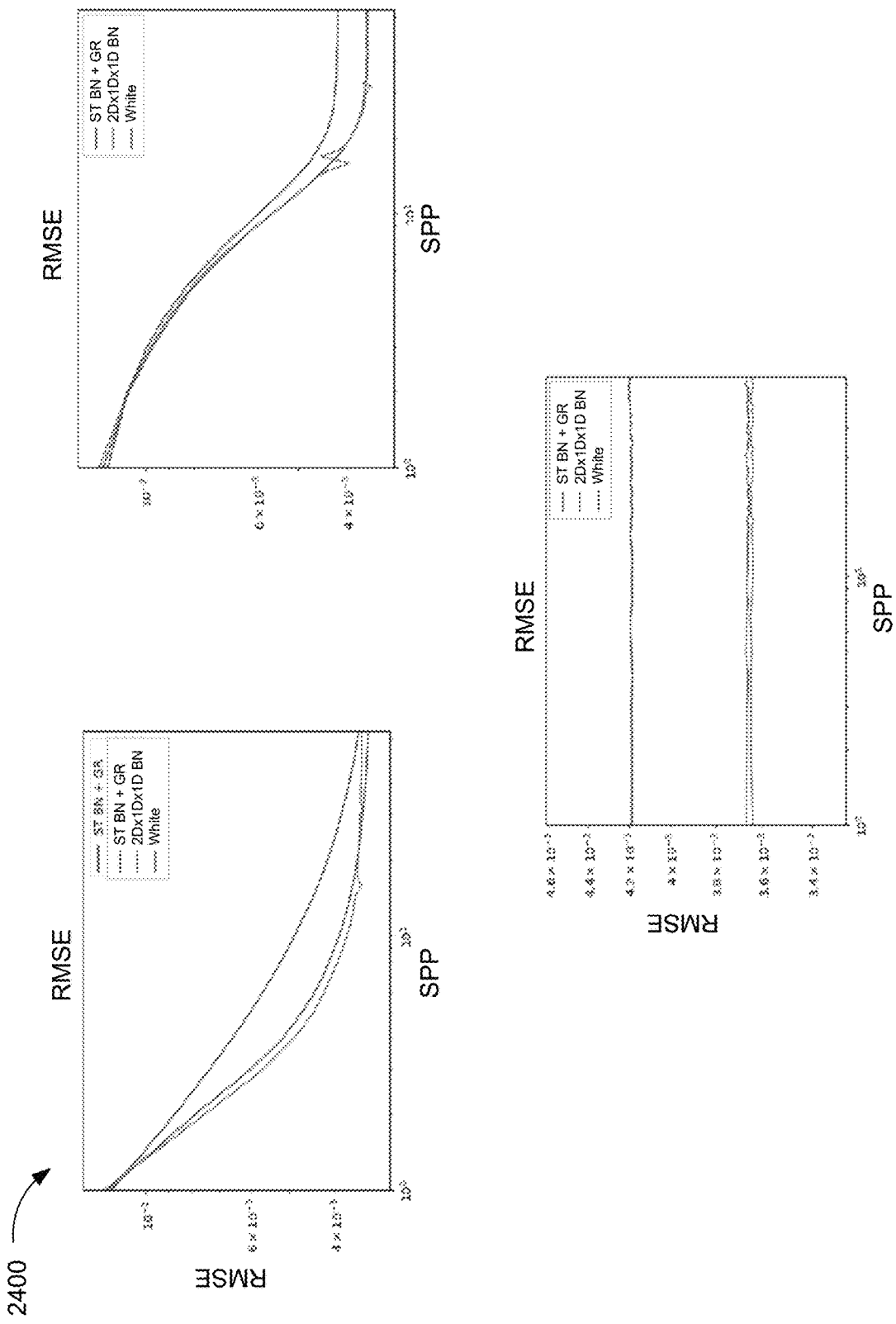
FIG. 24 illustrates a graph of ray marching fog convergence rates with various types of noise, according to at least one embodiment.

FIG. 24 illustrates a graph of ray marching fog convergence rates with various types of noise, according to at least one embodiment. In an embodiment, only 4 steps of ray marching are done per pixel.

Raytraced Ambient Occlusion (AO)

In an embodiment, ray traced AO is another algorithm that can be used. In an embodiment, AO uses 2D vectors per pixel to take each AO sample. In the techniques described herein, an algorithm generates blue noise masks with scalar values per entry, and not per vector. In one or more embodiments, multiple independent streams of scalar values may be derived from a single blue noise mask by having roughly maximally distanced read offsets per stream. Thus, in a ray traced AO algorithm, that extension may be used as an independent spatio-temporal blue noise data stream per axis. While there are other more sophisticated raytraced and rasterized AO algorithms, this is meant for giving high quality results with low sample counts, such as 1 ray traced sample per pixel (spp)—or lower if ran at less than full resolution.

In an embodiment, the ray traced AO algorithm runs after the primary ray hits location p, and the surface normal n is known. N random 3D unit vectors $\xi_i$ may be generated, added to the surface normal n and normalized to get N cosine weighted hemisphere samples $v_i$ where the hemisphere is oriented towards the surface normal n.

$$v_i = \frac{n + \xi_i}{\|n + \xi_i\|}$$

In an embodiment, each $v_i$ is used as a direction to shoot a ray from position p to get a hit distance d. Because AO is a local shadowing phenomenon, the hit length may be limited to a scene dependent maximum of d_max. An AO shading value a_i for this ray may be calculated as a percentage of how far the ray traveled compared to the maximum distance due to closer hits causing more occlusion and thus shadowing. This also allows more information per sample than a binary hit or miss result, leading to lower magnitude noise.

$$a_i = \frac{d}{d_{max}}$$

The AO shading values a_i may then be averaged to give a combined AO shading value of a, which can be used as a shadowing term in lighting equations.

$$a = \frac{1}{N}\sum_{i \in N} a_i$$

If using independent random numbers to generate each component of $\xi\_i$, the result will be white noise error. If using 2D blue noise, the noise cleans up spatially, and if using spatio-temporal blue noise, the AO data gains desirable sampling properties over time. Rendered results can be seen in FIG. 25, and convergence graphs can be seen in FIG. 26.

Spatio Temporal Blue Noise In Heitz Belcour Technique

Figure 28:
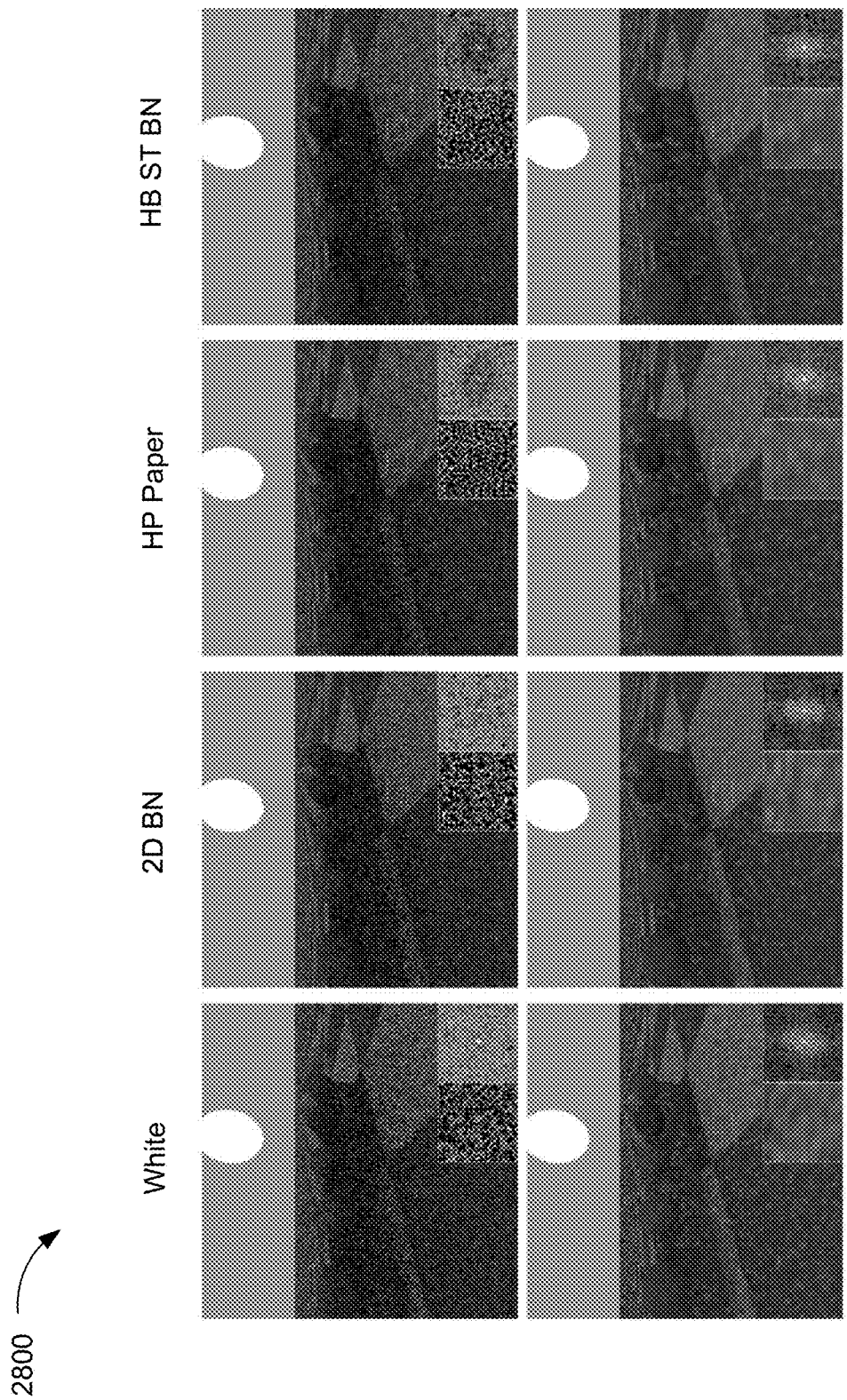
FIG. 28 illustrates images using a Sobol sequence offset, according to at least one embodiment.
Figure 30:
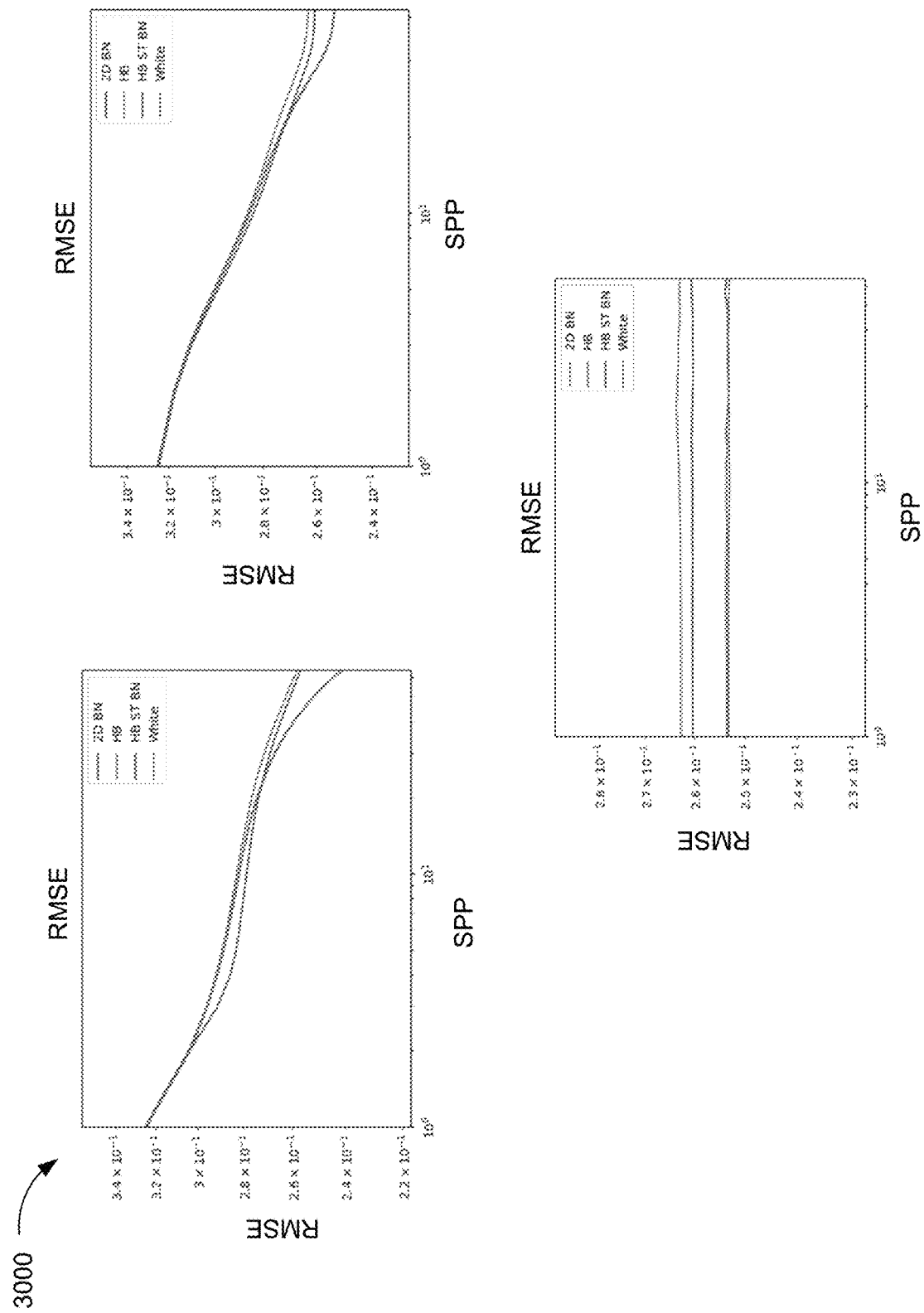
FIG. 30 illustrates graphs of convergence in Monte Carlo Integration, Leaky Integration, and Leaky Integration converged, according to at least one embodiment.

In an embodiment, blue noise masks tend to show benefits when used in algorithms that use scalars as shown with stippling, dithering, and ray marching participating media. They also show benefit when being used in simpler graphics algorithms that want vectors instead of scalars, such as ray traced AO, by using multiple independent streams of noise for each axis. In previous methods, blue noise masks tend to stop working as well when the sample count or dimensionality grow (e.g., path tracing). However, in some embodiments, techniques described herein may be used as an extension to algorithms (e.g., Heitz & Belcour technique) for generating blue noise masks in path tracing. For example, in the Heitz & Belcour technique, there may be a seed value per pixel, generated through any means desired, that is used to render the result for each pixel using whatever algorithms and sampling sequences desired. After this rendering is completed, the Heitz & Belcour technique may break the screen up into small sections on the order of 4×4 and sort the pixels in each section from darkest to brightest. In addition, the Heitz & Belcour technique may also break a blue noise texture tiled across the screen into the same small sections and sort them as well. These two sorted lists are used as a mapping for how to swap the seeds used for the previous frame's render such that if rendering again, the result will be closer to blue noise. The R2 low discrepancy sequence may be used to offset the reads into this blue noise texture every frame so that each frame has roughly uncorrelated 2D blue noise values from last frame. This gives a result of having blue noise over space, but provides white noise over time. By incorporating the techniques described herein, Heitz & Belcour technique can be made to give spatio-temporal blue noise results, thus retaining the qualities of blue noise over space, while gaining the desirable sampling properties over time. The rendered results are shown in FIG. 28 and the convergence graphs are shown in FIG. 30. Due to this, virtually any target error pattern should be achievable, such as wanting to get interleaved gradient noise which is better for use under temporal anti-aliasing.

Figure 25:
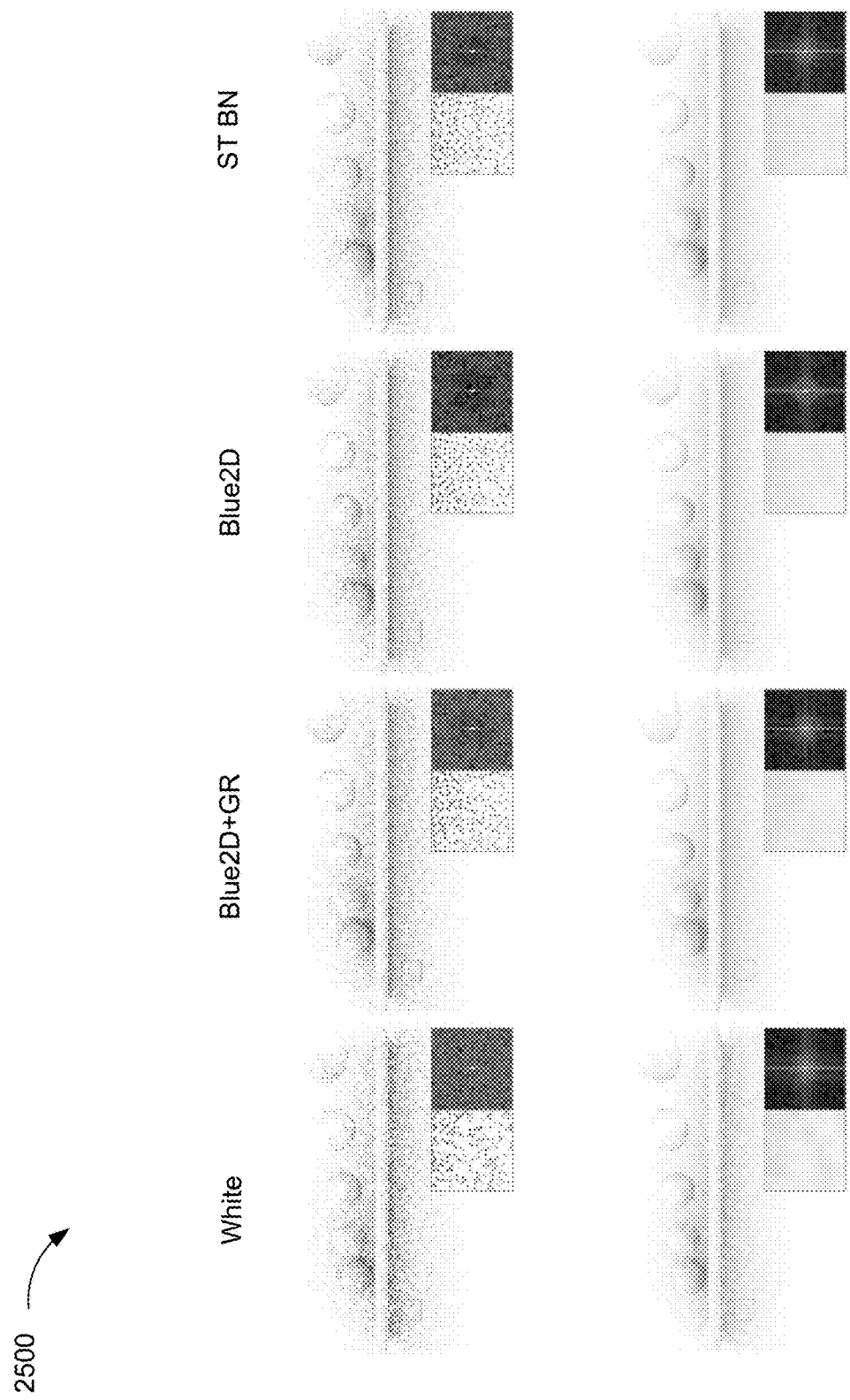
FIG. 25 illustrates using two independent streams of noise to generate x and y components for a 2D vector mapped to a cosine weighted hemisphere for a single Ambient Occlusion (AO) sample per pixel, according to at least one embodiment.

FIG. 25 illustrates using two independent streams of noise to generate x and y components for a 2D vector mapped to a cosine weighted hemisphere for a single AO sample per pixel, according to at least one embodiment. The top images are a raw frame, and bottom images are depth aware Gaussian blurred with a sigma of 2.

Figure 26:
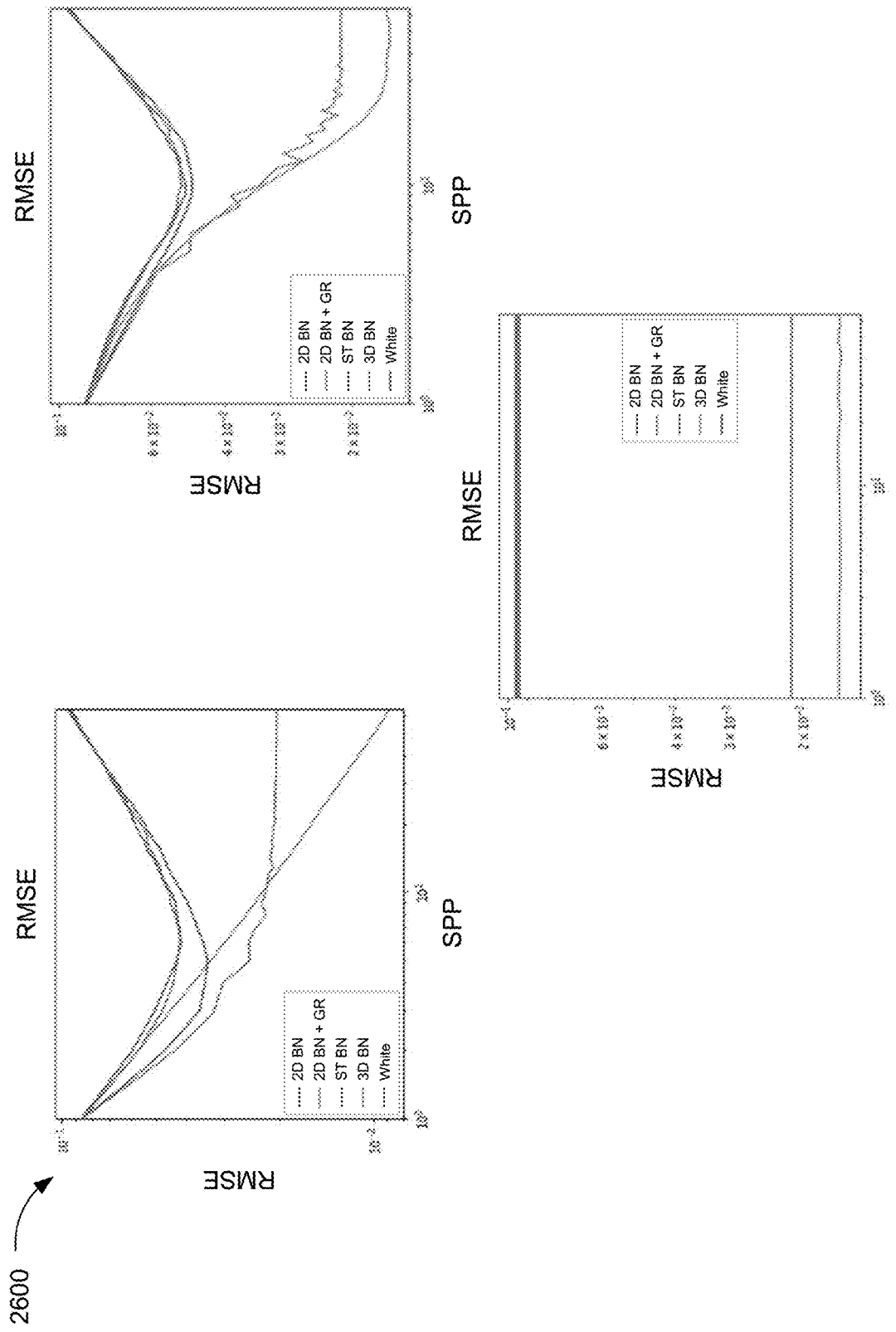
FIG. 26 illustrates how AO convergence relates with various types of noise, according to at least one embodiment.

FIG. 26 illustrates how Ambient Occlusion (AO) convergence relates with various types of noise, according to at least one embodiment.

Figure 27:
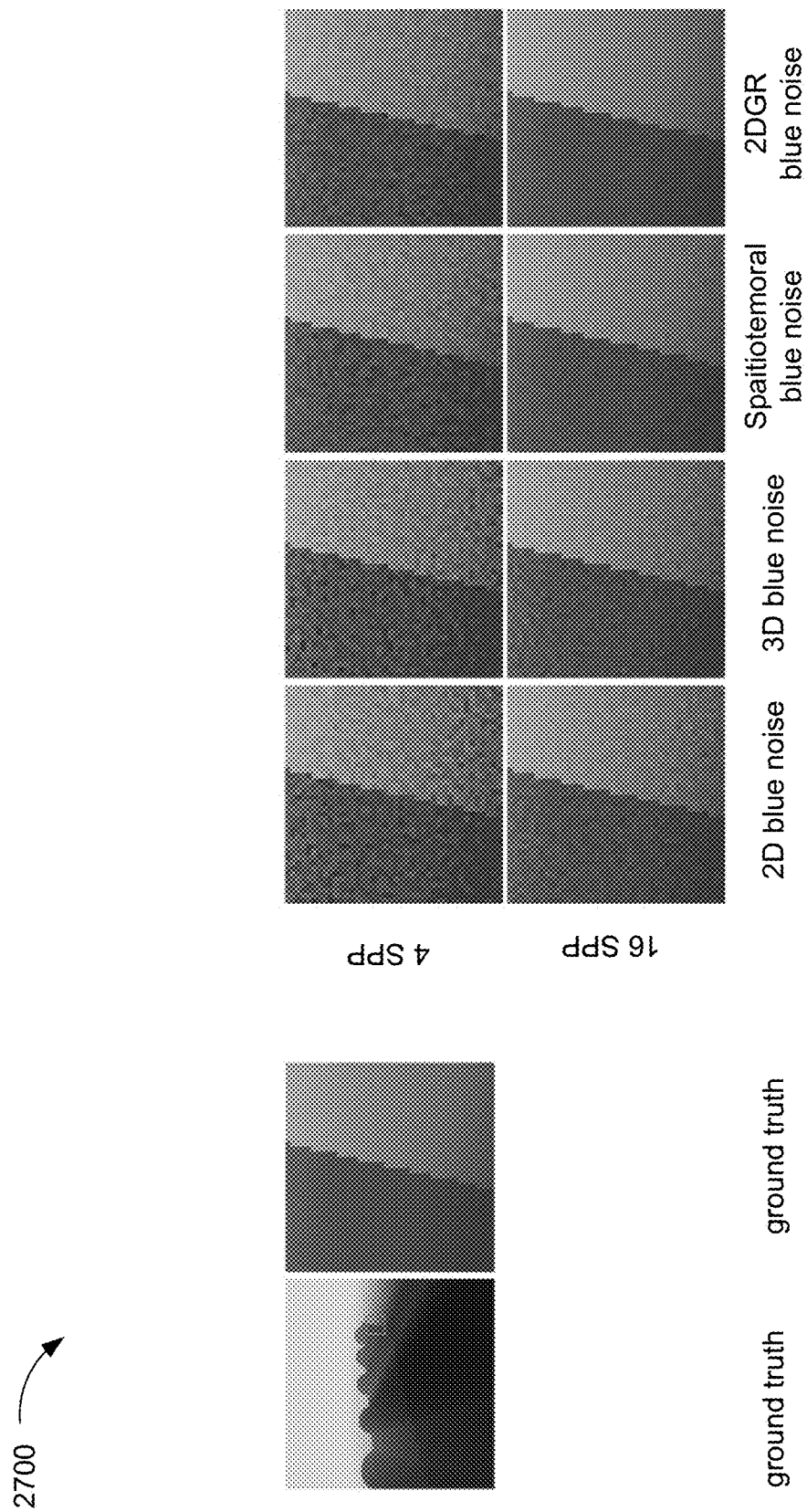
FIG. 27 illustrates one or more images of using a 2D blue noise mask, 3D blue noise mask, spatio-temporal blue noise mask, and 2DGR blue noise mask, according to at least one embodiment.

FIG. 27 illustrates one or more images of using a 2D blue noise mask, 3D blue noise mask, spatio-temporal blue noise mask, and 2DGR blue noise mask, according to at least one embodiment. In an embodiment, images from FIG. 27 show a rendered result using Monte Carlo integration with four samples per pixel.

FIG. 28 illustrates images using a Sobol sequence offset, according to at least one embodiment. In an embodiment, Sobol sequence offset by a vec2 from each mg type each frame. In an embodiment, top images are a raw frame, bottom images are depth aware Gaussian blurred with a sigma of 2.

Figure 29:
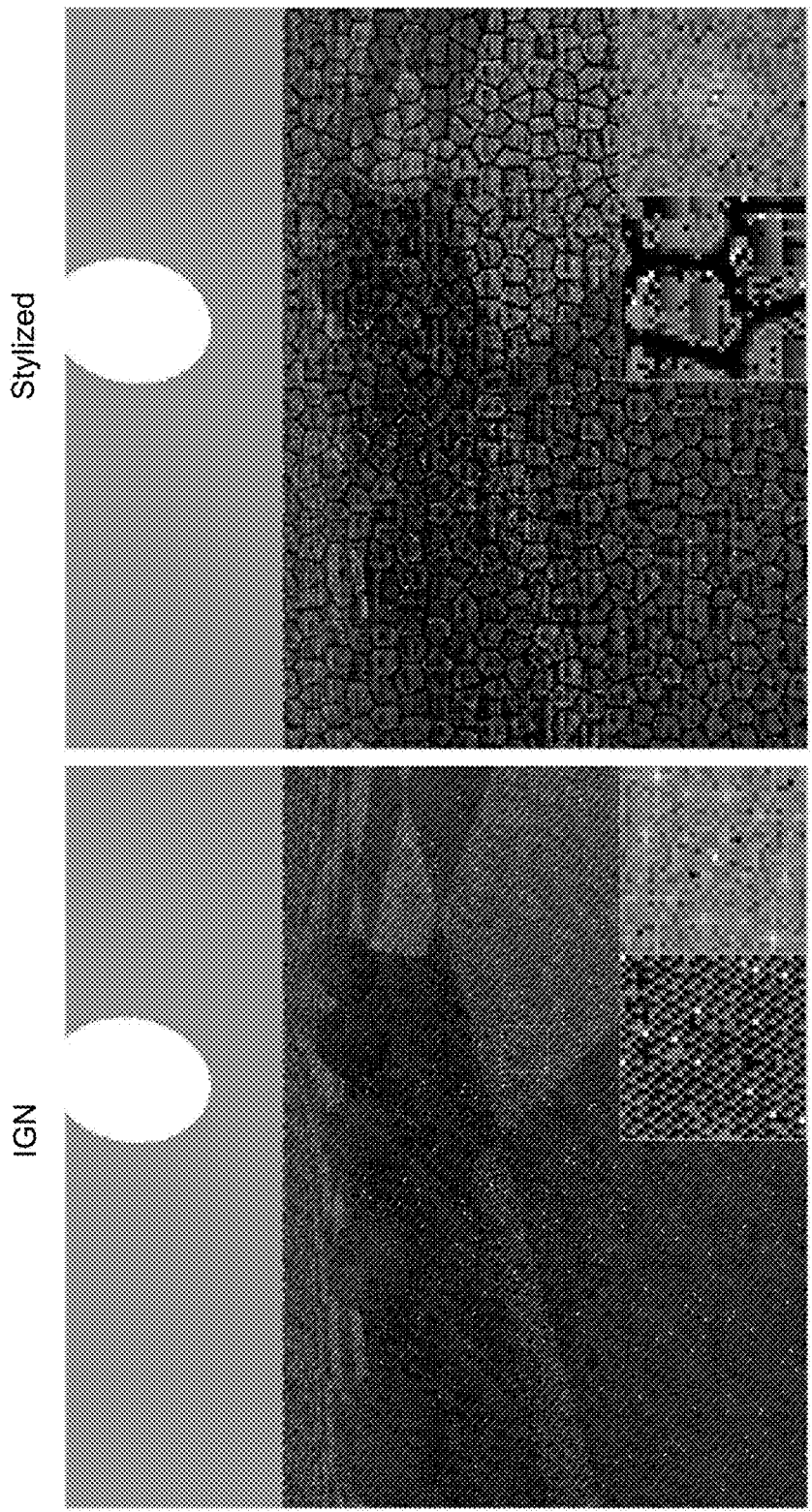
FIG. 29 illustrates a Heitz & Belcour technique using interleaved gradient noise and a stylized grey scale image for noise pattern targets, according to at least one embodiment.

FIG. 29 illustrates a Heitz & Belcour technique using interleaved gradient noise and a stylized grey scale image for noise pattern targets, according to at least one embodiment. These images were rendered using standard path tracing rendering code, but the seeds used to randomize each pixel were reordered to give a rendered result like the target images.

FIG. 30 illustrates graphs of convergence in Monte Carlo Integration, Leaky Integration, and Leaky Integration converged, according to at least one embodiment.

In an embodiment, spatio-temporal blue noise has the property to threshold values to some percentage, so that the corresponding percentage of the pixels will survive, and the pixels that survive will be distributed in a blue noise sample pattern within the constraints of the dimensional groups. More specifically, if thresholding all pixels in a spatio-temporal 2D×1D blue noise mask to 10%, each 2D XY slice of the mask may show roughly 10% of the pixels surviving, and they will be blue noise distributed (Randomized but roughly evenly spaced). Furthermore, looking at each pixel in isolation on the 1D Z axis, which makes a 1D image, roughly 10% of the pixels will have survived there as well, and they will also be blue noise distributed. These properties may extend to whatever dimensionality and grouping of subdimensions the mask was generated with.

An example usage case of this property could be in the situation where an importance map for some sparse raytracing may be done into a scene. A rough number of how many rays is needed may be defined to shoot out per frame, and use that per pixel, along with a per pixel random number to decide if a pixel should have a ray shot out for it or not, each frame. When using random numbers that are white over space, and over time, clumping and voids occur, and thus is uneven and redundant sampling in both space and time. When using a flip book of independent 2D blue noise textures, the result improves spatially, but there is still redundant sampling over time. When using a spatio-temporal blue noise mask, both time and space are more evenly sampled as the noise pattern may be the desirable blue noise pattern in screen space, but also more unique pixels will have a ray shot out for them, for the same number of frames, thus maximizing unique information received per ray, per frame. A graph of unique pixel counts over time can be seen in FIG. 34 and this can also be seen visually in FIG. 33.

Figure 31:
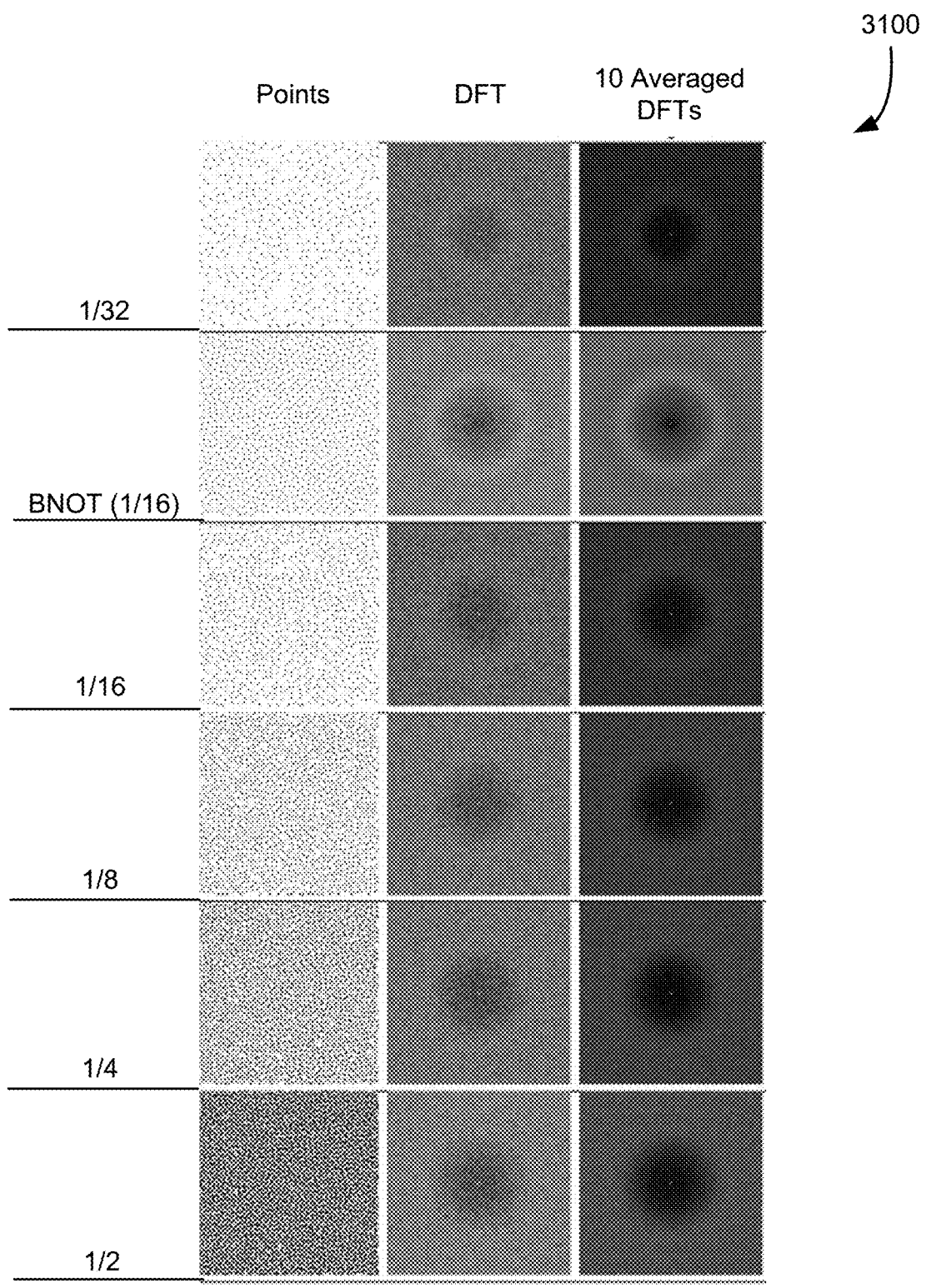
FIG. 31 shows how threshold masks are able to make point sets of any density, according to at least one embodiment.

FIG. 31 shows how threshold masks are able to make point sets of any density, according to at least one embodiment. That is, in FIG. 31, 1024 Blue Noise through Optimal Transport (BNOT) samples are compared with a 128×128×10 2D×1D blue noise mask threshold to different levels. BNOT is much higher quality over space but has a fixed density and gives no treatment to the time axis, necessitating independent sample sets to be white noise over time.

Figure 32:
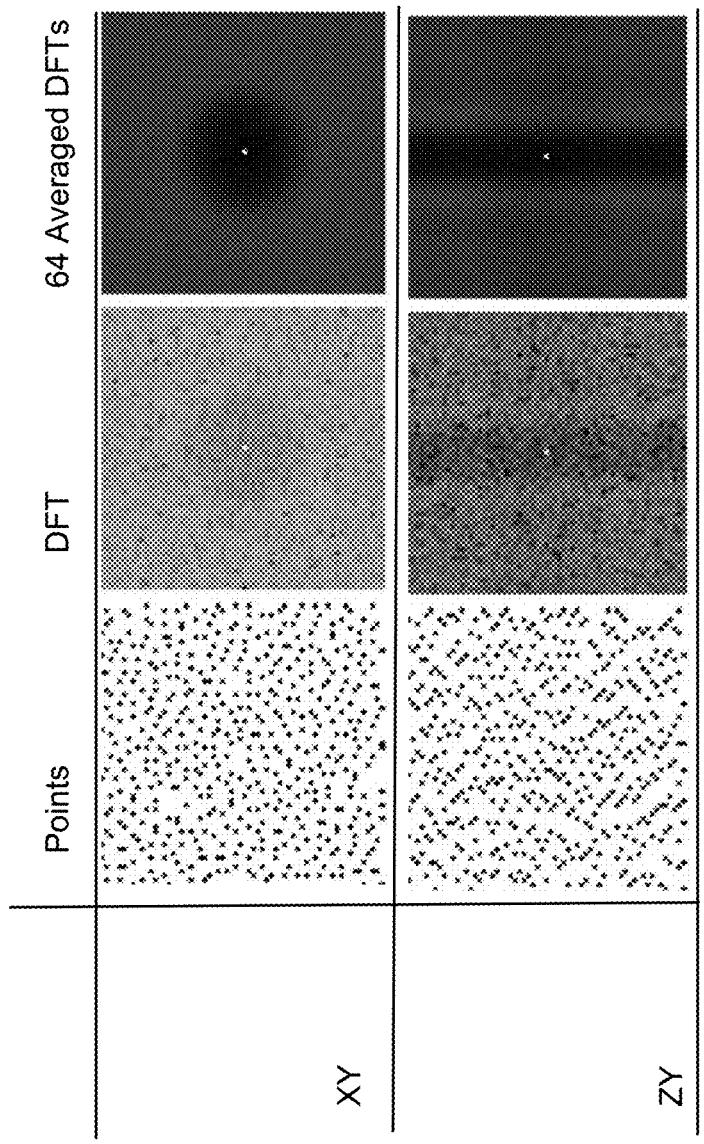
FIG. 32 shows how the threshold point sets keep their desired frequency spectra over axis groups, according to at least one embodiment.

FIG. 32 shows how the threshold point sets keep their desired frequency spectra over axis groups, according to at least one embodiment. That is, FIG. 32 illustrates DFT of 2D projections of 64×64×64 2D×1D blue noise masks with a $\frac{1}{8}^{th}$ threshold to show how the threshold point sets keep their blue noise spectrum that the masks have.

In an embodiment, modifications to the BNDS algorithm are described herein where blue noise masks of any dimension which have blue noise properties confined to subspace axis groups are generated. In an embodiment, these blue noise masks can be useful for a variety of low sample count rendering algorithms with the goal of getting desirable blue noise error patterns while also converging faster than other methods which use blue noise masks. In an embodiment, these blue noise masks can have a threshold to take these properties into the realm of blue noise sampling.

Figure 33:
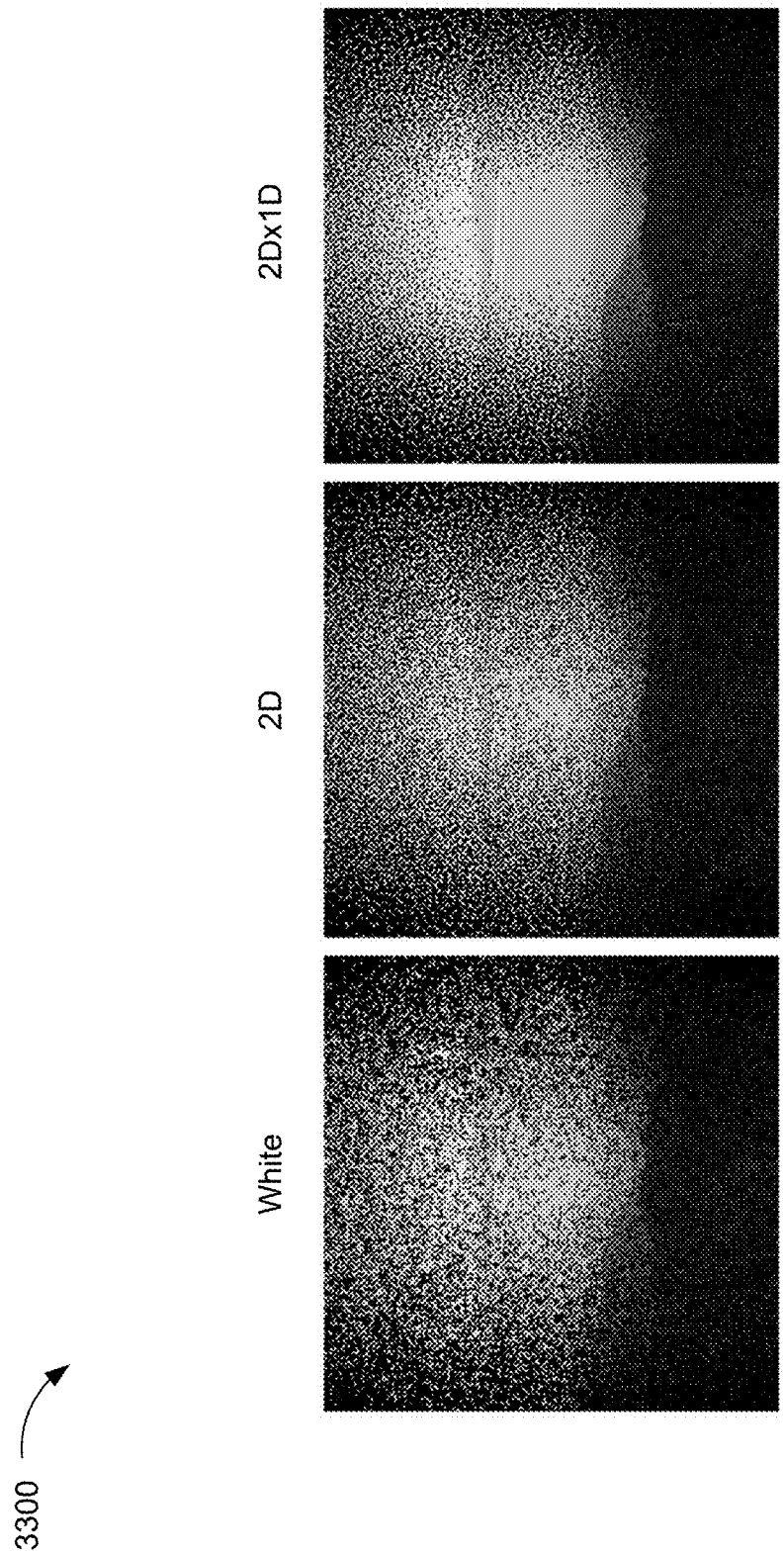
FIG. 33 shows five accumulated frames of pixels sampled from an image using a non-uniform importance map to make pixels towards the center be more likely to be sampled, according to at least one embodiment.

FIG. 33 shows five accumulated frames of pixels sampled from an image using a non-uniform importance map to make pixels towards the center be more likely to be sampled, according to at least one embodiment. While both 2D blue noise and spatio-temporal blue noise have desirable sampling patterns spatially, spatio-temporal blue noise samples more unique pixels in shorter numbers of frames.

As importance sampling is a topic which is largely at odds with using specific sample patterns, blue noise itself happens to keep desirable properties more often when put through warping functions. In an embodiment, these blue noise masks can be extended to not just have desired projections per axis group, but also allow them to have specific distributions per axis group. This enables blue noise to be generated in post-warp space, meaning the blue noise would not be damaged in any way and could have importance sampling PDFs baked into it. While some PDFs may be very specific for use and so perhaps not be as desirable to bake in all the time—such as a HDRI skybox image—other PDFs would get much more re-use, such as GGX for specular reflections.

Figure 34:
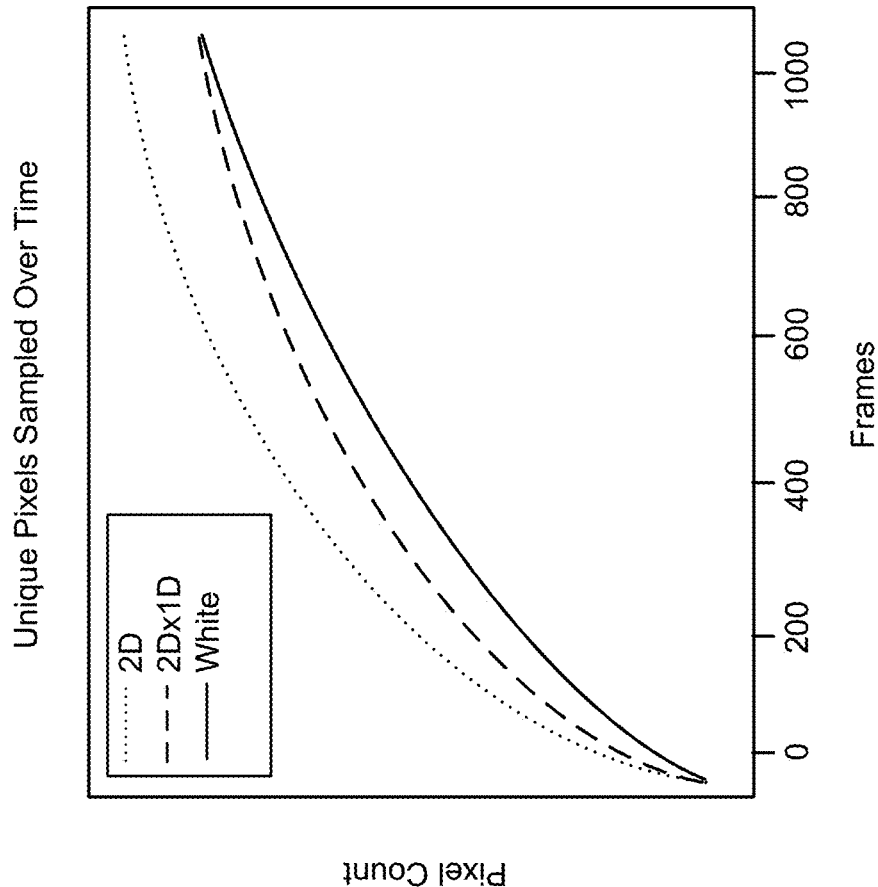
FIG. 34 illustrates that while white noise can have redundant sampled pixels each frame, and over time, spatio blue noise removes redundant pixels over space and 2D×1D spatio-temporal blue noise removes them over time as well, according to at least one embodiment.

FIG. 34 illustrates that while white noise can have redundant sampled pixels each frame, and over time, spatio-blue noise removes redundant pixels over space and 2D×1D spatio-temporal blue noise removes them over time as well, according to at least one embodiment.

Although the techniques described herein refer to blue noise masks, other colors (e.g., red noise) of noise may also be applicable to improve real-time image rendering and enhancement.

Inference and Training Logic

Figure 35A:
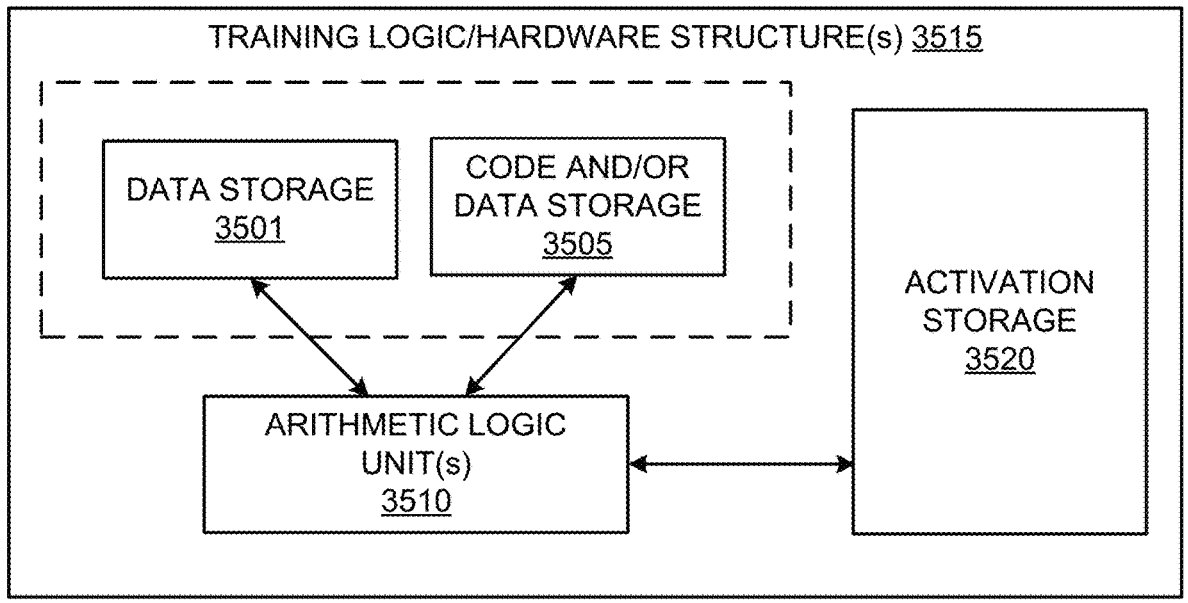
FIG. 35A illustrates inference and/or training logic, according to at least one embodiment.

FIG. 35A illustrates inference and/or training logic 3515 used to perform inferencing and/or training operations associated with one or more embodiments. Details regarding inference and/or training logic 3515 are provided below in conjunction with FIGS. 35A and/or 35B. In at least one embodiment, inference and/or training logic 2815 can be implemented with process 900 (see FIG. 9A) or process 906 (see FIG. 9B), e.g., to render an image using DLSS. In at least one embodiment, inference and/or training logic 2815 performs part or all or processes 200 and/or 800.

In at least one embodiment, inference and/or training logic 3515 may include, without limitation, code and/or data storage 3501 to store forward and/or output weight and/or input/output data, and/or other parameters to configure neurons or layers of a neural network trained and/or used for inferencing in aspects of one or more embodiments. In at least one embodiment, training logic 3515 may include, or be coupled to code and/or data storage 3501 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment, code and/or data storage 3501 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 3501 may be included with other on-chip or off-chip data storage, including a processor's L1, L2, or L3 cache or system memory.

In at least one embodiment, any portion of code and/or data storage 3501 may be internal or external to one or more processors or other hardware logic devices or circuits. In at least one embodiment, code and/or code and/or data storage 3501 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 3501 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 3515 may include, without limitation, a code and/or data storage 3505 to store backward and/or output weight and/or input/output data corresponding to neurons or layers of a neural network trained and/or used for inferencing in aspects of one or more embodiments. In at least one embodiment, code and/or data storage 3505 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 3515 may include, or be coupled to code and/or data storage 3505 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 3505 may be included with other on-chip or off-chip data storage, including a processor's L1, L2, or L3 cache or system memory. In at least one embodiment, any portion of code and/or data storage 3505 may be internal or external to one or more processors or other hardware logic devices or circuits. In at least one embodiment, code and/or data storage 3505 may be cache memory, DRAM, SRAM, non-volatile memory (e.g., flash memory), or other storage. In at least one embodiment, a choice of whether code and/or data storage 3505 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 3501 and code and/or data storage 3505 may be separate storage structures. In at least one embodiment, code and/or data storage 3501 and code and/or data storage 3505 may be a combined storage structure. In at least one embodiment, code and/or data storage 3501 and code and/or data storage 3505 may be partially combined and partially separate. In at least one embodiment, any portion of code and/or data storage 3501 and code and/or data storage 3505 may be included with other on-chip or off-chip data storage, including a processor's L1, L2, or L3 cache or system memory.

In at least one embodiment, inference and/or training logic 3515 may include, without limitation, one or more arithmetic logic unit(s) ("ALU(s)") 3510, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 3520 that are functions of input/output and/or weight parameter data stored in code and/or data storage 3501 and/or code and/or data storage 3505. In at least one embodiment, activations stored in activation storage 3520 are generated according to linear algebraic and/or matrix-based mathematics performed by ALU(s) 3510 in response to performing instructions or other code, wherein weight values stored in code and/or data storage 3505 and/or data storage 3501 are used as operands along with other values, such as bias values, gradient information, momentum values, or other parameters or hyperparameters, any or all of which may be stored in code and/or data storage 3505 or code and/or data storage 3501 or another storage on or off-chip.

In at least one embodiment, ALU(s) 3510 are included within one or more processors or other hardware logic devices or circuits, whereas in another embodiment, ALU(s) 3510 may be external to a processor or other hardware logic device or circuit that uses them (e.g., a co-processor). In at least one embodiment, ALUs 3510 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 3501, code and/or data storage 3505, and activation storage 3520 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 3520 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 3520 may be cache memory, DRAM, SRAM, non-volatile memory (e.g., flash memory), or other storage. In at least one embodiment, activation storage 3520 may be completely or partially within or external to one or more processors or other logical circuits. In at least one embodiment, a choice of whether activation storage 3520 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 3515 illustrated in FIG. 35A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 3515 illustrated in FIG. 35A may be used in conjunction with central processing unit ("CPU") hardware, graphics processing unit ("GPU") hardware or other hardware, such as field programmable gate arrays ("FPGAs").

Figure 35B:
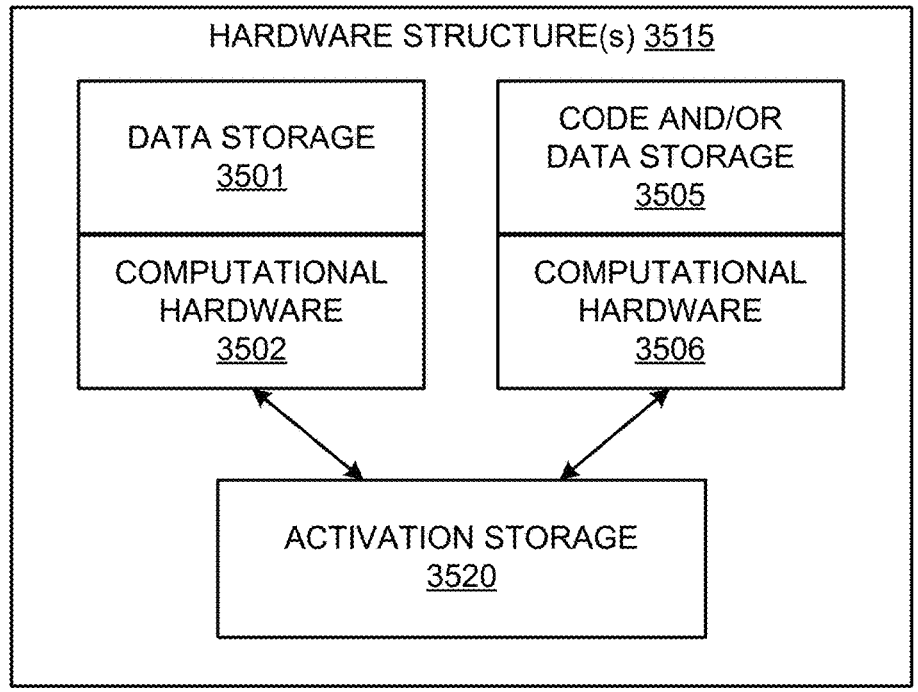
FIG. 35B illustrates inference and/or training logic, according to at least one embodiment.

FIG. 35B illustrates inference and/or training logic 3515, according to at least one embodiment. In at least one embodiment, inference and/or training logic 3515 may include, without limitation, hardware logic in which computational resources are dedicated or otherwise exclusively used in conjunction with weight values or other information corresponding to one or more layers of neurons within a neural network. In at least one embodiment, inference and/or training logic 3515 illustrated in FIG. 35B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 3515 illustrated in FIG. 35B may be used in conjunction with central processing unit (CPU) hardware, graphics processing unit (GPU) hardware or other hardware, such as field programmable gate arrays (FPGAs). In at least one embodiment, inference and/or training logic 3515 includes, without limitation, code and/or data storage 3501 and code and/or data storage 3505, which may be used to store code (e.g., graph code), weight values and/or other information, including bias values, gradient information, momentum values, and/or other parameter or hyperparameter information. In at least one embodiment illustrated in FIG. 35B, each of code and/or data storage 3501 and code and/or data storage 3505 is associated with a dedicated computational resource, such as computational hardware 3502 and computational hardware 3506, respectively. In at least one embodiment, each of computational hardware 3502 and computational hardware 3506 comprises one or more ALUs that perform mathematical functions, such as linear algebraic functions, only on information stored in code and/or data storage 3501 and code and/or data storage 3505, respectively, result of which is stored in activation storage 3520.

In at least one embodiment, each of code and/or data storage 3501 and 3505 and corresponding computational hardware 3502 and 3506, respectively, correspond to different layers of a neural network, such that resulting activation from one storage/computational pair 3501/3502 of code and/or data storage 3501 and computational hardware 3502 is provided as an input to a next storage/computational pair 3505/3506 of code and/or data storage 3505 and computational hardware 3506, in order to mirror a conceptual organization of a neural network. In at least one embodiment, each of storage/computational pairs 3501/3502 and 3505/3506 may correspond to more than one neural network layer. In at least one embodiment, additional storage/computation pairs (not shown) subsequent to or in parallel with storage/computation pairs 3501/3502 and 3505/3506 may be included in inference and/or training logic 3515.

Neural Network Training and Deployment

Figure 36:
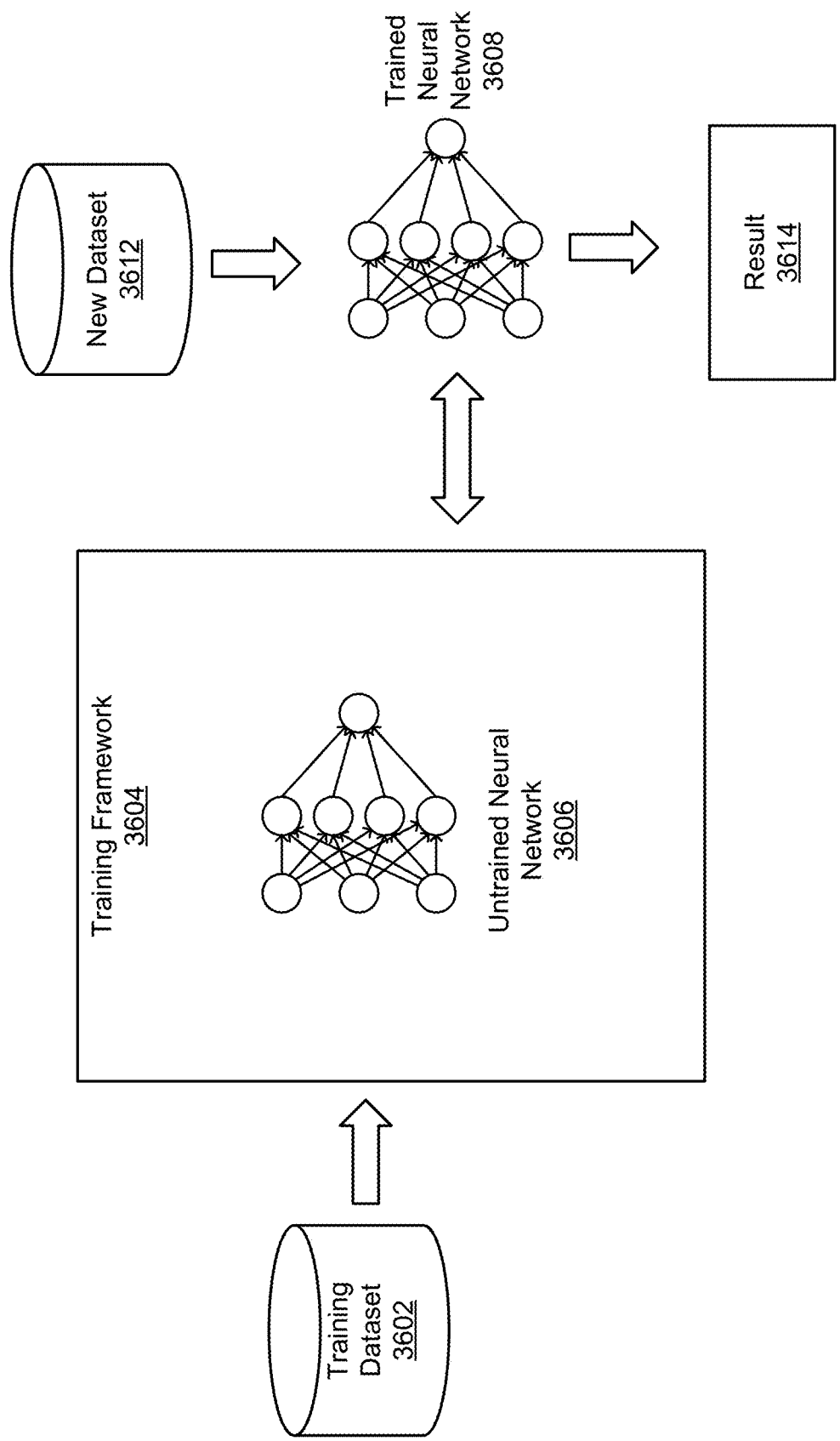
FIG. 36 illustrates training and deployment of a neural network, according to at least one embodiment.

FIG. 36 illustrates training and deployment of a deep neural network, according to at least one embodiment. In at least one embodiment, untrained neural network 3606 is trained using a training dataset 3602. In at least one embodiment, untrained neural network 2906 can be implemented with process 900 or process 906 (see FIG. 9B), e.g., to render an image using DLSS or another neural network operation. In at least one embodiment, training framework 3604 is a PyTorch framework, whereas in other embodiments, training framework 3604 is a TensorFlow, Boost, Caffe, Microsoft Cognitive Toolkit/CNTK, MXNet, Chainer, Keras, Deeplearning4j, or other training framework. In at least one embodiment, training framework 3604 trains an untrained neural network 3606 and enables it to be trained using processing resources described herein to generate a trained neural network 3608. In at least one embodiment, weights may be chosen randomly or by pre-training using a deep belief network. In at least one embodiment, training may be performed in either a supervised, partially supervised, or unsupervised manner.

In at least one embodiment, untrained neural network 3606 is trained using supervised learning, wherein training dataset 3602 includes an input paired with a desired output for an input, or where training dataset 3602 includes input having a known output and an output of neural network 3606 is manually graded. In at least one embodiment, untrained neural network 3606 is trained in a supervised manner and processes inputs from training dataset 3602 and compares resulting outputs against a set of expected or desired outputs. In at least one embodiment, errors are then propagated back through untrained neural network 3606. In at least one embodiment, training framework 3604 adjusts weights that control untrained neural network 3606. In at least one embodiment, training framework 3604 includes tools to monitor how well untrained neural network 3606 is converging towards a model, such as trained neural network 3608, suitable to generating correct answers, such as in result 3614, based on input data such as a new dataset 3612. In at least one embodiment, training framework 3604 trains untrained neural network 3606 repeatedly while adjust weights to refine an output of untrained neural network 3606 using a loss function and adjustment algorithm, such as stochastic gradient descent. In at least one embodiment, training framework 3604 trains untrained neural network 3606 until untrained neural network 3606 achieves a desired accuracy. In at least one embodiment, trained neural network 3608 can then be deployed to implement any number of machine learning operations.

In at least one embodiment, untrained neural network 3606 is trained using unsupervised learning, wherein untrained neural network 3606 attempts to train itself using unlabeled data. In at least one embodiment, unsupervised learning training dataset 3602 will include input data without any associated output data or "ground truth" data. In at least one embodiment, untrained neural network 3606 can learn groupings within training dataset 3602 and can determine how individual inputs are related to untrained dataset 3602. In at least one embodiment, unsupervised training can be used to generate a self-organizing map in trained neural network 3608 capable of performing operations useful in reducing dimensionality of new dataset 3612. In at least one embodiment, unsupervised training can also be used to perform anomaly detection, which allows identification of data points in new dataset 3612 that deviate from normal patterns of new dataset 3612.

In at least one embodiment, semi-supervised learning may be used, which is a technique in which in training dataset 3602 includes a mix of labeled and unlabeled data. In at least one embodiment, training framework 3604 may be used to perform incremental learning, such as through transferred learning techniques. In at least one embodiment, incremental learning enables trained neural network 3608 to adapt to new dataset 3612 without forgetting knowledge instilled within trained neural network 3608 during initial training.

Data Center

Figure 37:
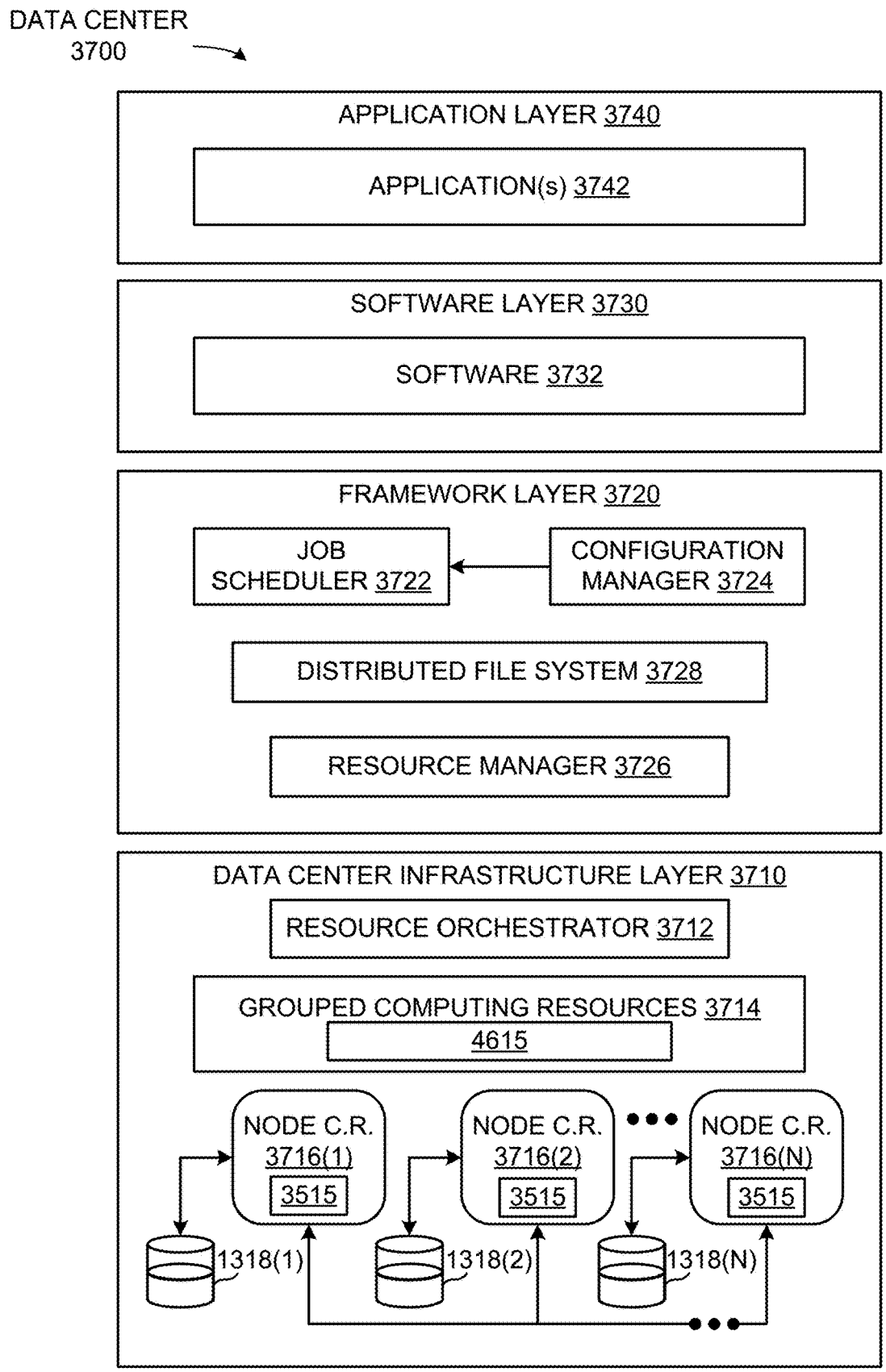
FIG. 37 illustrates an example data center system, according to at least one embodiment.

FIG. 37 illustrates an example data center 3700, in which at least one embodiment may be used. In at least one embodiment, data center 3700 includes a data center infrastructure layer 3710, a framework layer 3720, a software layer 3730 and an application layer 3740. Data center 3000 can implement process 900 or process 906 (see FIG. 9B).

In at least one embodiment, as shown in FIG. 37, data center infrastructure layer 3710 may include a resource orchestrator 3712, grouped computing resources 3714, and node computing resources ("node C.R.s") 3716(1)-3716(N), where "N" represents a positive integer (which may be a different integer "N" than used in other figures). In at least one embodiment, node C.R.s 3716(1)-3716(N) may include, but are not limited to, any number of central processing units ("CPUs") or other processors (including accelerators, field programmable gate arrays (FPGAs), graphics processors, etc.), memory storage devices 3718(1)-3718(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 3716(1)-3716(N) may be a server having one or more of above-mentioned computing resources.

In at least one embodiment, grouped computing resources 3714 may include separate groupings of node C.R.s housed within one or more racks (not shown), or many racks housed in data centers at various geographical locations (also not shown). In at least one embodiment, separate groupings of node C.R.s within grouped computing resources 3714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 3712 may configure or otherwise control one or more node C.R.s 3716(1)-3716(N) and/or grouped computing resources 3714. In at least one embodiment, resource orchestrator 3712 may include a software design infrastructure ("SDI") management entity for data center 3700. In at least one embodiment, resource orchestrator 3712 may include hardware, software or some combination thereof.

In at least one embodiment, as shown in FIG. 37, framework layer 3720 includes a job scheduler 3722, a configuration manager 3724, a resource manager 3726 and a distributed file system 3728. In at least one embodiment, framework layer 3720 may include a framework to support software 3732 of software layer 3730 and/or one or more application(s) 3742 of application layer 3740. In at least one embodiment, software 3732 or application(s) 3742 may respectively include web-based service software or applications, such as those provided by Amazon Web Services, Google Cloud and Microsoft Azure. In at least one embodiment, framework layer 3720 may be, but is not limited to, a type of free and open-source software web application framework such as Apache Spark™ (hereinafter "Spark") that may utilize distributed file system 3728 for large-scale data processing (e.g., "big data"). In at least one embodiment, job scheduler 3722 may include a Spark driver to facilitate scheduling of workloads supported by various layers of data center 3700. In at least one embodiment, configuration manager 3724 may be capable of configuring different layers such as software layer 3730 and framework layer 3720 including Spark and distributed file system 3728 for supporting large-scale data processing. In at least one embodiment, resource manager 3726 may be capable of managing clustered or grouped computing resources mapped to or allocated for support of distributed file system 3728 and job scheduler 3722. In at least one embodiment, clustered or grouped computing resources may include grouped computing resources 3714 at data center infrastructure layer 3710. In at least one embodiment, resource manager 3726 may coordinate with resource orchestrator 3712 to manage these mapped or allocated computing resources.

In at least one embodiment, software 3732 included in software layer 3730 may include software used by at least portions of node C.R.s 3716(1)-3716(N), grouped computing resources 3714, and/or distributed file system 3728 of framework layer 3720. In at least one embodiment, one or more types of software may include, but are not limited to, Internet web page search software, e-mail virus scan software, database software, and streaming video content software.

In at least one embodiment, application(s) 3742 included in application layer 3740 may include one or more types of applications used by at least portions of node C.R.s 3716(1)-3716(N), grouped computing resources 3714, and/or distributed file system 3728 of framework layer 3720. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 3724, resource manager 3726, and resource orchestrator 3712 may implement any number and type of self-modifying actions based on any amount and type of data acquired in any technically feasible fashion. In at least one embodiment, self-modifying actions may relieve a data center operator of data center 3700 from making possibly bad configuration decisions and possibly avoiding underutilized and/or poor performing portions of a data center.

In at least one embodiment, data center 3700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 3700. In at least one embodiment, trained machine learning models corresponding to one or more neural networks may be used to infer or predict information using resources described above with respect to data center 3700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in system FIG. 37 for inferencing or predicting operations based, at least in part, on weight parameters calculated using neural network training operations, neural network functions and/or architectures, or neural network use cases described herein.

Supercomputing

The following figures set forth, without limitation, exemplary supercomputer-based systems that can be used to implement at least one embodiment.

In at least one embodiment, a supercomputer may refer to a hardware system exhibiting substantial parallelism and comprising at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

Figure 38A:
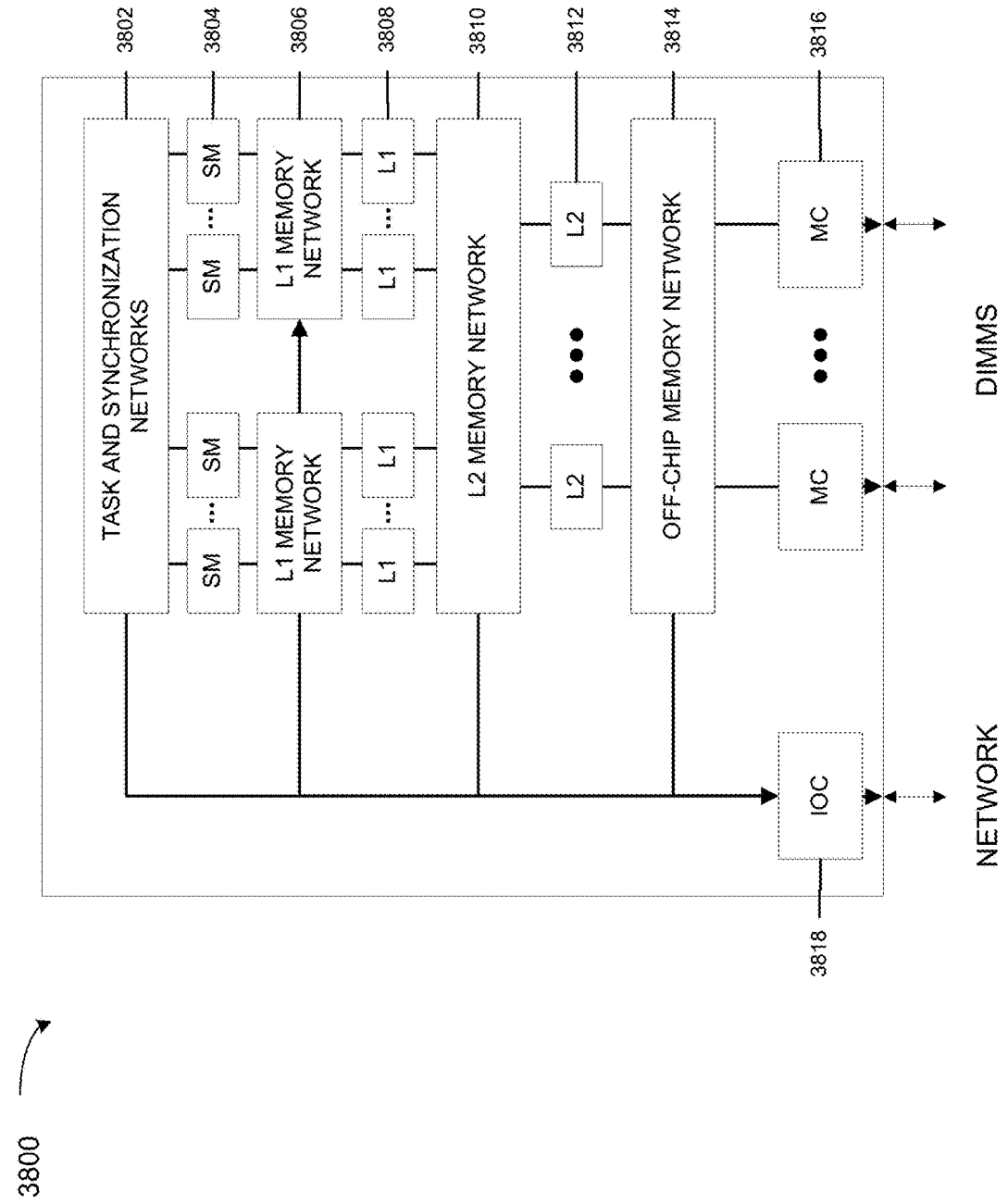
FIG. 38A illustrates a supercomputer at a chip level, in accordance with at least one embodiment.

FIG. 38A illustrates a supercomputer at a chip level, in accordance with at least one embodiment. In at least one embodiment, inside an FPGA or ASIC chip, main computation is performed within finite state machines (3804) called thread units. In an embodiment, the supercomputer 3100 can implement process 900 (see FIG. 9A) or process 906 (see FIG. 9B). In at least one embodiment, task and synchronization networks (3802) connect finite state machines and are used to dispatch threads and execute operations in correct order. In at least one embodiment, a multi-level partitioned on-chip cache hierarchy (3808, 3812) is accessed using memory networks (3806, 3810). In at least one embodiment, off-chip memory is accessed using memory controllers (3816) and an off-chip memory network (3814). In at least one embodiment, I/O controller (3818) is used for cross-chip communication when a design does not fit in a single logic chip.

Figure 38B:
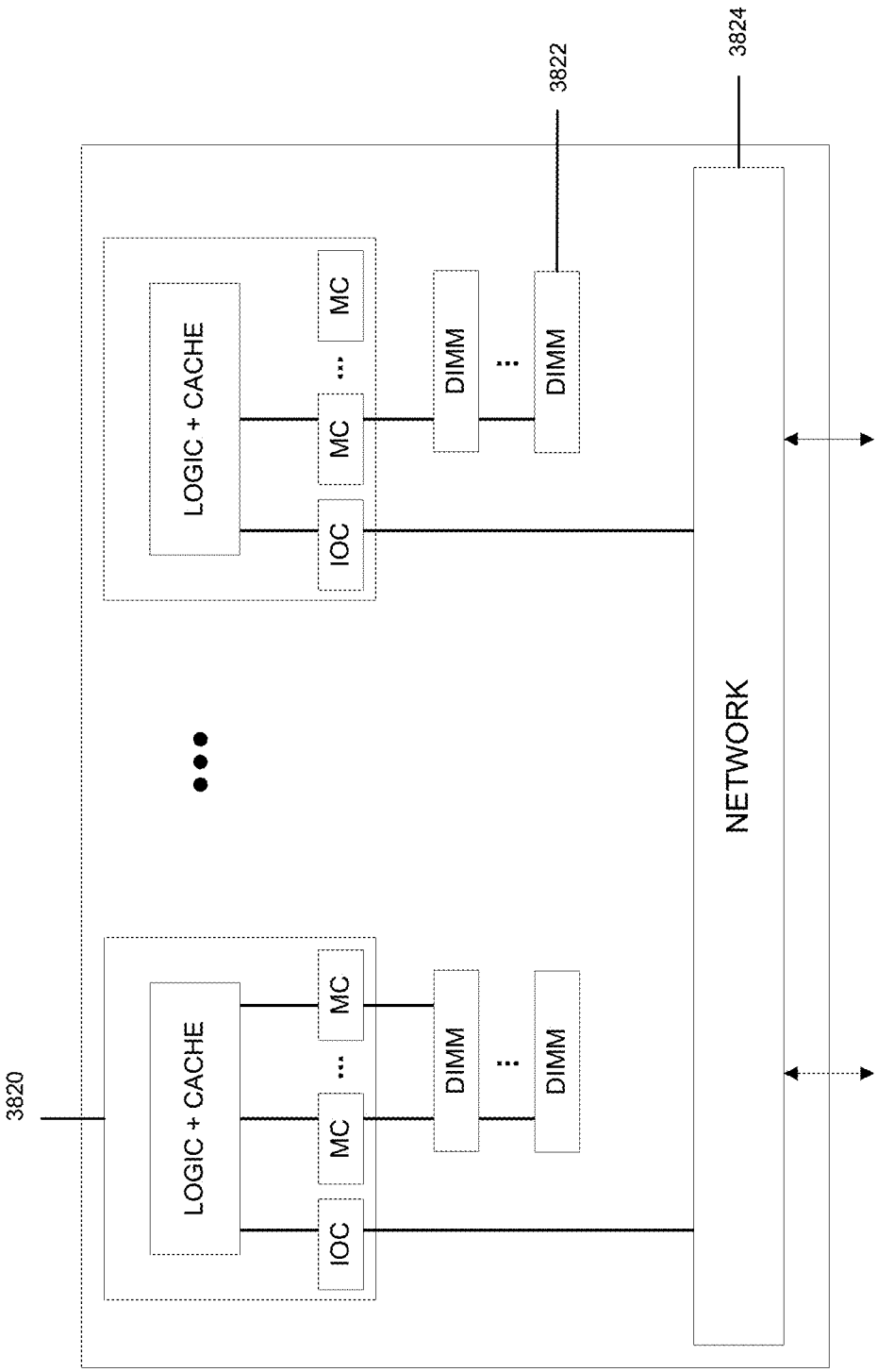
FIG. 38B illustrates a supercomputer at a rack module level, in accordance with at least one embodiment.

FIG. 38B illustrates a supercomputer at a rock module level, in accordance with at least one embodiment. In at least one embodiment, within a rack module, there are multiple FPGA or ASIC chips (3820) that are connected to one or more DRAM units (3822) which constitute main accelerator memory. In at least one embodiment, each FPGA/ASIC chip is connected to its neighbor FPGA/ASIC chip using wide busses on a board, with differential high speed signaling (3824). In at least one embodiment, each FPGA/ASIC chip is also connected to at least one high-speed serial communication cable.

Figure 38C:
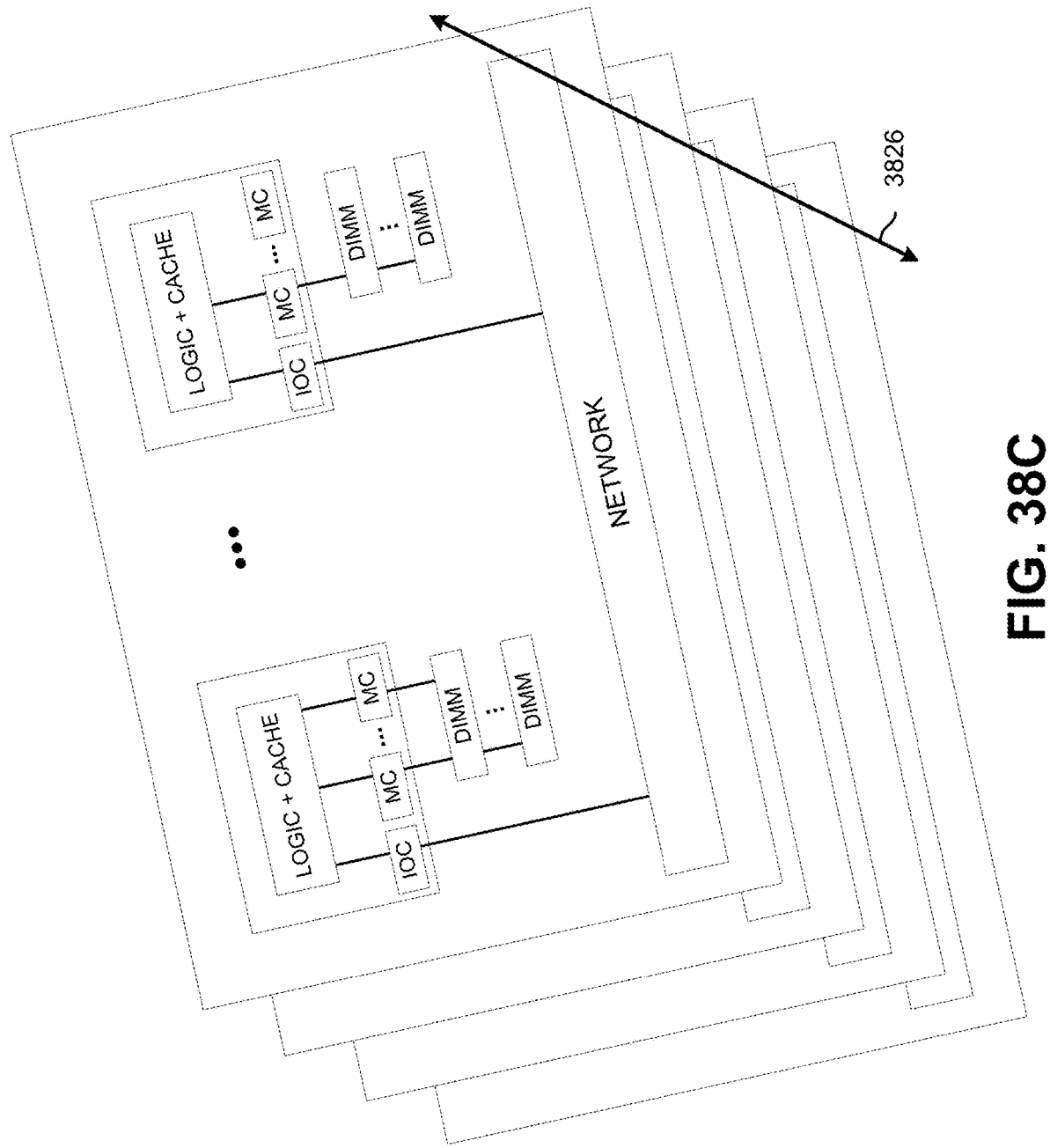
FIG. 38C illustrates a supercomputer at a rack level, in accordance with at least one embodiment.
Figure 38D:
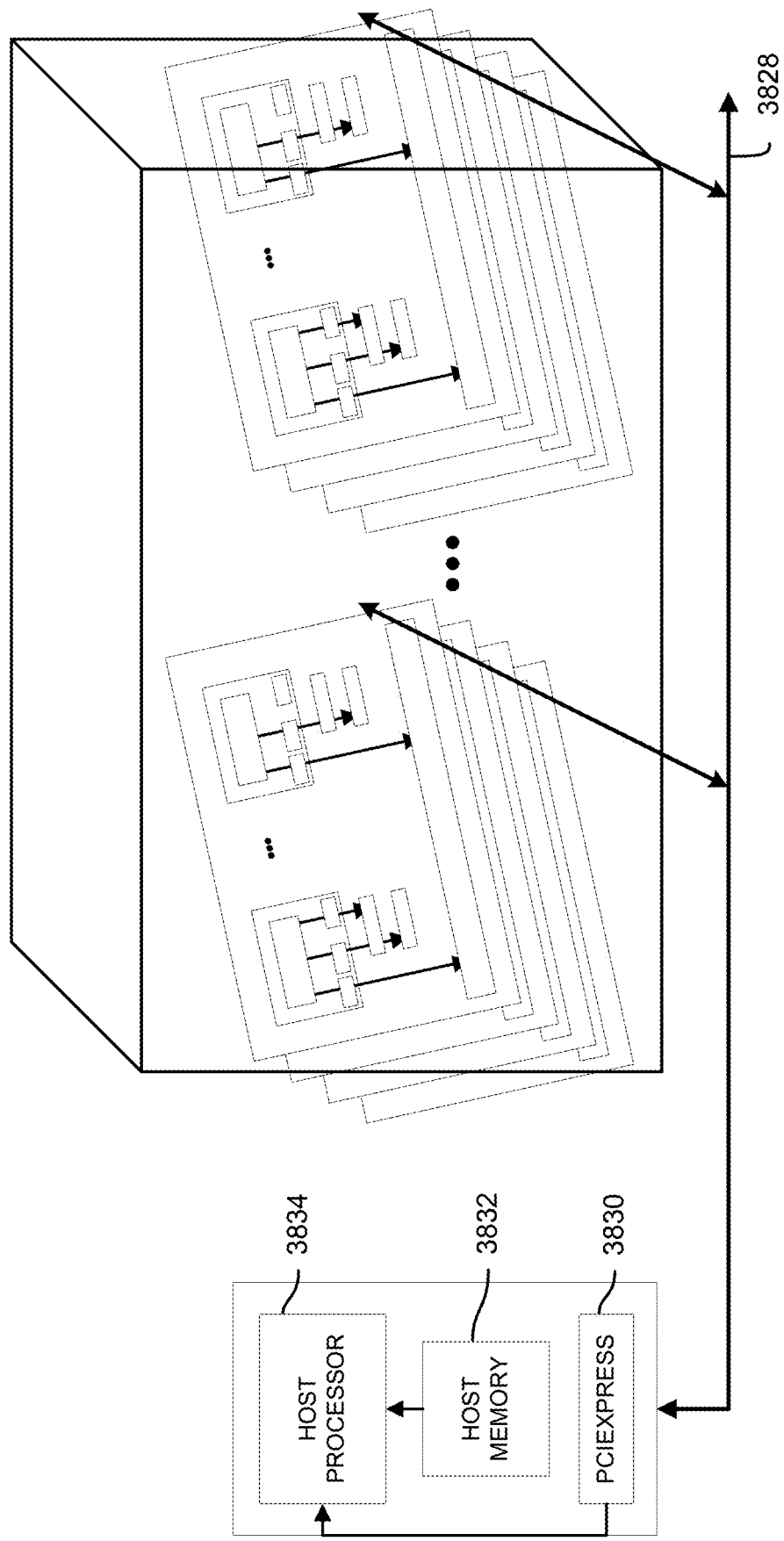
FIG. 38D illustrates a supercomputer at a whole system level, in accordance with at least one embodiment.

FIG. 38C illustrates a supercomputer at a rack level, in accordance with at least one embodiment. FIG. 38D illustrates a supercomputer at a whole system level, in accordance with at least one embodiment. In at least one embodiment, referring to FIG. 38C and FIG. 38D, between rack modules in a rack and across racks throughout an entire system, high-speed serial optical or copper cables (3826, 3828) are used to realize a scalable, possibly incomplete hypercube network. In at least one embodiment, one of FPGA/ASIC chips of an accelerator is connected to a host system through a PCI-Express connection (3830). In at least one embodiment, host system comprises a host microprocessor (3834) that a software part of an application runs on and a memory consisting of one or more host memory DRAM units (3832) that is kept coherent with memory on an accelerator. In at least one embodiment, host system can be a separate module on one of racks, or can be integrated with one of a supercomputer's modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to 2^12=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

Computer Systems

Figure 39:
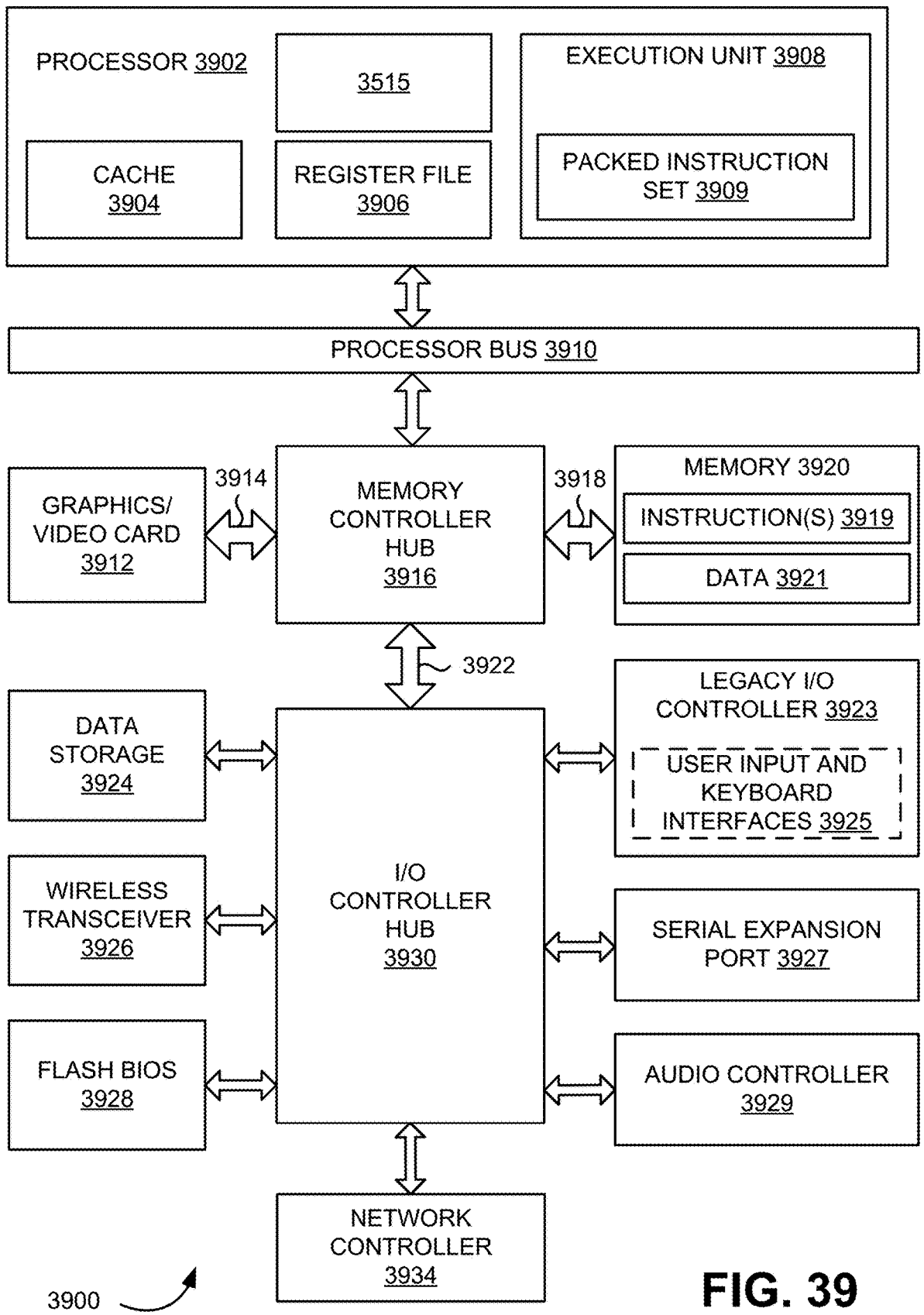
FIG. 39 is a block diagram illustrating a computer system, according to at least one embodiment.

FIG. 39 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 3900 may include, without limitation, a component, such as a processor 3902 to employ execution units including logic to perform algorithms for process data, in accordance with present disclosure, such as in embodiment described herein. In at least one embodiment, computer system 3900 may include processors, such as PENTIUM® Processor family, Xeon™ Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3900 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 3900 may include, without limitation, processor 3902 that may include, without limitation, one or more execution units 3908 to perform machine learning model training and/or inferencing according to techniques described herein. In at least one embodiment, computer system 3900 is a single processor desktop or server system, but in another embodiment, computer system 3900 may be a multiprocessor system. In at least one embodiment, processor 3902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 3902 may be coupled to a processor bus 3910 that may transmit data signals between processor 3902 and other components in computer system 3900.

In at least one embodiment, processor 3902 may include, without limitation, a Level 1 ("L1") internal cache memory ("cache") 3904. In at least one embodiment, processor 3902 may have a single internal cache or multiple levels of internal cache. In at least one embodiment, cache memory may reside external to processor 3902. Other embodiments may also include a combination of both internal and external caches depending on particular implementation and needs. In at least one embodiment, a register file 3906 may store different types of data in various registers including, without limitation, integer registers, floating point registers, status registers, and an instruction pointer register.

In at least one embodiment, execution unit 3908, including, without limitation, logic to perform integer and floating point operations, also resides in processor 3902. In at least one embodiment, processor 3902 may also include a microcode ("ucode") read only memory ("ROM") that stores microcode for certain macro instructions. In at least one embodiment, execution unit 3908 may include logic to handle a packed instruction set 3909. In at least one embodiment, by including packed instruction set 3909 in an instruction set of a general-purpose processor, along with associated circuitry to execute instructions, operations used by many multimedia applications may be performed using packed data in processor 3902. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 3908 may also be used in microcontrollers, embedded processors, graphics devices, DSPs, and other types of logic circuits. In at least one embodiment, computer system 3900 may include, without limitation, a memory 3920. In at least one embodiment, memory 3920 may be a Dynamic Random Access Memory ("DRAM") device, a Static Random Access Memory ("SRAM") device, a flash memory device, or another memory device. In at least one embodiment, memory 3920 may store instruction(s) 3919 and/or data 3921 represented by data signals that may be executed by processor 3902.

In at least one embodiment, a system logic chip may be coupled to processor bus 3910 and memory 3920. In at least one embodiment, a system logic chip may include, without limitation, a memory controller hub ("MCH") 3916, and processor 3902 may communicate with MCH 3916 via processor bus 3910. In at least one embodiment, MCH 3916 may provide a high bandwidth memory path 3918 to memory 3920 for instruction and data storage and for storage of graphics commands, data and textures. In at least one embodiment, MCH 3916 may direct data signals between processor 3902, memory 3920, and other components in computer system 3900 and to bridge data signals between processor bus 3910, memory 3920, and a system I/O interface 3922. In at least one embodiment, a system logic chip may provide a graphics port for coupling to a graphics controller. In at least one embodiment, MCH 3916 may be coupled to memory 3920 through high bandwidth memory path 3918 and a graphics/video card 3912 may be coupled to MCH 3916 through an Accelerated Graphics Port ("AGP") interconnect 3914.

In at least one embodiment, computer system 3900 may use system I/O interface 3922 as a proprietary hub interface bus to couple MCH 3916 to an I/O controller hub ("ICH") 3930. In at least one embodiment, ICH 3930 may provide direct connections to some I/O devices via a local I/O bus. In at least one embodiment, a local I/O bus may include, without limitation, a high-speed I/O bus for connecting peripherals to memory 3920, a chipset, and processor 3902. Examples may include, without limitation, an audio controller 3929, a firmware hub ("flash BIOS") 3928, a wireless transceiver 3926, a data storage 3924, a legacy I/O controller 3923 containing user input and keyboard interfaces 3925, a serial expansion port 3927, such as a Universal Serial Bus ("USB") port, and a network controller 3934. In at least one embodiment, data storage 3924 may comprise a hard disk drive, a floppy disk drive, a CD-ROM device, a flash memory device, or other mass storage device.

In at least one embodiment, FIG. 39 illustrates a system, which includes interconnected hardware devices or "chips", whereas in other embodiments, FIG. 39 may illustrate an exemplary SoC. In at least one embodiment, devices illustrated in FIG. 39 may be interconnected with proprietary interconnects, standardized interconnects (e.g., PCIe) or some combination thereof. In at least one embodiment, one or more components of computer system 3900 are interconnected using compute express link (CXL) interconnects.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in system FIG. 39 for inferencing or predicting operations based, at least in part, on weight parameters calculated using neural network training operations, neural network functions and/or architectures, or neural network use cases described herein.

Figure 40:
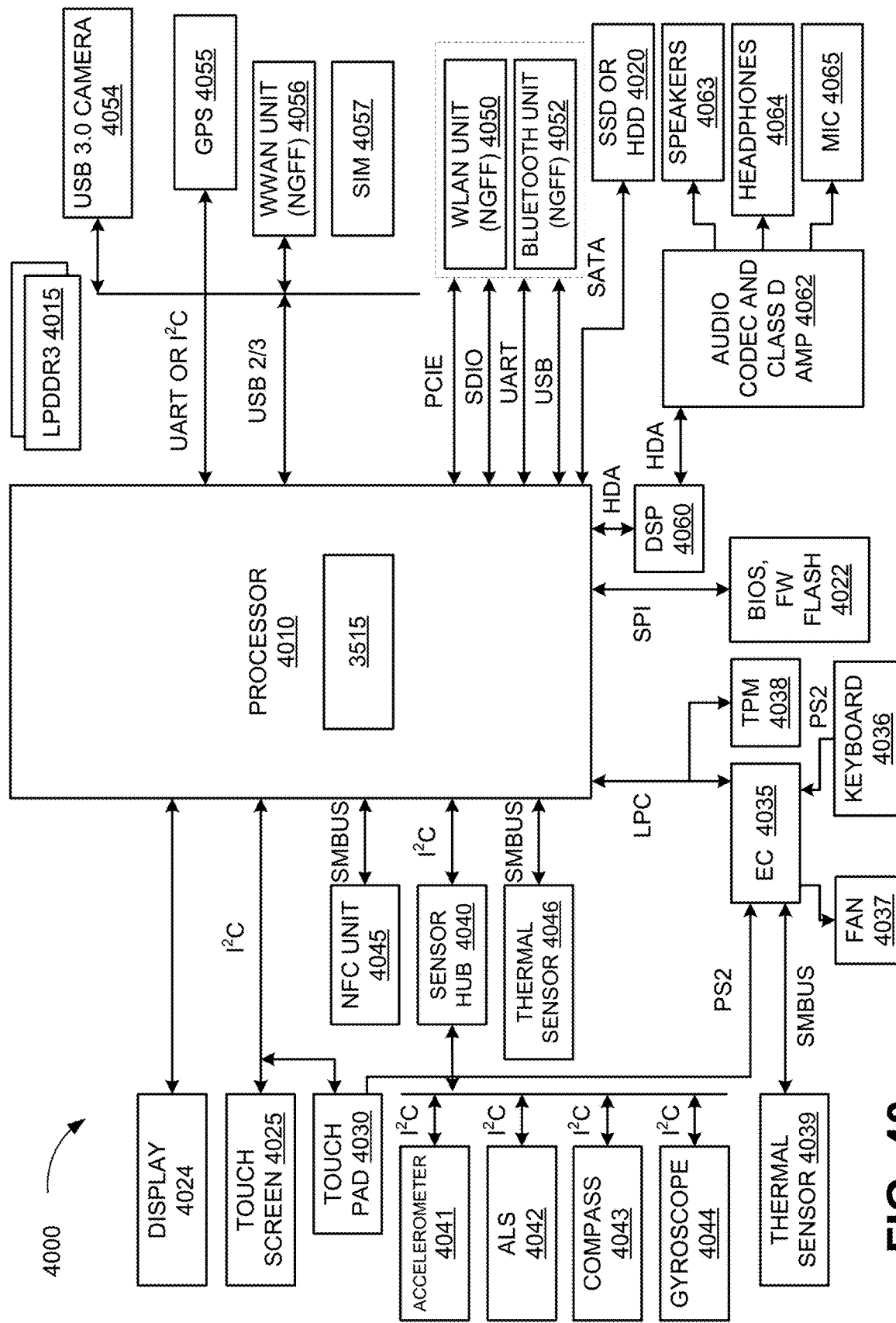
FIG. 40 is a block diagram illustrating a computer system, according to at least one embodiment.

FIG. 40 is a block diagram illustrating an electronic device 4000 for utilizing a processor 4010, according to at least one embodiment. In at least one embodiment, electronic device 4000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 4000 may include, without limitation, processor 4010 communicatively coupled to any suitable number or kind of components, peripherals, modules, or devices. In at least one embodiment, processor 4010 is coupled using a bus or interface, such as a I2C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 40 illustrates a system, which includes interconnected hardware devices or "chips", whereas in other embodiments, FIG. 40 may illustrate an exemplary SoC. In at least one embodiment, devices illustrated in FIG. 40 may be interconnected with proprietary interconnects, standardized interconnects (e.g., PCIe) or some combination thereof. In at least one embodiment, one or more components of FIG. 40 are interconnected using compute express link (CXL) interconnects.

In at least one embodiment, FIG. 40 may include a display 4024, a touch screen 4025, a touch pad 4030, a Near Field Communications unit ("NFC") 4045, a sensor hub 4040, a thermal sensor 4046, an Express Chipset ("EC") 4035, a Trusted Platform Module ("TPM") 4038, BIOS/firmware/flash memory ("BIOS, FW Flash") 4022, a DSP 4060, a drive 4020 such as a Solid State Disk ("SSD") or a Hard Disk Drive ("HDD"), a wireless local area network unit ("WLAN") 4050, a Bluetooth unit 4052, a Wireless Wide Area Network unit ("WWAN") 4056, a Global Positioning System (GPS) unit 4055, a camera ("USB 3.0 camera") 4054 such as a USB 3.0 camera, and/or a Low Power Double Data Rate ("LPDDR") memory unit ("LPDDR3") 4015 implemented in, for example, an LPDDR3 standard. These components may each be implemented in any suitable manner.

In at least one embodiment, other components may be communicatively coupled to processor 4010 through components described herein. In at least one embodiment, an accelerometer 4041, an ambient light sensor ("ALS") 4042, a compass 4043, and a gyroscope 4044 may be communicatively coupled to sensor hub 4040. In at least one embodiment, a thermal sensor 4039, a fan 4037, a keyboard 4036, and touch pad 4030 may be communicatively coupled to EC 4035. In at least one embodiment, speakers 4063, headphones 4064, and a microphone ("mic") 4065 may be communicatively coupled to an audio unit ("audio codec and class D amp") 4062, which may in turn be communicatively coupled to DSP 4060. In at least one embodiment, audio unit 4062 may include, for example and without limitation, an audio coder/decoder ("codec") and a class D amplifier. In at least one embodiment, a SIM card ("SIM") 4057 may be communicatively coupled to WWAN unit 4056. In at least one embodiment, components such as WLAN unit 4050 and Bluetooth unit 4052, as well as WWAN unit 4056 may be implemented in a Next Generation Form Factor ("NGFF").

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in system FIG. 40 for inferencing or predicting operations based, at least in part, on weight parameters calculated using neural network training operations, neural network functions and/or architectures, or neural network use cases described herein.

Figure 41:
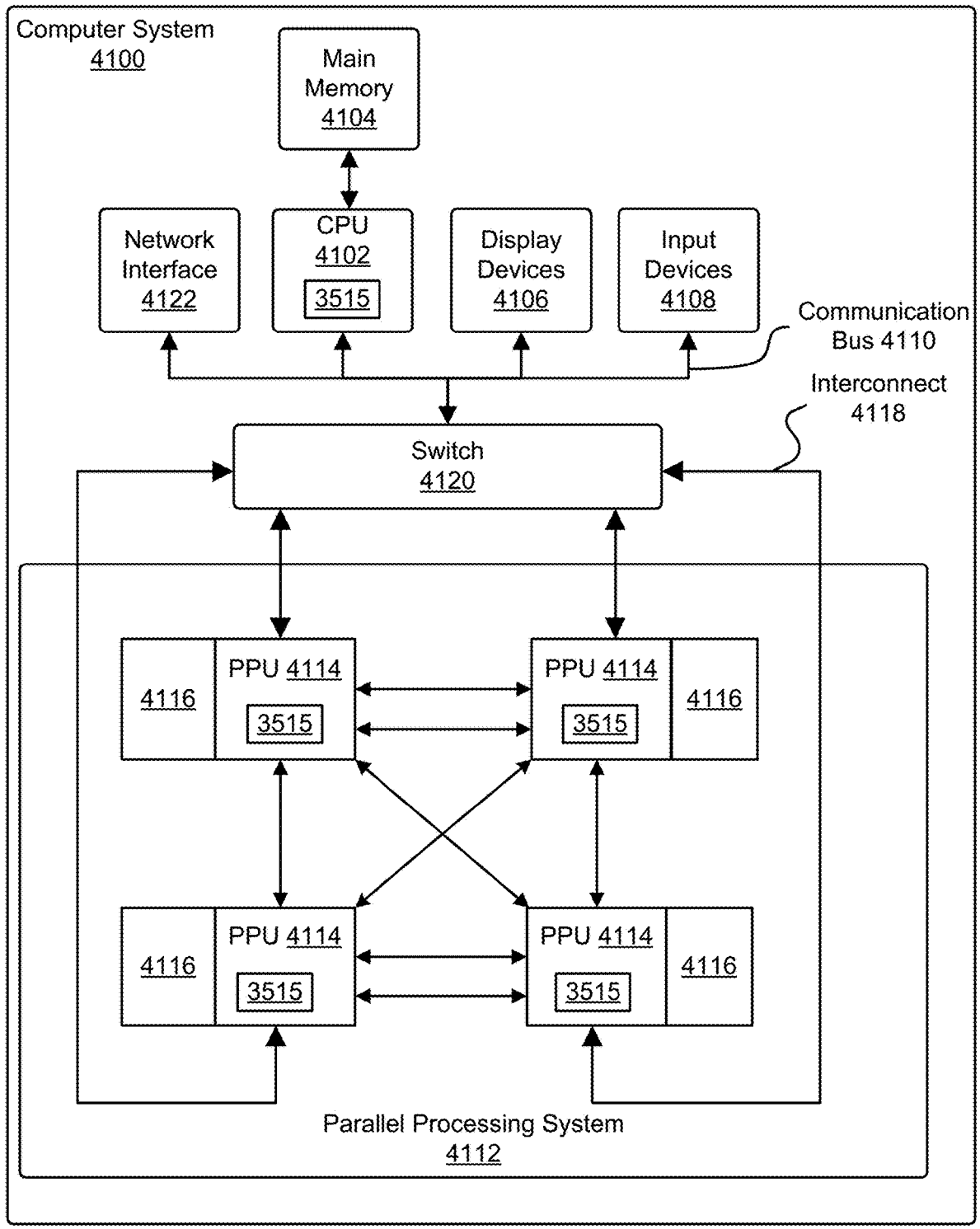
FIG. 41 illustrates a computer system, according to at least one embodiment.

FIG. 41 illustrates a computer system 4100, according to at least one embodiment. In at least one embodiment, computer system 4100 is configured to implement various processes and methods described throughout this disclosure.

In at least one embodiment, computer system 4100 comprises, without limitation, at least one central processing unit ("CPU") 4102 that is connected to a communication bus 4110 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 4100 includes, without limitation, a main memory 4104 and control logic (e.g., implemented as hardware, software, or a combination thereof) and data are stored in main memory 4104, which may take form of random access memory ("RAM"). In at least one embodiment, a network interface subsystem ("network interface") 4122 provides an interface to other computing devices and networks for receiving data from and transmitting data to other systems with computer system 4100.

In at least one embodiment, computer system 4100, in at least one embodiment, includes, without limitation, input devices 4108, a parallel processing system 4112, and display devices 4106 that can be implemented using a conventional cathode ray tube ("CRT"), a liquid crystal display ("LCD"), a light emitting diode ("LED") display, a plasma display, or other suitable display technologies. In at least one embodiment, user input is received from input devices 4108 such as keyboard, mouse, touchpad, microphone, etc. In at least one embodiment, each module described herein can be situated on a single semiconductor platform to form a processing system.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in system FIG. 41 for inferencing or predicting operations based, at least in part, on weight parameters calculated using neural network training operations, neural network functions and/or architectures, or neural network use cases described herein.

Figure 42:
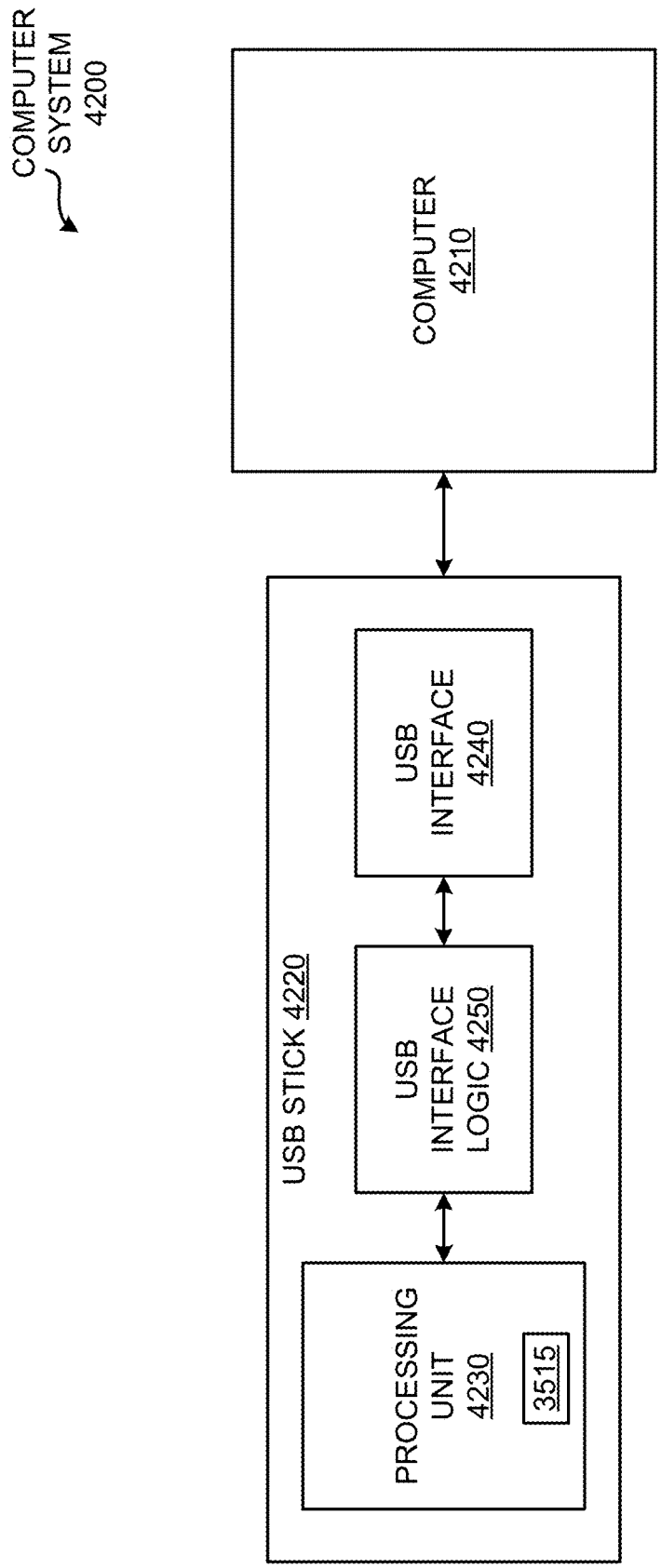
FIG. 42 illustrates a computer system, according to at least one embodiment.

FIG. 42 illustrates a computer system 4200, according to at least one embodiment. In at least one embodiment, computer system 4200 includes, without limitation, a computer 4210 and a USB stick 4220. In at least one embodiment, computer 4210 may include, without limitation, any number and type of processor(s) (not shown) and a memory (not shown). In at least one embodiment, computer 4210 includes, without limitation, a server, a cloud instance, a laptop, and a desktop computer.

In at least one embodiment, USB stick 4220 includes, without limitation, a processing unit 4230, a USB interface 4240, and USB interface logic 4250. In at least one embodiment, processing unit 4230 may be any instruction execution system, apparatus, or device capable of executing instructions. In at least one embodiment, processing unit 4230 may include, without limitation, any number and type of processing cores (not shown). In at least one embodiment, processing unit 4230 comprises an application specific integrated circuit ("ASIC") that is optimized to perform any amount and type of operations associated with machine learning. For instance, in at least one embodiment, processing unit 4230 is a tensor processing unit ("TPC") that is optimized to perform machine learning inference operations. In at least one embodiment, processing unit 4230 is a vision processing unit ("VPU") that is optimized to perform machine vision and machine learning inference operations.

In at least one embodiment, USB interface 4240 may be any type of USB connector or USB socket. For instance, in at least one embodiment, USB interface 4240 is a USB 3.0 Type-C socket for data and power. In at least one embodiment, USB interface 4240 is a USB 3.0 Type-A connector. In at least one embodiment, USB interface logic 4250 may include any amount and type of logic that enables processing unit 4230 to interface with devices (e.g., computer 4210) via USB connector 4240.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in system FIG. 42 for inferencing or predicting operations based, at least in part, on weight parameters calculated using neural network training operations, neural network functions and/or architectures, or neural network use cases described herein.

Figure 43A:
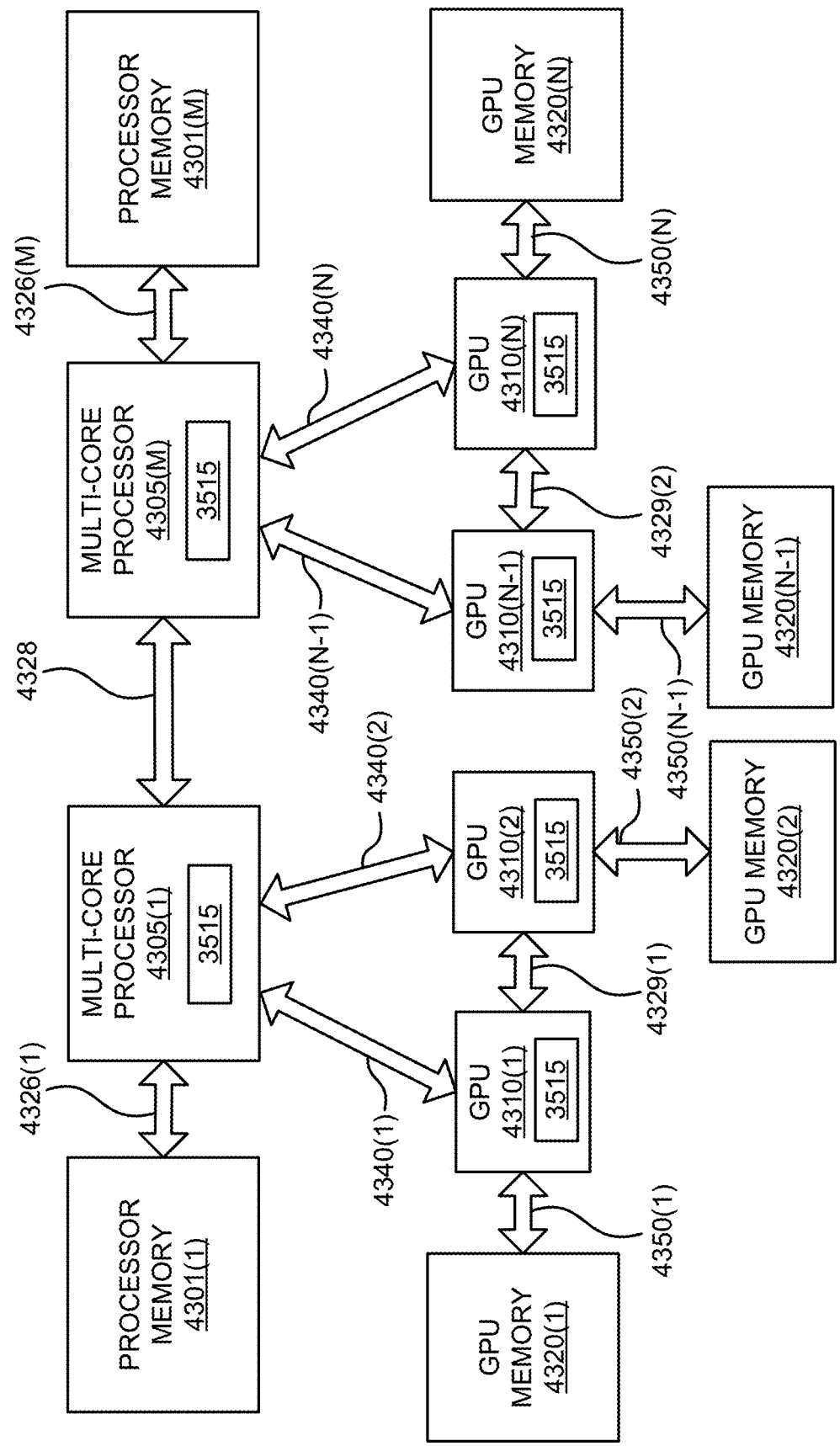
FIG. 43A illustrates a computer system, according to at least one embodiment.

FIG. 43A illustrates an exemplary architecture in which a plurality of GPUs 4310(1)-4310(N) is communicatively coupled to a plurality of multi-core processors 4305(1)-4305(M) over high-speed links 4340(1)-4340(N) (e.g., buses, point-to-point interconnects, etc.). In at least one embodiment, high-speed links 4340(1)-4340(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure.

In addition, and in at least one embodiment, two or more of GPUs 4310 are interconnected over high-speed links 4329(1)-4329(2), which may be implemented using similar or different protocols/links than those used for high-speed links 4340(1)-4340(N). Similarly, two or more of multi-core processors 4305 may be connected over a high-speed link 4328 which may be symmetric multi-processor (SMP) buses operating at 20 GB/s, 30 GB/s, 120 GB/s or higher. Alternatively, all communication between various system components shown in FIG. 43A may be accomplished using similar protocols/links (e.g., over a common interconnection fabric).

In at least one embodiment, each multi-core processor 4305 is communicatively coupled to a processor memory 4301(1)-4301(M), via memory interconnects 4326(1)-4326

(M), respectively, and each GPU 4310(1)-4310(N) is communicatively coupled to GPU memory 4320(1)-4320(N) over GPU memory interconnects 4350(1)-4350(N), respectively. In at least one embodiment, memory interconnects 4326 and 4350 may utilize similar or different memory access technologies. By way of example, and not limitation, processor memories 4301(1)-4301(M) and GPU memories 4320 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D)(Point or Nano-Ram. In at least one embodiment, some portion of processor memories 4301 may be volatile memory and another portion may be non-volatile memory (e.g., using a two-level memory (2LM) hierarchy).

As described herein, although various multi-core processors 4305 and GPUs 4310 may be physically coupled to a particular memory 4301, 4320, respectively, and/or a unified memory architecture may be implemented in which a virtual system address space (also referred to as "effective address" space) is distributed among various physical memories. For example, processor memories 4301(1)-4301(M) may each comprise 64 GB of system memory address space and GPU memories 4320(1)-4320(N) may each comprise 32 GB of system memory address space resulting in a total of 256 GB addressable memory when M=2 and N=4. Other values for N and M are possible.

Figure 43B:
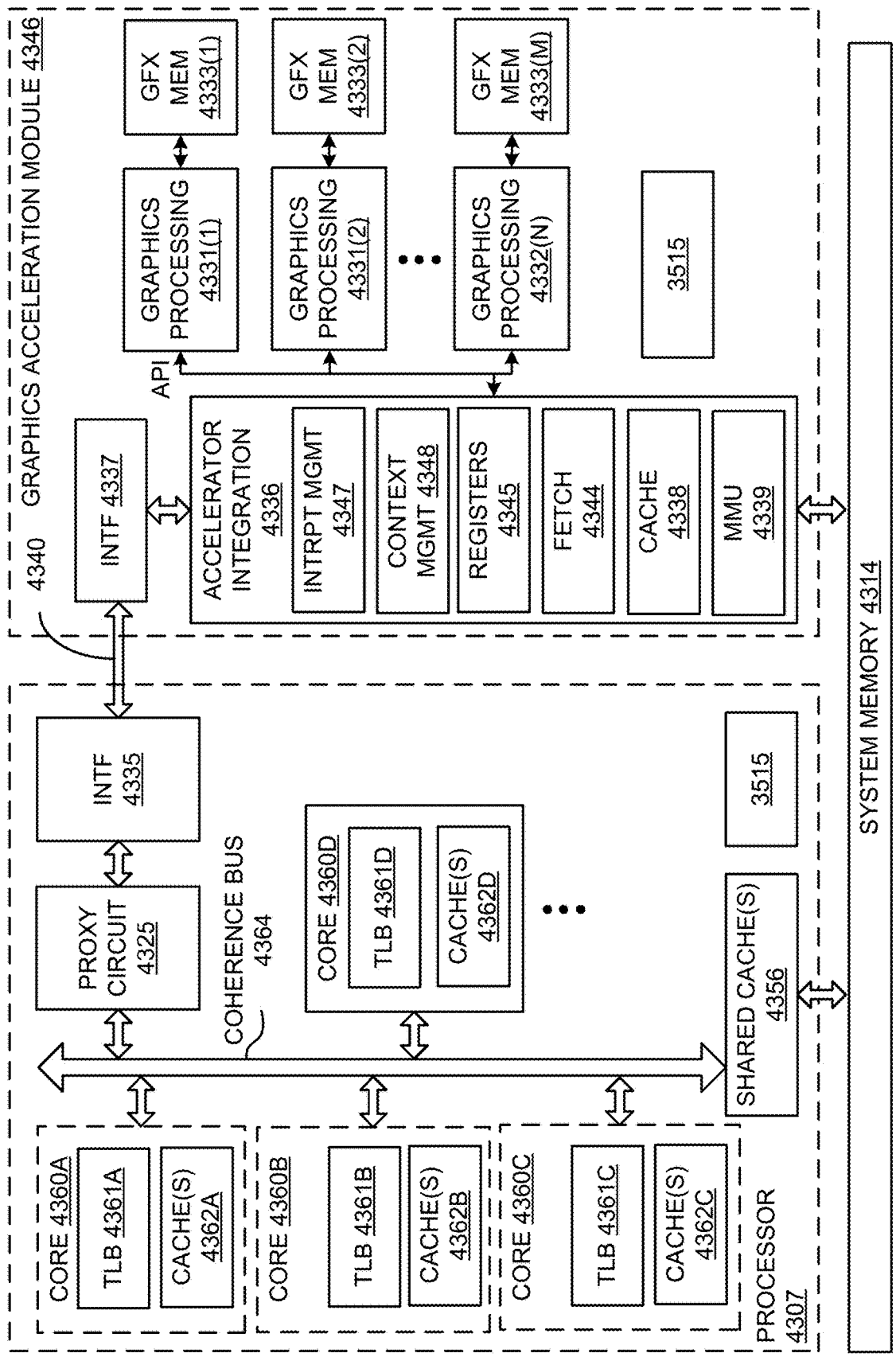
FIG. 43B illustrates a computer system, according to at least one embodiment.

FIG. 43B illustrates additional details for an interconnection between a multi-core processor 4307 and a graphics acceleration module 4346 in accordance with one exemplary embodiment. In at least one embodiment, graphics acceleration module 4346 may include one or more GPU chips integrated on a line card which is coupled to processor 4307 via high-speed link 4340 (e.g., a PCIe bus, NVLink, etc.). In at least one embodiment, graphics acceleration module 4346 may alternatively be integrated on a package or chip with processor 4307.

In at least one embodiment, processor 4307 includes a plurality of cores 4360A-4360D, each with a translation lookaside buffer ("TLB") 4361A-4361D and one or more caches 4362A-4362D. In at least one embodiment, cores 4360A-4360D may include various other components for executing instructions and processing data that are not illustrated. In at least one embodiment, caches 4362A-4362D may comprise Level 1 (L1) and Level 2 (L2) caches. In addition, one or more shared caches 4356 may be included in caches 4362A-4362D and shared by sets of cores 4360A-4360D. For example, one embodiment of processor 4307 includes 24 cores, each with its own L1 cache, twelve shared L2 caches, and twelve shared L3 caches. In this embodiment, one or more L2 and L3 caches are shared by two adjacent cores. In at least one embodiment, processor 4307 and graphics acceleration module 4346 connect with system memory 4314, which may include processor memories 4301(1)-4301(M) of FIG. 43A.

In at least one embodiment, coherency is maintained for data and instructions stored in various caches 4362A-4362D, 4356 and system memory 4314 via inter-core communication over a coherence bus 4364. In at least one embodiment, for example, each cache may have cache coherency logic/circuitry associated therewith to communicate to over coherence bus 4364 in response to detected reads or writes to particular cache lines. In at least one embodiment, a cache snooping protocol is implemented over coherence bus 4364 to snoop cache accesses.

In at least one embodiment, a proxy circuit 4325 communicatively couples graphics acceleration module 4346 to coherence bus 4364, allowing graphics acceleration module 4346 to participate in a cache coherence protocol as a peer of cores 4360A-4360D. In particular, in at least one embodiment, an interface 4335 provides connectivity to proxy circuit 4325 over high-speed link 4340 and an interface 4337 connects graphics acceleration module 4346 to high-speed link 4340.

In at least one embodiment, an accelerator integration circuit 4336 provides cache management, memory access, context management, and interrupt management services on behalf of a plurality of graphics processing engines 4331(1)-4331(N) of graphics acceleration module 4346. In at least one embodiment, graphics processing engines 4331(1)-4331(N) may each comprise a separate graphics processing unit (GPU). In at least one embodiment, graphics processing engines 4331(1)-4331(N) alternatively may comprise different types of graphics processing engines within a GPU, such as graphics execution units, media processing engines (e.g., video encoders/decoders), samplers, and blit engines. In at least one embodiment, graphics acceleration module 4346 may be a GPU with a plurality of graphics processing engines 4331(1)-4331(N) or graphics processing engines 4331(1)-4331(N) may be individual GPUs integrated on a common package, line card, or chip.

In at least one embodiment, accelerator integration circuit 4336 includes a memory management unit (MMU) 4339 for performing various memory management functions such as virtual-to-physical memory translations (also referred to as effective-to-real memory translations) and memory access protocols for accessing system memory 4314. In at least one embodiment, MMU 4339 may also include a translation lookaside buffer (TLB) (not shown) for caching virtual/effective to physical/real address translations. In at least one embodiment, a cache 4338 can store commands and data for efficient access by graphics processing engines 4331(1)-4331(N). In at least one embodiment, data stored in cache 4338 and graphics memories 4333(1)-4333(M) is kept coherent with core caches 4362A-4362D, 4356 and system memory 4314, possibly using a fetch unit 4344. As mentioned, this may be accomplished via proxy circuit 4325 on behalf of cache 4338 and memories 4333(1)-4333(M) (e.g., sending updates to cache 4338 related to modifications/accesses of cache lines on processor caches 4362A-4362D, 4356 and receiving updates from cache 4338).

In at least one embodiment, a set of registers 4345 store context data for threads executed by graphics processing engines 4331(1)-4331(N) and a context management circuit 4348 manages thread contexts. For example, context management circuit 4348 may perform save and restore operations to save and restore contexts of various threads during contexts switches (e.g., where a first thread is saved and a second thread is stored so that a second thread can be execute by a graphics processing engine). For example, on a context switch, context management circuit 4348 may store current register values to a designated region in memory (e.g., identified by a context pointer). It may then restore register values when returning to a context. In at least one embodiment, an interrupt management circuit 4347 receives and processes interrupts received from system devices.

In at least one embodiment, virtual/effective addresses from a graphics processing engine 4331 are translated to real/physical addresses in system memory 4314 by MMU 4339. In at least one embodiment, accelerator integration circuit 4336 supports multiple (e.g., 4, 8, 16) graphics accelerator modules 4346 and/or other accelerator devices. In at least one embodiment, graphics accelerator module 4346 may be dedicated to a single application executed on processor 4307 or may be shared between multiple applications. In at least one embodiment, a virtualized graphics execution environment is presented in which resources of graphics processing engines 4331(1)-4331(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 4336 performs as a bridge to a system for graphics acceleration module 4346 and provides address translation and system memory cache services. In addition, in at least one embodiment, accelerator integration circuit 4336 may provide virtualization facilities for a host processor to manage virtualization of graphics processing engines 4331(1)-4331(N), interrupts, and memory management.

In at least one embodiment, because hardware resources of graphics processing engines 4331(1)-4331(N) are mapped explicitly to a real address space seen by host processor 4307, any host processor can address these resources directly using an effective address value. In at least one embodiment, one function of accelerator integration circuit 4336 is physical separation of graphics processing engines 4331(1)-4331(N) so that they appear to a system as independent units.

In at least one embodiment, one or more graphics memories 4333(1)-4333(M) are coupled to each of graphics processing engines 4331(1)-4331(N), respectively and N=M. In at least one embodiment, graphics memories 4333(1)-4333(M) store instructions and data being processed by each of graphics processing engines 4331(1)-4331(N). In at least one embodiment, graphics memories 4333(1)-4333(M) may be volatile memories such as DRAMs (including stacked DRAMs), GDDR memory (e.g., GDDR5, GDDR6), or HBM, and/or may be non-volatile memories such as 3D) (Point or Nano-Ram.

In at least one embodiment, to reduce data traffic over high-speed link 4340, biasing techniques can be used to ensure that data stored in graphics memories 4333(1)-4333(M) is data that will be used most frequently by graphics processing engines 4331(1)-4331(N) and preferably not used by cores 4360A-4360D (at least not frequently). Similarly, in at least one embodiment, a biasing mechanism attempts to keep data needed by cores (and preferably not graphics processing engines 4331(1)-4331(N)) within caches 4362A-4362D, 4356 and system memory 4314.

Figure 43C:
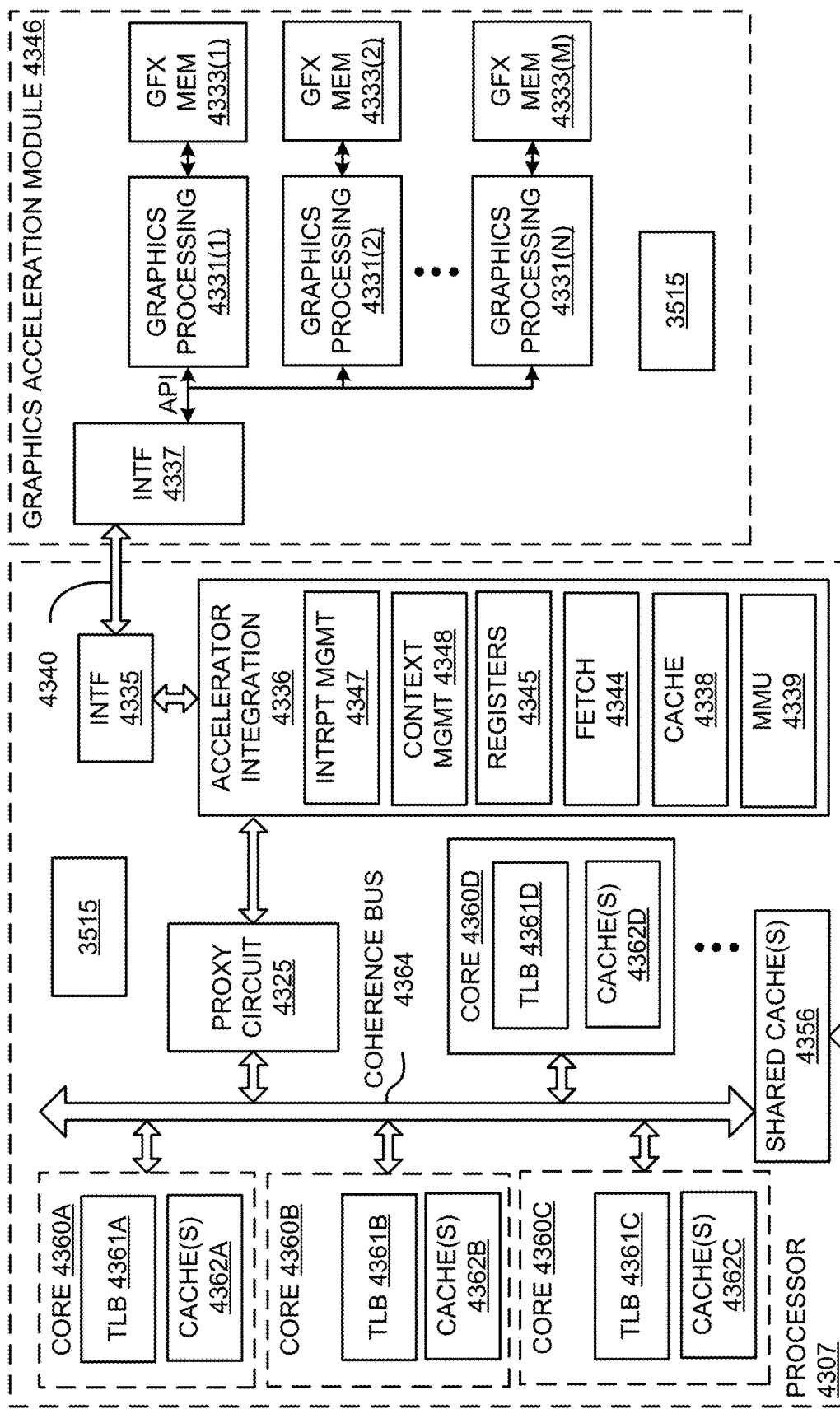
FIG. 43C illustrates a computer system, according to at least one embodiment.

FIG. 43C illustrates another exemplary embodiment in which accelerator integration circuit 4336 is integrated within processor 4307. In this embodiment, graphics processing engines 4331(1)-4331(N) communicate directly over high-speed link 4340 to accelerator integration circuit 4336 via interface 4337 and interface 4335 (which, again, may be any form of bus or interface protocol). In at least one embodiment, accelerator integration circuit 4336 may perform similar operations as those described with respect to FIG. 43B, but potentially at a higher throughput given its close proximity to coherence bus 4364 and caches 4362A-4362D, 4356. In at least one embodiment, an accelerator integration circuit supports different programming models including a dedicated-process programming model (no graphics acceleration module virtualization) and shared programming models (with virtualization), which may include programming models which are controlled by accelerator integration circuit 4336 and programming models which are controlled by graphics acceleration module 4346.

In at least one embodiment, graphics processing engines 4331(1)-4331(N) are dedicated to a single application or process under a single operating system. In at least one embodiment, a single application can funnel other application requests to graphics processing engines 4331(1)-4331(N), providing virtualization within a VM/partition.

In at least one embodiment, graphics processing engines 4331(1)-4331(N), may be shared by multiple VM/application partitions. In at least one embodiment, shared models may use a system hypervisor to virtualize graphics processing engines 4331(1)-4331(N) to allow access by each operating system. In at least one embodiment, for single-partition systems without a hypervisor, graphics processing engines 4331(1)-4331(N) are owned by an operating system. In at least one embodiment, an operating system can virtualize graphics processing engines 4331(1)-4331(N) to provide access to each process or application.

In at least one embodiment, graphics acceleration module 4346 or an individual graphics processing engine 4331(1)-4331(N) selects a process element using a process handle. In at least one embodiment, process elements are stored in system memory 4314 and are addressable using an effective address to real address translation technique described herein. In at least one embodiment, a process handle may be an implementation-specific value provided to a host process when registering its context with graphics processing engine 4331(1)-4331(N) (that is, calling system software to add a process element to a process element linked list). In at least one embodiment, a lower 16-bits of a process handle may be an offset of a process element within a process element linked list.

Figure 43D:
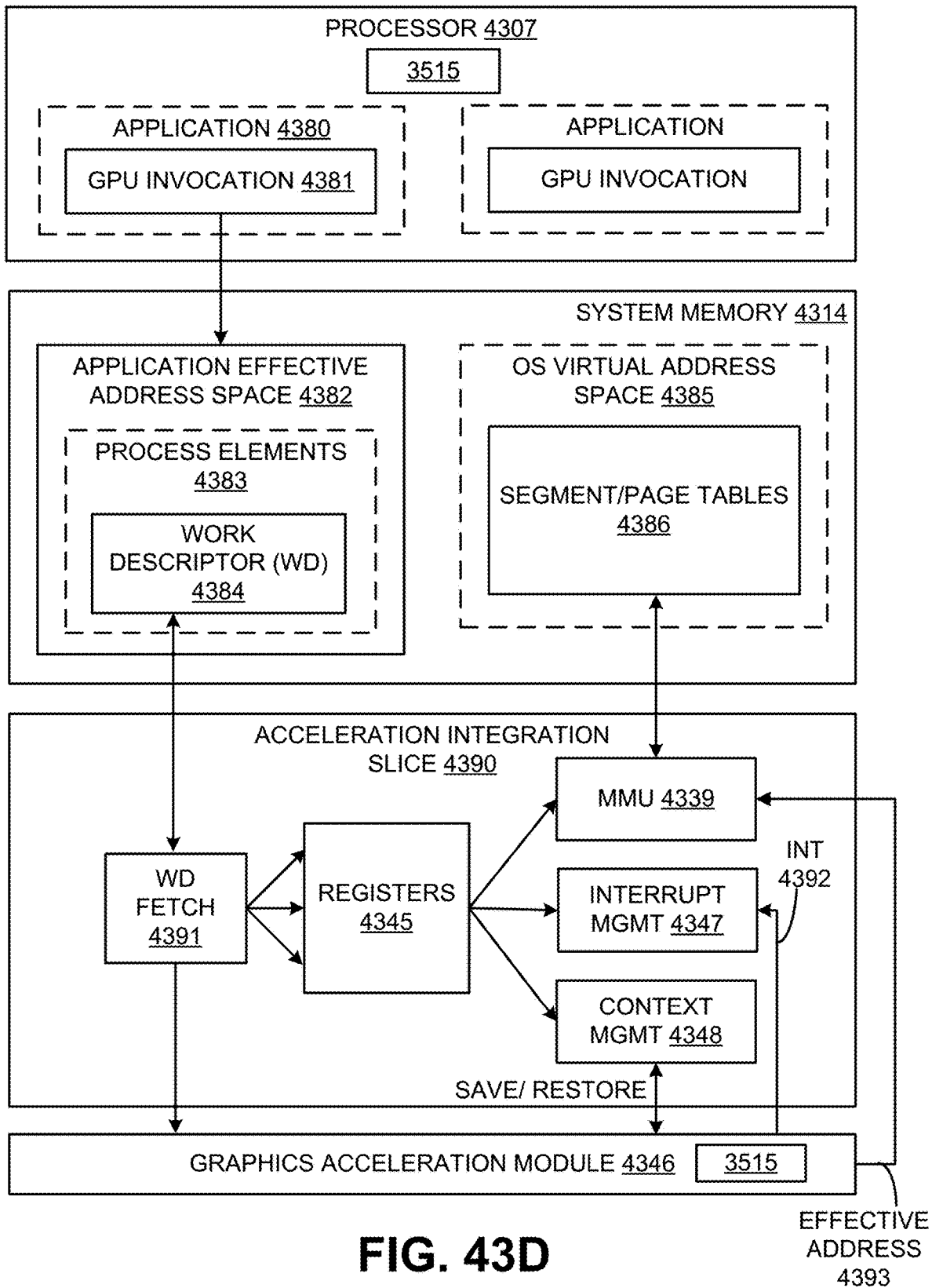
FIG. 43D illustrates a computer system, according to at least one embodiment.

FIG. 43D illustrates an exemplary accelerator integration slice 4390. In at least one embodiment, a "slice" comprises a specified portion of processing resources of accelerator integration circuit 4336. In at least one embodiment, an application is effective address space 4382 within system memory 4314 stores process elements 4383. In at least one embodiment, process elements 4383 are stored in response to GPU invocations 4381 from applications 4380 executed on processor 4307. In at least one embodiment, a process element 4383 contains process state for corresponding application 4380. In at least one embodiment, a work descriptor (WD) 4384 contained in process element 4383 can be a single job requested by an application or may contain a pointer to a queue of jobs. In at least one embodiment, WD 4384 is a pointer to a job request queue in an application's effective address space 4382.

In at least one embodiment, graphics acceleration module 4346 and/or individual graphics processing engines 4331(1)-4331(N) can be shared by all or a subset of processes in a system. In at least one embodiment, an infrastructure for setting up process states and sending a WD 4384 to a graphics acceleration module 4346 to start a job in a virtualized environment may be included.

In at least one embodiment, a dedicated-process programming model is implementation-specific. In at least one embodiment, in this model, a single process owns graphics acceleration module 4346 or an individual graphics processing engine 4331. In at least one embodiment, when graphics acceleration module 4346 is owned by a single process, a hypervisor initializes accelerator integration circuit 4336 for an owning partition and an operating system initializes accelerator integration circuit 4336 for an owning process when graphics acceleration module 4346 is assigned.

In at least one embodiment, in operation, a WD fetch unit 4391 in accelerator integration slice 4390 fetches next WD 4384, which includes an indication of work to be done by one or more graphics processing engines of graphics acceleration module 4346. In at least one embodiment, data from WD 4384 may be stored in registers 4345 and used by MMU 4339, interrupt management circuit 4347 and/or context management circuit 4348 as illustrated. For example, one embodiment of MMU 4339 includes segment/page walk circuitry for accessing segment/page tables 4386 within an OS virtual address space 4385. In at least one embodiment, interrupt management circuit 4347 may process interrupt events 4392 received from graphics acceleration module 4346. In at least one embodiment, when performing graphics operations, an effective address 4393 generated by a graphics processing engine 4331(1)-4331(N) is translated to a real address by MMU 4339.

In at least one embodiment, registers 4345 are duplicated for each graphics processing engine 4331(1)-4331(N) and/or graphics acceleration module 4346 and may be initialized by a hypervisor or an operating system. In at least one embodiment, each of these duplicated registers may be included in an accelerator integration slice 4390. Exemplary registers that may be initialized by a hypervisor are shown in Table 1.

TABLE 1

Hypervisor Initialized Registers

| Register # | Description |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| Register # | Description |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 4384 is specific to a particular graphics acceleration module 4346 and/or graphics processing engines 4331(1)-4331(N). In at least one embodiment, it contains all information required by a graphics processing engine 4331(1)-4331(N) to do work, or it can be a pointer to a memory location where an application has set up a command queue of work to be completed.

Figure 43E:
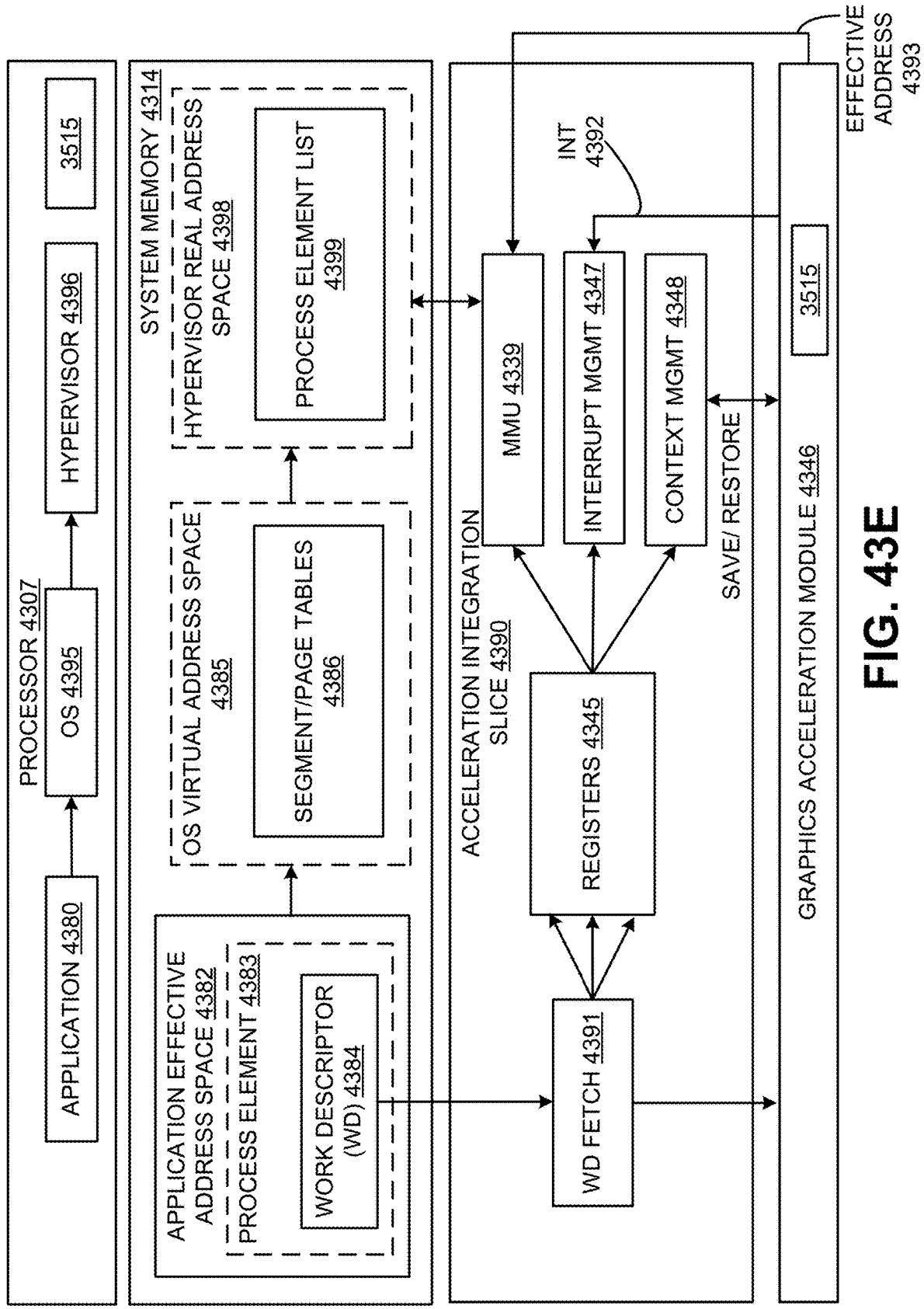
FIGS. 43E and 43F illustrate a shared programming model, according to at least one embodiment.

FIG. 43E illustrates additional details for one exemplary embodiment of a shared model. This embodiment includes a hypervisor real address space 4398 in which a process element list 4399 is stored. In at least one embodiment, hypervisor real address space 4398 is accessible via a hypervisor 4396 which virtualizes graphics acceleration module engines for operating system 4395.

In at least one embodiment, shared programming models allow for all or a subset of processes from all or a subset of partitions in a system to use a graphics acceleration module 4346. In at least one embodiment, there are two programming models where graphics acceleration module 4346 is shared by multiple processes and partitions, namely time-sliced shared and graphics directed shared.

In at least one embodiment, in this model, system hypervisor 4396 owns graphics acceleration module 4346 and makes its function available to all operating systems 4395. In at least one embodiment, for a graphics acceleration module 4346 to support virtualization by system hypervisor 4396, graphics acceleration module 4346 may adhere to certain requirements, such as (1) an application's job request must be autonomous (that is, state does not need to be maintained between jobs), or graphics acceleration module 4346 must provide a context save and restore mechanism, (2) an application's job request is guaranteed by graphics acceleration module 4346 to complete in a specified amount of time, including any translation faults, or graphics acceleration module 4346 provides an ability to preempt processing of a job, and (3) graphics acceleration module 4346 must be guaranteed fairness between processes when operating in a directed shared programming model.

In at least one embodiment, application 4380 is required to make an operating system 4395 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 4346 and can be in a form of a graphics acceleration module 4346 command, an effective address pointer to a user-defined structure, an effective address pointer to a queue of commands, or any other data structure to describe work to be done by graphics acceleration module 4346.

In at least one embodiment, an AMR value is an AMR state to use for a current process. In at least one embodiment, a value passed to an operating system is similar to an application setting an AMR. In at least one embodiment, if accelerator integration circuit 4336 (not shown) and graphics acceleration module 4346 implementations do not support a User Authority Mask Override Register (UAMOR), an operating system may apply a current UAMOR value to an AMR value before passing an AMR in a hypervisor call. In at least one embodiment, hypervisor 4396 may optionally apply a current Authority Mask Override Register (AMOR) value before placing an AMR into process element 4383. In at least one embodiment, CSRP is one of registers 4345 containing an effective address of an area in an application's effective address space 4382 for graphics acceleration module 4346 to save and restore context state. In at least one embodiment, this pointer is optional if no state is required to be saved between jobs or when a job is preempted. In at least one embodiment, context save/restore area may be pinned system memory.

Upon receiving a system call, operating system 4395 may verify that application 4380 has registered and been given authority to use graphics acceleration module 4346. In at least one embodiment, operating system 4395 then calls hypervisor 4396 with information shown in Table 3.

TABLE 3

OS to Hypervisor Call Parameters

| Parameter # | Description |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 4396 verifies that operating system 4395 has registered and been given authority to use graphics acceleration module 4346. In at least one embodiment, hypervisor 4396 then puts process element 4383 into a process element linked list for a corresponding graphics acceleration module 4346 type. In at least one embodiment, a process element may include information shown in Table 4.

TABLE 4

Process Element Information

| Element # | Description |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 4390 registers 4345.

Figure 43F:
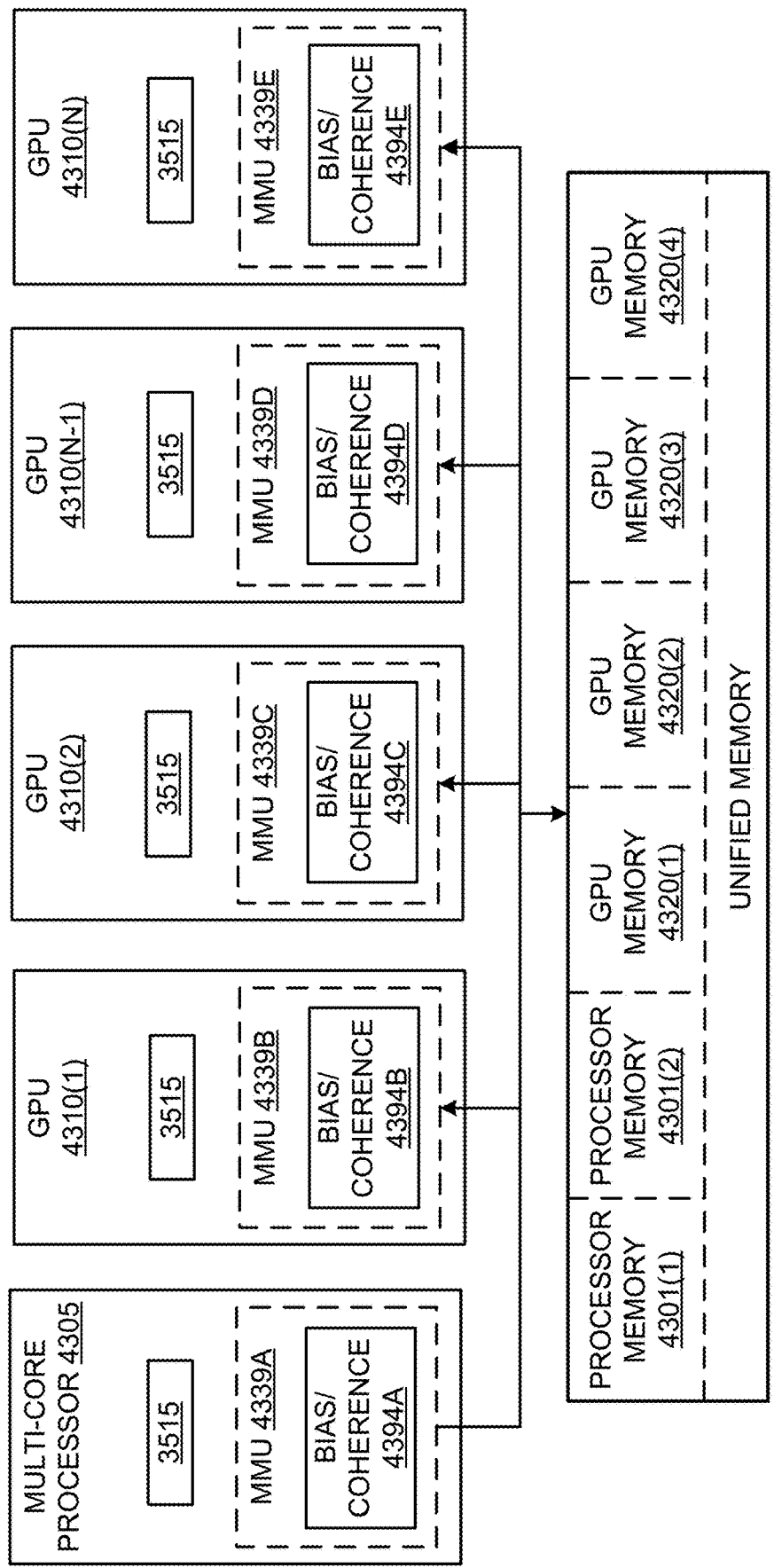

As illustrated in FIG. 43F, in at least one embodiment, a unified memory is used, addressable via a common virtual memory address space used to access physical processor memories 4301(1)-4301(N) and GPU memories 4320(1)-4320(N). In this implementation, operations executed on GPUs 4310(1)-4310(N) utilize a same virtual/effective memory address space to access processor memories 4301(1)-4301(M) and vice versa, thereby simplifying programmability. In at least one embodiment, a first portion of a virtual/effective address space is allocated to processor memory 4301(1), a second portion to second processor memory 4301(N), a third portion to GPU memory 4320(1), and so on. In at least one embodiment, an entire virtual/effective memory space (sometimes referred to as an effective address space) is thereby distributed across each of processor memories 4301 and GPU memories 4320, allowing any processor or GPU to access any physical memory with a virtual address mapped to that memory.

In at least one embodiment, bias/coherence management circuitry 4394A-4394E within one or more of MMUs 4339A-4339E ensures cache coherence between caches of one or more host processors (e.g., 4305) and GPUs 4310 and implements biasing techniques indicating physical memories in which certain types of data should be stored. In at least one embodiment, while multiple instances of bias/coherence management circuitry 4394A-4394E are illustrated in FIG. 43F, bias/coherence circuitry may be implemented within an MMU of one or more host processors 4305 and/or within accelerator integration circuit 4336.

One embodiment allows GPU memories 4320 to be mapped as part of system memory, and accessed using shared virtual memory (SVM) technology, but without suffering performance drawbacks associated with full system cache coherence. In at least one embodiment, an ability for GPU memories 4320 to be accessed as system memory without onerous cache coherence overhead provides a beneficial operating environment for GPU offload. In at least one embodiment, this arrangement allows software of host processor 4305 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 4320 without cache coherence overheads can be critical to execution time of an offloaded computation. In at least one embodiment, in cases with substantial streaming write memory traffic, for example, cache coherence overhead can significantly reduce an effective write bandwidth seen by a GPU 4310. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 4320, with or without a bias cache in a GPU 4310 (e.g., to cache frequently/recently used entries of a bias table). Alternatively, in at least one embodiment, an entire bias table may be maintained within a GPU.

In at least one embodiment, a bias table entry associated with each access to a GPU attached memory 4320 is accessed prior to actual access to a GPU memory, causing following operations. In at least one embodiment, local requests from a GPU 4310 that find their page in GPU bias are forwarded directly to a corresponding GPU memory 4320. In at least one embodiment, local requests from a GPU that find their page in host bias are forwarded to processor 4305 (e.g., over a high-speed link as described herein). In at least one embodiment, requests from processor 4305 that find a requested page in host processor bias complete a request like a normal memory read. Alternatively, requests directed to a GPU-biased page may be forwarded to a GPU 4310. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 4305 bias to GPU bias, but is not for an opposite transition.

In at least one embodiment, cache coherency is maintained by temporarily rendering GPU-biased pages uncacheable by host processor 4305. In at least one embodiment, to access these pages, processor 4305 may request access from GPU 4310, which may or may not grant access right away. In at least one embodiment, thus, to reduce communication between processor 4305 and GPU 4310 it is beneficial to ensure that GPU-biased pages are those which are required by a GPU but not host processor 4305 and vice versa.

Figure 44:
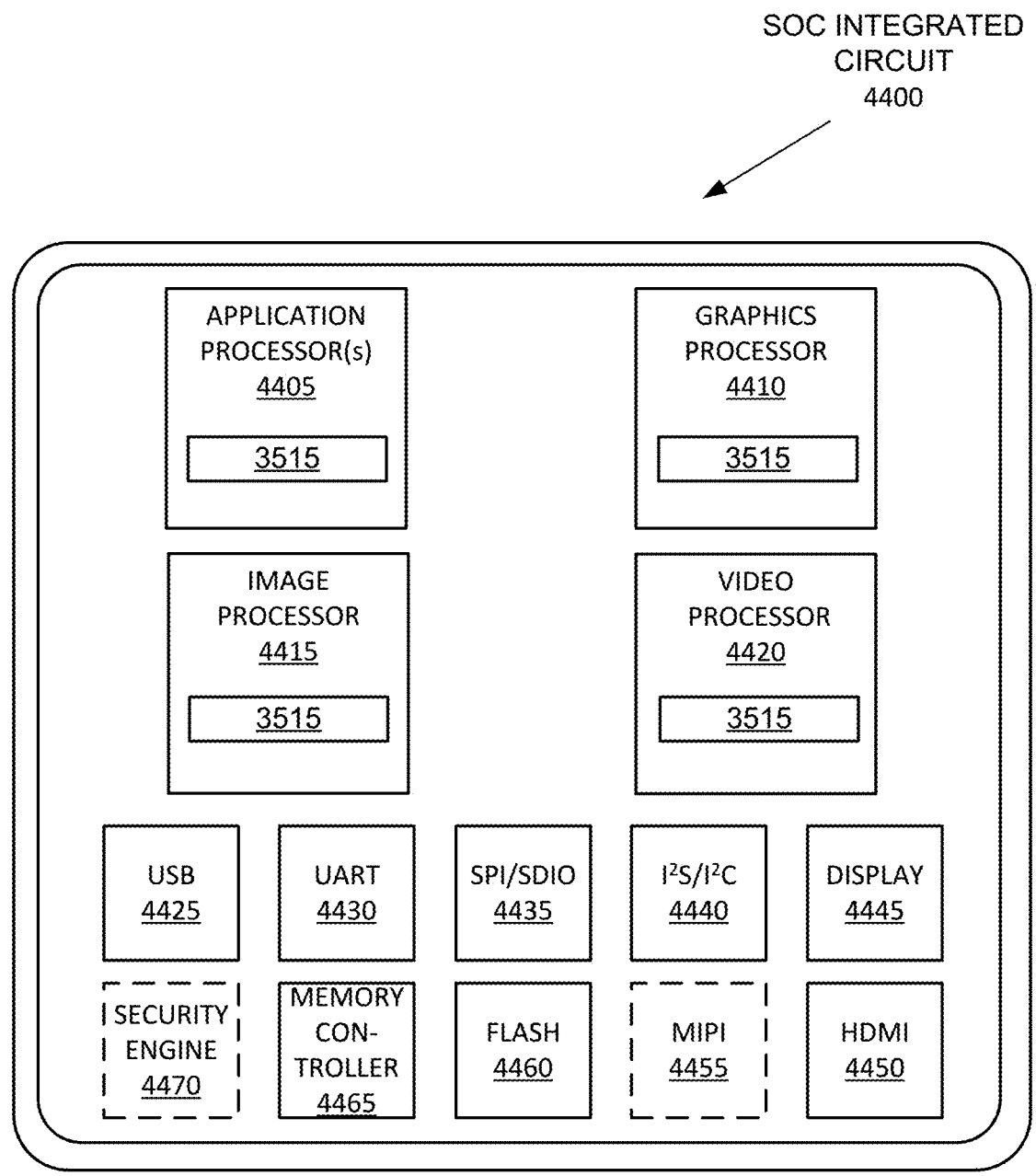
FIG. 44 illustrates exemplary integrated circuits and associated graphics processors, according to at least one embodiment.

FIG. 44 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 44 is a block diagram illustrating an exemplary system on a chip integrated circuit 4400 that may be fabricated using one or more IP cores, according to at least one embodiment. In at least one embodiment, integrated circuit 4400 includes one or more application processor(s) 4405 (e.g., CPUs), at least one graphics processor 4410, and may additionally include an image processor 4415 and/or a video processor 4420, any of which may be a modular IP core. In at least one embodiment, integrated circuit 4400 includes peripheral or bus logic including a USB controller 4425, a UART controller 4430, an SPI/SDIO controller 4435, and an I22S/I22C controller 4440. In at least one embodiment, integrated circuit 4400 can include a display device 4445 coupled to one or more of a high-definition multimedia interface (HDMI) controller 4450 and a mobile industry processor interface (MIPI) display interface 4455. In at least one embodiment, storage may be provided by a flash memory subsystem 4460 including flash memory and a flash memory controller. In at least one embodiment, a memory interface may be provided via a memory controller 4465 for access to SDRAM or SRAM memory devices. In at least one embodiment, some integrated circuits additionally include an embedded security engine 4470.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in integrated circuit 4400 for inferencing or predicting operations based, at least in part, on weight parameters calculated using neural network training operations, neural network functions and/or architectures, or neural network use cases described herein.

Figure 45A:
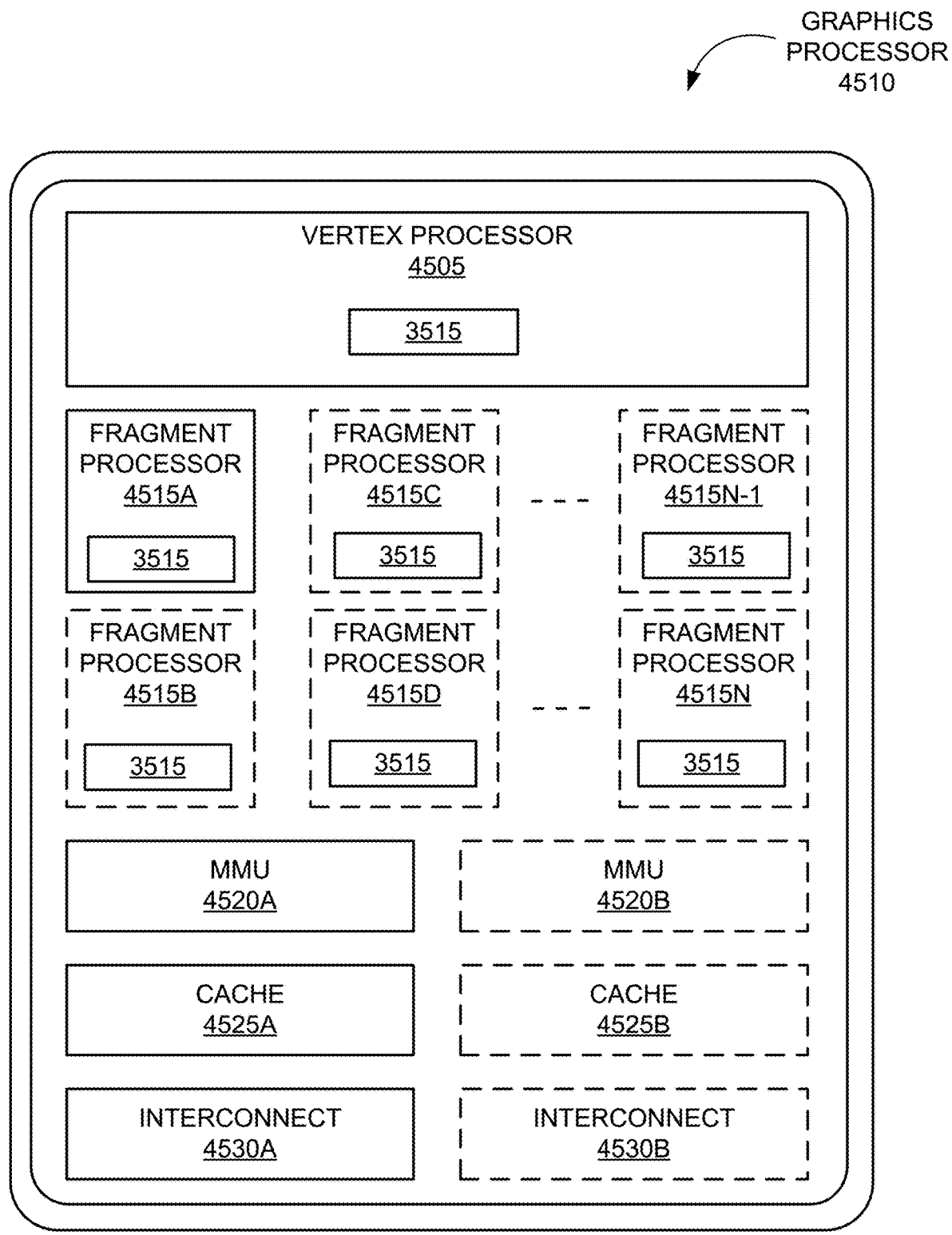
FIGS. 45A and 45B illustrate exemplary integrated circuits and associated graphics processors, according to at least one embodiment.
Figure 45B:
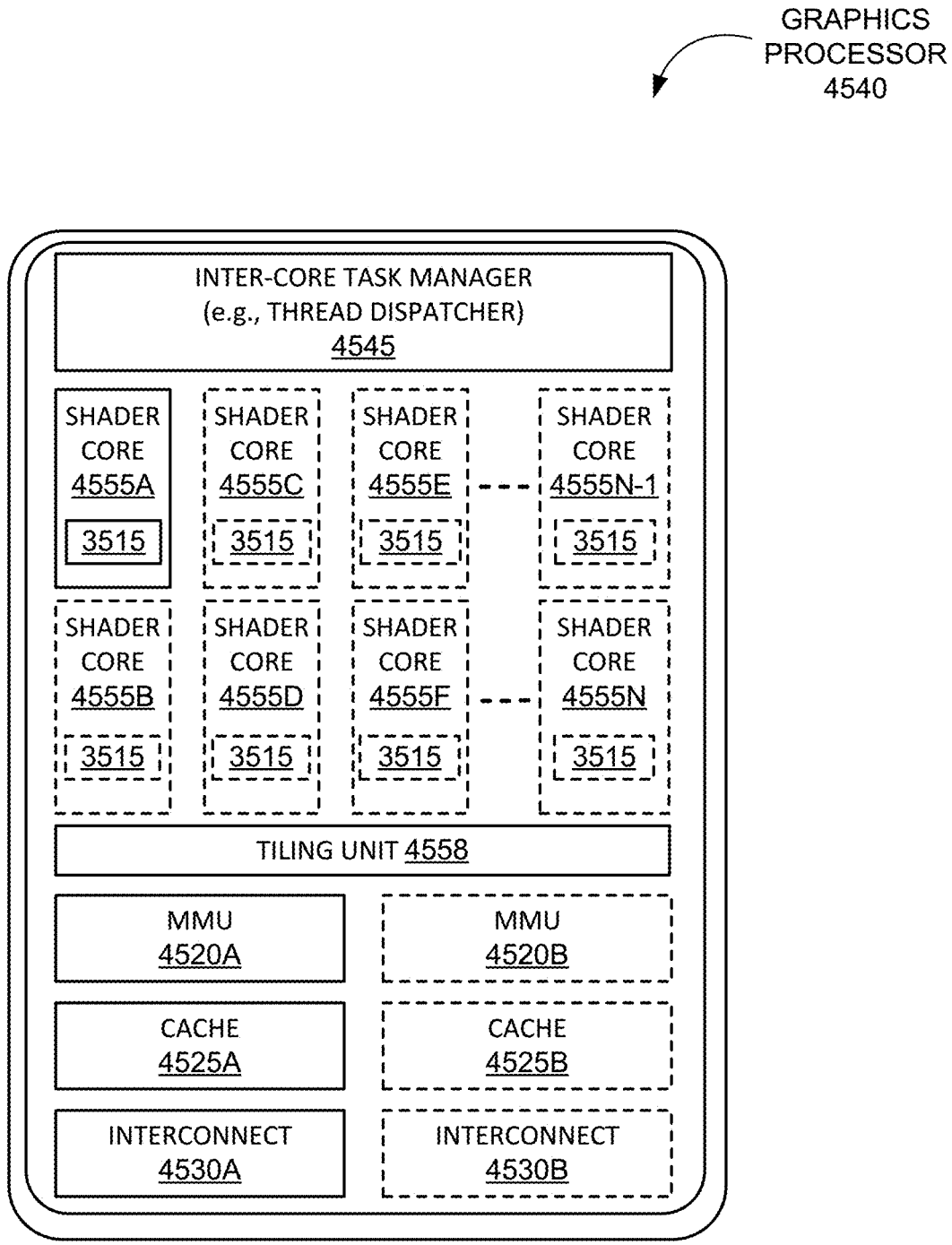

FIGS. 45A-45B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 45A-45B are block diagrams illustrating exemplary graphics processors for use within an SoC, according to embodiments described herein. FIG. 45A illustrates an exemplary graphics processor 4510 of a system on a chip integrated circuit that may be fabricated using one or more IP cores, according to at least one embodiment. FIG. 45B illustrates an additional exemplary graphics processor 4540 of a system on a chip integrated circuit that may be fabricated using one or more IP cores, according to at least one embodiment. In at least one embodiment, graphics processor 4510 of FIG. 45A is a low power graphics processor core. In at least one embodiment, graphics processor 4540 of FIG. 45B is a higher performance graphics processor core. In at least one embodiment, each of graphics processors 4510, 4540 can be variants of graphics processor 4410 of FIG. 44.

In at least one embodiment, graphics processor 4510 includes a vertex processor 4505 and one or more fragment processor(s) 4515A-4515N (e.g., 4515A, 4515B, 4515C, 4515D, through 4515N-1, and 4515N). In at least one embodiment, graphics processor 4510 can execute different shader programs via separate logic, such that vertex processor 4505 is optimized to execute operations for vertex shader programs, while one or more fragment processor(s) 4515A-4515N execute fragment (e.g., pixel) shading operations for fragment or pixel shader programs. In at least one embodiment, vertex processor 4505 performs a vertex processing stage of a 3D graphics pipeline and generates primitives and vertex data. In at least one embodiment, fragment processor(s) 4515A-4515N use primitive and vertex data generated by vertex processor 4505 to produce a framebuffer that is displayed on a display device. In at least one embodiment, fragment processor(s) 4515A-4515N are optimized to execute fragment shader programs as provided for in an OpenGL API, which may be used to perform similar operations as a pixel shader program as provided for in a Direct 3D API.

In at least one embodiment, graphics processor 4510 additionally includes one or more memory management units (MMUs) 4520A-4520B, cache(s) 4525A-4525B, and circuit interconnect(s) 4530A-4530B. In at least one embodiment, one or more MMU(s) 4520A-4520B provide for virtual to physical address mapping for graphics processor 4510, including for vertex processor 4505 and/or fragment processor(s) 4515A-4515N, which may reference vertex or image/texture data stored in memory, in addition to vertex or image/texture data stored in one or more cache(s) 4525A-4525B. In at least one embodiment, one or more MMU(s) 4520A-4520B may be synchronized with other MMUs within a system, including one or more MMUs associated with one or more application processor(s) 4405, image processors 4415, and/or video processors 4420 of FIG. 44, such that each processor 4405-4420 can participate in a shared or unified virtual memory system. In at least one embodiment, one or more circuit interconnect(s) 4530A-4530B enable graphics processor 4510 to interface with other IP cores within SoC, either via an internal bus of SoC or via a direct connection.

In at least one embodiment, graphics processor 4540 includes one or more shader core(s) 4555A-4555N (e.g., 4555A, 4555B, 4555C, 4555D, 4555E, 4555F, through 4555N-1, and 4555N) as shown in FIG. 45B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 4540 includes an inter-core task manager 4545, which acts as a thread dispatcher to dispatch execution threads to one or more shader cores 4555A-4555N and a tiling unit 4558 to accelerate tiling operations for tile-based rendering, in which rendering operations for a scene are subdivided in image space, for example to exploit local spatial coherence within a scene or to optimize use of internal caches.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in integrated circuit 45A and/or 45B for inferencing or predicting operations based, at least in part, on weight parameters calculated using neural network training operations, neural network functions and/or architectures, or neural network use cases described herein.

Figure 46A:
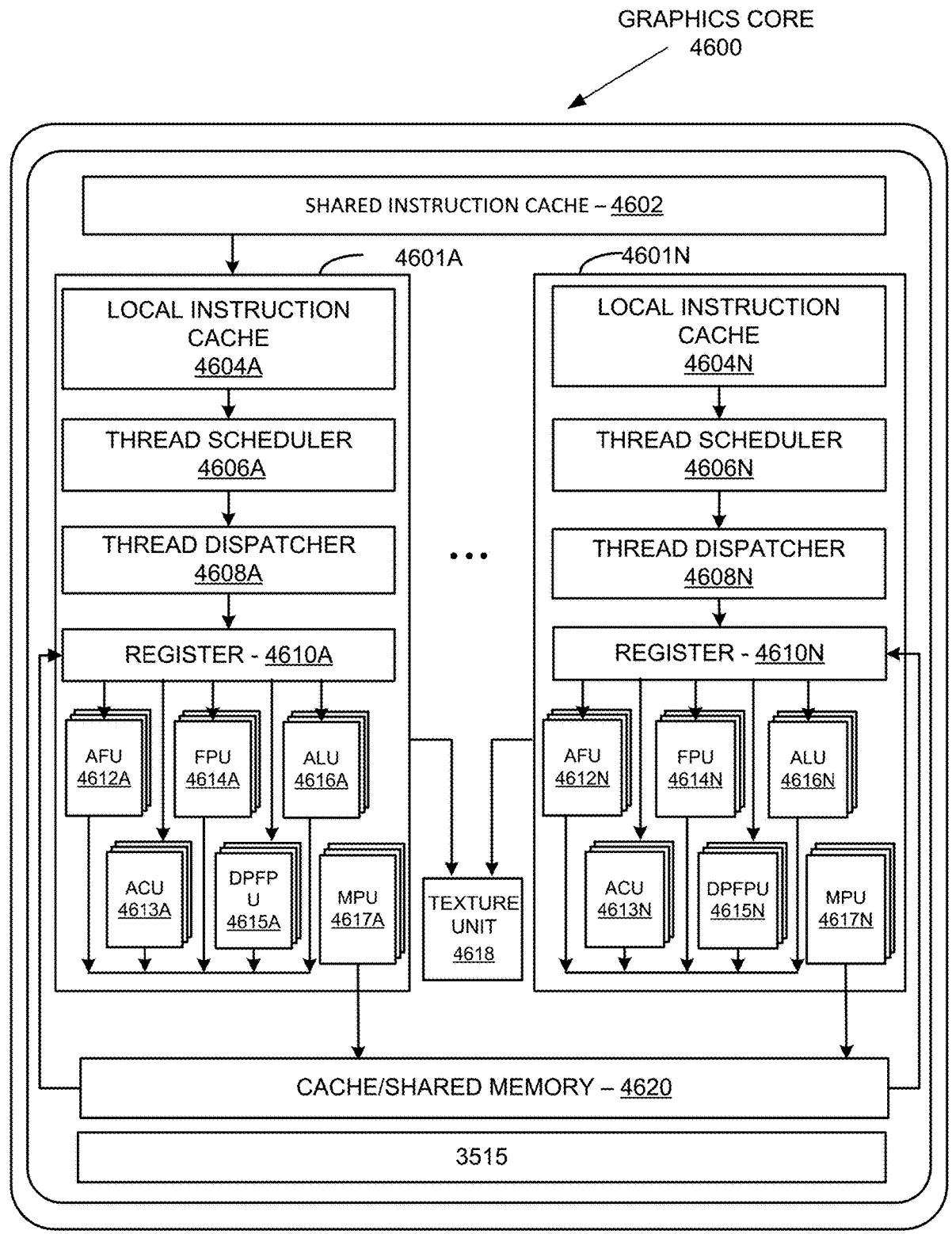
FIGS. 46A and 46B illustrate additional exemplary graphics processor logic according to at least one embodiment.
Figure 46B:
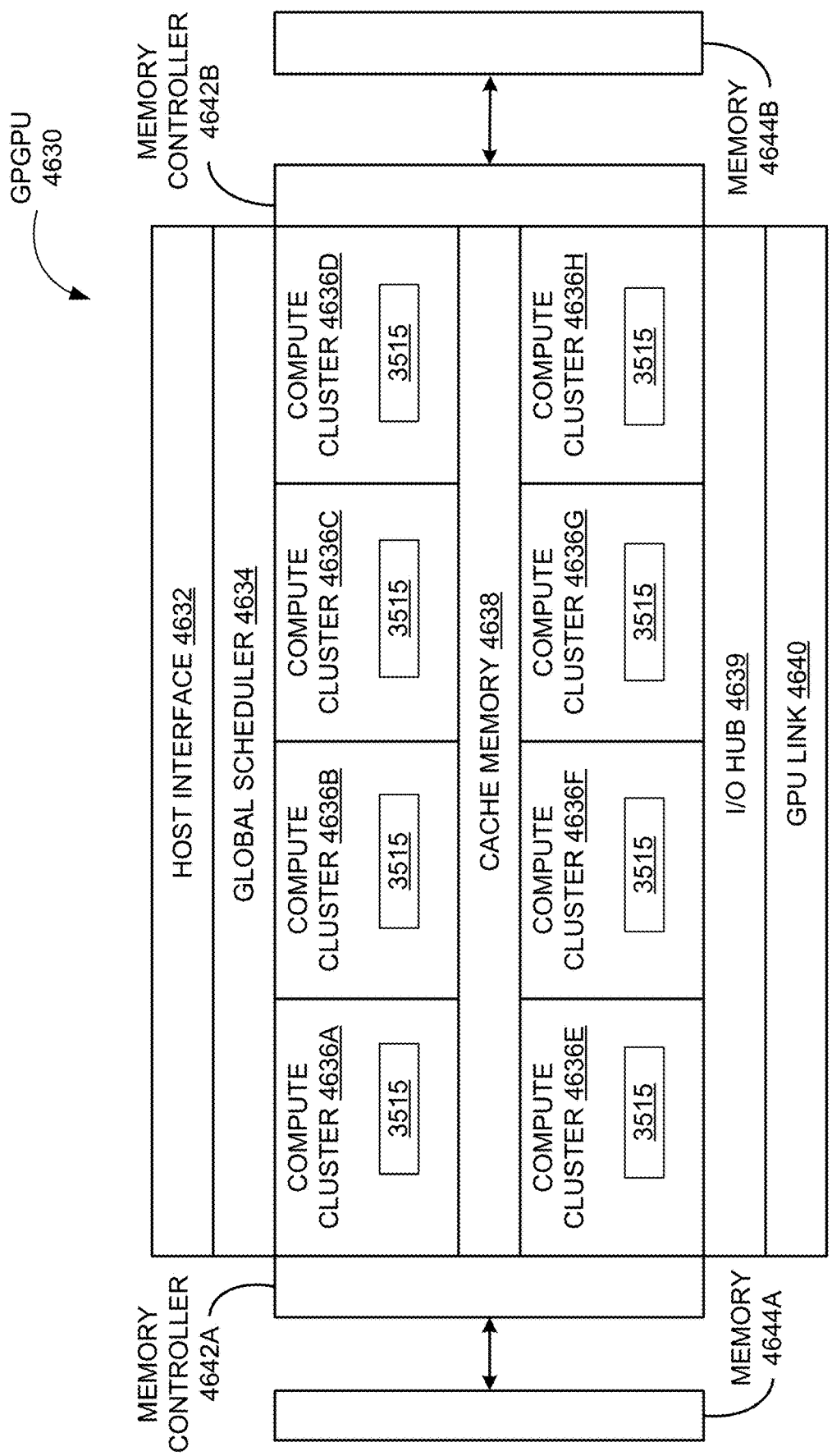

FIGS. 46A-46B illustrate additional exemplary graphics processor logic according to embodiments described herein. FIG. 46A illustrates a graphics core 4600 that may be included within graphics processor 4410 of FIG. 44, in at least one embodiment, and may be a unified shader core 4555A-4555N as in FIG. 45B in at least one embodiment. FIG. 46B illustrates a highly-parallel general-purpose graphics processing unit ("GPGPU") 4630 suitable for deployment on a multi-chip module in at least one embodiment.

In at least one embodiment, graphics core 4600 includes a shared instruction cache 4602, a texture unit 4618, and a cache/shared memory 4620 that are common to execution resources within graphics core 4600. In at least one embodiment, graphics core 4600 can include multiple slices 4601A-4601N or a partition for each core, and a graphics processor can include multiple instances of graphics core 4600. In at least one embodiment, slices 4601A-4601N can include support logic including a local instruction cache 4604A-4604N, a thread scheduler 4606A-4606N, a thread dispatcher 4608A-4608N, and a set of registers 4610A-4610N. In at least one embodiment, slices 4601A-4601N can include a set of additional function units (AFUs 4612A-4612N), floating-point units (FPUs 4614A-4614N), integer arithmetic logic units (ALUs 4616A-4616N), address computational units (ACUs 4613A-4613N), double-precision floating-point units (DPFPUs 4615A-4615N), and matrix processing units (MPUs 4617A-4617N).

In at least one embodiment, FPUs 4614A-4614N can perform single-precision (32-bit) and half-precision (16-bit) floating point operations, while DPFPUs 4615A-4615N perform double precision (64-bit) floating point operations. In at least one embodiment, ALUs 4616A-4616N can perform variable precision integer operations at 8-bit, 16-bit, and 32-bit precision, and can be configured for mixed precision operations. In at least one embodiment, MPUs 4617A-4617N can also be configured for mixed precision matrix operations, including half-precision floating point and 8-bit integer operations. In at least one embodiment, MPUs 4617-4617N can perform a variety of matrix operations to accelerate machine learning application frameworks, including enabling support for accelerated general matrix to matrix multiplication (GEMM). In at least one embodiment, AFUs 4612A-4612N can perform additional logic operations not supported by floating-point or integer units, including trigonometric operations (e.g., sine, cosine, etc.).

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in graphics core 4600 for inferencing or predicting operations based, at least in part, on weight parameters calculated using neural network training operations, neural network functions and/or architectures, or neural network use cases described herein.

FIG. 46B illustrates a general-purpose processing unit (GPGPU) 4630 that can be configured to enable highly-parallel compute operations to be performed by an array of graphics processing units, in at least one embodiment. In at least one embodiment, GPGPU 4630 can be linked directly to other instances of GPGPU 4630 to create a multi-GPU cluster to improve training speed for deep neural networks. In at least one embodiment, GPGPU 4630 includes a host interface 4632 to enable a connection with a host processor. In at least one embodiment, host interface 4632 is a PCI Express interface. In at least one embodiment, host interface 4632 can be a vendor-specific communications interface or communications fabric. In at least one embodiment, GPGPU 4630 receives commands from a host processor and uses a global scheduler 4634 to distribute execution threads associated with those commands to a set of compute clusters 4636A-4636H. In at least one embodiment, compute clusters 4636A-4636H share a cache memory 4638. In at least one embodiment, cache memory 4638 can serve as a higher-level cache for cache memories within compute clusters 4636A-4636H.

In at least one embodiment, GPGPU 4630 includes memory 4644A-4644B coupled with compute clusters 4636A-4636H via a set of memory controllers 4642A-4642B. In at least one embodiment, memory 4644A-4644B can include various types of memory devices including dynamic random access memory (DRAM) or graphics random access memory, such as synchronous graphics random access memory (SGRAM), including graphics double data rate (GDDR) memory.

In at least one embodiment, compute clusters 4636A-4636H each include a set of graphics cores, such as graphics core 4600 of FIG. 46A, which can include multiple types of integer and floating point logic units that can perform computational operations at a range of precisions including suited for machine learning computations. For example, in at least one embodiment, at least a subset of floating point units in each of compute clusters 4636A-4636H can be configured to perform 16-bit or 32-bit floating point operations, while a different subset of floating point units can be configured to perform 64-bit floating point operations.

In at least one embodiment, multiple instances of GPGPU 4630 can be configured to operate as a compute cluster. In at least one embodiment, communication used by compute clusters 4636A-4636H for synchronization and data exchange varies across embodiments. In at least one embodiment, multiple instances of GPGPU 4630 communicate over host interface 4632. In at least one embodiment, GPGPU 4630 includes an I/O hub 4639 that couples GPGPU 4630 with a GPU link 4640 that enables a direct connection to other instances of GPGPU 4630. In at least one embodiment, GPU link 4640 is coupled to a dedicated GPU-to-GPU bridge that enables communication and synchronization between multiple instances of GPGPU 4630. In at least one embodiment, GPU link 4640 couples with a high-speed interconnect to transmit and receive data to other GPGPUs or parallel processors. In at least one embodiment, multiple instances of GPGPU 4630 are located in separate data processing systems and communicate via a network device that is accessible via host interface 4632. In at least one embodiment GPU link 4640 can be configured to enable a connection to a host processor in addition to or as an alternative to host interface 4632.

In at least one embodiment, GPGPU 4630 can be configured to train neural networks. In at least one embodiment, GPGPU 4630 can be used within an inferencing platform. In at least one embodiment, in which GPGPU 4630 is used for inferencing, GPGPU 4630 may include fewer compute clusters 4636A-4636H relative to when GPGPU 4630 is used for training a neural network. In at least one embodiment, memory technology associated with memory 4644A-4644B may differ between inferencing and training configurations, with higher bandwidth memory technologies devoted to training configurations. In at least one embodiment, an inferencing configuration of GPGPU 4630 can support inferencing specific instructions. For example, in at least one embodiment, an inferencing configuration can provide support for one or more 8-bit integer dot product instructions, which may be used during inferencing operations for deployed neural networks.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in GPGPU 4630 for inferencing or predicting operations based, at least in part, on weight parameters calculated using neural network training operations, neural network functions and/or architectures, or neural network use cases described herein.

Figure 47:
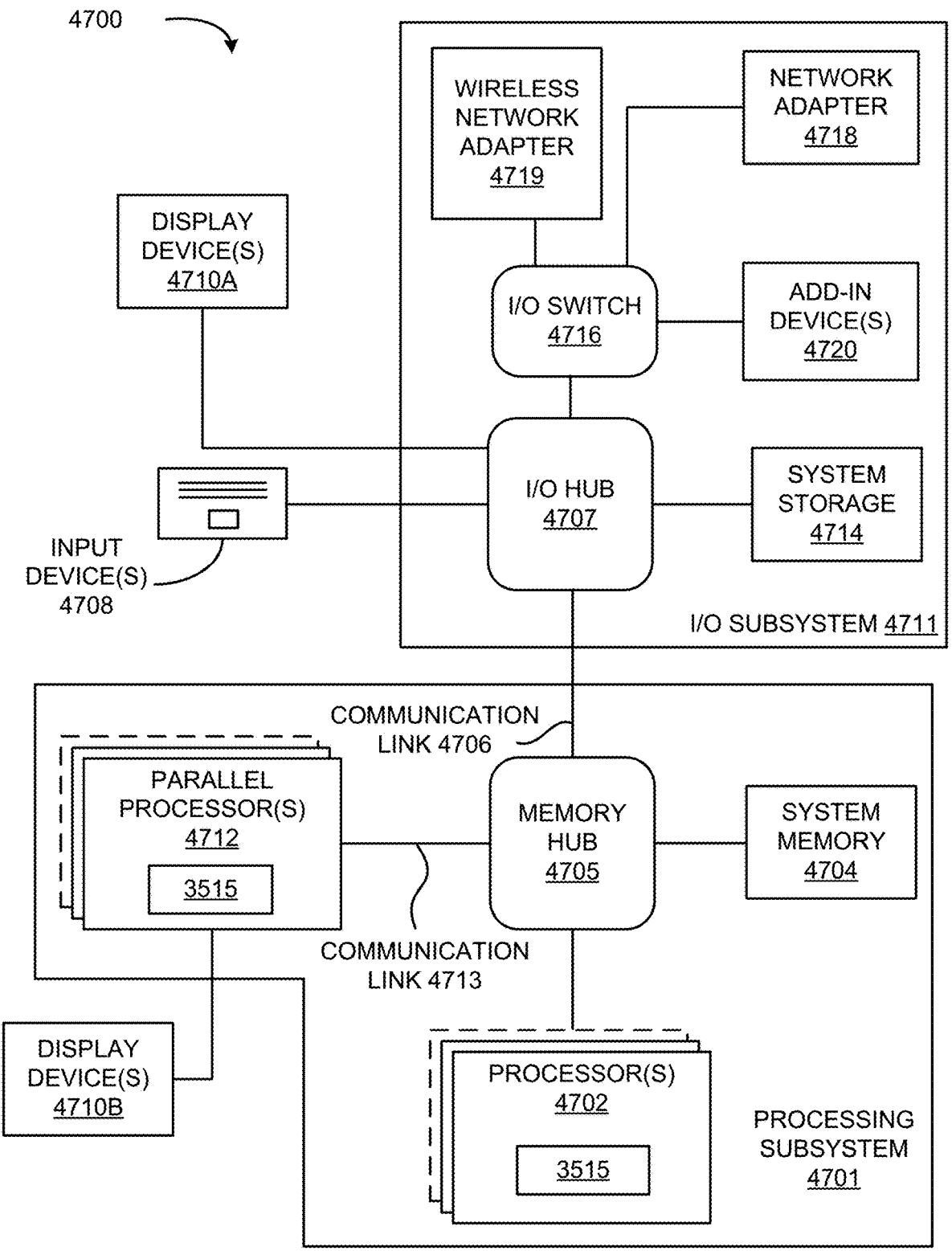
FIG. 47 illustrates a computer system, according to at least one embodiment.

FIG. 47 is a block diagram illustrating a computing system 4700 according to at least one embodiment. In at least one embodiment, computing system 4700 includes a processing subsystem 4701 having one or more processor(s) 4702 and a system memory 4704 communicating via an interconnection path that may include a memory hub 4705. In at least one embodiment, memory hub 4705 may be a separate component within a chipset component or may be integrated within one or more processor(s) 4702. In at least one embodiment, memory hub 4705 couples with an I/O subsystem 4711 via a communication link 4706. In at least one embodiment, I/O subsystem 4711 includes an I/O hub 4707 that can enable computing system 4700 to receive input from one or more input device(s) 4708. In at least one embodiment, I/O hub 4707 can enable a display controller, which may be included in one or more processor(s) 4702, to provide outputs to one or more display device(s) 4710A. In at least one embodiment, one or more display device(s) 4710A coupled with I/O hub 4707 can include a local, internal, or embedded display device.

In at least one embodiment, processing subsystem 4701 includes one or more parallel processor(s) 4712 coupled to memory hub 4705 via a bus or other communication link 4713. In at least one embodiment, communication link 4713 may use one of any number of standards based communication link technologies or protocols, such as, but not limited to PCI Express, or may be a vendor-specific communications interface or communications fabric. In at least one embodiment, one or more parallel processor(s) 4712 form a computationally focused parallel or vector processing system that can include a large number of processing cores and/or processing clusters, such as a many-integrated core (MIC) processor. In at least one embodiment, some or all of parallel processor(s) 4712 form a graphics processing subsystem that can output pixels to one of one or more display device(s) 4710A coupled via I/O Hub 4707. In at least one embodiment, parallel processor(s) 4712 can also include a display controller and display interface (not shown) to enable a direct connection to one or more display device(s) 4710B.

In at least one embodiment, a system storage unit 4714 can connect to I/O hub 4707 to provide a storage mechanism for computing system 4700. In at least one embodiment, an I/O switch 4716 can be used to provide an interface mechanism to enable connections between I/O hub 4707 and other components, such as a network adapter 4718 and/or a wireless network adapter 4719 that may be integrated into platform, and various other devices that can be added via one or more add-in device(s) 4720. In at least one embodiment, network adapter 4718 can be an Ethernet adapter or another wired network adapter. In at least one embodiment, wireless network adapter 4719 can include one or more of a Wi-Fi, Bluetooth, near field communication (NFC), or other network device that includes one or more wireless radios.

In at least one embodiment, computing system 4700 can include other components not explicitly shown, including USB or other port connections, optical storage drives, video capture devices, and like, may also be connected to I/O hub 4707. In at least one embodiment, communication paths interconnecting various components in FIG. 47 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 4712 incorporate circuitry optimized for graphics and video processing, including, for example, video output circuitry, and constitutes a graphics processing unit (GPU). In at least one embodiment, parallel processor(s) 4712 incorporate circuitry optimized for general purpose processing. In at least embodiment, components of computing system 4700 may be integrated with one or more other system elements on a single integrated circuit. For example, in at least one embodiment, parallel processor(s) 4712, memory hub 4705, processor(s) 4702, and I/O hub 4707 can be integrated into a system on chip (SoC) integrated circuit. In at least one embodiment, components of computing system 4700 can be integrated into a single package to form a system in package (SIP) configuration. In at least one embodiment, at least a portion of components of computing system 4700 can be integrated into a multi-chip module (MCM), which can be interconnected with other multi-chip modules into a modular computing system.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in system FIG. 4700 for inferencing or predicting operations based, at least in part, on weight parameters calculated using neural network training operations, neural network functions and/or architectures, or neural network use cases described herein.

Processors

Figure 48A:
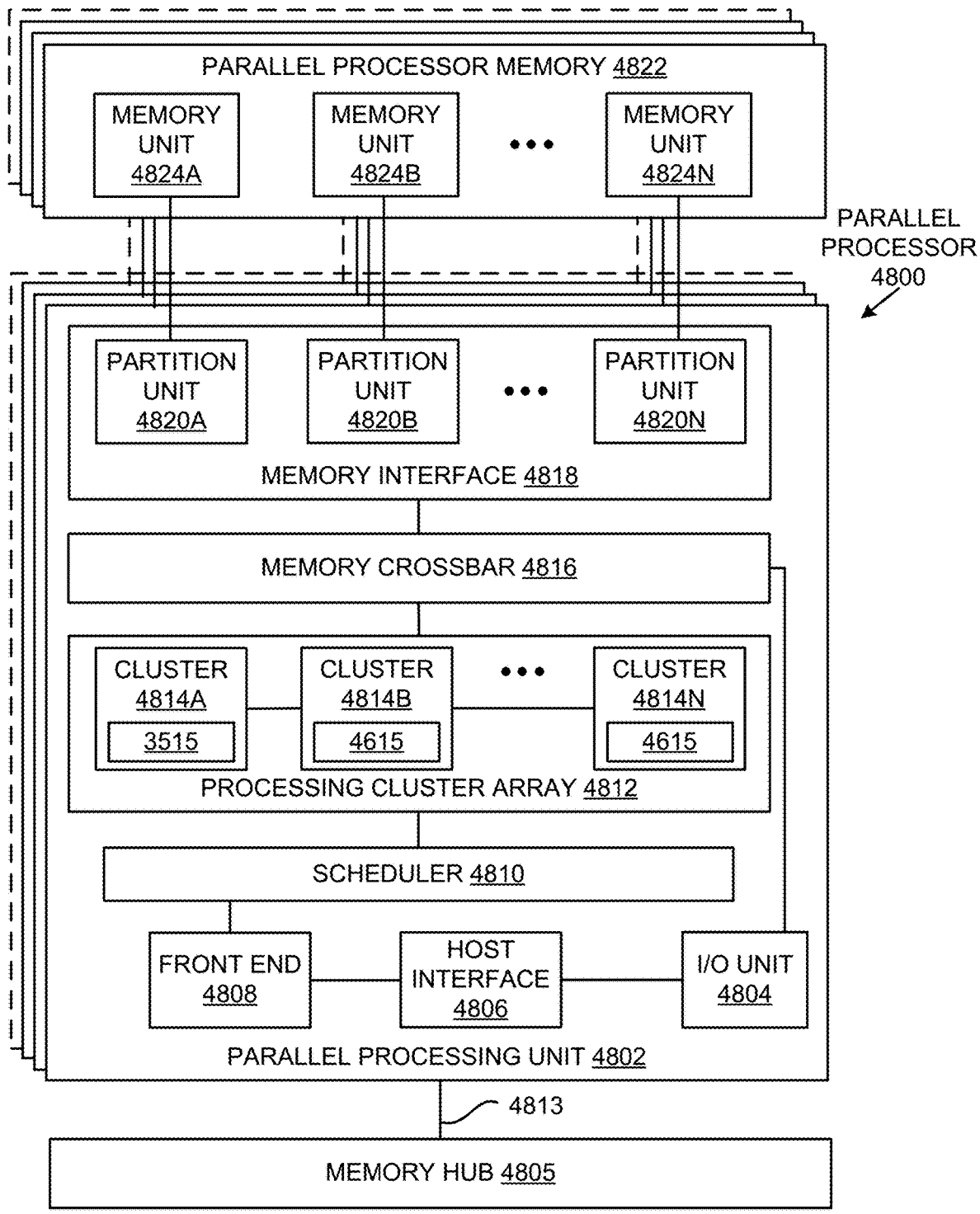
FIG. 48A illustrates a parallel processor, according to at least one embodiment.

FIG. 48A illustrates a parallel processor 4800 according to at least one embodiment. In at least one embodiment, various components of parallel processor 4800 may be implemented using one or more integrated circuit devices, such as programmable processors, application specific integrated circuits (ASICs), or field programmable gate arrays (FPGA). In at least one embodiment, illustrated parallel processor 4800 is a variant of one or more parallel processor(s) 4712 shown in FIG. 47 according to an exemplary embodiment.

In at least one embodiment, parallel processor 4800 includes a parallel processing unit 4802. In at least one embodiment, parallel processing unit 4802 includes an I/O unit 4804 that enables communication with other devices, including other instances of parallel processing unit 4802. In at least one embodiment, I/O unit 4804 may be directly connected to other devices. In at least one embodiment, I/O unit 4804 connects with other devices via use of a hub or switch interface, such as a memory hub 4805. In at least one embodiment, connections between memory hub 4805 and I/O unit 4804 form a communication link 4813. In at least one embodiment, I/O unit 4804 connects with a host interface 4806 and a memory crossbar 4816, where host interface 4806 receives commands directed to performing processing operations and memory crossbar 4816 receives commands directed to performing memory operations.

In at least one embodiment, when host interface 4806 receives a command buffer via I/O unit 4804, host interface 4806 can direct work operations to perform those commands to a front end 4808. In at least one embodiment, front end 4808 couples with a scheduler 4810, which is configured to distribute commands or other work items to a processing cluster array 4812. In at least one embodiment, scheduler 4810 ensures that processing cluster array 4812 is properly configured and in a valid state before tasks are distributed to a cluster of processing cluster array 4812. In at least one embodiment, scheduler 4810 is implemented via firmware logic executing on a microcontroller. In at least one embodiment, microcontroller implemented scheduler 4810 is configurable to perform complex scheduling and work distribution operations at coarse and fine granularity, enabling rapid preemption and context switching of threads executing on processing array 4812. In at least one embodiment, host software can prove workloads for scheduling on processing cluster array 4812 via one of multiple graphics processing paths. In at least one embodiment, workloads can then be automatically distributed across processing array cluster 4812 by scheduler 4810 logic within a microcontroller including scheduler 4810.

In at least one embodiment, processing cluster array 4812 can include up to "N" processing clusters (e.g., cluster 4814A, cluster 4814B, through cluster 4814N), where "N" represents a positive integer (which may be a different integer "N" than used in other figures). In at least one embodiment, each cluster 4814A-4814N of processing cluster array 4812 can execute a large number of concurrent threads. In at least one embodiment, scheduler 4810 can allocate work to clusters 4814A-4814N of processing cluster array 4812 using various scheduling and/or work distribution algorithms, which may vary depending on workload arising for each type of program or computation. In at least one embodiment, scheduling can be handled dynamically by scheduler 4810, or can be assisted in part by compiler logic during compilation of program logic configured for execution by processing cluster array 4812. In at least one embodiment, different clusters 4814A-4814N of processing cluster array 4812 can be allocated for processing different types of programs or for performing different types of computations.

In at least one embodiment, processing cluster array 4812 can be configured to perform various types of parallel processing operations. In at least one embodiment, processing cluster array 4812 is configured to perform general-purpose parallel compute operations. For example, in at least one embodiment, processing cluster array 4812 can include logic to execute processing tasks including filtering of video and/or audio data, performing modeling operations, including physics operations, and performing data transformations.

In at least one embodiment, processing cluster array 4812 is configured to perform parallel graphics processing operations. In at least one embodiment, processing cluster array 4812 can include additional logic to support execution of such graphics processing operations, including but not limited to, texture sampling logic to perform texture operations, as well as tessellation logic and other vertex processing logic. In at least one embodiment, processing cluster array 4812 can be configured to execute graphics processing related shader programs such as, but not limited to, vertex shaders, tessellation shaders, geometry shaders, and pixel shaders. In at least one embodiment, parallel processing unit 4802 can transfer data from system memory via I/O unit 4804 for processing. In at least one embodiment, during processing, transferred data can be stored to on-chip memory (e.g., parallel processor memory 4822) during processing, then written back to system memory.

In at least one embodiment, when parallel processing unit 4802 is used to perform graphics processing, scheduler 4810 can be configured to divide a processing workload into approximately equal sized tasks, to better enable distribution of graphics processing operations to multiple clusters 4814A-4814N of processing cluster array 4812. In at least one embodiment, portions of processing cluster array 4812 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 4814A-4814N may be stored in buffers to allow intermediate data to be transmitted between clusters 4814A-4814N for further processing.

In at least one embodiment, processing cluster array 4812 can receive processing tasks to be executed via scheduler 4810, which receives commands defining processing tasks from front end 4808. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 4810 may be configured to fetch indices corresponding to tasks or may receive indices from front end 4808. In at least one embodiment, front end 4808 can be configured to ensure processing cluster array 4812 is configured to a valid state before a workload specified by incoming command buffers (e.g., batch-buffers, push buffers, etc.) is initiated.

In at least one embodiment, each of one or more instances of parallel processing unit 4802 can couple with a parallel processor memory 4822. In at least one embodiment, parallel processor memory 4822 can be accessed via memory crossbar 4816, which can receive memory requests from processing cluster array 4812 as well as I/O unit 4804. In at least one embodiment, memory crossbar 4816 can access parallel processor memory 4822 via a memory interface 4818. In at least one embodiment, memory interface 4818 can include multiple partition units (e.g., partition unit 4820A, partition unit 4820B, through partition unit 4820N) that can each couple to a portion (e.g., memory unit) of parallel processor memory 4822. In at least one embodiment, a number of partition units 4820A-4820N is configured to be equal to a number of memory units, such that a first partition unit 4820A has a corresponding first memory unit 4824A, a second partition unit 4820B has a corresponding memory unit 4824B, and an N-th partition unit 4820N has a corresponding N-th memory unit 4824N. In at least one embodiment, a number of partition units 4820A-4820N may not be equal to a number of memory units.

In at least one embodiment, memory units 4824A-4824N can include various types of memory devices, including dynamic random access memory (DRAM) or graphics random access memory, such as synchronous graphics random access memory (SGRAM), including graphics double data rate (GDDR) memory. In at least one embodiment, memory units 4824A-4824N may also include 3D stacked memory, including but not limited to high bandwidth memory (HBM). In at least one embodiment, render targets, such as frame buffers or texture maps may be stored across memory units 4824A-4824N, allowing partition units 4820A-4820N to write portions of each render target in parallel to efficiently use available bandwidth of parallel processor memory 4822. In at least one embodiment, a local instance of parallel processor memory 4822 may be excluded in favor of a unified memory design that utilizes system memory in conjunction with local cache memory.

In at least one embodiment, any one of clusters 4814A-4814N of processing cluster array 4812 can process data that will be written to any of memory units 4824A-4824N within parallel processor memory 4822. In at least one embodiment, memory crossbar 4816 can be configured to transfer an output of each cluster 4814A-4814N to any partition unit 4820A-4820N or to another cluster 4814A-4814N, which can perform additional processing operations on an output. In at least one embodiment, each cluster 4814A-4814N can communicate with memory interface 4818 through memory crossbar 4816 to read from or write to various external memory devices. In at least one embodiment, memory crossbar 4816 has a connection to memory interface 4818 to communicate with I/O unit 4804, as well as a connection to a local instance of parallel processor memory 4822, enabling processing units within different processing clusters 4814A-4814N to communicate with system memory or other memory that is not local to parallel processing unit 4802. In at least one embodiment, memory crossbar 4816 can use virtual channels to separate traffic streams between clusters 4814A-4814N and partition units 4820A-4820N.

In at least one embodiment, multiple instances of parallel processing unit 4802 can be provided on a single add-in card, or multiple add-in cards can be interconnected. In at least one embodiment, different instances of parallel processing unit 4802 can be configured to interoperate even if different instances have different numbers of processing cores, different amounts of local parallel processor memory, and/or other configuration differences. For example, in at least one embodiment, some instances of parallel processing unit 4802 can include higher precision floating point units relative to other instances. In at least one embodiment, systems incorporating one or more instances of parallel processing unit 4802 or parallel processor 4800 can be implemented in a variety of configurations and form factors, including but not limited to desktop, laptop, or handheld personal computers, servers, workstations, game consoles, and/or embedded systems.

Figure 48B:
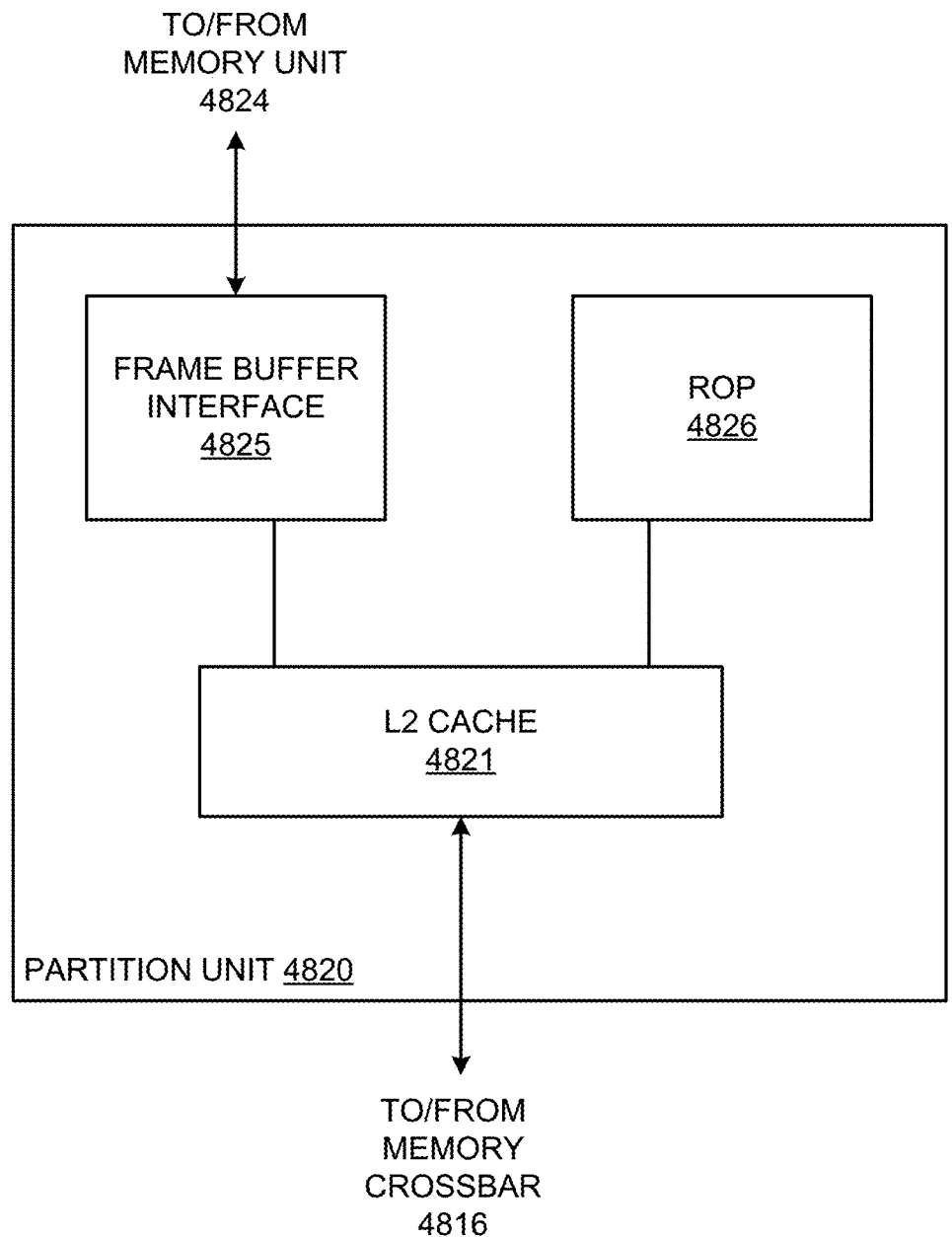
FIG. 48B illustrates a partition unit, according to at least one embodiment.

FIG. 48B is a block diagram of a partition unit 4820 according to at least one embodiment. In at least one embodiment, partition unit 4820 is an instance of one of partition units 4820A-4820N of FIG. 48A. In at least one embodiment, partition unit 4820 includes an L2 cache 4821, a frame buffer interface 4825, and a ROP 4826 (raster operations unit). In at least one embodiment, L2 cache 4821 is a read/write cache that is configured to perform load and store operations received from memory crossbar 4816 and ROP 4826. In at least one embodiment, read misses and urgent write-back requests are output by L2 cache 4821 to frame buffer interface 4825 for processing. In at least one embodiment, updates can also be sent to a frame buffer via frame buffer interface 4825 for processing. In at least one embodiment, frame buffer interface 4825 interfaces with one of memory units in parallel processor memory, such as memory units 4824A-4824N of FIG. 48 (e.g., within parallel processor memory 4822).

In at least one embodiment, ROP 4826 is a processing unit that performs raster operations such as stencil, z test, blending, etc. In at least one embodiment, ROP 4826 then outputs processed graphics data that is stored in graphics memory. In at least one embodiment, ROP 4826 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 4826 can vary based on statistical characteristics of data to be compressed. For example, in at least one embodiment, delta color compression is performed on depth and color data on a per-tile basis.

In at least one embodiment, ROP 4826 is included within each processing cluster (e.g., cluster 4814A-4814N of FIG. 48A) instead of within partition unit 4820. In at least one embodiment, read and write requests for pixel data are transmitted over memory crossbar 4816 instead of pixel fragment data. In at least one embodiment, processed graphics data may be displayed on a display device, such as one of one or more display device(s) 4710 of FIG. 47, routed for further processing by processor(s) 4702, or routed for further processing by one of processing entities within parallel processor 4800 of FIG. 48A.

Figure 48C:
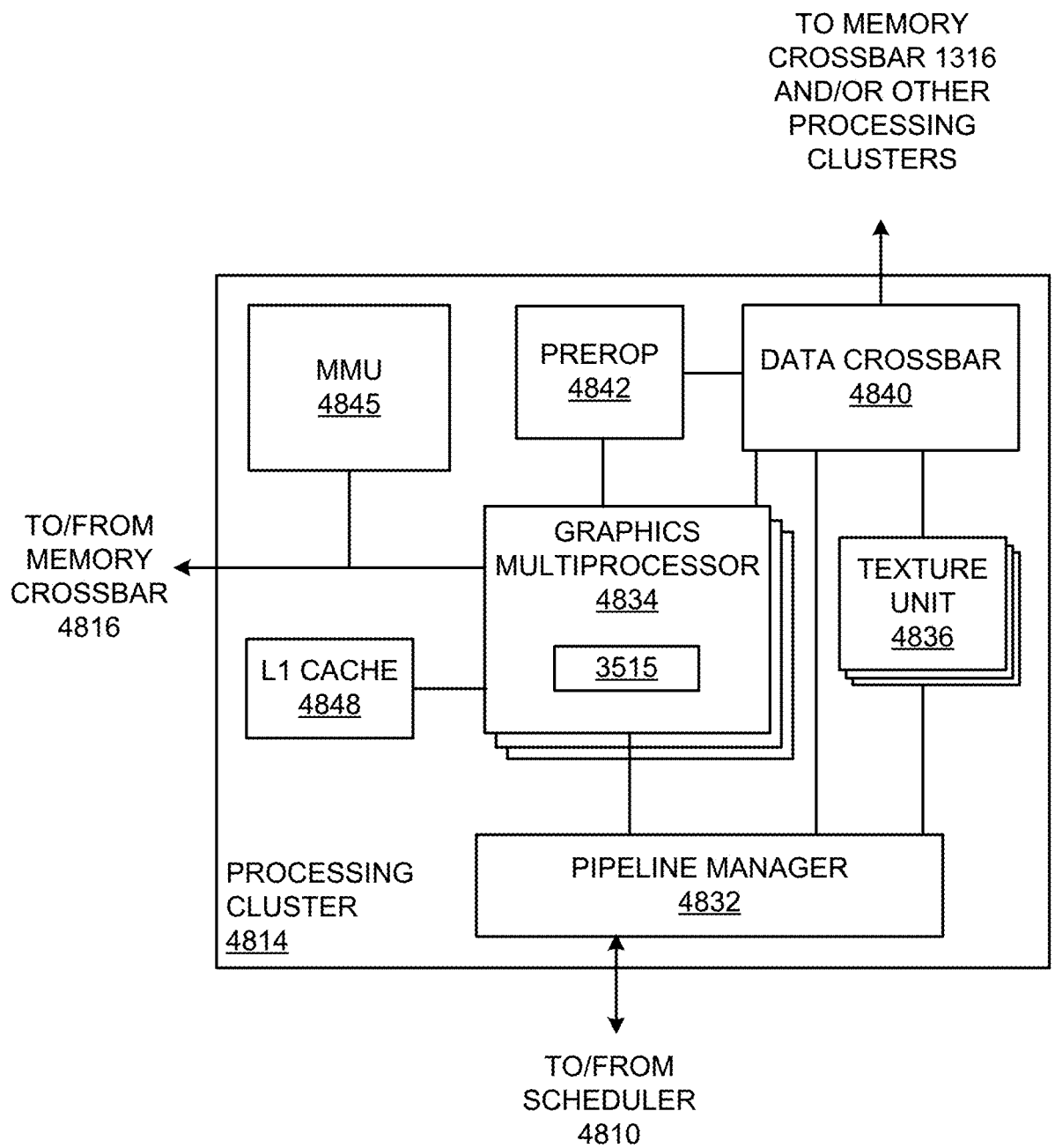
FIG. 48C illustrates a processing cluster, according to at least one embodiment.

FIG. 48C is a block diagram of a processing cluster 4814 within a parallel processing unit according to at least one embodiment. In at least one embodiment, a processing cluster is an instance of one of processing clusters 4814A-4814N of FIG. 48A. In at least one embodiment, processing cluster 4814 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 4814 can be controlled via a pipeline manager 4832 that distributes processing tasks to SIMT parallel processors. In at least one embodiment, pipeline manager 4832 receives instructions from scheduler 4810 of FIG. 48A and manages execution of those instructions via a graphics multiprocessor 4834 and/or a texture unit 4836. In at least one embodiment, graphics multiprocessor 4834 is an exemplary instance of a SIMT parallel processor. However, in at least one embodiment, various types of SIMT parallel processors of differing architectures may be included within processing cluster 4814. In at least one embodiment, one or more instances of graphics multiprocessor 4834 can be included within a processing cluster 4814. In at least one embodiment, graphics multiprocessor 4834 can process data and a data crossbar 4840 can be used to distribute processed data to one of multiple possible destinations, including other shader units. In at least one embodiment, pipeline manager 4832 can facilitate distribution of processed data by specifying destinations for processed data to be distributed via data crossbar 4840.

In at least one embodiment, each graphics multiprocessor 4834 within processing cluster 4814 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 4814 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 4834. In at least one embodiment, a thread group may include fewer threads than a number of processing engines within graphics multiprocessor 4834. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 4834. In at least one embodiment, when a thread group includes more threads than number of processing engines within graphics multiprocessor 4834, processing can be performed over consecutive clock cycles. In at least one embodiment, multiple thread groups can be executed concurrently on a graphics multiprocessor 4834.

In at least one embodiment, graphics multiprocessor 4834 includes an internal cache memory to perform load and store operations. In at least one embodiment, graphics multiprocessor 4834 can forego an internal cache and use a cache memory (e.g., L1 cache 4848) within processing cluster 4814. In at least one embodiment, each graphics multiprocessor 4834 also has access to L2 caches within partition units (e.g., partition units 4820A-4820N of FIG. 48A) that are shared among all processing clusters 4814 and may be used to transfer data between threads. In at least one embodiment, graphics multiprocessor 4834 may also access off-chip global memory, which can include one or more of local parallel processor memory and/or system memory. In at least one embodiment, any memory external to parallel processing unit 4802 may be used as global memory. In at least one embodiment, processing cluster 4814 includes multiple instances of graphics multiprocessor 4834 and can share common instructions and data, which may be stored in L1 cache 4848.

In at least one embodiment, each processing cluster 4814 may include an MMU 4845 (memory management unit) that is configured to map virtual addresses into physical addresses. In at least one embodiment, one or more instances of MMU 4845 may reside within memory interface 4818 of FIG. 48A. In at least one embodiment, MMU 4845 includes a set of page table entries (PTEs) used to map a virtual address to a physical address of a tile and optionally a cache line index. In at least one embodiment, MMU 4845 may include address translation lookaside buffers (TLB) or caches that may reside within graphics multiprocessor 4834 or L1 4848 cache or processing cluster 4814. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 4814 may be configured such that each graphics multiprocessor 4834 is coupled to a texture unit 4836 for performing texture mapping operations, e.g., determining texture sample positions, reading texture data, and filtering texture data. In at least one embodiment, texture data is read from an internal texture L1 cache (not shown) or from an L1 cache within graphics multiprocessor 4834 and is fetched from an L2 cache, local parallel processor memory, or system memory, as needed. In at least one embodiment, each graphics multiprocessor 4834 outputs processed tasks to data crossbar 4840 to provide processed task to another processing cluster 4814 for further processing or to store processed task in an L2 cache, local parallel processor memory, or system memory via memory crossbar 4816. In at least one embodiment, a preROP 4842 (pre-raster operations unit) is configured to receive data from graphics multiprocessor 4834, and direct data to ROP units, which may be located with partition units as described herein (e.g., partition units 4820A-4820N of FIG. 48A). In at least one embodiment, preROP 4842 unit can perform optimizations for color blending, organizing pixel color data, and performing address translations.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in graphics processing cluster 4814 for inferencing or predicting operations based, at least in part, on weight parameters calculated using neural network training operations, neural network functions and/or architectures, or neural network use cases described herein.

Figure 48D:
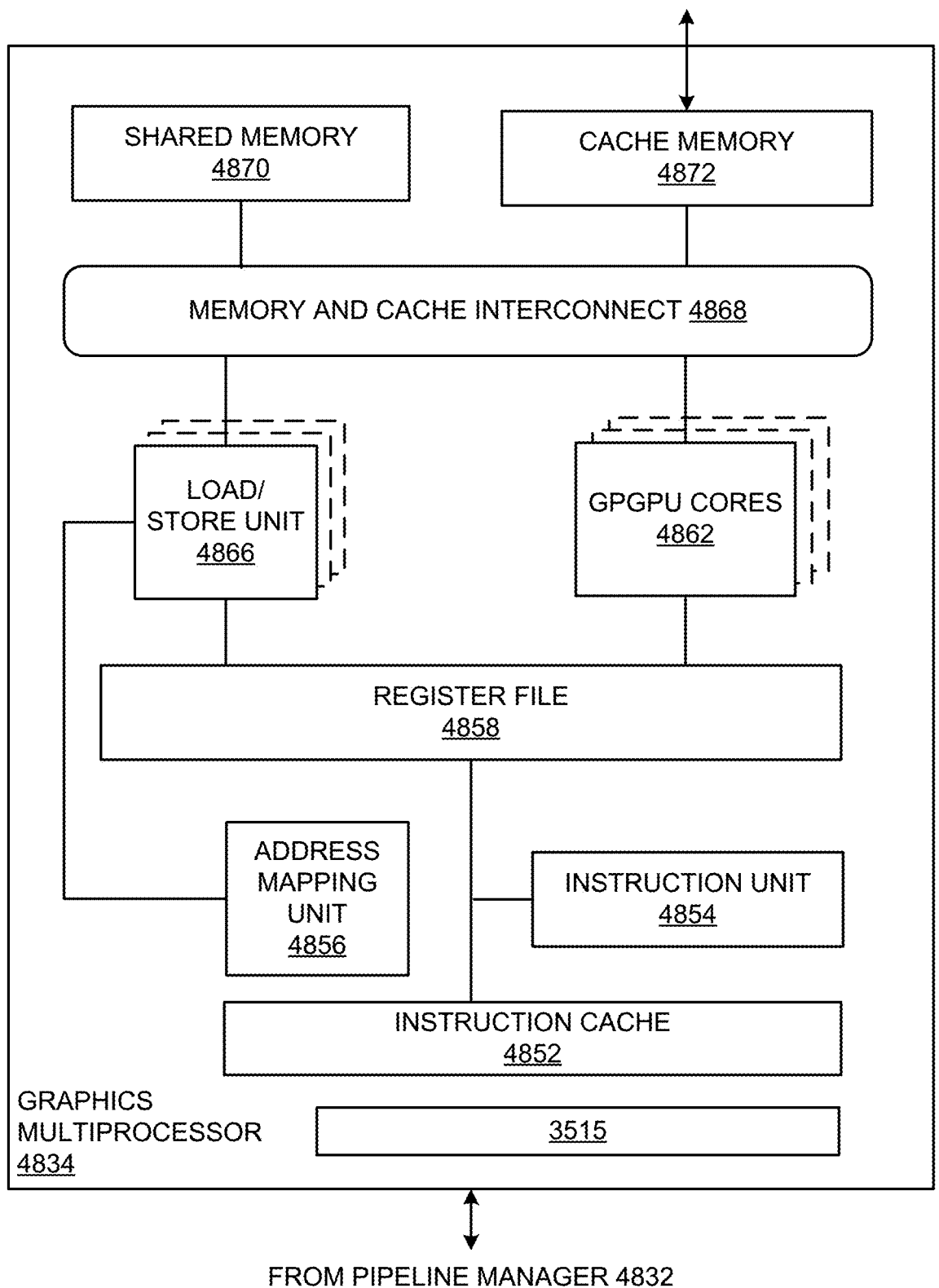
FIG. 48D illustrates a graphics multiprocessor, according to at least one embodiment.

FIG. 48D shows a graphics multiprocessor 4834 according to at least one embodiment. In at least one embodiment, graphics multiprocessor 4834 couples with pipeline manager 4832 of processing cluster 4814. In at least one embodiment, graphics multiprocessor 4834 has an execution pipeline including but not limited to an instruction cache 4852, an instruction unit 4854, an address mapping unit 4856, a register file 4858, one or more general purpose graphics processing unit (GPGPU) cores 4862, and one or more load/store units 4866. In at least one embodiment, GPGPU cores 4862 and load/store units 4866 are coupled with cache memory 4872 and shared memory 4870 via a memory and cache interconnect 4868.

In at least one embodiment, instruction cache 4852 receives a stream of instructions to execute from pipeline manager 4832. In at least one embodiment, instructions are cached in instruction cache 4852 and dispatched for execution by an instruction unit 4854. In at least one embodiment, instruction unit 4854 can dispatch instructions as thread groups (e.g., warps), with each thread of thread group assigned to a different execution unit within GPGPU cores 4862. In at least one embodiment, an instruction can access any of a local, shared, or global address space by specifying an address within a unified address space. In at least one embodiment, address mapping unit 4856 can be used to translate addresses in a unified address space into a distinct memory address that can be accessed by load/store units 4866.

In at least one embodiment, register file 4858 provides a set of registers for functional units of graphics multiprocessor 4834. In at least one embodiment, register file 4858 provides temporary storage for operands connected to data paths of functional units (e.g., GPGPU cores 4862, load/store units 4866) of graphics multiprocessor 4834. In at least one embodiment, register file 4858 is divided between each of functional units such that each functional unit is allocated a dedicated portion of register file 4858. In at least one embodiment, register file 4858 is divided between different warps being executed by graphics multiprocessor 4834.

In at least one embodiment, GPGPU cores 4862 can each include floating point units (FPUs) and/or integer arithmetic logic units (ALUs) that are used to execute instructions of graphics multiprocessor 4834. In at least one embodiment, GPGPU cores 4862 can be similar in architecture or can differ in architecture. In at least one embodiment, a first portion of GPGPU cores 4862 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 4834 can additionally include one or more fixed function or special function units to perform specific functions such as copy rectangle or pixel blending operations. In at least one embodiment, one or more of GPGPU cores 4862 can also include fixed or special function logic.

In at least one embodiment, GPGPU cores 4862 include SIMD logic capable of performing a single instruction on multiple sets of data. In at least one embodiment, GPGPU cores 4862 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 4868 is an interconnect network that connects each functional unit of graphics multiprocessor 4834 to register file 4858 and to shared memory 4870. In at least one embodiment, memory and cache interconnect 4868 is a crossbar interconnect that allows load/store unit 4866 to implement load and store operations between shared memory 4870 and register file 4858. In at least one embodiment, register file 4858 can operate at a same frequency as GPGPU cores 4862, thus data transfer between GPGPU cores 4862 and register file 4858 can have very low latency. In at least one embodiment, shared memory 4870 can be used to enable communication between threads that execute on functional units within graphics multiprocessor 4834. In at least one embodiment, cache memory 4872 can be used as a data cache for example, to cache texture data communicated between functional units and texture unit 4836. In at least one embodiment, shared memory 4870 can also be used as a program managed cache. In at least one embodiment, threads executing on GPGPU cores 4862 can programmatically store data within shared memory in addition to automatically cached data that is stored within cache memory 4872.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in graphics multiprocessor 4834 for inferencing or predicting operations based, at least in part, on weight parameters calculated using neural network training operations, neural network functions and/or architectures, or neural network use cases described herein.

Figure 49:
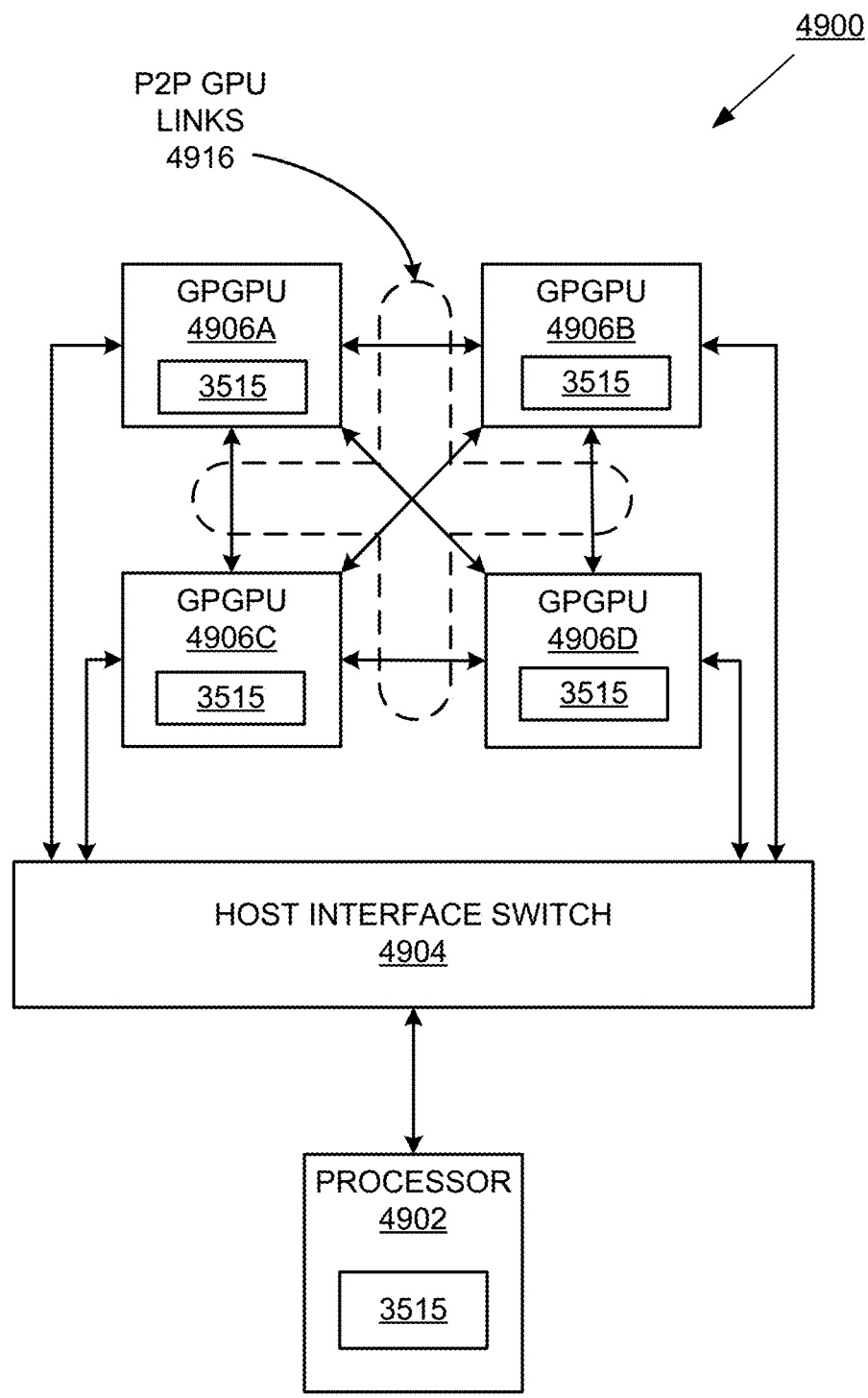
FIG. 49 illustrates a multi-graphics processing unit (GPU) system, according to at least one embodiment.

FIG. 49 illustrates a multi-GPU computing system 4900, according to at least one embodiment. In at least one embodiment, multi-GPU computing system 4900 can include a processor 4902 coupled to multiple general purpose graphics processing units (GPGPUs) 4906A-D via a host interface switch 4904. In at least one embodiment, host interface switch 4904 is a PCI express switch device that couples processor 4902 to a PCI express bus over which processor 4902 can communicate with GPGPUs 4906A-D. In at least one embodiment, GPGPUs 4906A-D can interconnect via a set of high-speed point-to-point GPU-to-GPU links 4916. In at least one embodiment, GPU-to-GPU links 4916 connect to each of GPGPUs 4906A-D via a dedicated GPU link. In at least one embodiment, P2P GPU links 4916 enable direct communication between each of GPGPUs 4906A-D without requiring communication over host interface switch 4904 to which processor 4902 is connected. In at least one embodiment, with GPU-to-GPU traffic directed to P2P GPU links 4916, host interface switch 4904 remains available for system memory access or to communicate with other instances of multi-GPU computing system 4900, for example, via one or more network devices. While in at least one embodiment GPGPUs 4906A-D connect to processor 4902 via host interface switch 4904, in at least one embodiment processor 4902 includes direct support for P2P GPU links 4916 and can connect directly to GPGPUs 4906A-D. In at least one embodiment, multi GPU computing system 4200 performs process 900 (see FIG. 9A) or process 906 (see FIG. 9B).

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in multi-GPU computing system 4900 for inferencing or predicting operations based, at least in part, on weight parameters calculated using neural network training operations, neural network functions and/or architectures, or neural network use cases described herein.

Figure 50:
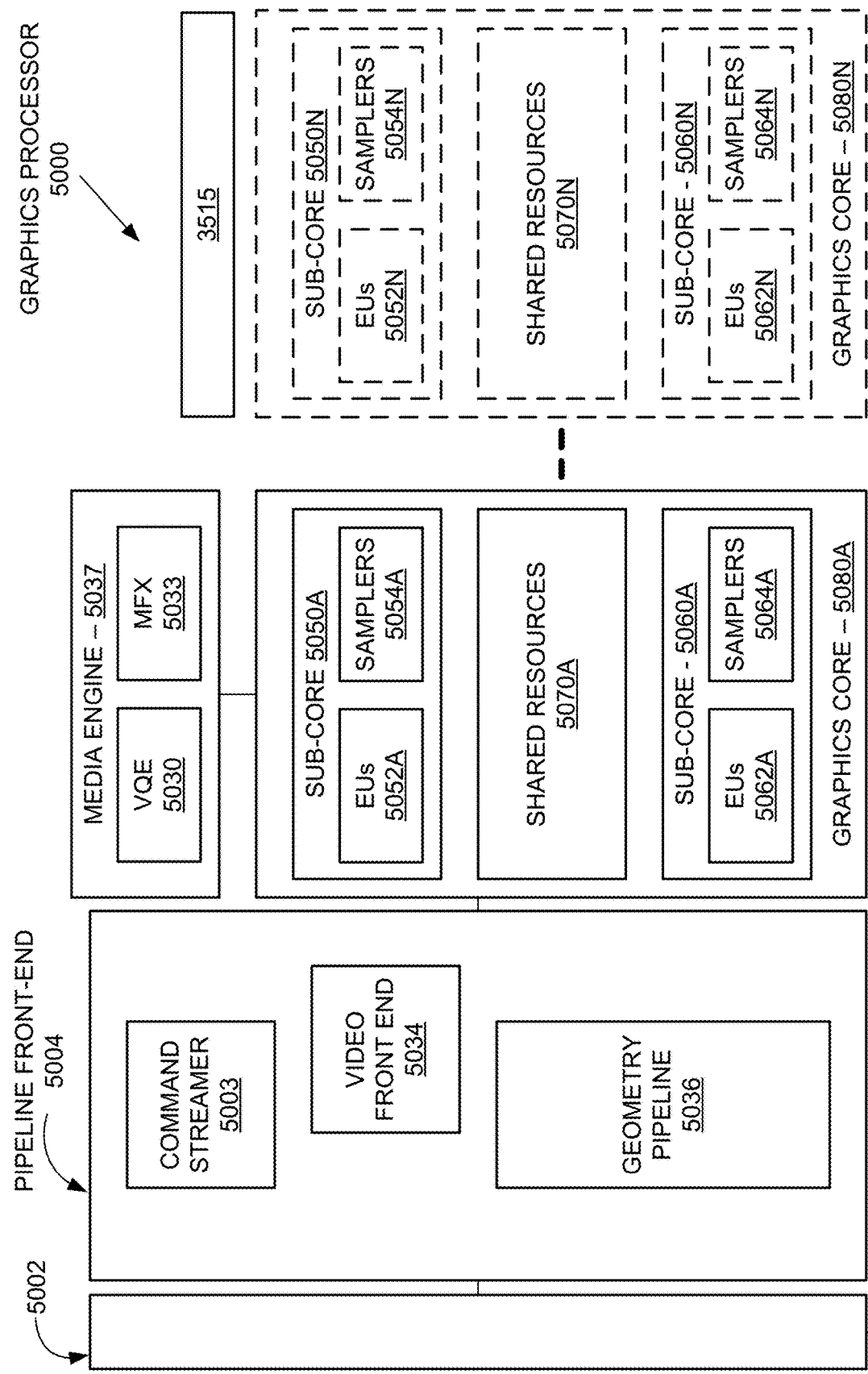
FIG. 50 illustrates a graphics processor, according to at least one embodiment.

FIG. 50 is a block diagram of a graphics processor 5000, according to at least one embodiment. In at least one embodiment, graphics processor 5000 includes a ring interconnect 5002, a pipeline front-end 5004, a media engine 5037, and graphics cores 5080A-5080N. In at least one embodiment, ring interconnect 5002 couples graphics processor 5000 to other processing units, including other graphics processors or one or more general-purpose processor cores. In at least one embodiment, graphics processor 5000 is one of many processors integrated within a multi-core processing system.

In at least one embodiment, graphics processor 5000 receives batches of commands via ring interconnect 5002. In at least one embodiment, incoming commands are interpreted by a command streamer 5003 in pipeline front-end 5004. In at least one embodiment, graphics processor 5000 includes scalable execution logic to perform 3D geometry processing and media processing via graphics core(s) 5080A-5080N. In at least one embodiment, for 3D geometry processing commands, command streamer 5003 supplies commands to geometry pipeline 5036. In at least one embodiment, for at least some media processing commands, command streamer 5003 supplies commands to a video front end 5034, which couples with media engine 5037. In at least one embodiment, media engine 5037 includes a Video Quality Engine (VQE) 5030 for video and image post-processing and a multi-format encode/decode (MFX) 5033 engine to provide hardware-accelerated media data encoding and decoding. In at least one embodiment, geometry pipeline 5036 and media engine 5037 each generate execution threads for thread execution resources provided by at least one graphics core 5080.

In at least one embodiment, graphics processor 5000 includes scalable thread execution resources featuring graphics cores 5080A-5080N (which can be modular and are sometimes referred to as core slices), each having multiple sub-cores 5050A-50N, 5060A-5060N (sometimes referred to as core sub-slices). In at least one embodiment, graphics processor 5000 can have any number of graphics cores 5080A. In at least one embodiment, graphics processor 5000 includes a graphics core 5080A having at least a first sub-core 5050A and a second sub-core 5060A. In at least one embodiment, graphics processor 5000 is a low power processor with a single sub-core (e.g., 5050A). In at least one embodiment, graphics processor 5000 includes multiple graphics cores 5080A-5080N, each including a set of first sub-cores 5050A-5050N and a set of second sub-cores 5060A-5060N. In at least one embodiment, each sub-core in first sub-cores 5050A-5050N includes at least a first set of execution units 5052A-5052N and media/texture samplers 5054A-5054N. In at least one embodiment, each sub-core in second sub-cores 5060A-5060N includes at least a second set of execution units 5062A-5062N and samplers 5064A-5064N. In at least one embodiment, each sub-core 5050A-5050N, 5060A-5060N shares a set of shared resources 5070A-5070N. In at least one embodiment, shared resources include shared cache memory and pixel operation logic.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, inference and/or training logic 3515 may be used in graphics processor 5000 for inferencing or predicting operations based, at least in part, on weight parameters calculated using neural network training operations, neural network functions and/or architectures, or neural network use cases described herein.

Figure 51:
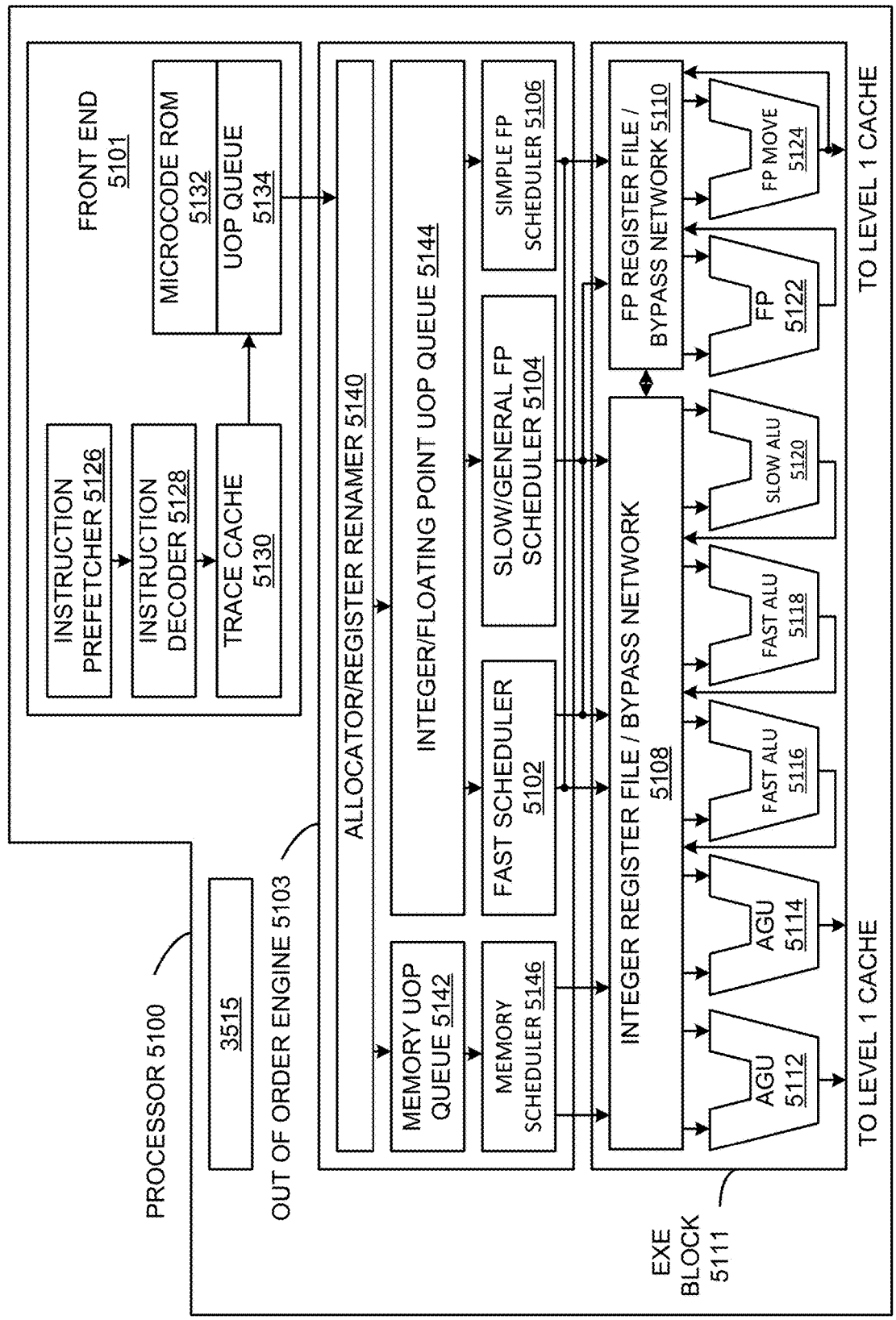
FIG. 51 is a block diagram illustrating a processor microarchitecture for a processor, according to at least one embodiment.

FIG. 51 is a block diagram illustrating micro-architecture for a processor 5100 that may include logic circuits to perform instructions, according to at least one embodiment. In at least one embodiment, processor 5100 may perform instructions, including x86 instructions, ARM instructions, specialized instructions for application-specific integrated circuits (ASICs), etc. In at least one embodiment, processor 5100 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 5100 may perform instructions to accelerate machine learning or deep learning algorithms, training, or inferencing.

In at least one embodiment, processor 5100 includes an in-order front end ("front end") 5101 to fetch instructions to be executed and prepare instructions to be used later in a processor pipeline. In at least one embodiment, front end 5101 may include several units. In at least one embodiment, an instruction prefetcher 5126 fetches instructions from memory and feeds instructions to an instruction decoder 5128 which in turn decodes or interprets instructions. For example, in at least one embodiment, instruction decoder 5128 decodes a received instruction into one or more operations called "micro-instructions" or "micro-operations" (also called "micro ops" or "uops") that a machine may execute. In at least one embodiment, instruction decoder 5128 parses an instruction into an opcode and corresponding data and control fields that may be used by micro-architecture to perform operations in accordance with at least one embodiment. In at least one embodiment, a trace cache 5130 may assemble decoded uops into program ordered sequences or traces in a uop queue 5134 for execution. In at least one embodiment, when trace cache 5130 encounters a complex instruction, a microcode ROM 5132 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 5128 may access microcode ROM 5132 to perform that instruction. In at least one embodiment, an instruction may be decoded into a small number of micro-ops for processing at instruction decoder 5128. In at least one embodiment, an instruction may be stored within microcode ROM 5132 should a number of micro-ops be needed to accomplish such operation. In at least one embodiment, trace cache 5130 refers to an entry point programmable logic array ("PLA") to determine a correct micro-instruction pointer for reading microcode sequences to complete one or more instructions from microcode ROM 5132 in accordance with at least one embodiment. In at least one embodiment, after microcode ROM 5132 finishes sequencing micro-ops for an instruction, front end 5101 of a machine may resume fetching micro-ops from trace cache 5130.

In at least one embodiment, out-of-order execution engine ("out of order engine") 5103 may prepare instructions for execution. In at least one embodiment, out-of-order execution logic has a number of buffers to smooth out and re-order flow of instructions to optimize performance as they go down a pipeline and get scheduled for execution. In at least one embodiment, out-of-order execution engine 5103 includes, without limitation, an allocator/register renamer 5140, a memory uop queue 5142, an integer/floating point uop queue 5144, a memory scheduler 5146, a fast scheduler 5102, a slow/general floating point scheduler ("slow/general FP scheduler") 5104, and a simple floating point scheduler ("simple FP scheduler") 5106. In at least one embodiment, fast schedule 5102, slow/general floating point scheduler 5104, and simple floating point scheduler 5106 are also collectively referred to herein as "uop schedulers 5102, 5104, 5106." In at least one embodiment, allocator/register renamer 5140 allocates machine buffers and resources that each uop needs in order to execute. In at least one embodiment, allocator/register renamer 5140 renames logic registers onto entries in a register file. In at least one embodiment, allocator/register renamer 5140 also allocates an entry for each uop in one of two uop queues, memory uop queue 5142 for memory operations and integer/floating point uop queue 5144 for non-memory operations, in front of memory scheduler 5146 and uop schedulers 5102, 5104, 5106. In at least one embodiment, uop schedulers 5102, 5104, 5106, determine when a uop is ready to execute based on readiness of their dependent input register operand sources and availability of execution resources uops need to complete their operation. In at least one embodiment, fast scheduler 5102 may schedule on each half of a main clock cycle while slow/general floating point scheduler 5104 and simple floating point scheduler 5106 may schedule once per main processor clock cycle. In at least one embodiment, uop schedulers 5102, 5104, 5106 arbitrate for dispatch ports to schedule uops for execution.

In at least one embodiment, execution block 5111 includes, without limitation, an integer register file/bypass network 5108, a floating point register file/bypass network ("FP register file/bypass network") 5110, address generation units ("AGUs") 5112 and 5114, fast Arithmetic Logic Units (ALUs) ("fast ALUs") 5116 and 5118, a slow Arithmetic Logic Unit ("slow ALU") 5120, a floating point ALU ("FP") 5122, and a floating point move unit ("FP move") 5124. In at least one embodiment, integer register file/bypass network 5108 and floating point register file/bypass network 5110 are also referred to herein as "register files 5108, 5110." In at least one embodiment, AGUSs 5112 and 5114, fast ALUs 5116 and 5118, slow ALU 5120, floating point ALU 5122, and floating point move unit 5124 are also referred to herein as "execution units 5112, 5114, 5116, 5118, 5120, 5122, and 5124." In at least one embodiment, execution block 5111 may include, without limitation, any number (including zero) and type of register files, bypass networks, address generation units, and execution units, in any combination.

In at least one embodiment, register networks 5108, 5110 may be arranged between uop schedulers 5102, 5104, 5106, and execution units 5112, 5114, 5116, 5118, 5120, 5122, and 5124. In at least one embodiment, integer register file/bypass network 5108 performs integer operations. In at least one embodiment, floating point register file/bypass network 5110 performs floating point operations. In at least one embodiment, each of register networks 5108, 5110 may include, without limitation, a bypass network that may bypass or forward just completed results that have not yet been written into a register file to new dependent uops. In at least one embodiment, register networks 5108, 5110 may communicate data with each other. In at least one embodiment, integer register file/bypass network 5108 may include, without limitation, two separate register files, one register file for a low-order thirty-two bits of data and a second register file for a high order thirty-two bits of data. In at least one embodiment, floating point register file/bypass network 5110 may include, without limitation, 128-bit wide entries because floating point instructions typically have operands from 64 to 128 bits in width.

In at least one embodiment, execution units 5112, 5114, 5116, 5118, 5120, 5122, 5124 may execute instructions. In at least one embodiment, register networks 5108, 5110 store integer and floating point data operand values that microinstructions need to execute. In at least one embodiment, processor 5100 may include, without limitation, any number and combination of execution units 5112, 5114, 5116, 5118, 5120, 5122, 5124. In at least one embodiment, floating point ALU 5122 and floating point move unit 5124, may execute floating point, MMX, SIMD, AVX and SSE, or other operations, including specialized machine learning instructions. In at least one embodiment, floating point ALU 5122 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 5116, 5118. In at least one embodiment, fast ALUS 5116, 5118 may execute fast operations with an effective latency of half a clock cycle. In at least one embodiment, most complex integer operations go to slow ALU 5120 as slow ALU 5120 may include, without limitation, integer execution hardware for long-latency type of operations, such as a multiplier, shifts, flag logic, and branch processing. In at least one embodiment, memory load/store operations may be executed by AGUs 5112, 5114. In at least one embodiment, fast ALU 5116, fast ALU 5118, and slow ALU 5120 may perform integer operations on 64-bit data operands. In at least one embodiment, fast ALU 5116, fast ALU 5118, and slow ALU 5120 may be implemented to support a variety of data bit sizes including sixteen, thirty-two, 128, 256, etc. In at least one embodiment, floating point ALU 5122 and floating point move unit 5124 may be implemented to support a range of operands having bits of various widths, such as 128-bit wide packed data operands in conjunction with SIMD and multimedia instructions.

In at least one embodiment, uop schedulers 5102, 5104, 5106 dispatch dependent operations before a parent load has finished executing. In at least one embodiment, as uops may be speculatively scheduled and executed in processor 5100, processor 5100 may also include logic to handle memory misses. In at least one embodiment, if a data load misses in a data cache, there may be dependent operations in flight in a pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and a replay mechanism of at least one embodiment of a processor may also be designed to catch instruction sequences for text string comparison operations.

In at least one embodiment, "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment portions or all of inference and/or training logic 3515 may be incorporated into execution block 5111 and other memory or registers shown or not shown. For example, in at least one embodiment, training and/or inferencing techniques described herein may use one or more of ALUs illustrated in execution block 5111. Moreover, weight parameters may be stored in on-chip or off-chip memory and/or registers (shown or not shown) that configure ALUs of execution block 5111 to perform one or more machine learning algorithms, neural network architectures, use cases, or training techniques described herein.

Figure 52:
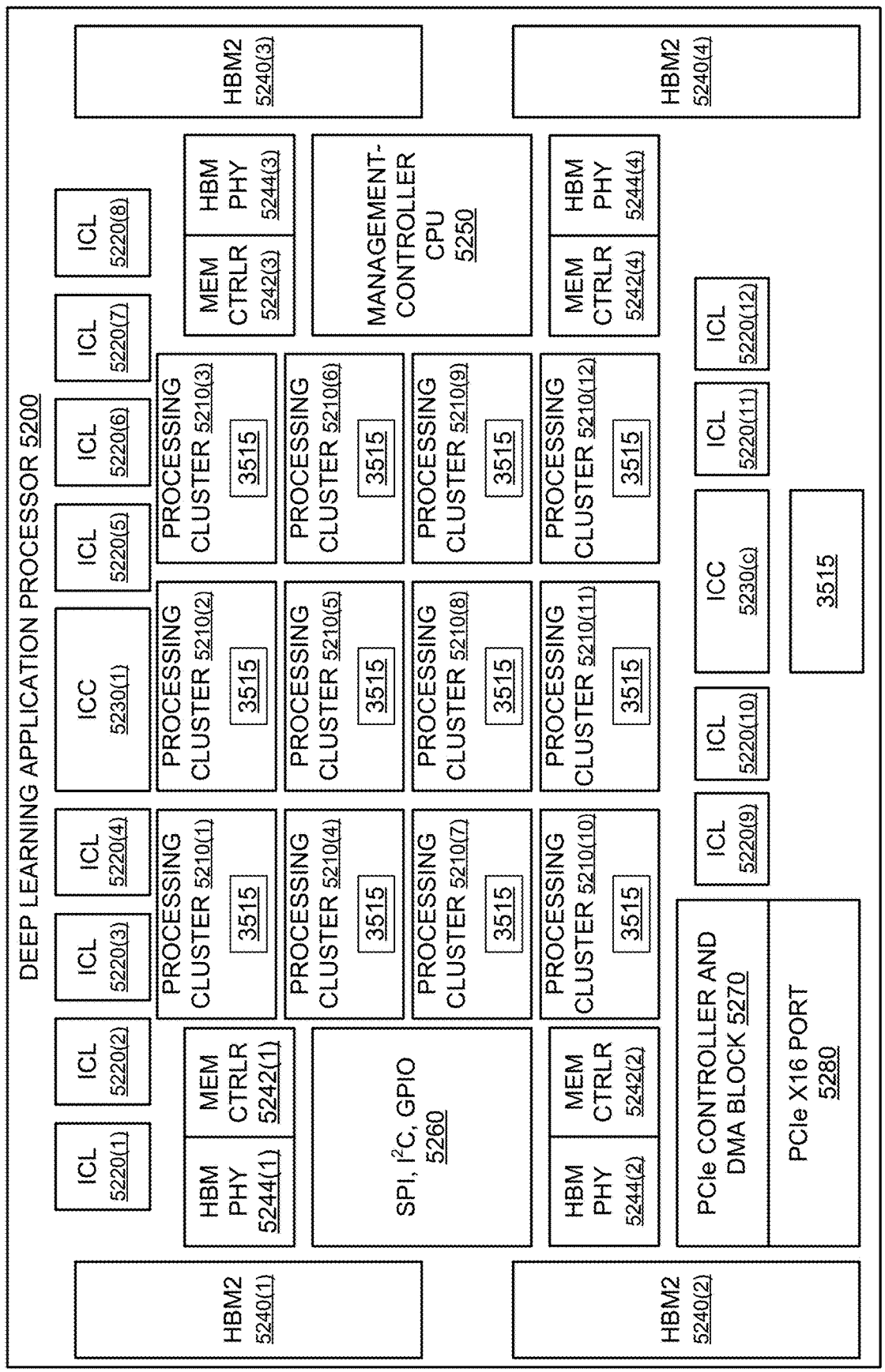
FIG. 52 illustrates a deep learning application processor, according to at least one embodiment.

FIG. 52 illustrates a deep learning application processor 5200, according to at least one embodiment. In at least one embodiment, deep learning application processor 5200 uses instructions that, if executed by deep learning application processor 5200, cause deep learning application processor 5200 to perform some or all of processes and techniques described throughout this disclosure. In at least one embodiment, deep learning application processor 5200 is an application-specific integrated circuit (ASIC). In at least one embodiment, application processor 5200 performs matrix multiply operations either "hard-wired" into hardware as a result of performing one or more instructions or both. In at least one embodiment, deep learning application processor 5200 includes, without limitation, processing clusters 5210 (1)-5210(12), Inter-Chip Links ("ICLs") 5220(1)-5220(12), Inter-Chip Controllers ("ICCs") 5230(1)-5230(2), high-bandwidth memory second generation ("HBM2") 5240(1)-5240(4), memory controllers ("Mem Ctrlrs") 5242(1)-5242(4), high bandwidth memory physical layer ("HBM PHY") 5244(1)-5244(4), a management-controller central processing unit ("management-controller CPU") 5250, a Serial Peripheral Interface, Inter-Integrated Circuit, and General Purpose Input/Output block ("SPI, I2C, GPIO") 5260, a peripheral component interconnect express controller and direct memory access block ("PCIe Controller and DMA") 5270, and a sixteen-lane peripheral component interconnect express port ("PCI Express×16") 5280.

In at least one embodiment, processing clusters 5210 may perform deep learning operations, including inference or prediction operations based on weight parameters calculated one or more training techniques, including those described herein. In at least one embodiment, each processing cluster 5210 may include, without limitation, any number and type of processors. In at least one embodiment, deep learning application processor 5200 may include any number and type of processing clusters 5210. In at least one embodiment, Inter-Chip Links 5220 are bi-directional. In at least one embodiment, Inter-Chip Links 5220 and Inter-Chip Controllers 5230 enable multiple deep learning application processors 5200 to exchange information, including activation information resulting from performing one or more machine learning algorithms embodied in one or more neural networks. In at least one embodiment, deep learning application processor 5200 may include any number (including zero) and type of ICLs 5220 and ICCs 5230.

In at least one embodiment, HBM2s 5240 provide a total of 32 Gigabytes (GB) of memory. In at least one embodiment, HBM2 5240($i$) is associated with both memory controller 5242($i$) and HBM PHY 5244($i$) where "i" is an arbitrary integer. In at least one embodiment, any number of HBM2s 5240 may provide any type and total amount of high bandwidth memory and may be associated with any number (including zero) and type of memory controllers 5242 and HBM PHYs 5244. In at least one embodiment, SPI, I2C, GPIO 5260, PCIe Controller and DMA 5270, and/or PCIe 5280 may be replaced with any number and type of blocks that enable any number and type of communication standards in any technically feasible fashion.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, deep learning application processor is used to train a machine learning model, such as a neural network, to predict or infer information provided to deep learning application processor 5200. In at least one embodiment, deep learning application processor 5200 is used to infer or predict information based on a trained machine learning model (e.g., neural network) that has been trained by another processor or system or by deep learning application processor 5200. In at least one embodiment, processor 5200 may be used to perform one or more neural network use cases described herein.

Figure 53:
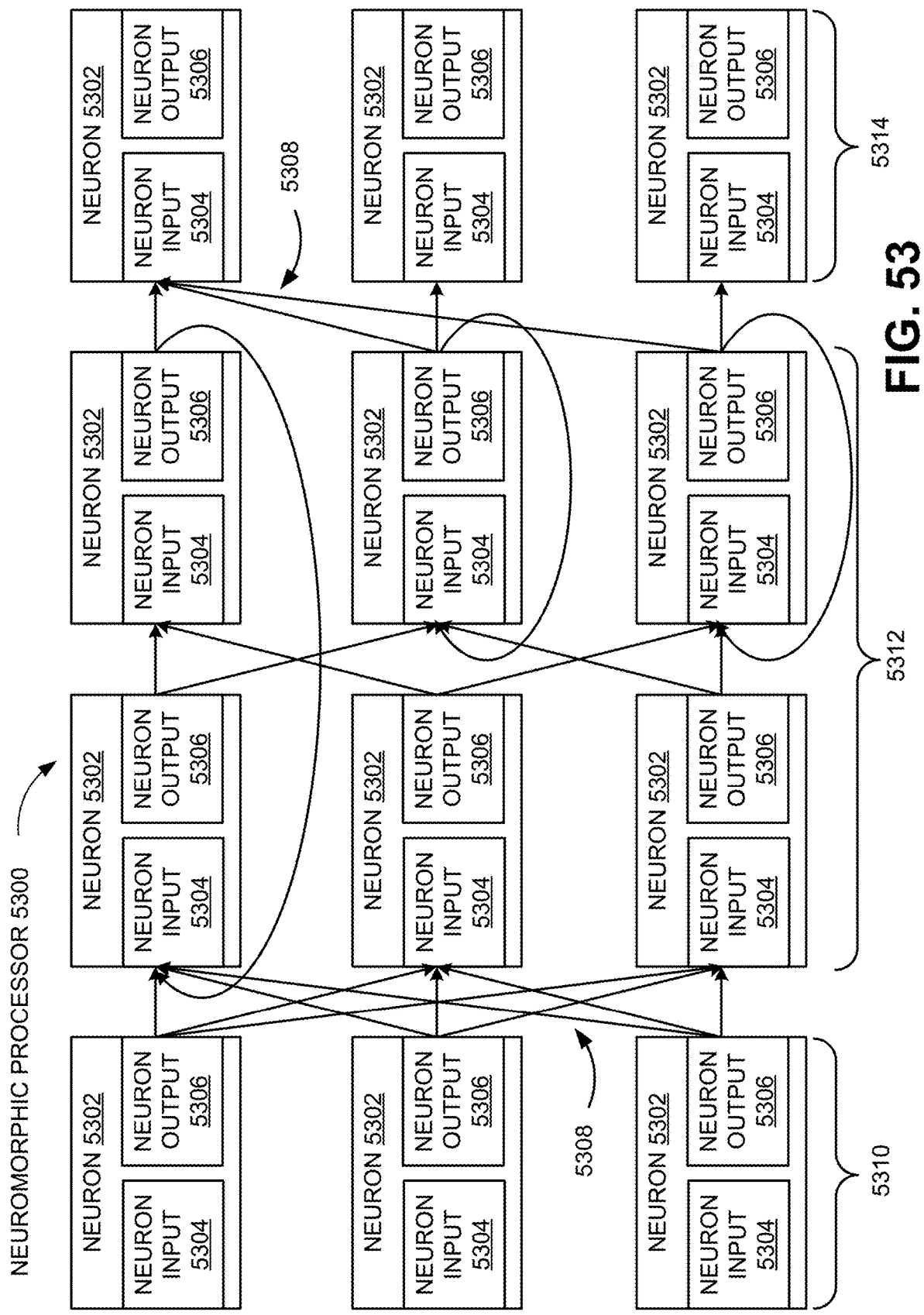
FIG. 53 is a block diagram illustrating an example neuromorphic processor, according to at least one embodiment.

FIG. 53 is a block diagram of a neuromorphic processor 5300, according to at least one embodiment. In at least one embodiment, neuromorphic processor 5300 may receive one or more inputs from sources external to neuromorphic processor 5300. In at least one embodiment, these inputs may be transmitted to one or more neurons 5302 within neuromorphic processor 5300. In at least one embodiment, neurons 5302 and components thereof may be implemented using circuitry or logic, including one or more arithmetic logic units (ALUs). In at least one embodiment, neuromorphic processor 5300 may include, without limitation, thousands or millions of instances of neurons 5302, but any suitable number of neurons 5302 may be used. In at least one embodiment, each instance of neuron 5302 may include a neuron input 5304 and a neuron output 5306. In at least one embodiment, neurons 5302 may generate outputs that may be transmitted to inputs of other instances of neurons 5302.

For example, in at least one embodiment, neuron inputs 5304 and neuron outputs 5306 may be interconnected via synapses 5308.

In at least one embodiment, neurons 5302 and synapses 5308 may be interconnected such that neuromorphic processor 5300 operates to process or analyze information received by neuromorphic processor 5300. In at least one embodiment, neurons 5302 may transmit an output pulse (or "fire" or "spike") when inputs received through neuron input 5304 exceed a threshold. In at least one embodiment, neurons 5302 may sum or integrate signals received at neuron inputs 5304. For example, in at least one embodiment, neurons 5302 may be implemented as leaky integrate-and-fire neurons, wherein if a sum (referred to as a "membrane potential") exceeds a threshold value, neuron 5302 may generate an output (or "fire") using a transfer function such as a sigmoid or threshold function. In at least one embodiment, a leaky integrate-and-fire neuron may sum signals received at neuron inputs 5304 into a membrane potential and may also apply a decay factor (or leak) to reduce a membrane potential. In at least one embodiment, a leaky integrate-and-fire neuron may fire if multiple input signals are received at neuron inputs 5304 rapidly enough to exceed a threshold value (i.e., before a membrane potential decays too low to fire). In at least one embodiment, neurons 5302 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 5302 may include, without limitation, comparator circuits or logic that generate an output spike at neuron output 5306 when result of applying a transfer function to neuron input 5304 exceeds a threshold. In at least one embodiment, once neuron 5302 fires, it may disregard previously received input information by, for example, resetting a membrane potential to 0 or another suitable default value. In at least one embodiment, once membrane potential is reset to 0, neuron 5302 may resume normal operation after a suitable period of time (or refractory period).

In at least one embodiment, neurons 5302 may be interconnected through synapses 5308. In at least one embodiment, synapses 5308 may operate to transmit signals from an output of a first neuron 5302 to an input of a second neuron 5302. In at least one embodiment, neurons 5302 may transmit information over more than one instance of synapse 5308. In at least one embodiment, one or more instances of neuron output 5306 may be connected, via an instance of synapse 5308, to an instance of neuron input 5304 in same neuron 5302. In at least one embodiment, an instance of neuron 5302 generating an output to be transmitted over an instance of synapse 5308 may be referred to as a "pre-synaptic neuron" with respect to that instance of synapse 5308. In at least one embodiment, an instance of neuron 5302 receiving an input transmitted over an instance of synapse 5308 may be referred to as a "post-synaptic neuron" with respect to that instance of synapse 5308. Because an instance of neuron 5302 may receive inputs from one or more instances of synapse 5308, and may also transmit outputs over one or more instances of synapse 5308, a single instance of neuron 5302 may therefore be both a "pre-synaptic neuron" and "post-synaptic neuron," with respect to various instances of synapses 5308, in at least one embodiment.

In at least one embodiment, neurons 5302 may be organized into one or more layers. In at least one embodiment, each instance of neuron 5302 may have one neuron output 5306 that may fan out through one or more synapses 5308 to one or more neuron inputs 5304. In at least one embodiment, neuron outputs 5306 of neurons 5302 in a first layer 5310 may be connected to neuron inputs 5304 of neurons 5302 in a second layer 5312. In at least one embodiment, layer 5310 may be referred to as a "feed-forward layer." In at least one embodiment, each instance of neuron 5302 in an instance of first layer 5310 may fan out to each instance of neuron 5302 in second layer 5312. In at least one embodiment, first layer 5310 may be referred to as a "fully connected feed-forward layer." In at least one embodiment, each instance of neuron 5302 in an instance of second layer 5312 may fan out to fewer than all instances of neuron 5302 in a third layer 5314. In at least one embodiment, second layer 5312 may be referred to as a "sparsely connected feed-forward layer." In at least one embodiment, neurons 5302 in second layer 5312 may fan out to neurons 5302 in multiple other layers, including to neurons 5302 also in second layer 5312. In at least one embodiment, second layer 5312 may be referred to as a "recurrent layer." In at least one embodiment, neuromorphic processor 5300 may include, without limitation, any suitable combination of recurrent layers and feed-forward layers, including, without limitation, both sparsely connected feed-forward layers and fully connected feed-forward layers.

In at least one embodiment, neuromorphic processor 5300 may include, without limitation, a reconfigurable interconnect architecture or dedicated hard-wired interconnects to connect synapse 5308 to neurons 5302. In at least one embodiment, neuromorphic processor 5300 may include, without limitation, circuitry or logic that allows synapses to be allocated to different neurons 5302 as needed based on neural network topology and neuron fan-in/out. For example, in at least one embodiment, synapses 5308 may be connected to neurons 5302 using an interconnect fabric, such as network-on-chip, or with dedicated connections. In at least one embodiment, synapse interconnections and components thereof may be implemented using circuitry or logic.

Figure 54:
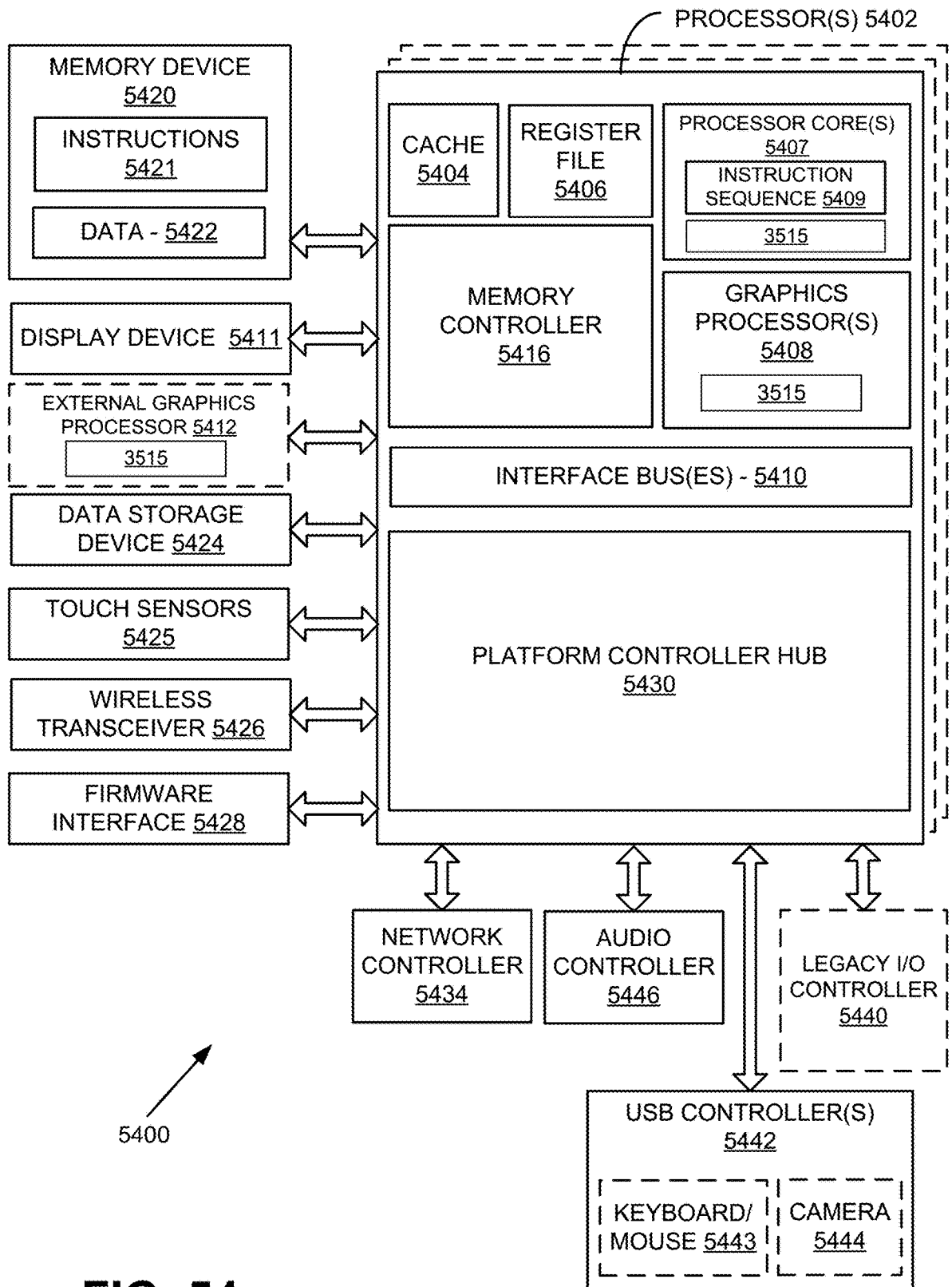
FIG. 54 illustrates at least portions of a graphics processor, according to one or more embodiments.

FIG. 54 is a block diagram of a processing system, according to at least one embodiment. In at least one embodiment, system 5400 includes one or more processors 5402 and one or more graphics processors 5408, and may be a single processor desktop system, a multiprocessor workstation system, or a server system having a large number of processors 5402 or processor cores 5407. In at least one embodiment, system 5400 is a processing platform incorporated within a system-on-a-chip (SoC) integrated circuit for use in mobile, handheld, or embedded devices. In at least one embodiment, system 4700 performs process 900 (see FIG. 9A) and/or process 906 (see FIG. 9B).

In at least one embodiment, system 5400 can include, or be incorporated within a server-based gaming platform, a game console, including a game and media console, a mobile gaming console, a handheld game console, or an online game console. In at least one embodiment, system 5400 is a mobile phone, a smart phone, a tablet computing device or a mobile Internet device. In at least one embodiment, processing system 5400 can also include, couple with, or be integrated within a wearable device, such as a smart watch wearable device, a smart eyewear device, an augmented reality device, or a virtual reality device. In at least one embodiment, processing system 5400 is a television or set top box device having one or more processors 5402 and a graphical interface generated by one or more graphics processors 5408.

In at least one embodiment, one or more processors 5402 each include one or more processor cores 5407 to process instructions which, when executed, perform operations for system and user software. In at least one embodiment, each of one or more processor cores 5407 is configured to process a specific instruction sequence 5409. In at least one embodiment, instruction sequence 5409 may facilitate Complex Instruction Set Computing (CISC), Reduced Instruction Set Computing (RISC), or computing via a Very Long Instruction Word (VLIW). In at least one embodiment, processor cores 5407 may each process a different instruction sequence 5409, which may include instructions to facilitate emulation of other instruction sequences. In at least one embodiment, processor core 5407 may also include other processing devices, such a Digital Signal Processor (DSP).

In at least one embodiment, processor 5402 includes a cache memory 5404. In at least one embodiment, processor 5402 can have a single internal cache or multiple levels of internal cache. In at least one embodiment, cache memory is shared among various components of processor 5402. In at least one embodiment, processor 5402 also uses an external cache (e.g., a Level-3 (L3) cache or Last Level Cache (LLC)) (not shown), which may be shared among processor cores 5407 using known cache coherency techniques. In at least one embodiment, a register file 5406 is additionally included in processor 5402, which may include different types of registers for storing different types of data (e.g., integer registers, floating point registers, status registers, and an instruction pointer register). In at least one embodiment, register file 5406 may include general-purpose registers or other registers.

In at least one embodiment, one or more processor(s) 5402 are coupled with one or more interface bus(es) 5410 to transmit communication signals such as address, data, or control signals between processor 5402 and other components in system 5400. In at least one embodiment, interface bus 5410 can be a processor bus, such as a version of a Direct Media Interface (DMI) bus. In at least one embodiment, interface bus 5410 is not limited to a DMI bus, and may include one or more Peripheral Component Interconnect buses (e.g., PCI, PCI Express), memory busses, or other types of interface busses. In at least one embodiment processor(s) 5402 include an integrated memory controller 5416 and a platform controller hub 5430. In at least one embodiment, memory controller 5416 facilitates communication between a memory device and other components of system 5400, while platform controller hub (PCH) 5430 provides connections to I/O devices via a local I/O bus.

In at least one embodiment, a memory device 5420 can be a dynamic random access memory (DRAM) device, a static random access memory (SRAM) device, flash memory device, phase-change memory device, or some other memory device having suitable performance to serve as process memory. In at least one embodiment, memory device 5420 can operate as system memory for system 5400, to store data 5422 and instructions 5421 for use when one or more processors 5402 executes an application or process. In at least one embodiment, memory controller 5416 also couples with an optional external graphics processor 5412, which may communicate with one or more graphics processors 5408 in processors 5402 to perform graphics and media operations. In at least one embodiment, a display device 5411 can connect to processor(s) 5402. In at least one embodiment, display device 5411 can include one or more of an internal display device, as in a mobile electronic device or a laptop device, or an external display device attached via a display interface (e.g., DisplayPort, etc.). In at least one embodiment, display device 5411 can include a head mounted display (HMD) such as a stereoscopic display device for use in virtual reality (VR) applications or augmented reality (AR) applications.

In at least one embodiment, platform controller hub 5430 enables peripherals to connect to memory device 5420 and processor 5402 via a high-speed I/O bus. In at least one embodiment, I/O peripherals include, but are not limited to, an audio controller 5446, a network controller 5434, a firmware interface 5428, a wireless transceiver 5426, touch sensors 5425, a data storage device 5424 (e.g., hard disk drive, flash memory, etc.). In at least one embodiment, data storage device 5424 can connect via a storage interface (e.g., SATA) or via a peripheral bus, such as a Peripheral Component Interconnect bus (e.g., PCI, PCI Express). In at least one embodiment, touch sensors 5425 can include touch screen sensors, pressure sensors, or fingerprint sensors. In at least one embodiment, wireless transceiver 5426 can be a Wi-Fi transceiver, a Bluetooth transceiver, or a mobile network transceiver such as a 3G, 4G, or Long Term Evolution (LTE) transceiver. In at least one embodiment, firmware interface 5428 enables communication with system firmware, and can be, for example, a unified extensible firmware interface (UEFI). In at least one embodiment, network controller 5434 can enable a network connection to a wired network. In at least one embodiment, a high-performance network controller (not shown) couples with interface bus 5410. In at least one embodiment, audio controller 5446 is a multi-channel high definition audio controller. In at least one embodiment, system 5400 includes an optional legacy I/O controller 5440 for coupling legacy (e.g., Personal System 2 (PS/2)) devices to system 5400. In at least one embodiment, platform controller hub 5430 can also connect to one or more Universal Serial Bus (USB) controllers 5442 connect input devices, such as keyboard and mouse 5443 combinations, a camera 5444, or other USB input devices.

In at least one embodiment, an instance of memory controller 5416 and platform controller hub 5430 may be integrated into a discreet external graphics processor, such as external graphics processor 5412. In at least one embodiment, platform controller hub 5430 and/or memory controller 5416 may be external to one or more processor(s) 5402. For example, in at least one embodiment, system 5400 can include an external memory controller 5416 and platform controller hub 5430, which may be configured as a memory controller hub and peripheral controller hub within a system chipset that is in communication with processor(s) 5402.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment portions or all of inference and/or training logic 3515 may be incorporated into graphics processor(s) 5408. For example, in at least one embodiment, training and/or inferencing techniques described herein may use one or more of ALUs embodied in a 3D pipeline. Moreover, in at least one embodiment, inferencing and/or training operations described herein may be done using logic other than logic illustrated in FIG. 35A or 35B. In at least one embodiment, weight parameters may be stored in on-chip or off-chip memory and/or registers (shown or not shown) that configure ALUs of graphics processor(s) 5408 to perform one or more machine learning algorithms, neural network architectures, use cases, or training techniques described herein.

Figure 55:
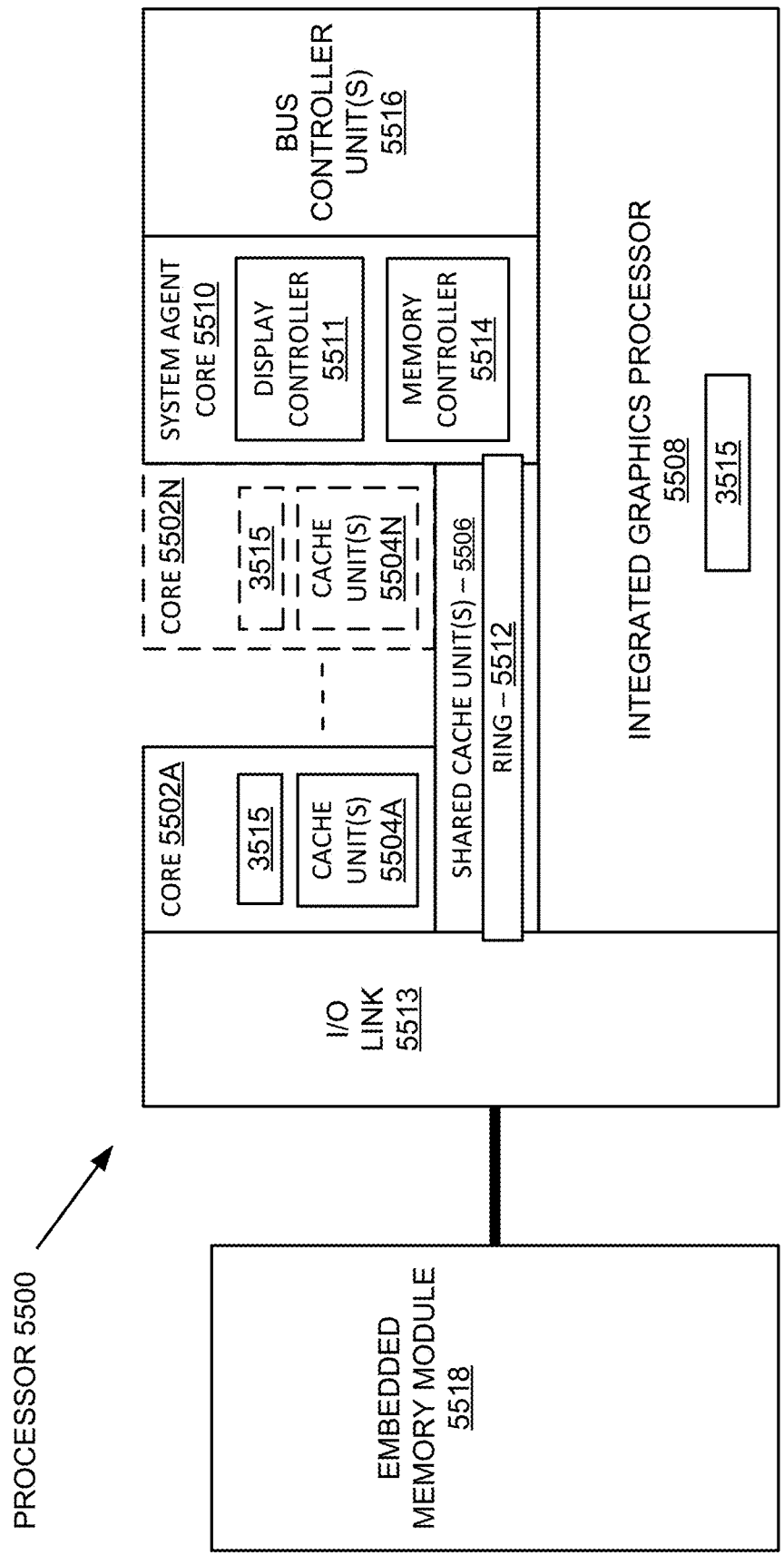
FIG. 55 illustrates at least portions of a graphics processor, according to one or more embodiments.

FIG. 55 is a block diagram of a processor 5500 having one or more processor cores 5502A-5502N, an integrated memory controller 5514, and an integrated graphics processor 5508, according to at least one embodiment. In at least one embodiment, processor 5500 can include additional cores up to and including additional core 5502N represented by dashed lined boxes. In at least one embodiment, each of processor cores 5502A-5502N includes one or more internal cache units 5504A-5504N. In at least one embodiment, each processor core also has access to one or more shared cached units 5506. In at least one embodiment, processor 5500 performs process 900 (see FIG. 9A) or process 906 (see FIG. 9B).

In at least one embodiment, internal cache units 5504A-5504N and shared cache units 5506 represent a cache memory hierarchy within processor 5500. In at least one embodiment, cache memory units 5504A-5504N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 5506 and 5504A-5504N.

In at least one embodiment, processor 5500 may also include a set of one or more bus controller units 5516 and a system agent core 5510. In at least one embodiment, bus controller units 5516 manage a set of peripheral buses, such as one or more PCI or PCI express busses. In at least one embodiment, system agent core 5510 provides management functionality for various processor components. In at least one embodiment, system agent core 5510 includes one or more integrated memory controllers 5514 to manage access to various external memory devices (not shown).

In at least one embodiment, one or more of processor cores 5502A-5502N include support for simultaneous multi-threading. In at least one embodiment, system agent core 5510 includes components for coordinating and operating cores 5502A-5502N during multi-threaded processing. In at least one embodiment, system agent core 5510 may additionally include a power control unit (PCU), which includes logic and components to regulate one or more power states of processor cores 5502A-5502N and graphics processor 5508.

In at least one embodiment, processor 5500 additionally includes graphics processor 5508 to execute graphics processing operations. In at least one embodiment, graphics processor 5508 couples with shared cache units 5506, and system agent core 5510, including one or more integrated memory controllers 5514. In at least one embodiment, system agent core 5510 also includes a display controller 5511 to drive graphics processor output to one or more coupled displays. In at least one embodiment, display controller 5511 may also be a separate module coupled with graphics processor 5508 via at least one interconnect, or may be integrated within graphics processor 5508.

In at least one embodiment, a ring-based interconnect unit 5512 is used to couple internal components of processor 5500. In at least one embodiment, an alternative interconnect unit may be used, such as a point-to-point interconnect, a switched interconnect, or other techniques. In at least one embodiment, graphics processor 5508 couples with ring interconnect 5512 via an I/O link 5513.

In at least one embodiment, I/O link 5513 represents at least one of multiple varieties of I/O interconnects, including an on package I/O interconnect which facilitates communication between various processor components and a high-performance embedded memory module 5518, such as an eDRAM module. In at least one embodiment, each of processor cores 5502A-5502N and graphics processor 5508 use embedded memory module 5518 as a shared Last Level Cache.

In at least one embodiment, processor cores 5502A-5502N are homogeneous cores executing a common instruction set architecture. In at least one embodiment, processor cores 5502A-5502N are heterogeneous in terms of instruction set architecture (ISA), where one or more of processor cores 5502A-5502N execute a common instruction set, while one or more other cores of processor cores 5502A-5502N executes a subset of a common instruction set or a different instruction set. In at least one embodiment, processor cores 5502A-5502N are heterogeneous in terms of microarchitecture, where one or more cores having a relatively higher power consumption couple with one or more power cores having a lower power consumption. In at least one embodiment, processor 5500 can be implemented on one or more chips or as an SoC integrated circuit.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment portions or all of inference and/or training logic 3515 may be incorporated into processor 5500. For example, in at least one embodiment, training and/or inferencing techniques described herein may use one or more of ALUs embodied in a 3D pipeline, graphics core(s) 5502, shared function logic, or other logic in FIG. 55. Moreover, in at least one embodiment, inferencing and/or training operations described herein may be done using logic other than logic illustrated in FIG. 35A or 35B. In at least one embodiment, weight parameters may be stored in on-chip or off-chip memory and/or registers (shown or not shown) that configure ALUs of processor 5500 to perform one or more machine learning algorithms, neural network architectures, use cases, or training techniques described herein.

Figure 56:
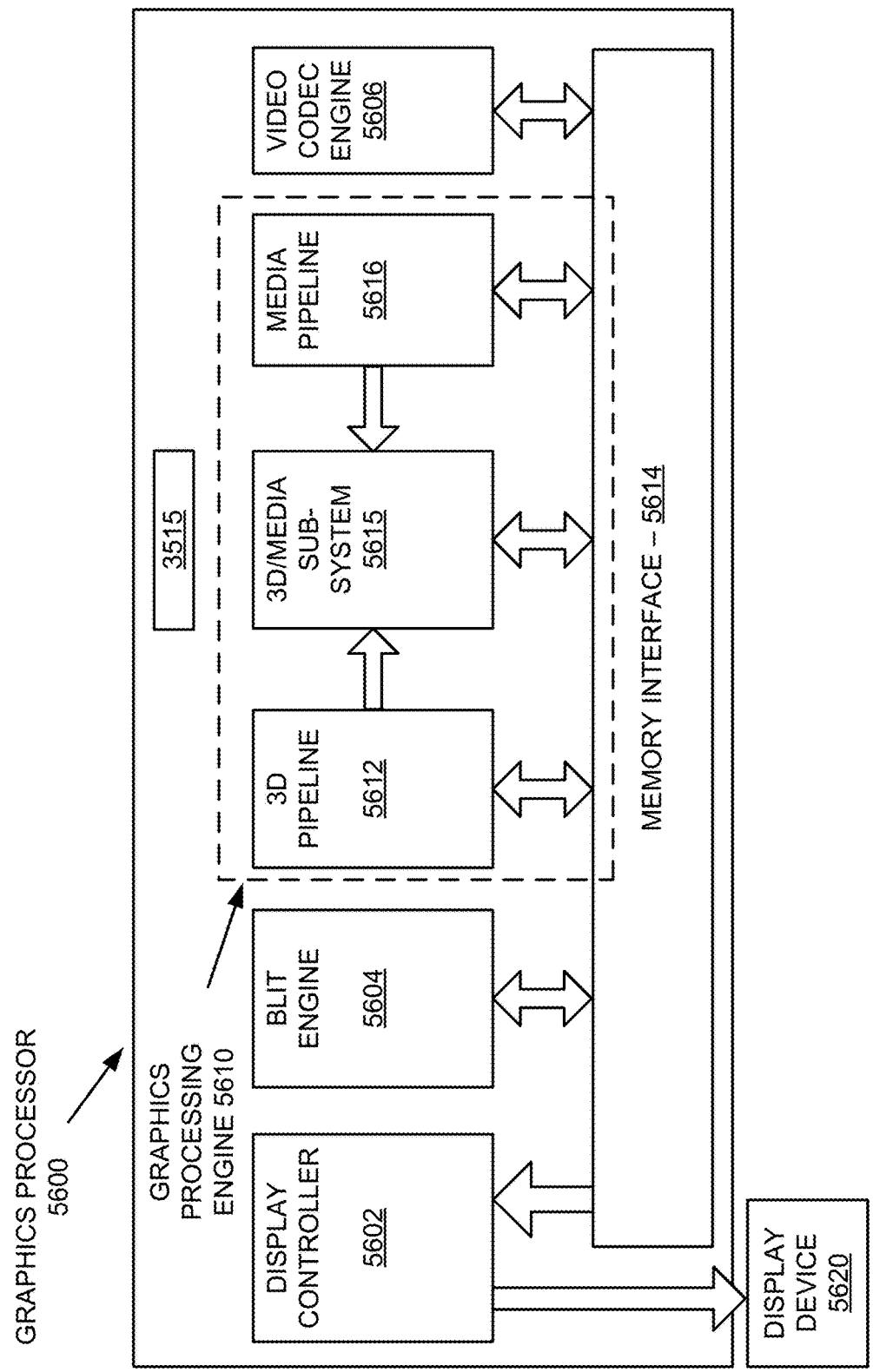
FIG. 56 illustrates at least portions of a graphics processor, according to one or more embodiments.

FIG. 56 is a block diagram of a graphics processor 5600, which may be a discrete graphics processing unit, or may be a graphics processor integrated with a plurality of processing cores. In at least one embodiment, graphics processor 5600 communicates via a memory mapped I/O interface to registers on graphics processor 5600 and with commands placed into memory. In at least one embodiment, graphics processor 5600 includes a memory interface 5614 to access memory. In at least one embodiment, memory interface 5614 is an interface to local memory, one or more internal caches, one or more shared external caches, and/or to system memory.

In at least one embodiment, graphics processor 5600 also includes a display controller 5602 to drive display output data to a display device 5620. In at least one embodiment, display controller 5602 includes hardware for one or more overlay planes for display device 5620 and composition of multiple layers of video or user interface elements. In at least one embodiment, display device 5620 can be an internal or external display device. In at least one embodiment, display device 5620 is a head mounted display device, such as a virtual reality (VR) display device or an augmented reality (AR) display device. In at least one embodiment, graphics processor 5600 includes a video codec engine 5606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats. In at least one embodiment, graphics processor 5600 performs process 900 (see FIG. 9A) or process 906 (see FIG. 9B).

In at least one embodiment, graphics processor 5600 includes a block image transfer (BLIT) engine 5604 to perform two-dimensional (2D) rasterizer operations including, for example, bit-boundary block transfers. However, in at least one embodiment, 2D graphics operations are performed using one or more components of a graphics processing engine (GPE) 5610. In at least one embodiment, GPE 5610 is a compute engine for performing graphics operations, including three-dimensional (3D) graphics operations and media operations.

In at least one embodiment, GPE 5610 includes a 3D pipeline 5612 for performing 3D operations, such as rendering three-dimensional images and scenes using processing functions that act upon 3D primitive shapes (e.g., rectangle, triangle, etc.). In at least one embodiment, 3D pipeline 5612 includes programmable and fixed function elements that perform various tasks and/or spawn execution threads to a 3D/Media sub-system 5615. While 3D pipeline 5612 can be used to perform media operations, in at least one embodiment, GPE 5610 also includes a media pipeline 5616 that is used to perform media operations, such as video post-processing and image enhancement.

In at least one embodiment, media pipeline 5616 includes fixed function or programmable logic units to perform one or more specialized media operations, such as video decode acceleration, video de-interlacing, and video encode acceleration in place of, or on behalf of, video codec engine 5606. In at least one embodiment, media pipeline 5616 additionally includes a thread spawning unit to spawn threads for execution on 3D/Media sub-system 5615. In at least one embodiment, spawned threads perform computations for media operations on one or more graphics execution units included in 3D/Media sub-system 5615.

In at least one embodiment, 3D/Media subsystem 5615 includes logic for executing threads spawned by 3D pipeline 5612 and media pipeline 5616. In at least one embodiment, 3D pipeline 5612 and media pipeline 5616 send thread execution requests to 3D/Media subsystem 5615, which includes thread dispatch logic for arbitrating and dispatching various requests to available thread execution resources. In at least one embodiment, execution resources include an array of graphics execution units to process 3D and media threads. In at least one embodiment, 3D/Media subsystem 5615 includes one or more internal caches for thread instructions and data. In at least one embodiment, subsystem 5615 also includes shared memory, including registers and addressable memory, to share data between threads and to store output data.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment portions or all of inference and/or training logic 3515 may be incorporated into graphics processor 5600. For example, in at least one embodiment, training and/or inferencing techniques described herein may use one or more of ALUs embodied in 3D pipeline 5612. Moreover, in at least one embodiment, inferencing and/or training operations described herein may be done using logic other than logic illustrated in FIG. 35A or 35B. In at least one embodiment, weight parameters may be stored in on-chip or off-chip memory and/or registers (shown or not shown) that configure ALUs of graphics processor 5600 to perform one or more machine learning algorithms, neural network architectures, use cases, or training techniques described herein.

Figure 57:
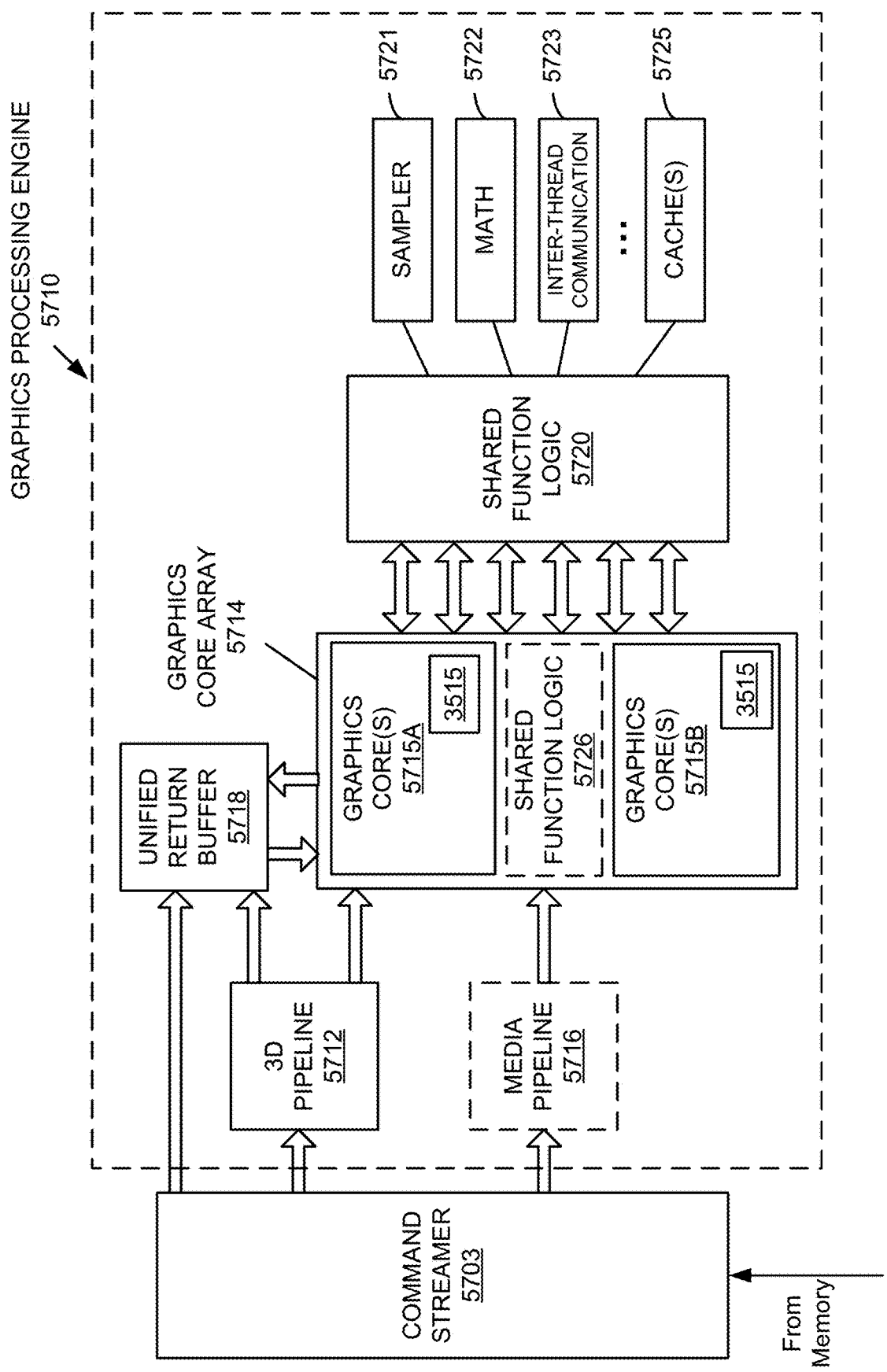
FIG. 57 is a block diagram of a graphics processing engine of a graphics processor in accordance with at least one embodiment.

FIG. 57 is a block diagram of a graphics processing engine 5710 of a graphics processor in accordance with at least one embodiment. In at least one embodiment, graphics processing engine (GPE) 5710 is a version of GPE 5610 shown in FIG. 56. In at least one embodiment, a media pipeline 5716 is optional and may not be explicitly included within GPE 5710. In at least one embodiment, a separate media and/or image processor is coupled to GPE 5710. In at least on embodiment, graphics processing engine 5710 performs process 900 (see FIG. 9A) or process 906 (see FIG. 9B).

In at least one embodiment, GPE 5710 is coupled to or includes a command streamer 5703, which provides a command stream to a 3D pipeline 5712 and/or media pipeline 5716. In at least one embodiment, command streamer 5703 is coupled to memory, which can be system memory, or one or more of internal cache memory and shared cache memory. In at least one embodiment, command streamer 5703 receives commands from memory and sends commands to 3D pipeline 5712 and/or media pipeline 5716. In at least one embodiment, commands are instructions, primitives, or micro-operations fetched from a ring buffer, which stores commands for 3D pipeline 5712 and media pipeline 5716. In at least one embodiment, a ring buffer can additionally include batch command buffers storing batches of multiple commands. In at least one embodiment, commands for 3D pipeline 5712 can also include references to data stored in memory, such as, but not limited to, vertex and geometry data for 3D pipeline 5712 and/or image data and memory objects for media pipeline 5716. In at least one embodiment, 3D pipeline 5712 and media pipeline 5716 process commands and data by performing operations or by dispatching one or more execution threads to a graphics core array 5714. In at least one embodiment, graphics core array 5714 includes one or more blocks of graphics cores (e.g., graphics core(s) 5715A, graphics core(s) 5715B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 3515 in FIG. 35A and FIG. 35B.

In at least one embodiment, 3D pipeline 5712 includes fixed function and programmable logic to process one or more shader programs, such as vertex shaders, geometry shaders, pixel shaders, fragment shaders, compute shaders, or other shader programs, by processing instructions and dispatching execution threads to graphics core array 5714. In at least one embodiment, graphics core array 5714 provides a unified block of execution resources for use in processing shader programs. In at least one embodiment, a multi-purpose execution logic (e.g., execution units) within graphics core(s) 5715A-5715B of graphic core array 5714 includes support for various 3D API shader languages and can execute multiple simultaneous execution threads associated with multiple shaders.

In at least one embodiment, graphics core array 5714 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 5714 can output data to memory in a unified return buffer (URB) 5718. In at least one embodiment, URB 5718 can store data for multiple threads. In at least one embodiment, URB 5718 may be used to send data between different threads executing on graphics core array 5714. In at least one embodiment, URB 5718 may additionally be used for synchronization between threads on graphics core array 5714 and fixed function logic within shared function logic 5720.

In at least one embodiment, graphics core array 5714 is scalable, such that graphics core array 5714 includes a variable number of graphics cores, each having a variable number of execution units based on a target power and performance level of GPE 5710. In at least one embodiment, execution resources are dynamically scalable, such that execution resources may be enabled or disabled as needed.

In at least one embodiment, graphics core array 5714 is coupled to shared function logic 5720 that includes multiple resources that are shared between graphics cores in graphics core array 5714. In at least one embodiment, shared functions performed by shared function logic 5720 are embodied in hardware logic units that provide specialized supplemental functionality to graphics core array 5714. In at least one embodiment, shared function logic 5720 includes but is not limited to a sampler unit 5721, a math unit 5722, and inter-thread communication (ITC) logic 5723. In at least one embodiment, one or more cache(s) 5725 are included in, or coupled to, shared function logic 5720.

In at least one embodiment, a shared function is used if demand for a specialized function is insufficient for inclusion within graphics core array 5714. In at least one embodiment, a single instantiation of a specialized function is used in shared function logic 5720 and shared among other execution resources within graphics core array 5714. In at least one embodiment, specific shared functions within shared function logic 5720 that are used extensively by graphics core array 5714 may be included within shared function logic 5726 within graphics core array 5714. In at least one embodiment, shared function logic 5726 within graphics core array 5714 can include some or all logic within shared function logic 5720. In at least one embodiment, all logic elements within shared function logic 5720 may be duplicated within shared function logic 5726 of graphics core array 5714. In at least one embodiment, shared function logic 5720 is excluded in favor of shared function logic 5726 within graphics core array 5714.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment portions or all of inference and/or training logic 3515 may be incorporated into graphics processor 5710. For example, in at least one embodiment, training and/or inferencing techniques described herein may use one or more of ALUs embodied in 3D pipeline 5712, graphics core(s) 5715, shared function logic 5726, shared function logic 5720, or other logic in FIG. 57. Moreover, in at least one embodiment, inferencing and/or training operations described herein may be done using logic other than logic illustrated in FIG. 35A or 35B. In at least one embodiment, weight parameters may be stored in on-chip or off-chip memory and/or registers (shown or not shown) that configure ALUs of graphics processor 5710 to perform one or more machine learning algorithms, neural network architectures, use cases, or training techniques described herein.

Figure 58:
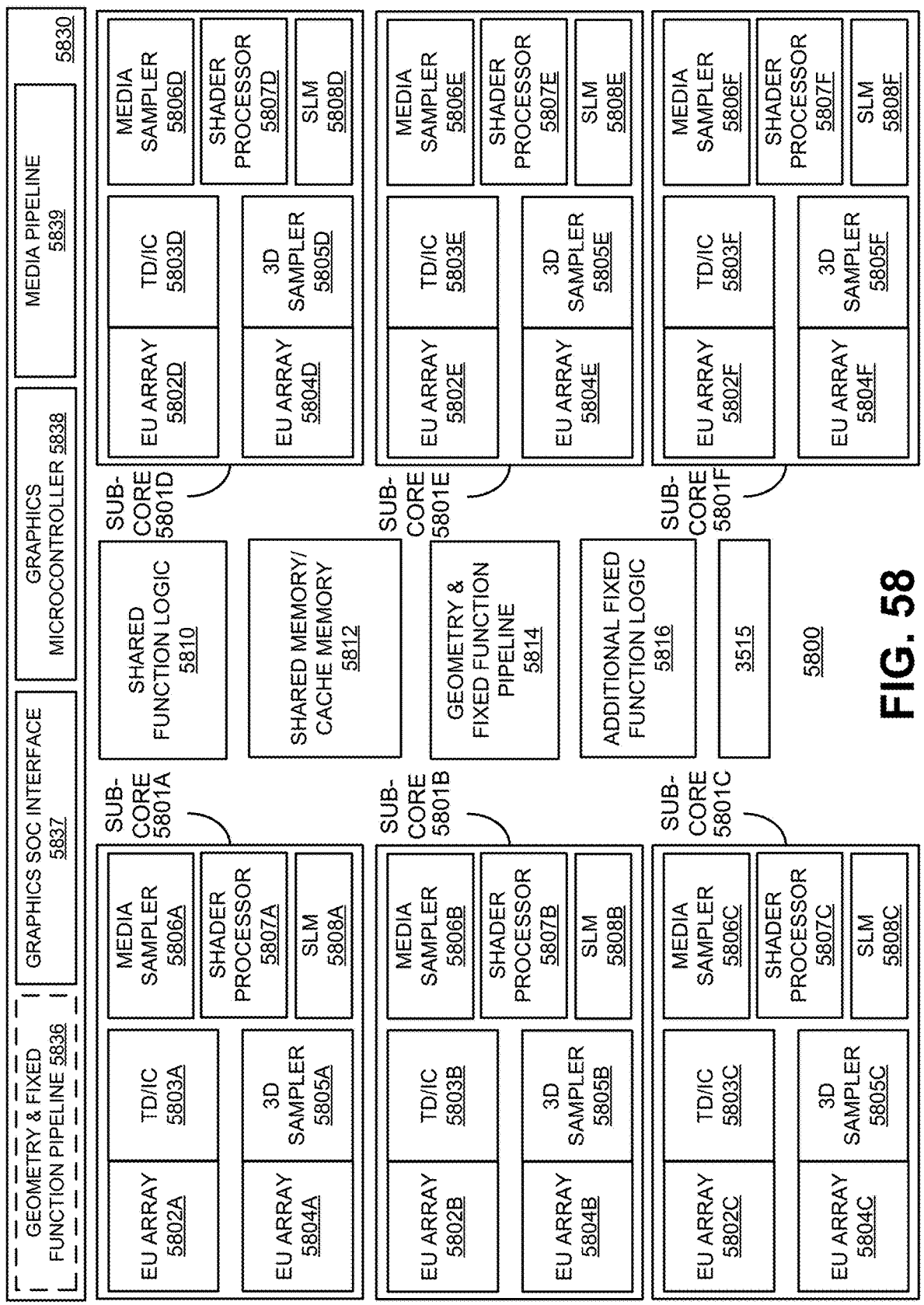
FIG. 58 is a block diagram of at least portions of a graphics processor core, according to at least one embodiment.

FIG. 58 is a block diagram of hardware logic of a graphics processor core 5800, according to at least one embodiment described herein. In at least one embodiment, graphics processor core 5800 is included within a graphics core array. In at least one embodiment, graphics processor core 5800, sometimes referred to as a core slice, can be one or multiple graphics cores within a modular graphics processor. In at least one embodiment, graphics processor core 5800 is exemplary of one graphics core slice, and a graphics processor as described herein may include multiple graphics core slices based on target power and performance envelopes. In at least one embodiment, each graphics core 5800 can include a fixed function block 5830 coupled with multiple sub-cores 5801A-5801F, also referred to as sub-slices, that include modular blocks of general-purpose and fixed function logic. In at least one embodiment, graphics processor core 5800 performs process 900 (see FIG. 9A) or process 906 (see FIG. 9B).

In at least one embodiment, fixed function block 5830 includes a geometry and fixed function pipeline 5836 that can be shared by all sub-cores in graphics processor 5800, for example, in lower performance and/or lower power graphics processor implementations. In at least one embodiment, geometry and fixed function pipeline 5836 includes a 3D fixed function pipeline, a video front-end unit, a thread spawner and thread dispatcher, and a unified return buffer manager, which manages unified return buffers.

In at least one embodiment, fixed function block 5830 also includes a graphics SoC interface 5837, a graphics microcontroller 5838, and a media pipeline 5839. In at least one embodiment, graphics SoC interface 5837 provides an interface between graphics core 5800 and other processor cores within a system on a chip integrated circuit. In at least one embodiment, graphics microcontroller 5838 is a programmable sub-processor that is configurable to manage various functions of graphics processor 5800, including thread dispatch, scheduling, and preemption. In at least one embodiment, media pipeline 5839 includes logic to facilitate decoding, encoding, pre-processing, and/or post-processing of multimedia data, including image and video data. In at least one embodiment, media pipeline 5839 implements media operations via requests to compute or sampling logic within sub-cores 5801A-5801F.

In at least one embodiment, SoC interface 5837 enables graphics core 5800 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 5837 can also enable communication with fixed function devices within an SoC, such as camera imaging pipelines, and enables use of and/or implements global memory atomics that may be shared between graphics core 5800 and CPUs within an SoC. In at least one embodiment, graphics SoC interface 5837 can also implement power management controls for graphics processor core 5800 and enable an interface between a clock domain of graphics processor core 5800 and other clock domains within an SoC. In at least one embodiment, SoC interface 5837 enables receipt of command buffers from a command streamer and global thread dispatcher that are configured to provide commands and instructions to each of one or more graphics cores within a graphics processor. In at least one embodiment, commands and instructions can be dispatched to media pipeline 5839, when media operations are to be performed, or a geometry and fixed function pipeline (e.g., geometry and fixed function pipeline 5836, and/or a geometry and fixed function pipeline 5814) when graphics processing operations are to be performed.

In at least one embodiment, graphics microcontroller 5838 can be configured to perform various scheduling and management tasks for graphics core 5800. In at least one embodiment, graphics microcontroller 5838 can perform graphics and/or compute workload scheduling on various graphics parallel engines within execution unit (EU) arrays 5802A-5802F, 5804A-5804F within sub-cores 5801A-5801F. In at least one embodiment, host software executing on a CPU core of an SoC including graphics core 5800 can submit workloads to one of multiple graphic processor paths, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 5838 can also facilitate low-power or idle states for graphics core 5800, providing graphics core 5800 with an ability to save and restore registers within graphics core 5800 across low-power state transitions independently from an operating system and/or graphics driver software on a system.

In at least one embodiment, graphics core 5800 may have greater than or fewer than illustrated sub-cores 5801A-5801F, up to N modular sub-cores. For each set of N sub-cores, in at least one embodiment, graphics core 5800 can also include shared function logic 5810, shared and/or cache memory 5812, geometry/fixed function pipeline 5814, as well as additional fixed function logic 5816 to accelerate various graphics and compute processing operations. In at least one embodiment, shared function logic 5810 can include logic units (e.g., sampler, math, and/or inter-thread communication logic) that can be shared by each N sub-cores within graphics core 5800. In at least one embodiment, shared and/or cache memory 5812 can be a last-level cache for N sub-cores 5801A-5801F within graphics core 5800 and can also serve as shared memory that is accessible by multiple sub-cores. In at least one embodiment, geometry/fixed function pipeline 5814 can be included instead of geometry/fixed function pipeline 5836 within fixed function block 5830 and can include similar logic units.

In at least one embodiment, graphics core 5800 includes additional fixed function logic 5816 that can include various fixed function acceleration logic for use by graphics core 5800. In at least one embodiment, additional fixed function logic 5816 includes an additional geometry pipeline for use in position-only shading. In position-only shading, at least two geometry pipelines exist, whereas in a full geometry pipeline within geometry and fixed function pipelines 5814, 5836, and a cull pipeline, which is an additional geometry pipeline that may be included within additional fixed function logic 5816. In at least one embodiment, a cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 5816 can execute position shaders in parallel with a main application and generally generates critical results faster than a full pipeline, as a cull pipeline fetches and shades position attributes of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 5816 can also include machine-learning acceleration logic, such as fixed function matrix multiplication logic, for implementations including optimizations for machine learning training or inferencing.

In at least one embodiment, within each graphics sub-core 5801A-5801F includes a set of execution resources that may be used to perform graphics, media, and compute operations in response to requests by graphics pipeline, media pipeline, or shader programs. In at least one embodiment, graphics sub-cores 5801A-5801F include multiple EU arrays 5802A-5802F, 5804A-5804F, thread dispatch and inter-thread communication (TD/IC) logic 5803A-5803F, a 3D (e.g., texture) sampler 5805A-5805F, a media sampler 5806A-5806F, a shader processor 5807A-5807F, and shared local memory (SLM) 5808A-5808F. In at least one embodiment, EU arrays 5802A-5802F, 5804A-5804F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 5803A-5803F performs local thread dispatch and thread control operations for execution units within a sub-core and facilitates communication between threads executing on execution units of a sub-core. In at least one embodiment, 3D samplers 5805A-5805F can read texture or other 3D graphics related data into memory. In at least one embodiment, 3D samplers can read texture data differently based on a configured sample state and texture format associated with a given texture. In at least one embodiment, media samplers 5806A-5806F can perform similar read operations based on a type and format associated with media data. In at least one embodiment, each graphics sub-core 5801A-5801F can alternately include a unified 3D and media sampler. In at least one embodiment, threads executing on execution units within each of sub-cores 5801A-5801F can make use of shared local memory 5808A-5808F within each sub-core, to enable threads executing within a thread group to execute using a common pool of on-chip memory.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, portions or all of inference and/or training logic 3515 may be incorporated into graphics processor 5800. For example, in at least one embodiment, training and/or inferencing techniques described herein may use one or more of ALUs embodied in a 3D pipeline, graphics microcontroller 5838, geometry and fixed function pipeline 5814 and 5836, or other logic in FIG. 58. Moreover, in at least one embodiment, inferencing and/or training operations described herein may be done using logic other than logic illustrated in FIG. 35A or 35B. In at least one embodiment, weight parameters may be stored in on-chip or off-chip memory and/or registers (shown or not shown) that configure ALUs of graphics processor 5800 to perform one or more machine learning algorithms, neural network architectures, use cases, or training techniques described herein.

Figure 59A:
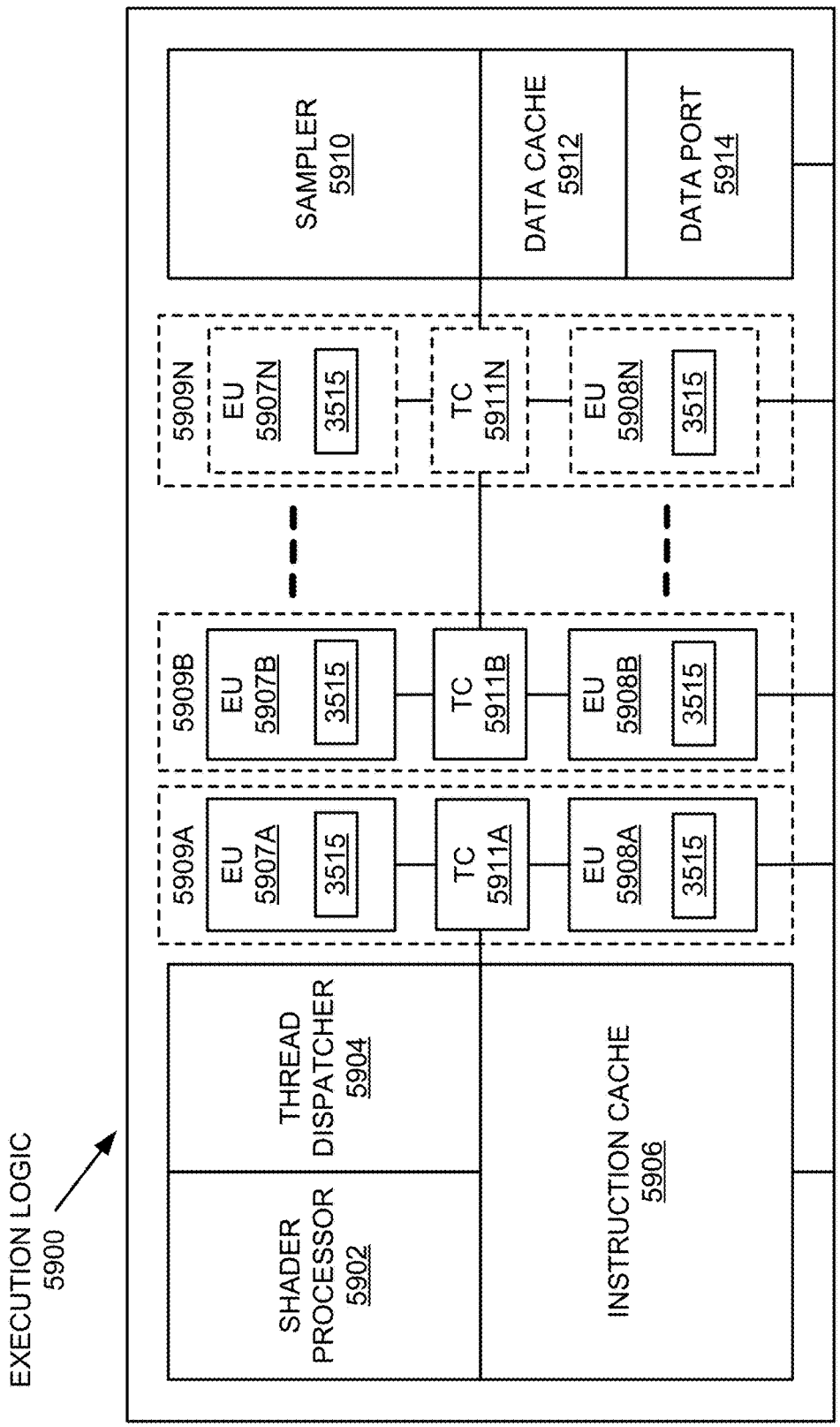
FIGS. 59A and 59B illustrate thread execution logic including an array of processing elements of a graphics processor core according to at least one embodiment.
Figure 59B:
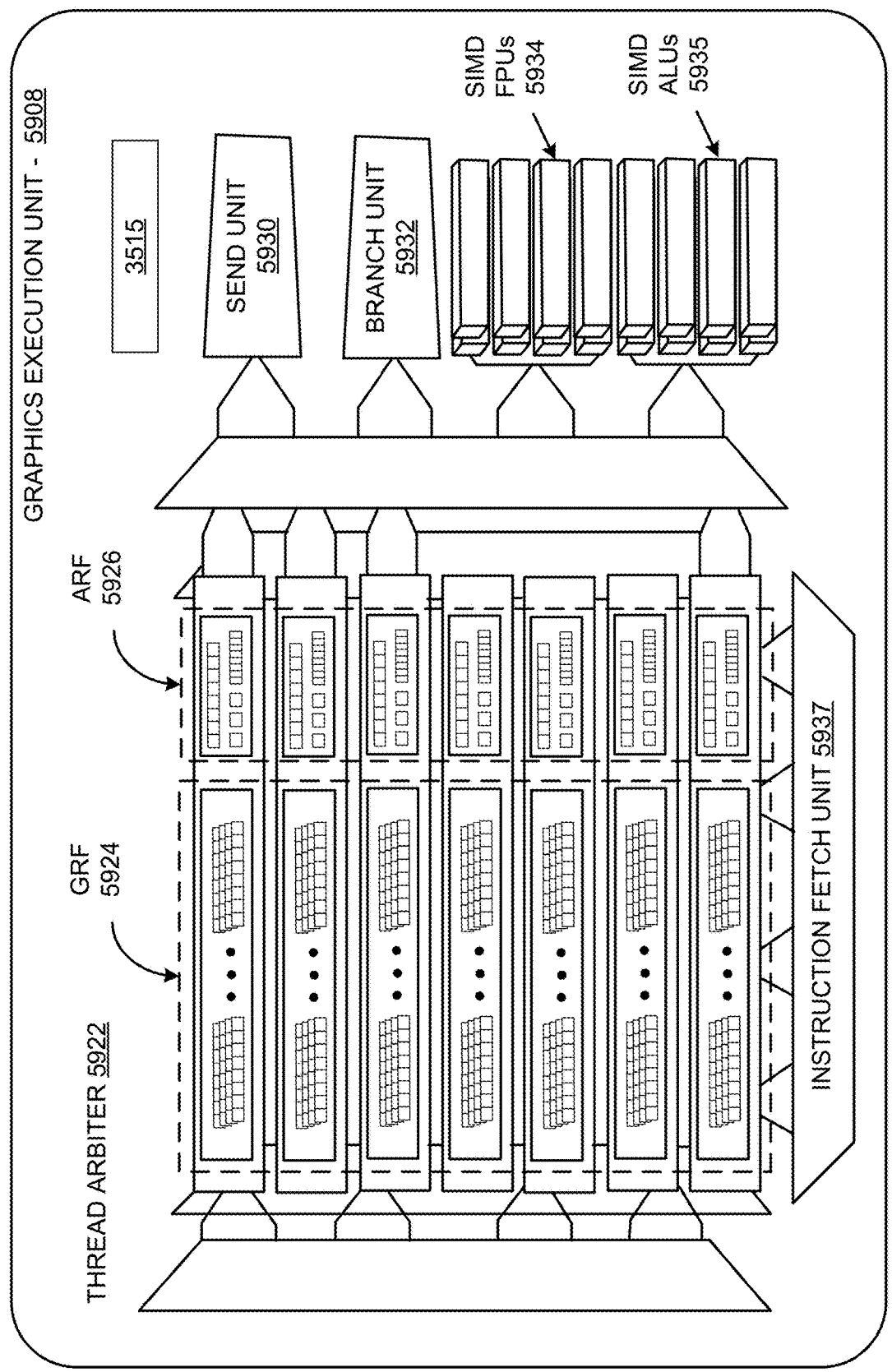

FIGS. 59A-59B illustrate thread execution logic 5900 including an array of processing elements of a graphics processor core according to at least one embodiment. FIG. 59A illustrates at least one embodiment, in which thread execution logic 5900 is used. FIG. 59B illustrates exemplary internal details of a graphics execution unit 5908, according to at least one embodiment.

As illustrated in FIG. 59A, in at least one embodiment, thread execution logic 5900 includes a shader processor 5902, a thread dispatcher 5904, an instruction cache 5906, a scalable execution unit array including a plurality of execution units 5907A-5907N and 5908A-5908N, a sampler 5910, a data cache 5912, and a data port 5914. In at least one embodiment, a scalable execution unit array can dynamically scale by enabling or disabling one or more execution units (e.g., any of execution unit 5908A-N or 5907A-N) based on computational requirements of a workload, for example. In at least one embodiment, scalable execution units are interconnected via an interconnect fabric that links to each execution unit. In at least one embodiment, thread execution logic 5900 includes one or more connections to memory, such as system memory or cache memory, through one or more of instruction cache 5906, data port 5914, sampler 5910, and execution units 5907 or 5908. In at least one embodiment, each execution unit (e.g., 5907A) is a stand-alone programmable general-purpose computational unit that is capable of executing multiple simultaneous hardware threads while processing multiple data elements in parallel for each thread. In at least one embodiment, array of execution units 5907 and/or 5908 is scalable to include any number individual execution units.

In at least one embodiment, execution units 5907 and/or 5908 are primarily used to execute shader programs. In at least one embodiment, shader processor 5902 can process various shader programs and dispatch execution threads associated with shader programs via a thread dispatcher 5904. In at least one embodiment, thread dispatcher 5904 includes logic to arbitrate thread initiation requests from graphics and media pipelines and instantiate requested threads on one or more execution units in execution units 5907 and/or 5908. For example, in at least one embodiment, a geometry pipeline can dispatch vertex, tessellation, or geometry shaders to thread execution logic for processing. In at least one embodiment, thread dispatcher 5904 can also process runtime thread spawning requests from executing shader programs.

In at least one embodiment, execution units 5907 and/or 5908 support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, and/or vertex shaders), pixel processing (e.g., pixel shaders, fragment shaders) and general-purpose processing (e.g., compute and media shaders). In at least one embodiment, each of execution units 5907 and/or 5908, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 5907 and/or 5908 causes a waiting thread to sleep until requested data has been returned. In at least one embodiment, while an awaiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 5907 and/or 5908 operates on arrays of data elements. In at least one embodiment, a number of data elements is an "execution size," or number of channels for an instruction. In at least one embodiment, an execution channel is a logical unit of execution for data element access, masking, and flow control within instructions. In at least one embodiment, a number of channels may be independent of a number of physical arithmetic logic units (ALUs) or floating point units (FPUs) for a particular graphics processor. In at least one embodiment, execution units 5907 and/or 5908 support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 5909A-5909N having thread control logic (5911A-5911N) that is common to fused EUs such as execution unit 5907A fused with execution unit 5908A into fused execution unit 5909A. In at least one embodiment, multiple EUs can be fused into an EU group. In at least one embodiment, each EU in a fused EU group can be configured to execute a separate SIMD hardware thread, with a number of EUs in a fused EU group possibly varying according to various embodiments. In at least one embodiment, various SIMD widths can be performed per-EU, including but not limited to SIMD8, SIMD16, and SIMD32. In at least one embodiment, each fused graphics execution unit 5909A-5909N includes at least two execution units. For example, in at least one embodiment, fused execution unit 5909A includes a first EU 5907A, second EU 5908A, and thread control logic 5911A that is common to first EU 5907A and second EU 5908A. In at least one embodiment, thread control logic 5911A controls threads executed on fused graphics execution unit 5909A, allowing each EU within fused execution units 5909A-5909N to execute using a common instruction pointer register.

In at least one embodiment, one or more internal instruction caches (e.g., 5906) are included in thread execution logic 5900 to cache thread instructions for execution units. In at least one embodiment, one or more data caches (e.g., 5912) are included to cache thread data during thread execution. In at least one embodiment, sampler 5910 is included to provide texture sampling for 3D operations and media sampling for media operations. In at least one embodiment, sampler 5910 includes specialized texture or media sampling functionality to process texture or media data during sampling process before providing sampled data to an execution unit.

During execution, in at least one embodiment, graphics and media pipelines send thread initiation requests to thread execution logic 5900 via thread spawning and dispatch logic. In at least one embodiment, once a group of geometric objects has been processed and rasterized into pixel data, pixel processor logic (e.g., pixel shader logic, fragment shader logic, etc.) within shader processor 5902 is invoked to further compute output information and cause results to be written to output surfaces (e.g., color buffers, depth buffers, stencil buffers, etc.). In at least one embodiment, a pixel shader or a fragment shader calculates values of various vertex attributes that are to be interpolated across a rasterized object. In at least one embodiment, pixel processor logic within shader processor 5902 then executes an application programming interface (API)-supplied pixel or fragment shader program. In at least one embodiment, to execute a shader program, shader processor 5902 dispatches threads to an execution unit (e.g., 5908A) via thread dispatcher 5904. In at least one embodiment, shader processor 5902 uses texture sampling logic in sampler 5910 to access texture data in texture maps stored in memory. In at least one embodiment, arithmetic operations on texture data and input geometry data compute pixel color data for each geometric fragment, or discards one or more pixels from further processing.

In at least one embodiment, data port 5914 provides a memory access mechanism for thread execution logic 5900 to output processed data to memory for further processing on a graphics processor output pipeline. In at least one embodiment, data port 5914 includes or couples to one or more cache memories (e.g., data cache 5912) to cache data for memory access via a data port.

As illustrated in FIG. 59B, in at least one embodiment, a graphics execution unit 5908 can include an instruction fetch unit 5937, a general register file array (GRF) 5924, an architectural register file array (ARF) 5926, a thread arbiter 5922, a send unit 5930, a branch unit 5932, a set of SIMD floating point units (FPUs) 5934, and a set of dedicated integer SIMD ALUs 5935. In at least one embodiment, GRF 5924 and ARF 5926 includes a set of general register files and architecture register files associated with each simultaneous hardware thread that may be active in graphics execution unit 5908. In at least one embodiment, per thread architectural state is maintained in ARF 5926, while data used during thread execution is stored in GRF 5924. In at least one embodiment, execution state of each thread, including instruction pointers for each thread, can be held in thread-specific registers in ARF 5926.

In at least one embodiment, graphics execution unit 5908 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 5908 can co-issue multiple instructions, which may each be different instructions. In at least one embodiment, thread arbiter 5922 of graphics execution unit thread 5908 can dispatch instructions to one of send unit 5930, branch unit 5932, or SIMD FPU(s) 5934 for execution. In at least one embodiment, each execution thread can access 128 general-purpose registers within GRF 5924, where each register can store 32 bytes, accessible as a SIMD 8-element vector of 32-bit data elements. In at least one embodiment, each execution unit thread has access to 4 kilobytes within GRF 5924, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 kilobytes, GRF 5924 can store a total of 28 kilobytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing to send unit 5930. In at least one embodiment, branch instructions are dispatched to branch unit 5932 to facilitate SIMD divergence and eventual convergence.

In at least one embodiment, graphics execution unit 5908 includes one or more SIMD floating point units (FPU(s)) 5934 to perform floating-point operations. In at least one embodiment, FPU(s) 5934 also support integer computation. In at least one embodiment, FPU(s) 5934 can SIMD execute up to M number of 32-bit floating-point (or integer) operations, or SIMD execute up to 2M 16-bit integer or 16-bit floating-point operations. In at least one embodiment, at least one FPU provides extended math capability to support high-throughput transcendental math functions and double precision 64-bit floating-point. In at least one embodiment, a set of 8-bit integer SIMD ALUs 5935 are also present, and may be specifically optimized to perform operations associated with machine learning computations.

In at least one embodiment, arrays of multiple instances of graphics execution unit 5908 can be instantiated in a graphics sub-core grouping (e.g., a sub-slice). In at least one embodiment, execution unit 5908 can execute instructions across a plurality of execution channels. In at least one embodiment, each thread executed on graphics execution unit 5908 is executed on a different channel.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, portions or all of inference and/or training logic 3515 may be incorporated into thread execution logic 5900. Moreover, in at least one embodiment, inferencing and/or training operations described herein may be done using logic other than logic illustrated in FIG. 35A or In at least one embodiment, weight parameters may be stored in on-chip or off-chip memory and/or registers (shown or not shown) that configure ALUs thread of execution logic 5900 to perform one or more machine learning algorithms, neural network architectures, use cases, or training techniques described herein.

Figure 60:
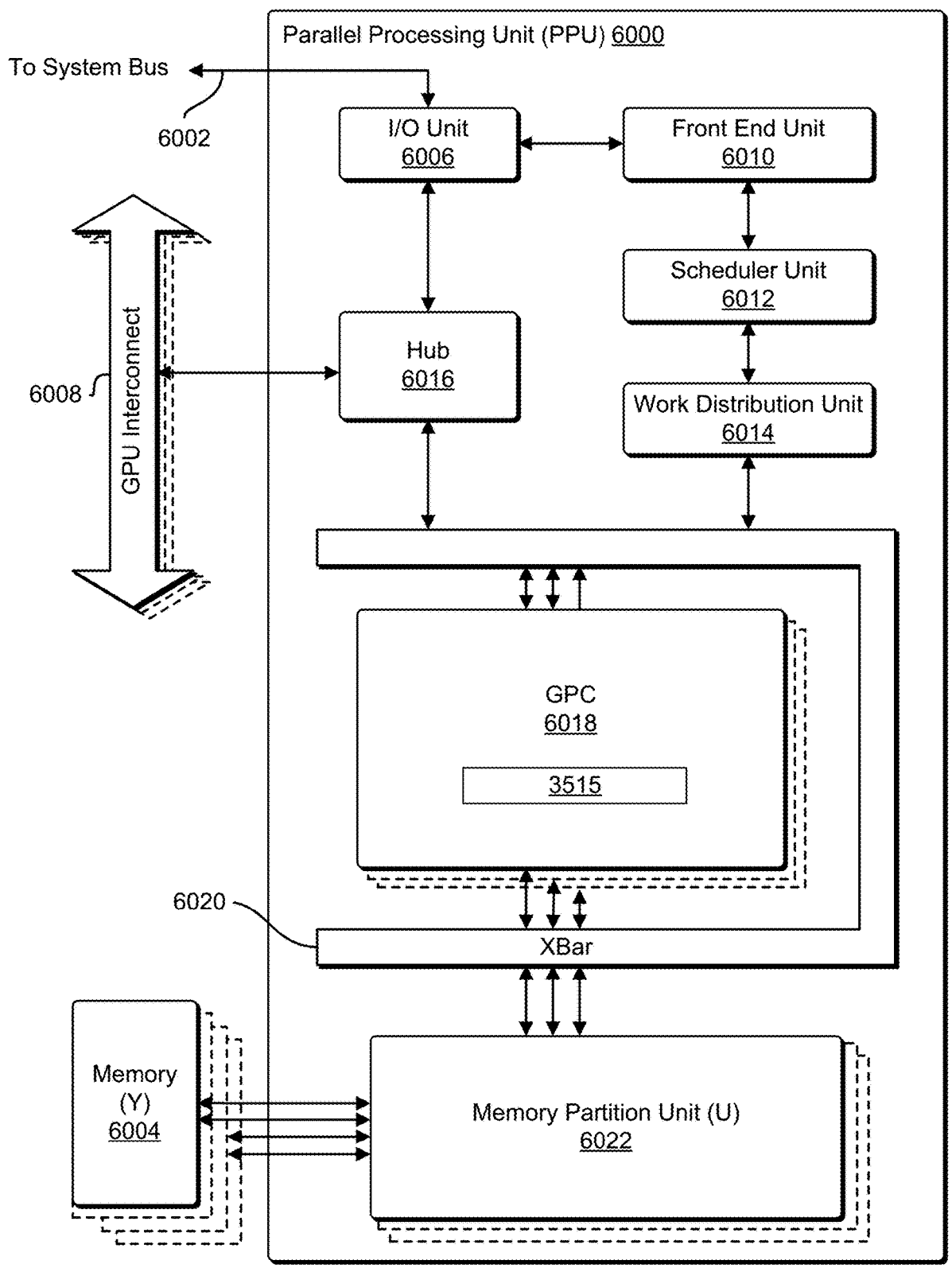
FIG. 60 illustrates a parallel processing unit ("PPU"), according to at least one embodiment.

FIG. 60 illustrates a parallel processing unit ("PPU") 6000, according to at least one embodiment. In at least one embodiment, PPU 6000 is configured with machine-readable code that, if executed by PPU 6000, causes PPU 6000 to perform some or all of processes and techniques described throughout this disclosure. In at least one embodiment, PPU 6000 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 6000. In at least one embodiment, PPU 6000 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 6000 is utilized to perform computations such as linear algebra operations and machine-learning operations. FIG. 60 illustrates an example parallel processor for illustrative purposes only and should be construed as a non-limiting example of processor architectures contemplated within scope of this disclosure and that any suitable processor may be employed to supplement and/or substitute for same. In at least one embodiment, PPU 6000 performs process 900 (see FIG. 9A) or process 906 (see FIG. 9B).

In at least one embodiment, one or more PPUs 6000 are configured to accelerate High Performance Computing ("HPC"), data center, and machine learning applications. In at least one embodiment, PPU 6000 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 6000 includes, without limitation, an Input/Output ("I/O") unit 6006, a front-end unit 6010, a scheduler unit 6012, a work distribution unit 6014, a hub 6016, a crossbar ("XBar") 6020, one or more general processing clusters ("GPCs") 6018, and one or more partition units ("memory partition units") 6022. In at least one embodiment, PPU 6000 is connected to a host processor or other PPUs 6000 via one or more high-speed GPU interconnects ("GPU interconnects") 6008. In at least one embodiment, PPU 6000 is connected to a host processor or other peripheral devices via a system bus 6002. In at least one embodiment, PPU 6000 is connected to a local memory comprising one or more memory devices ("memory") 6004. In at least one embodiment, memory devices 6004 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 6008 may refer to a wire-based multi-lane communications link that is used by systems to scale and include one or more PPUs 6000 combined with one or more central processing units ("CPUs"), supports cache coherence between PPUs 6000 and CPUs, and CPU mastering. In at least one embodiment, data and/or commands are transmitted by high-speed GPU interconnect 6008 through hub 6016 to/from other units of PPU 6000 such as one or more copy engines, video encoders, video decoders, power management units, and other components which may not be explicitly illustrated in FIG. 60.

In at least one embodiment, I/O unit 6006 is configured to transmit and receive communications (e.g., commands, data) from a host processor (not illustrated in FIG. 60) over system bus 6002. In at least one embodiment, I/O unit 6006 communicates with host processor directly via system bus 6002 or through one or more intermediate devices such as a memory bridge. In at least one embodiment, I/O unit 6006 may communicate with one or more other processors, such as one or more of PPUs 6000 via system bus 6002. In at least one embodiment, I/O unit 6006 implements a Peripheral Component Interconnect Express ("PCIe") interface for communications over a PCIe bus. In at least one embodiment, I/O unit 6006 implements interfaces for communicating with external devices.

In at least one embodiment, I/O unit 6006 decodes packets received via system bus 6002. In at least one embodiment, at least some packets represent commands configured to cause PPU 6000 to perform various operations. In at least one embodiment, I/O unit 6006 transmits decoded commands to various other units of PPU 6000 as specified by commands. In at least one embodiment, commands are transmitted to front-end unit 6010 and/or transmitted to hub 6016 or other units of PPU 6000 such as one or more copy engines, a video encoder, a video decoder, a power management unit, etc. (not explicitly illustrated in FIG. 60). In at least one embodiment, I/O unit 6006 is configured to route communications between and among various logical units of PPU 6000.

In at least one embodiment, a program executed by host processor encodes a command stream in a buffer that provides workloads to PPU 6000 for processing. In at least one embodiment, a workload comprises instructions and data to be processed by those instructions. In at least one embodiment, a buffer is a region in a memory that is accessible (e.g., read/write) by both a host processor and PPU 6000—a host interface unit may be configured to access that buffer in a system memory connected to system bus 6002 via memory requests transmitted over system bus 6002 by I/O unit 6006. In at least one embodiment, a host processor writes a command stream to a buffer and then transmits a pointer to a start of a command stream to PPU 6000 such that front-end unit 6010 receives pointers to one or more command streams and manages one or more command streams, reading commands from command streams and forwarding commands to various units of PPU 6000.

In at least one embodiment, front-end unit 6010 is coupled to scheduler unit 6012 that configures various GPCs 6018 to process tasks defined by one or more command streams. In at least one embodiment, scheduler unit 6012 is configured to track state information related to various tasks managed by scheduler unit 6012 where state information may indicate which of GPCs 6018 a task is assigned to, whether task is active or inactive, a priority level associated with task, and so forth. In at least one embodiment, scheduler unit 6012 manages execution of a plurality of tasks on one or more of GPCs 6018.

In at least one embodiment, scheduler unit 6012 is coupled to work distribution unit 6014 that is configured to dispatch tasks for execution on GPCs 6018. In at least one embodiment, work distribution unit 6014 tracks a number of scheduled tasks received from scheduler unit 6012 and work distribution unit 6014 manages a pending task pool and an active task pool for each of GPCs 6018. In at least one embodiment, pending task pool comprises a number of slots (e.g., 32 slots) that contain tasks assigned to be processed by a particular GPC 6018; an active task pool may comprise a number of slots (e.g., 4 slots) for tasks that are actively being processed by GPCs 6018 such that as one of GPCs 6018 completes execution of a task, that task is evicted from that active task pool for GPC 6018 and another task from a pending task pool is selected and scheduled for execution on GPC 6018. In at least one embodiment, if an active task is idle on GPC 6018, such as while waiting for a data dependency to be resolved, then that active task is evicted from GPC 6018 and returned to that pending task pool while another task in that pending task pool is selected and scheduled for execution on GPC 6018.

In at least one embodiment, work distribution unit 6014 communicates with one or more GPCs 6018 via XBar 6020. In at least one embodiment, XBar 6020 is an interconnect network that couples many of units of PPU 6000 to other units of PPU 6000 and can be configured to couple work distribution unit 6014 to a particular GPC 6018. In at least one embodiment, one or more other units of PPU 6000 may also be connected to XBar 6020 via hub 6016.

In at least one embodiment, tasks are managed by scheduler unit 6012 and dispatched to one of GPCs 6018 by work distribution unit 6014. In at least one embodiment, GPC 6018 is configured to process task and generate results. In at least one embodiment, results may be consumed by other tasks within GPC 6018, routed to a different GPC 6018 via XBar 6020, or stored in memory 6004. In at least one embodiment, results can be written to memory 6004 via partition units 6022, which implement a memory interface for reading and writing data to/from memory 6004. In at least one embodiment, results can be transmitted to another PPU 6000 or CPU via high-speed GPU interconnect 6008. In at least one embodiment, PPU 6000 includes, without limitation, a number U of partition units 6022 that is equal to a number of separate and distinct memory devices 6004 coupled to PPU 6000, as described in more detail herein in conjunction with FIG. 62.

In at least one embodiment, a host processor executes a driver kernel that implements an application programming interface ("API") that enables one or more applications executing on a host processor to schedule operations for execution on PPU 6000. In at least one embodiment, multiple compute applications are simultaneously executed by PPU 6000 and PPU 6000 provides isolation, quality of service ("QoS"), and independent address spaces for multiple compute applications. In at least one embodiment, an application generates instructions (e.g., in form of API calls) that cause a driver kernel to generate one or more tasks for execution by PPU 6000 and that driver kernel outputs tasks to one or more streams being processed by PPU 6000. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail in conjunction with FIG. 62.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, deep learning application processor is used to train a machine learning model, such as a neural network, to predict or infer information provided to PPU 6000. In at least one embodiment, PPU 6000 is used to infer or predict information based on a trained machine learning model (e.g., neural network) that has been trained by another processor or system or by PPU 6000. In at least one embodiment, PPU 6000 may be used to perform one or more neural network use cases described herein.

Figure 61:
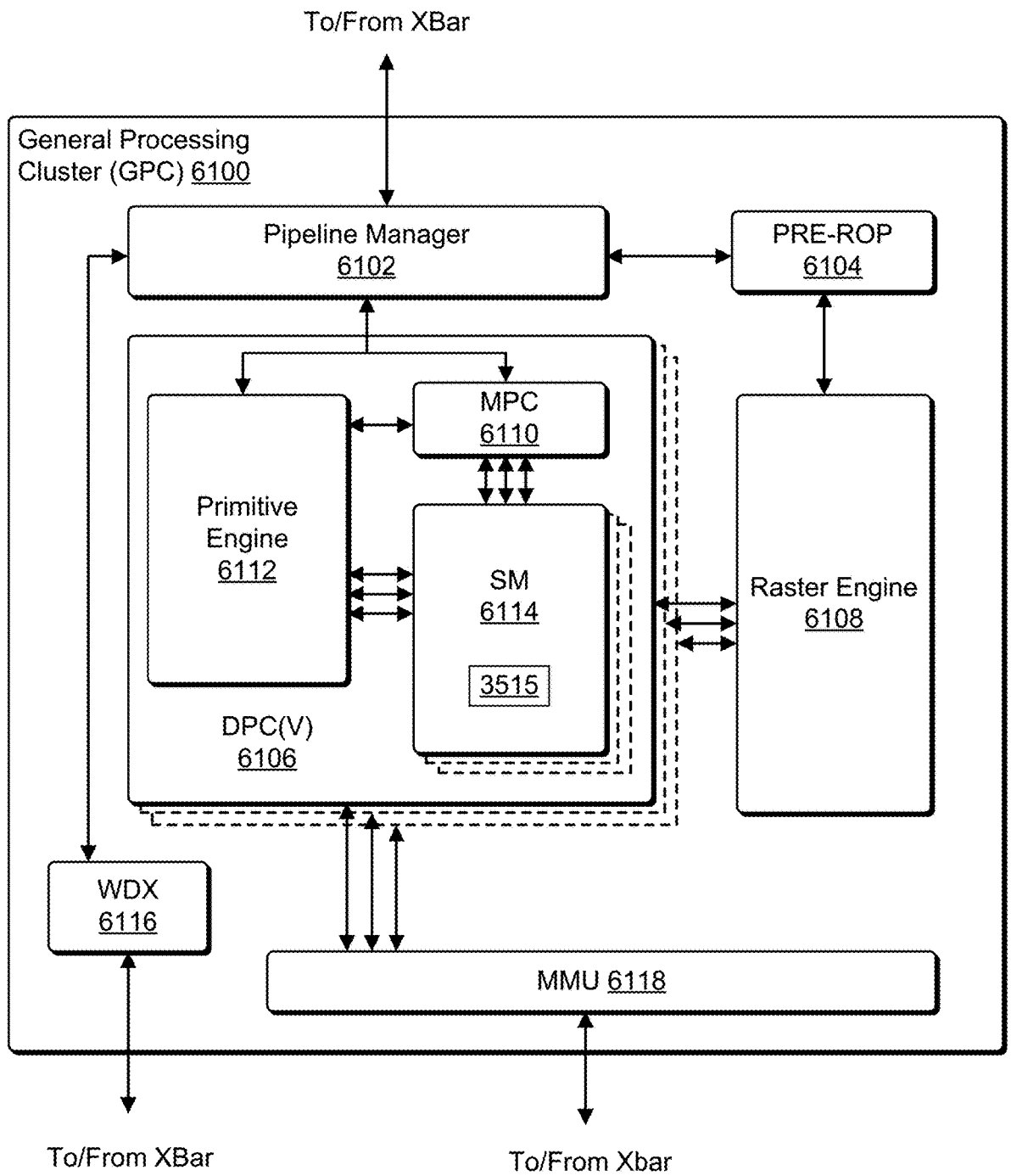
FIG. 61 illustrates a general processing cluster ("GPC"), according to at least one embodiment.

FIG. 61 illustrates a general processing cluster ("GPC") 6100, according to at least one embodiment. In at least one embodiment, GPC 6100 is GPC 6018 of FIG. 60. In at least one embodiment, each GPC 6100 includes, without limitation, a number of hardware units for processing tasks and each GPC 6100 includes, without limitation, a pipeline manager 6102, a pre-raster operations unit ("preROP") 6104, a raster engine 6108, a work distribution crossbar ("WDX") 6116, a memory management unit ("MMU") 6118, one or more Data Processing Clusters ("DPCs") 6106, and any suitable combination of parts.

In at least one embodiment, operation of GPC 6100 is controlled by pipeline manager 6102. In at least one embodiment, pipeline manager 6102 manages configuration of one or more DPCs 6106 for processing tasks allocated to GPC 6100. In at least one embodiment, pipeline manager 6102 configures at least one of one or more DPCs 6106 to implement at least a portion of a graphics rendering pipeline. In at least one embodiment, DPC 6106 is configured to execute a vertex shader program on a programmable streaming multi-processor ("SM") 6114. In at least one embodiment, pipeline manager 6102 is configured to route packets received from a work distribution unit to appropriate logical units within GPC 6100, in at least one embodiment, and some packets may be routed to fixed function hardware units in preROP 6104 and/or raster engine 6108 while other packets may be routed to DPCs 6106 for processing by a primitive engine 6112 or SM 6114. In at least one embodiment, pipeline manager 6102 configures at least one of DPCs 6106 to implement a neural network model and/or a computing pipeline.

In at least one embodiment, preROP unit 6104 is configured, in at least one embodiment, to route data generated by raster engine 6108 and DPCs 6106 to a Raster Operations ("ROP") unit in partition unit 6022, described in more detail above in conjunction with FIG. 60. In at least one embodiment, preROP unit 6104 is configured to perform optimizations for color blending, organize pixel data, perform address translations, and more. In at least one embodiment, raster engine 6108 includes, without limitation, a number of fixed function hardware units configured to perform various raster operations, in at least one embodiment, and raster engine 6108 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 6108 comprises fragments to be processed by any suitable entity, such as by a fragment shader implemented within DPC 6106.

In at least one embodiment, each DPC 6106 included in GPC 6100 comprises, without limitation, an M-Pipe Controller ("MPC") 6110; primitive engine 6112; one or more SMs 6114; and any suitable combination thereof. In at least one embodiment, MPC 6110 controls operation of DPC 6106, routing packets received from pipeline manager 6102 to appropriate units in DPC 6106. In at least one embodiment, packets associated with a vertex are routed to primitive engine 6112, which is configured to fetch vertex attributes associated with a vertex from memory; in contrast, packets associated with a shader program may be transmitted to SM 6114.

In at least one embodiment, SM 6114 comprises, without limitation, a programmable streaming processor that is configured to process tasks represented by a number of threads. In at least one embodiment, SM 6114 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute a common set of instructions. In at least one embodiment, SM 6114 implements a Single-Instruction, Multiple Thread ("SIMT") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp, enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 6114 is described in more detail herein.

In at least one embodiment, MMU 6118 provides an interface between GPC 6100 and a memory partition unit (e.g., partition unit 6022 of FIG. 60) and MMU 6118 provides translation of virtual addresses into physical addresses, memory protection, and arbitration of memory requests. In at least one embodiment, MMU 6118 provides one or more translation lookaside buffers ("TLBs") for performing translation of virtual addresses into physical addresses in memory.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, deep learning application processor is used to train a machine learning model, such as a neural network, to predict or infer information provided to GPC 6100. In at least one embodiment, GPC 6100 is used to infer or predict information based on a trained machine learning model (e.g., neural network) that has been trained by another processor or system or by GPC 6100. In at least one embodiment, GPC 6100 may be used to perform one or more neural network use cases described herein.

Figure 62:
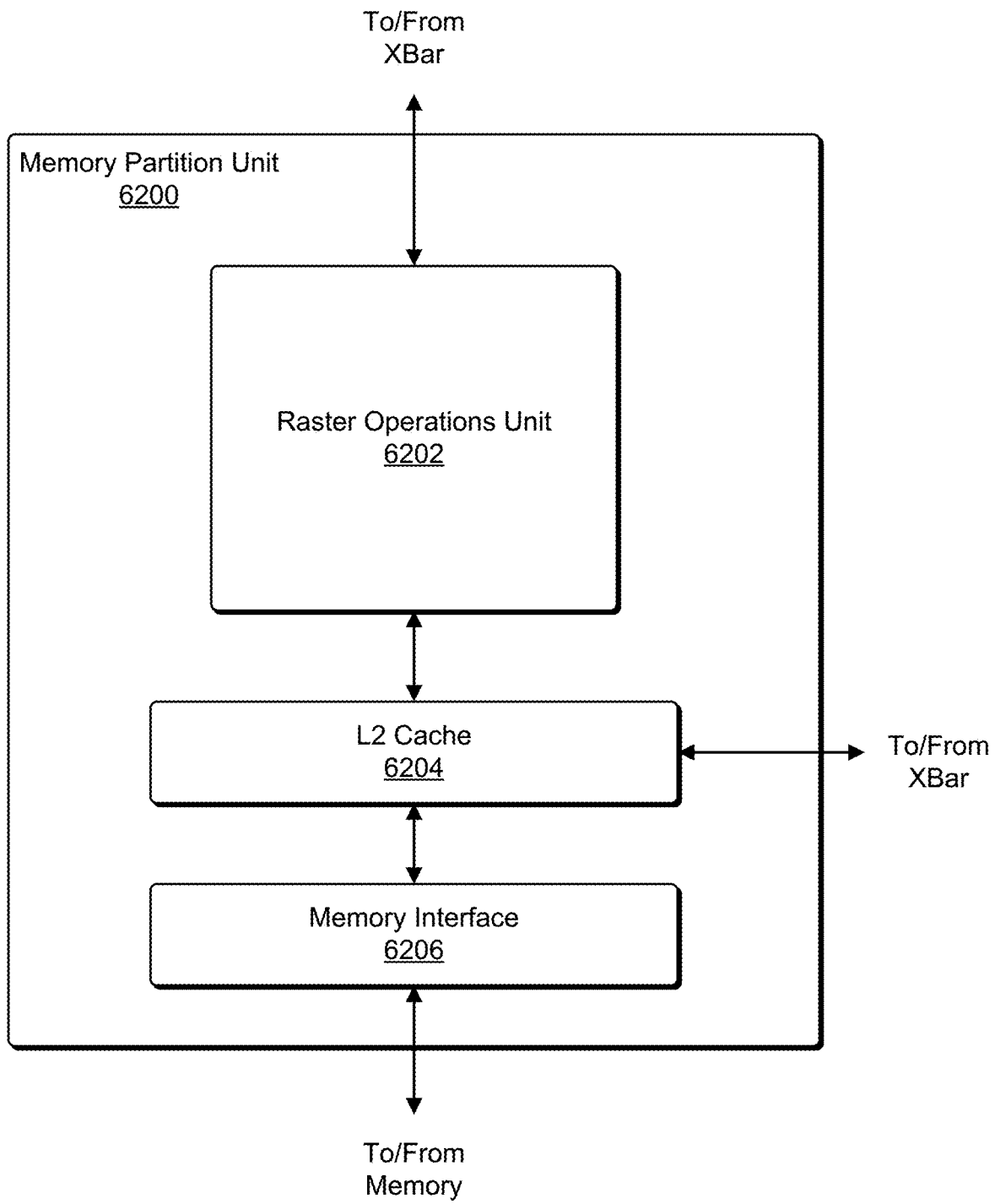
FIG. 62 illustrates a memory partition unit of a parallel processing unit ("PPU"), according to at least one embodiment.

FIG. 62 illustrates a memory partition unit 6200 of a parallel processing unit ("PPU"), in accordance with at least one embodiment. In at least one embodiment, memory partition unit 6200 includes, without limitation, a Raster Operations ("ROP") unit 6202, a level two ("L2") cache 6204, a memory interface 6206, and any suitable combination thereof. In at least one embodiment, memory interface 6206 is coupled to memory. In at least one embodiment, memory interface 6206 may implement 32, 64, 128, 1024-bit data buses, or like, for high-speed data transfer. In at least one embodiment, PPU incorporates U memory interfaces 6206 where U is a positive integer, with one memory interface 6206 per pair of partition units 6200, where each pair of partition units 6200 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 6206 implements a high bandwidth memory second generation ("HBM2") memory interface and Y equals half of U. In at least one embodiment, HBM2 memory stacks are located on a physical package with a PPU, providing substantial power and area savings compared with conventional GDDR5 SDRAM systems. In at least one embodiment, each HBM2 stack includes, without limitation, four memory dies with Y=4, with each HBM2 stack including two 128-bit channels per die for a total of 8 channels and a data bus width of 1024 bits. In at least one embodiment, that memory supports Single-Error Correcting Double-Error Detecting ("SECDED") Error Correction Code ("ECC") to protect data. In at least one embodiment, ECC can provide higher reliability for compute applications that are sensitive to data corruption.

In at least one embodiment, PPU implements a multi-level memory hierarchy. In at least one embodiment, memory partition unit 6200 supports a unified memory to provide a single unified virtual address space for central processing unit ("CPU") and PPU memory, enabling data sharing between virtual memory systems. In at least one embodiment frequency of accesses by a PPU to a memory located on other processors is traced to ensure that memory pages are moved to physical memory of PPU that is accessing pages more frequently. In at least one embodiment, high-speed GPU interconnect 6008 supports address translation services allowing PPU to directly access a CPU's page tables and providing full access to CPU memory by a PPU.

In at least one embodiment, copy engines transfer data between multiple PPUs or between PPUs and CPUs. In at least one embodiment, copy engines can generate page faults for addresses that are not mapped into page tables and memory partition unit 6200 then services page faults, mapping addresses into page table, after which copy engine performs a transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and a copy process is transparent.

Data from memory 6004 of FIG. 60 or other system memory is fetched by memory partition unit 6200 and stored in L2 cache 6204, which is located on-chip and is shared between various GPCs, in accordance with at least one embodiment. Each memory partition unit 6200, in at least one embodiment, includes, without limitation, at least a portion of L2 cache associated with a corresponding memory device. In at least one embodiment, lower level caches are implemented in various units within GPCs. In at least one embodiment, each of SMs 6114 in FIG. 61 may implement a Level 1 ("L1") cache wherein that L1 cache is private memory that is dedicated to a particular SM 6114 and data from L2 cache 6204 is fetched and stored in each L1 cache for processing in functional units of SMs 6114. In at least one embodiment, L2 cache 6204 is coupled to memory interface 6206 and XBar 6020 shown in FIG. 60.

ROP unit 6202 performs graphics raster operations related to pixel color, such as color compression, pixel blending, and more, in at least one embodiment. ROP unit 6202, in at least one embodiment, implements depth testing in conjunction with raster engine 6108, receiving a depth for a sample location associated with a pixel fragment from a culling engine of raster engine 6108. In at least one embodiment, depth is tested against a corresponding depth in a depth buffer for a sample location associated with a fragment. In at least one embodiment, if that fragment passes that depth test for that sample location, then ROP unit 6202 updates depth buffer and transmits a result of that depth test to raster engine 6108. It will be appreciated that a number of partition units 6200 may be different than a number of GPCs and, therefore, each ROP unit 6202 can, in at least one embodiment, be coupled to each GPC. In at least one embodiment, ROP unit 6202 tracks packets received from different GPCs and determines whether a result generated by ROP unit 6202 is to be routed to through XBar 6020.

Figure 63:
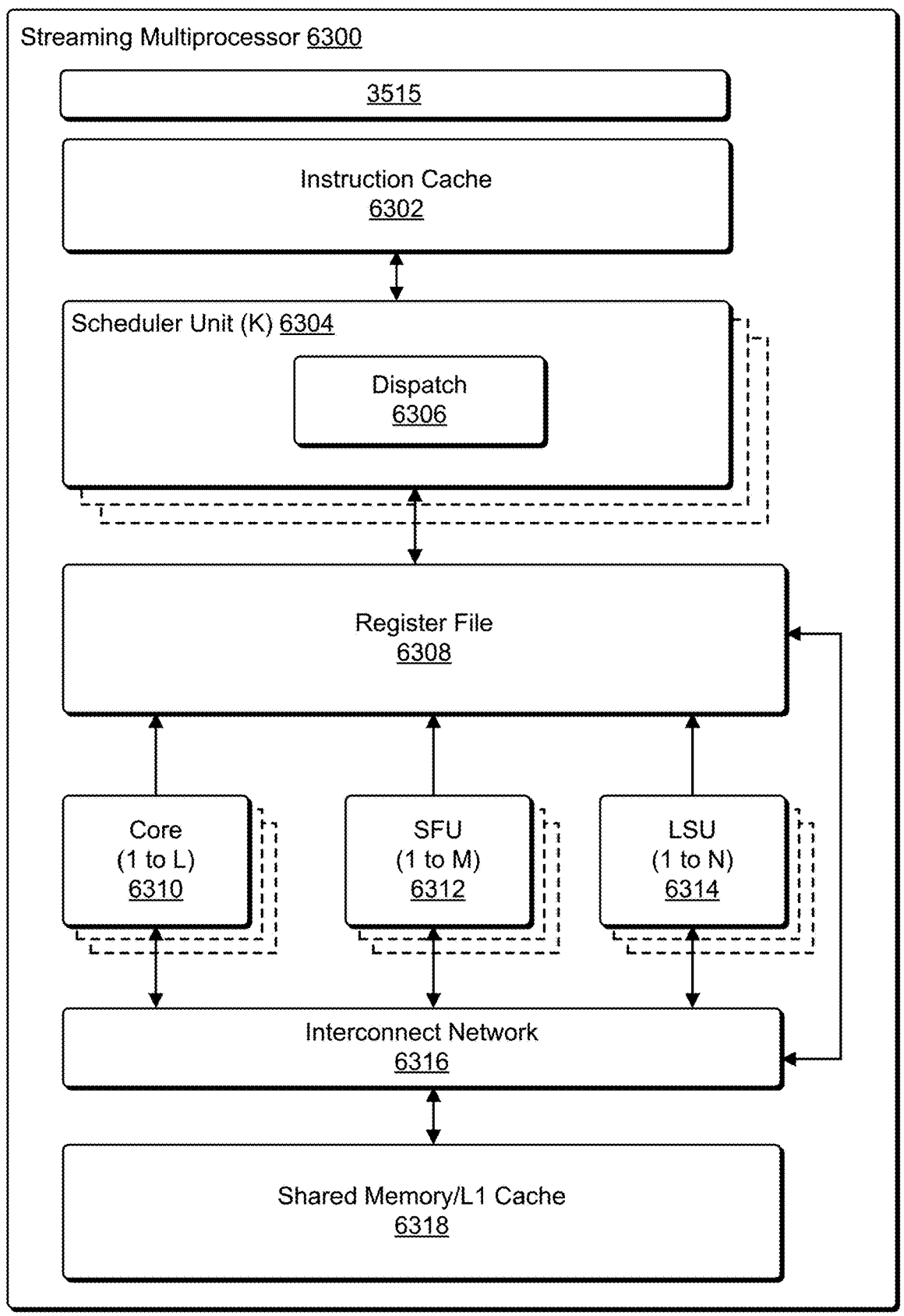
FIG. 63 illustrates a streaming multi-processor, according to at least one embodiment.

FIG. 63 illustrates a streaming multi-processor ("SM") 6300, according to at least one embodiment. In at least one embodiment, SM 6300 is SM of FIG. 61. In at least one embodiment, SM 6300 includes, without limitation, an instruction cache 6302, one or more scheduler units 6304, a register file 6308, one or more processing cores ("cores") 6310, one or more special function units ("SFUs") 6312, one or more load/store units ("LSUs") 6314, an interconnect network 6316, a shared memory/level one ("L1") cache 6318, and/or any suitable combination thereof.

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 6300. In at least one embodiment, scheduler unit 6304 receives tasks from a work distribution unit and manages instruction scheduling for one or more thread blocks assigned to SM 6300. In at least one embodiment, scheduler unit 6304 schedules thread blocks for execution as warps of parallel threads, wherein each thread block is allocated at least one warp. In at least one embodiment, each warp executes threads. In at least one embodiment, scheduler unit 6304 manages a plurality of different thread blocks, allocating warps to different thread blocks and then dispatching instructions from plurality of different cooperative groups to various functional units (e.g., processing cores 6310, SFUs 6312, and LSUs 6314) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 6306 is configured to transmit instructions to one or more functional units and scheduler unit 6304 and includes, without limitation, two dispatch units 6306 that enable two different instructions from a common warp to be dispatched during each clock cycle. In at least one embodiment, each scheduler unit 6304 includes a single dispatch unit 6306 or additional dispatch units 6306.

In at least one embodiment, each SM 6300, in at least one embodiment, includes, without limitation, register file 6308 that provides a set of registers for functional units of SM 6300. In at least one embodiment, register file 6308 is divided between each functional unit such that each functional unit is allocated a dedicated portion of register file 6308. In at least one embodiment, register file 6308 is divided between different warps being executed by SM 6300 and register file 6308 provides temporary storage for operands connected to data paths of functional units. In at least one embodiment, each SM 6300 comprises, without limitation, a plurality of L processing cores 6310, where Lisa positive integer. In at least one embodiment, SM 6300 includes, without limitation, a large number (e.g., 128 or more) of distinct processing cores 6310. In at least one embodiment, each processing core 6310 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 6310 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 6310. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp.

In at least one embodiment, each SM 6300 comprises, without limitation, M SFUs 6312 that perform special functions (e.g., attribute evaluation, reciprocal square root, and like). In at least one embodiment, SFUs 6312 include, without limitation, a tree traversal unit configured to traverse a hierarchical tree data structure. In at least one embodiment, SFUs 6312 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 6300. In at least one embodiment, texture maps are stored in shared memory/L1 cache 6318. In at least one embodiment, texture units implement texture operations such as filtering operations using mip-maps (e.g., texture maps of varying levels of detail), in accordance with at least one embodiment. In at least one embodiment, each SM 6300 includes, without limitation, two texture units.

Each SM 6300 comprises, without limitation, N LSUs 6314 that implement load and store operations between shared memory/L1 cache 6318 and register file 6308, in at least one embodiment. Interconnect network 6316 connects each functional unit to register file 6308 and LSU 6314 to register file 6308 and shared memory/L1 cache 6318 in at least one embodiment. In at least one embodiment, interconnect network 6316 is a crossbar that can be configured to connect any functional units to any registers in register file 6308 and connect LSUs 6314 to register file 6308 and memory locations in shared memory/L1 cache 6318.

In at least one embodiment, shared memory/L1 cache 6318 is an array of on-chip memory that allows for data storage and communication between SM 6300 and primitive engine and between threads in SM 6300, in at least one embodiment. In at least one embodiment, shared memory/L1 cache 6318 comprises, without limitation, 128 KB of storage capacity and is in a path from SM 6300 to a partition unit. In at least one embodiment, shared memory/L1 cache 6318, in at least one embodiment, is used to cache reads and writes. In at least one embodiment, one or more of shared memory/L1 cache 6318, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 6318 enables shared memory/L1 cache 6318 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 6300 to execute program and perform calculations, shared memory/L1 cache 6318 to communicate between threads, and LSU 6314 to read and write global memory through shared memory/L1 cache 6318 and memory partition unit. In at least one embodiment, when configured for general purpose parallel computation, SM 6300 writes commands that scheduler unit 6304 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Inference and/or training logic 3515 are used to perform inferencing and/or training operations associated with one or more embodiments. Details regarding inference and/or training logic 3515 are provided herein in conjunction with FIGS. 35A and/or 35B. In at least one embodiment, deep learning application processor is used to train a machine learning model, such as a neural network, to predict or infer information provided to SM 6300. In at least one embodiment, SM 6300 is used to infer or predict information based on a trained machine learning model (e.g., neural network) that has been trained by another processor or system or by SM 6300. In at least one embodiment, SM 6300 may be used to perform one or more neural network use cases described herein.

Embodiments are disclosed related a virtualized computing platform for advanced computing, such as image inferencing and image processing in medical applications. Without limitation, embodiments may include radiography, magnetic resonance imaging (MM), nuclear medicine, ultrasound, sonography, elastography, photoacoustic imaging, tomography, echocardiography, functional near-infrared spectroscopy, and magnetic particle imaging, or a combination thereof. In at least one embodiment, a virtualized computing platform and associated processes described herein may additionally or alternatively be used, without limitation, in forensic science analysis, sub-surface detection and imaging (e.g., oil exploration, archaeology, paleontology, etc.), topography, oceanography, geology, osteology, meteorology, intelligent area or object tracking and monitoring, sensor data processing (e.g., RADAR, SONAR, LIDAR, etc.), and/or genomics and gene sequencing.

Figure 64:
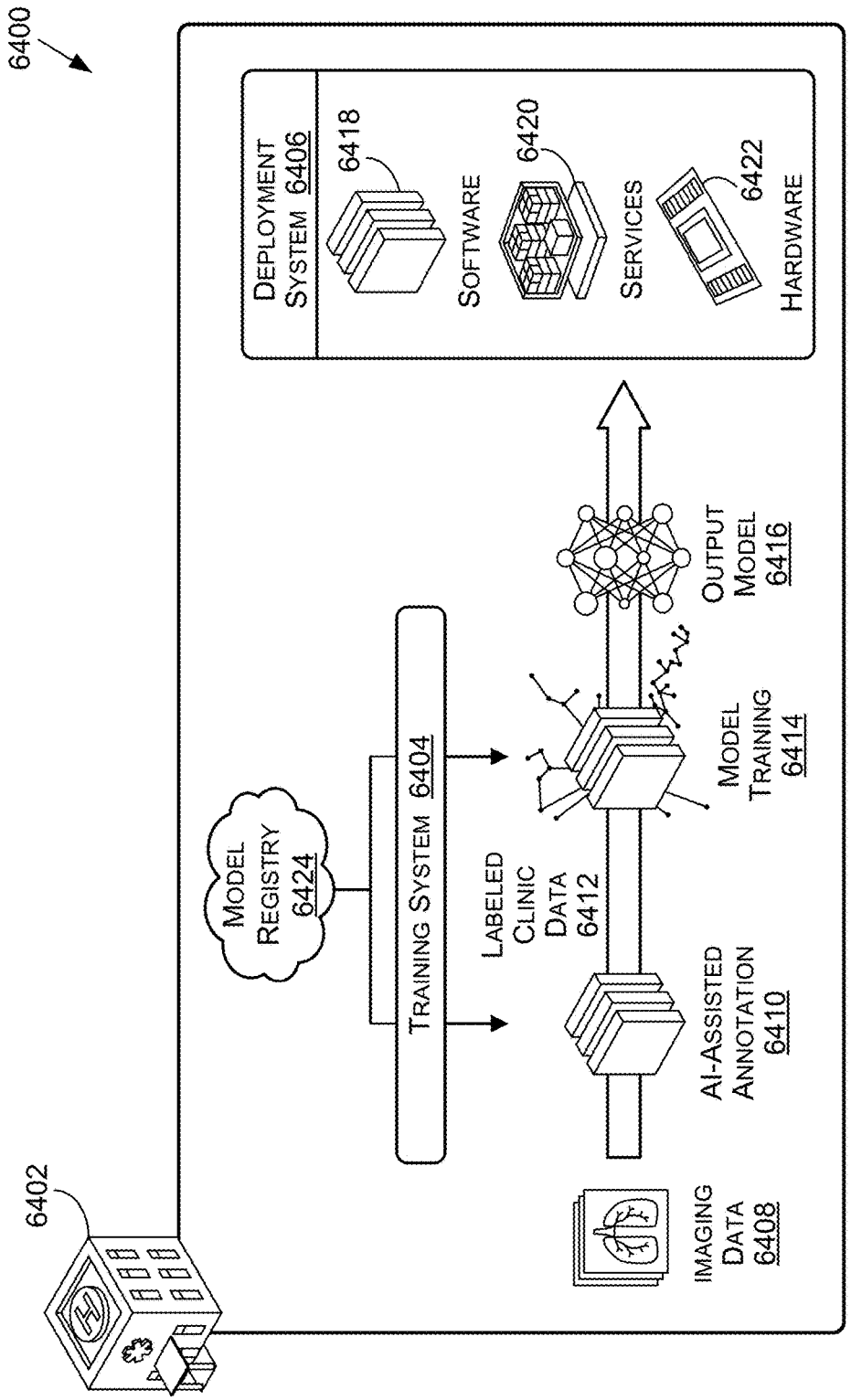
FIG. 64 is an example data flow diagram for an advanced computing pipeline, in accordance with at least one embodiment.

With reference to FIG. 64, FIG. 64 is an example data flow diagram for a process 6400 of generating and deploying an image processing and inferencing pipeline, in accordance with at least one embodiment. In at least one embodiment, process 6400 may be deployed for use with imaging devices, processing devices, genomics devices, gene sequencing devices, radiology devices, and/or other device types at one or more facilities 6402, such as medical facilities, hospitals, healthcare institutes, clinics, research or diagnostic labs, etc. In at least one embodiment, process 6400 may be deployed to perform genomics analysis and inferencing on sequencing data. Examples of genomic analyses that may be performed using systems and processes described herein include, without limitation, variant calling, mutation detection, and gene expression quantification.

In at least one embodiment, process 6400 may be executed within a training system 6404 and/or a deployment system 6406. In at least one embodiment, training system 6404 may be used to perform training, deployment, and implementation of machine learning models (e.g., neural networks, object detection algorithms, computer vision algorithms, etc.) for use in deployment system 6406. In at least one embodiment, deployment system 6406 may be configured to offload processing and compute resources among a distributed computing environment to reduce infrastructure requirements at facility 6402. In at least one embodiment, deployment system 6406 may provide a streamlined platform for selecting, customizing, and implementing virtual instruments for use with imaging devices (e.g., Mill, CT Scan, X-Ray, Ultrasound, etc.) or sequencing devices at facility 6402. In at least one embodiment, virtual instruments may include software-defined applications for performing one or more processing operations with respect to imaging data generated by imaging devices, sequencing devices, radiology devices, and/or other device types. In at least one embodiment, one or more applications in a pipeline may use or call upon services (e.g., inference, visualization, compute, AI, etc.) of deployment system 6406 during execution of applications.

In at least one embodiment, some of applications used in advanced processing and inferencing pipelines may use machine learning models or other AI to perform one or more processing steps. In at least one embodiment, machine learning models may be trained at facility 6402 using data 6408 (such as imaging data) generated at facility 6402 (and stored on one or more picture archiving and communication system (PACS) servers at facility 6402), may be trained using imaging or sequencing data 6408 from another facility or facilities (e.g., a different hospital, lab, clinic, etc.), or a combination thereof. In at least one embodiment, training system 6404 may be used to provide applications, services, and/or other resources for generating working, deployable machine learning models for deployment system 6406.

In at least one embodiment, a model registry 6424 may be backed by object storage that may support versioning and object metadata. In at least one embodiment, object storage may be accessible through, for example, a cloud storage (e.g., a cloud 6526 of FIG. 65) compatible application programming interface (API) from within a cloud platform. In at least one embodiment, machine learning models within model registry 6424 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 6504 (FIG. 65) may include a scenario where facility 6402 is training their own machine learning model, or has an existing machine learning model that needs to be optimized or updated. In at least one embodiment, imaging data 6408 generated by imaging device(s), sequencing devices, and/or other device types may be received. In at least one embodiment, once imaging data 6408 is received, AI-assisted annotation 6410 may be used to aid in generating annotations corresponding to imaging data 6408 to be used as ground truth data for a machine learning model. In at least one embodiment, AI-assisted annotation 6410 may include one or more machine learning models (e.g., convolutional neural networks (CNNs)) that may be trained to generate annotations corresponding to certain types of imaging data 6408 (e.g., from certain devices) and/or certain types of anomalies in imaging data 6408. In at least one embodiment, AI-assisted annotations 6410 may then be used directly, or may be adjusted or fine-tuned using an annotation tool (e.g., by a researcher, a clinician, a doctor, a scientist, etc.), to generate ground truth data. In at least one embodiment, in some examples, labeled clinic data 6412 (e.g., annotations provided by a clinician, doctor, scientist, technician, etc.) may be used as ground truth data for training a machine learning model. In at least one embodiment, AI-assisted annotations 6410, labeled clinic data 6412, or a combination thereof may be used as ground truth data for training a machine learning model. In at least one embodiment, a trained machine learning model may be referred to as an output model 6416, and may be used by deployment system 6406, as described herein.

In at least one embodiment, training pipeline 6504 (FIG. 65) may include a scenario where facility 6402 needs a machine learning model for use in performing one or more processing tasks for one or more applications in deployment system 6406, but facility 6402 may not currently have such a machine learning model (or may not have a model that is optimized, efficient, or effective for such purposes). In at least one embodiment, an existing machine learning model may be selected from model registry 6424. In at least one embodiment, model registry 6424 may include machine learning models trained to perform a variety of different inference tasks on imaging data. In at least one embodiment, machine learning models in model registry 6424 may have been trained on imaging data from different facilities than facility 6402 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 6424. In at least one embodiment, a machine learning model may then be retrained, or updated, at any number of other facilities, and a retrained or updated model may be made available in model registry 6424. In at least one embodiment, a machine learning model may then be selected from model registry 6424—and referred to as output model 6416—and may be used in deployment system 6406 to perform one or more processing tasks for one or more applications of a deployment system.

In at least one embodiment, training pipeline 6504 (FIG. 65) may be used in a scenario that includes facility 6402 requiring a machine learning model for use in performing one or more processing tasks for one or more applications in deployment system 6406, but facility 6402 may not currently have such a machine learning model (or may not have a model that is optimized, efficient, or effective for such purposes). In at least one embodiment, a machine learning model selected from model registry 6424 might not be fine-tuned or optimized for imaging data 6408 generated at facility 6402 because of differences in populations, genetic variations, robustness of training data used to train a machine learning model, diversity in anomalies of training data, and/or other issues with training data. In at least one embodiment, AI-assisted annotation 6410 may be used to aid in generating annotations corresponding to imaging data 6408 to be used as ground truth data for retraining or updating a machine learning model. In at least one embodiment, labeled clinic data 6412 (e.g., annotations provided by a clinician, doctor, scientist, etc.) may be used as ground truth data for training a machine learning model. In at least one embodiment, retraining or updating a machine learning model may be referred to as model training 6414. In at least one embodiment, model training 6414—e.g., AI-assisted annotations 6410, labeled clinic data 6412, or a combination thereof—may be used as ground truth data for retraining or updating a machine learning model.

In at least one embodiment, deployment system 6406 may include software 6418, services 6420, hardware 6422, and/or other components, features, and functionality. In at least one embodiment, deployment system 6406 may include a software "stack," such that software 6418 may be built on top of services 6420 and may use services 6420 to perform some or all of processing tasks, and services 6420 and software 6418 may be built on top of hardware 6422 and use hardware 6422 to execute processing, storage, and/or other compute tasks of deployment system 6406.

In at least one embodiment, software 6418 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of imaging device (e.g., CT, MM, X-Ray, ultrasound, sonography, echocardiography, etc.), sequencing device, radiology device, genomics device, etc., there may be any number of containers that may perform a data processing task with respect to imaging data 6408 (or other data types, such as those described herein) generated by a device. In at least one embodiment, an advanced processing and inferencing pipeline may be defined based on selections of different containers that are desired or required for processing imaging data 6408, in addition to containers that receive and configure imaging data for use by each container and/or for use by facility 6402 after processing through a pipeline (e.g., to convert outputs back to a usable data type, such as digital imaging and communications in medicine (DICOM) data, radiology information system (RIS) data, clinical information system (CIS) data, remote procedure call (RPC) data, data substantially compliant with a representation state transfer (REST) interface, data substantially compliant with a file-based interface, and/or raw data, for storage and display at facility 6402). In at least one embodiment, a combination of containers within software 6418 (e.g., that make up a pipeline) may be referred to as a virtual instrument (as described in more detail herein), and a virtual instrument may leverage services 6420 and hardware 6422 to execute some or all processing tasks of applications instantiated in containers.

In at least one embodiment, a data processing pipeline may receive input data (e.g., imaging data 6408) in a DICOM, RIS, CIS, REST compliant, RPC, raw, and/or other format in response to an inference request (e.g., a request from a user of deployment system 6406, such as a clinician, a doctor, a radiologist, etc.). In at least one embodiment, input data may be representative of one or more images, video, and/or other data representations generated by one or more imaging devices, sequencing devices, radiology devices, genomics devices, and/or other device types. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 6416 of training system 6404.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 6424 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility) on data from a first facility) with an SDK which may support at least some of services 6420 as a system (e.g., system 6500 of FIG. 65). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming DICOM data. In at least one embodiment, once validated by system 6500 (e.g., for accuracy, safety, patient privacy, etc.), an application may be available in a container registry for selection and/or implementation by a user (e.g., a hospital, clinic, lab, healthcare provider, etc.) to perform one or more processing tasks with respect to data at a facility (e.g., a second facility) of a user.

Figure 65:
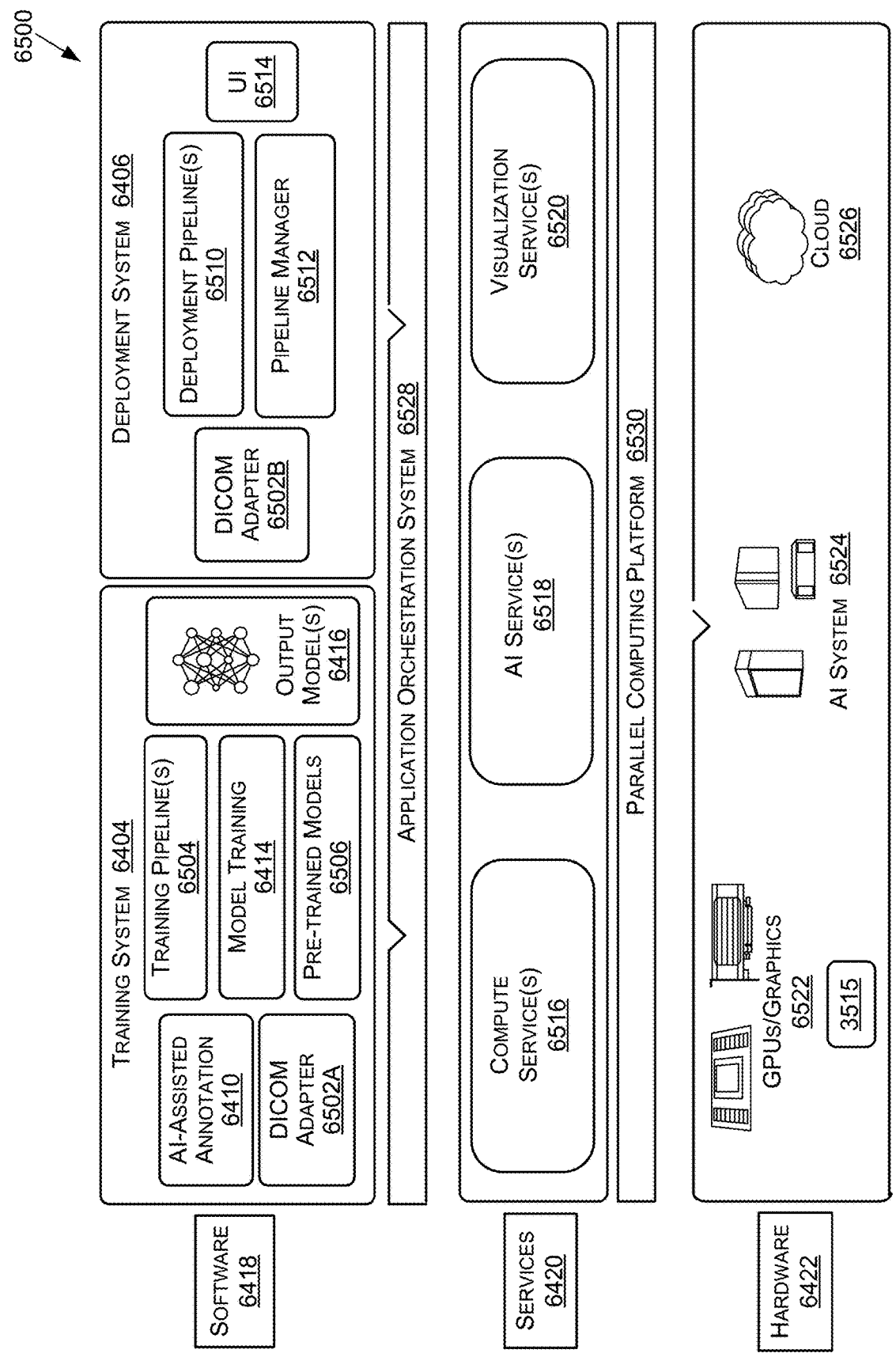
FIG. 65 is a system diagram for an example system for training, adapting, instantiating, and deploying machine learning models in an advanced computing pipeline, in accordance with at least one embodiment.

In at least one embodiment, developers may then share applications or containers through a network for access and use by users of a system (e.g., system 6500 of FIG. 65). In at least one embodiment, completed and validated applications or containers may be stored in a container registry and associated machine learning models may be stored in model registry 6424. In at least one embodiment, a requesting entity (e.g., a user at a medical facility)—who provides an inference or image processing request—may browse a container registry and/or model registry 6424 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 6406 (e.g., a cloud) to perform processing of data processing pipeline. In at least one embodiment, processing by deployment system 6406 may include referencing selected elements (e.g., applications, containers, models, etc.) from a container registry and/or model registry 6424. In at least one embodiment, once results are generated by a pipeline, results may be returned to a user for reference (e.g., for viewing in a viewing application suite executing on a local, on-premises workstation or terminal). In at least one embodiment, a radiologist may receive results from an data processing pipeline including any number of application and/or containers, where results may include anomaly detection in X-rays, CT scans, MRIs, etc.

In at least one embodiment, to aid in processing or execution of applications or containers in pipelines, services 6420 may be leveraged. In at least one embodiment, services 6420 may include compute services, artificial intelligence (AI) services, visualization services, and/or other service types. In at least one embodiment, services 6420 may provide functionality that is common to one or more applications in software 6418, so functionality may be abstracted to a service that may be called upon or leveraged by applications. In at least one embodiment, functionality provided by services 6420 may run dynamically and more efficiently, while also scaling well by allowing applications to process data in parallel (e.g., using a parallel computing platform 6530 (FIG. 65)). In at least one embodiment, rather than each application that shares a same functionality offered by a service 6420 being required to have a respective instance of service 6420, service 6420 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc. —to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 6420 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 6418 implementing advanced processing and inferencing pipeline that includes segmentation application and anomaly detection application may be streamlined because each application may call upon a same inference service to perform one or more inferencing tasks.

In at least one embodiment, hardware 6422 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 6422 may be used to provide efficient, purpose-built support for software 6418 and services 6420 in deployment system 6406. In at least one embodiment, use of GPU processing may be implemented for processing locally (e.g., at facility 6402), within an AI/deep learning system, in a cloud system, and/or in other processing components of deployment system 6406 to improve efficiency, accuracy, and efficacy of image processing, image reconstruction, segmentation, MRI exams, stroke or heart attack detection (e.g., in real-time), image quality in rendering, etc. In at least one embodiment, a facility may include imaging devices, genomics devices, sequencing devices, and/or other device types on-premises that may leverage GPUs to generate imaging data representative of a subject's anatomy.

In at least one embodiment, software 6418 and/or services 6420 may be optimized for GPU processing with respect to deep learning, machine learning, and/or high-performance computing, as non-limiting examples. In at least one embodiment, at least some of computing environment of deployment system 6406 and/or training system 6404 may be executed in a datacenter one or more supercomputers or high performance computing systems, with GPU optimized software (e.g., hardware and software combination of NVIDIA's DGX system). In at least one embodiment, datacenters may be compliant with provisions of HIPAA, such that receipt, processing, and transmission of imaging data and/or other patient data is securely handled with respect to privacy of patient data. In at least one embodiment, hardware 6422 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 65 is a system diagram for an example system 6500 for generating and deploying an imaging deployment pipeline, in accordance with at least one embodiment. In at least one embodiment, system 6500 may be used to implement process 6400 of FIG. 64 and/or other processes including advanced processing and inferencing pipelines. In at least one embodiment, system 6500 may include training system 6404 and deployment system 6406. In at least one embodiment, training system 6404 and deployment system 6406 may be implemented using software 6418, services 6420, and/or hardware 6422, as described herein.

In at least one embodiment, system 6500 (e.g., training system 6404 and/or deployment system 6406) may implemented in a cloud computing environment (e.g., using cloud 6526). In at least one embodiment, system 6500 may be implemented locally with respect to a healthcare services facility, or as a combination of both cloud and local computing resources. In at least one embodiment, in embodiments where cloud computing is implemented, patient data may be separated from, or unprocessed by, by one or more components of system 6500 that would render processing non-compliant with HIPAA and/or other data handling and privacy regulations or laws. In at least one embodiment, access to APIs in cloud 6526 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 6500, may be restricted to a set of public IPs that have been vetted or authorized for interaction.

In at least one embodiment, various components of system 6500 may communicate between and among one another using any of a variety of different network types, including but not limited to local area networks (LANs) and/or wide area networks (WANs) via wired and/or wireless communication protocols. In at least one embodiment, communication between facilities and components of system 6500 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 6404 may execute training pipelines 6504, similar to those described herein with respect to FIG. 64. In at least one embodiment, where one or more machine learning models are to be used in deployment pipelines 6510 by deployment system 6406, training pipelines 6504 may be used to train or retrain one or more (e.g., pre-trained) models, and/or implement one or more of pre-trained models 6506 (e.g., without a need for retraining or updating). In at least one embodiment, as a result of training pipelines 6504, output model(s) 6416 may be generated. In at least one embodiment, training pipelines 6504 may include any number of processing steps, such as but not limited to imaging data (or other input data) conversion or adaption (e.g., using DICOM adapter 6502A to convert DICOM images to another format suitable for processing by respective machine learning models, such as Neuroimaging Informatics Technology Initiative (NIfTI) format), AI-assisted annotation 6410, labeling or annotating of imaging data 6408 to generate labeled clinic data 6412, model selection from a model registry, model training 6414, training, retraining, or updating models, and/or other processing steps. In at least one embodiment, for different machine learning models used by deployment system 6406, different training pipelines 6504 may be used. In at least one embodiment, training pipeline 6504 similar to a first example described with respect to FIG. 64 may be used for a first machine learning model, training pipeline 6504 similar to a second example described with respect to FIG. 64 may be used for a second machine learning model, and training pipeline 6504 similar to a third example described with respect to FIG. 64 may be used for a third machine learning model. In at least one embodiment, any combination of tasks within training system 6404 may be used depending on what is required for each respective machine learning model. In at least one embodiment, one or more of machine learning models may already be trained and ready for deployment so machine learning models may not undergo any processing by training system 6404, and may be implemented by deployment system 6406.

In at least one embodiment, output model(s) 6416 and/or pre-trained model(s) 6506 may include any types of machine learning models depending on implementation or embodiment. In at least one embodiment, and without limitation, machine learning models used by system 6500 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 68A:
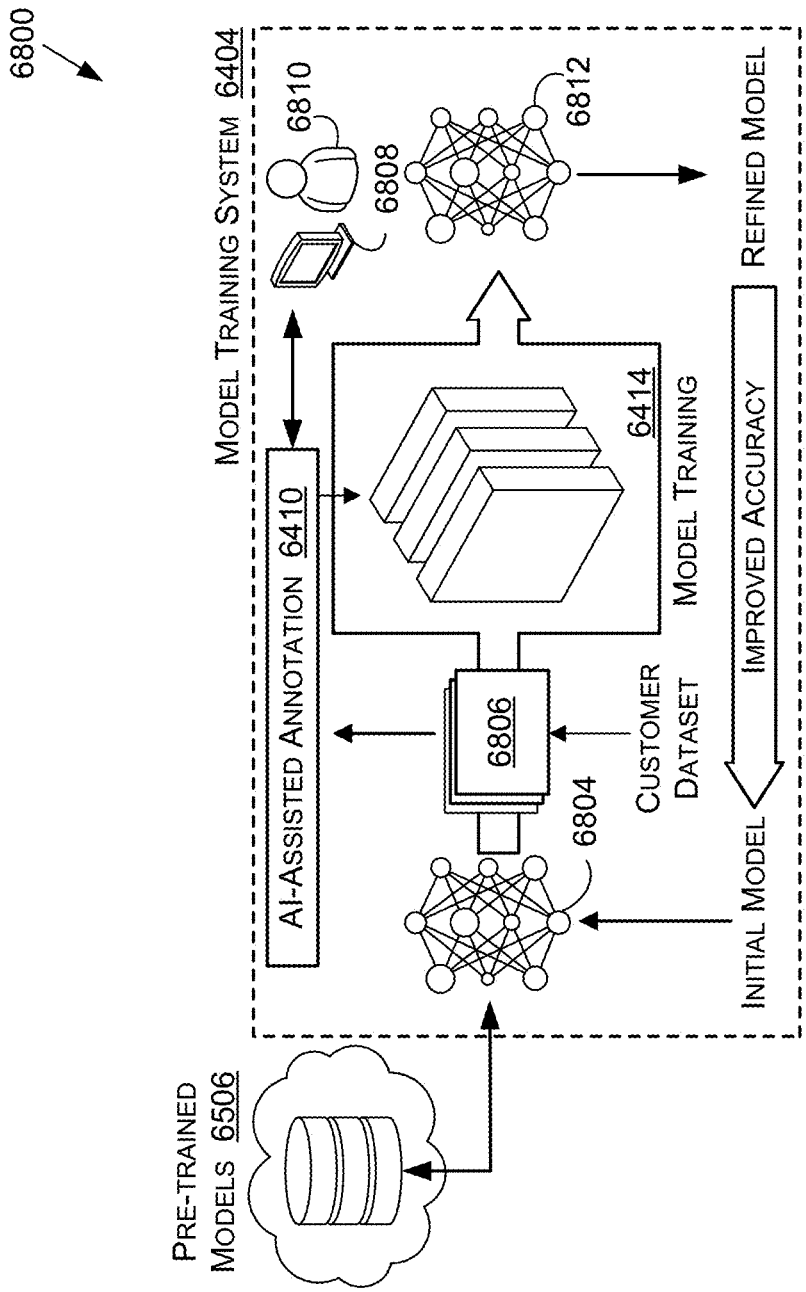
FIG. 68A illustrates a data flow diagram for a process to train a machine learning model, in accordance with at least one embodiment.
Figure 68B:
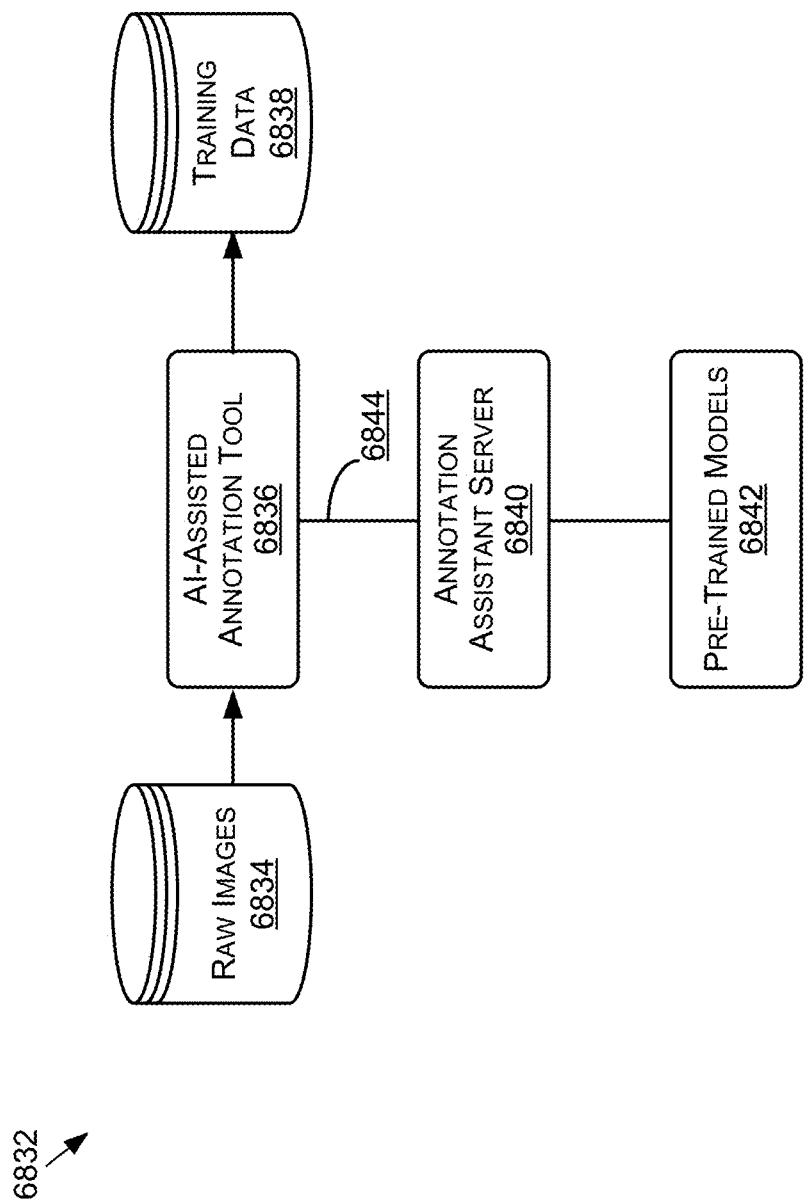
FIG. 68B is an example illustration of a client-server architecture to enhance annotation tools with pre-trained annotation models, in accordance with at least one embodiment.

In at least one embodiment, training pipelines 6504 may include AI-assisted annotation, as described in more detail herein with respect to at least FIG. 68B. In at least one embodiment, labeled clinic data 6412 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 6408 (or other data type used by machine learning models), there may be corresponding ground truth data generated by training system 6404. In at least one embodiment, AI-assisted annotation may be performed as part of deployment pipelines 6510; either in addition to, or in lieu of AI-assisted annotation included in training pipelines 6504. In at least one embodiment, system 6500 may include a multi-layer platform that may include a software layer (e.g., software 6418) of diagnostic applications (or other application types) that may perform one or more medical imaging and diagnostic functions. In at least one embodiment, system 6500 may be communicatively coupled to (e.g., via encrypted links) PACS server networks of one or more facilities. In at least one embodiment, system 6500 may be configured to access and referenced data (e.g., DICOM data, RIS data, raw data, CIS data, REST compliant data, RPC data, raw data, etc.) from PACS servers (e.g., via a DICOM adapter 6502, or another data type adapter such as RIS, CIS, REST compliant, RPC, raw, etc.) to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 6402). In at least one embodiment, applications may then call or execute one or more services 6420 for performing compute, AI, or visualization tasks associated with respective applications, and software 6418 and/or services 6420 may leverage hardware 6422 to perform processing tasks in an effective and efficient manner.

In at least one embodiment, deployment system 6406 may execute deployment pipelines 6510. In at least one embodiment, deployment pipelines 6510 may include any number of applications that may be sequentially, non-sequentially, or otherwise applied to imaging data (and/or other data types) generated by imaging devices, sequencing devices, genomics devices, etc. —including AI-assisted annotation, as described above. In at least one embodiment, as described herein, a deployment pipeline 6510 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 6510 depending on information desired from data generated by a device. In at least one embodiment, where detections of anomalies are desired from an MM machine, there may be a first deployment pipeline 6510, and where image enhancement is desired from output of an MRI machine, there may be a second deployment pipeline 6510.

In at least one embodiment, applications available for deployment pipelines 6510 may include any application that may be used for performing processing tasks on imaging data or other data from devices. In at least one embodiment, different applications may be responsible for image enhancement, segmentation, reconstruction, anomaly detection, object detection, feature detection, treatment planning, dosimetry, beam planning (or other radiation treatment procedures), and/or other analysis, image processing, or inferencing tasks. In at least one embodiment, deployment system 6406 may define constructs for each of applications, such that users of deployment system 6406 (e.g., medical facilities, labs, clinics, etc.) may understand constructs and adapt applications for implementation within their respective facility. In at least one embodiment, an application for image reconstruction may be selected for inclusion in deployment pipeline 6510, but data type generated by an imaging device may be different from a data type used within an application. In at least one embodiment, DICOM adapter 6502B (and/or a DICOM reader) or another data type adapter or reader (e.g., RIS, CIS, REST compliant, RPC, raw, etc.) may be used within deployment pipeline 6510 to convert data to a form useable by an application within deployment system 6406. In at least one embodiment, access to DICOM, RIS, CIS, REST compliant, RPC, raw, and/or other data type libraries may be accumulated and pre-processed, including decoding, extracting, and/or performing any convolutions, color corrections, sharpness, gamma, and/or other augmentations to data. In at least one embodiment, DICOM, RIS, CIS, REST compliant, RPC, and/or raw data may be unordered and a pre-pass may be executed to organize or sort collected data. In at least one embodiment, because various applications may share common image operations, in some embodiments, a data augmentation library (e.g., as one of services 6420) may be used to accelerate these operations. In at least one embodiment, to avoid bottlenecks of conventional processing approaches that rely on CPU processing, parallel computing platform 6530 may be used for GPU acceleration of these processing tasks.

In at least one embodiment, an image reconstruction application may include a processing task that includes use of a machine learning model. In at least one embodiment, a user may desire to use their own machine learning model, or to select a machine learning model from model registry 6424. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 6500—such as services 6420 and hardware 6422— deployment pipelines 6510 may be even more user friendly, provide for easier integration, and produce more accurate, efficient, and timely results.

In at least one embodiment, deployment system 6406 may include a user interface 6514 (e.g., a graphical user interface, a web interface, etc.) that may be used to select applications for inclusion in deployment pipeline(s) 6510, arrange applications, modify or change applications or parameters or constructs thereof, use and interact with deployment pipeline(s) 6510 during setup and/or deployment, and/or to otherwise interact with deployment system 6406. In at least one embodiment, although not illustrated with respect to training system 6404, user interface 6514 (or a different user interface) may be used for selecting models for use in deployment system 6406, for selecting models for training, or retraining, in training system 6404, and/or for otherwise interacting with training system 6404.

Figure 66:
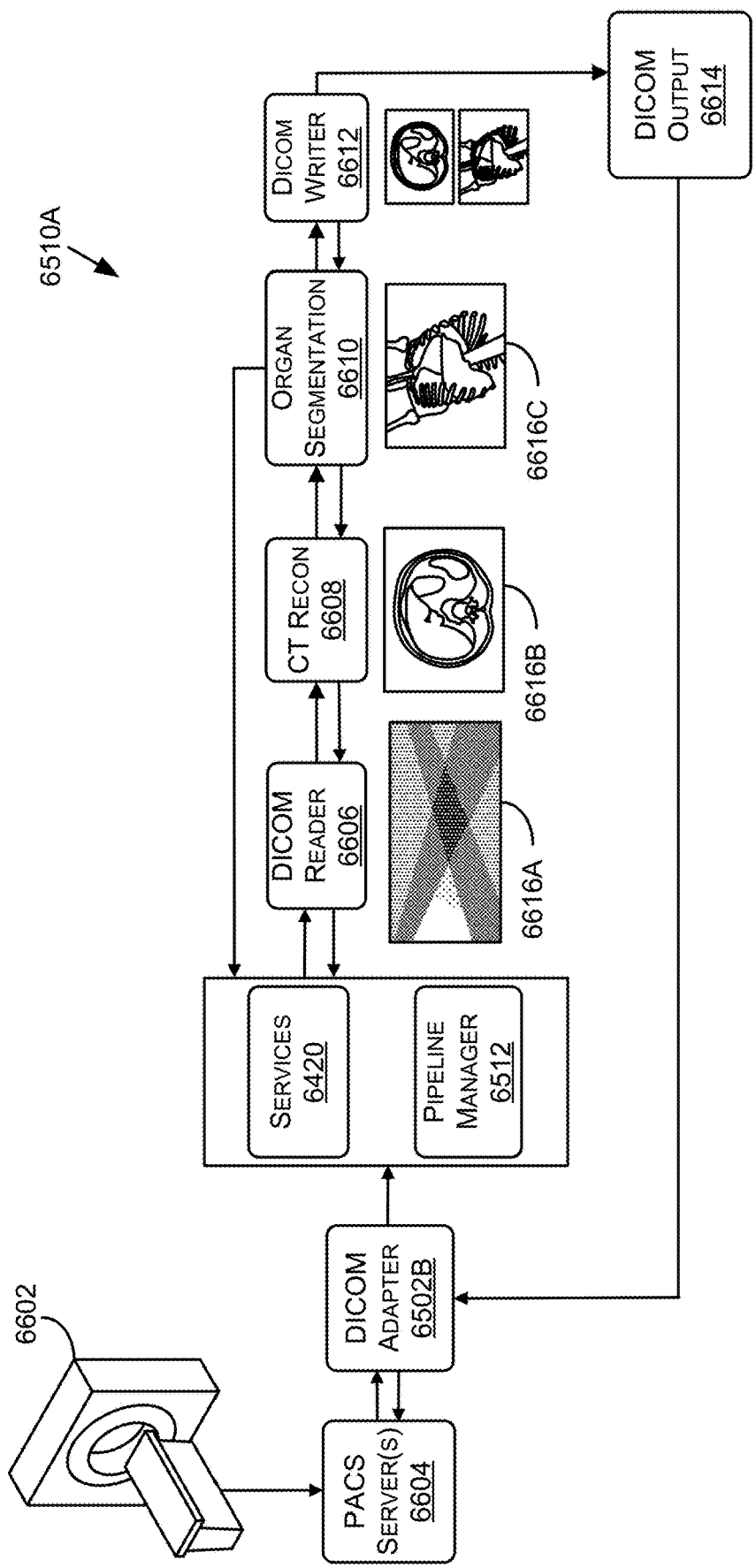
FIG. 66 includes an example illustration of an advanced computing pipeline 6510A for processing imaging data, in accordance with at least one embodiment.

In at least one embodiment, pipeline manager 6512 may be used, in addition to an application orchestration system 6528, to manage interaction between applications or containers of deployment pipeline(s) 6510 and services 6420 and/or hardware 6422. In at least one embodiment, pipeline manager 6512 may be configured to facilitate interactions from application to application, from application to service 6420, and/or from application or service to hardware 6422. In at least one embodiment, although illustrated as included in software 6418, this is not intended to be limiting, and in some examples (e.g., as illustrated in FIG. 66) pipeline manager 6512 may be included in services 6420. In at least one embodiment, application orchestration system 6528

(e.g., Kubernetes, DOCKER, etc.) may include a container orchestration system that may group applications into containers as logical units for coordination, management, scaling, and deployment. In at least one embodiment, by associating applications from deployment pipeline(s) 6510 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 6512 and application orchestration system 6528. In at least one embodiment, so long as an expected input and/or output of each container or application is known by a system (e.g., based on constructs of applications or containers), application orchestration system 6528 and/or pipeline manager 6512 may facilitate communication among and between, and sharing of resources among and between, each of applications or containers. In at least one embodiment, because one or more of applications or containers in deployment pipeline(s) 6510 may share same services and resources, application orchestration system 6528 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 6528) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 6420 leveraged by and shared by applications or containers in deployment system 6406 may include compute services 6516, AI services 6518, visualization services 6520, and/or other service types. In at least one embodiment, applications may call (e.g., execute) one or more of services 6420 to perform processing operations for an application. In at least one embodiment, compute services 6516 may be leveraged by applications to perform super-computing or other high-performance computing (HPC) tasks. In at least one embodiment, compute service(s) 6516 may be leveraged to perform parallel processing (e.g., using a parallel computing platform 6530) for processing data through one or more of applications and/or one or more tasks of a single application, substantially simultaneously. In at least one embodiment, parallel computing platform 6530 (e.g., NVIDIA's CUDA) may enable general purpose computing on GPUs (GPGPU) (e.g., GPUs 6522). In at least one embodiment, a software layer of parallel computing platform 6530 may provide access to virtual instruction sets and parallel computational elements of GPUs, for execution of compute kernels. In at least one embodiment, parallel computing platform 6530 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 6530 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 6518 may be leveraged to perform inferencing services for executing machine learning model(s) associated with applications (e.g., tasked with performing one or more processing tasks of an application). In at least one embodiment, AI services 6518 may leverage AI system 6524 to execute machine learning model(s) (e.g., neural networks, such as CNNs) for segmentation, reconstruction, object detection, feature detection, classification, and/or other inferencing tasks. In at least one embodiment, applications of deployment pipeline(s) 6510 may use one or more of output models 6416 from training system 6404 and/or other models of applications to perform inference on imaging data (e.g., DICOM data, RIS data, CIS data, REST compliant data, RPC data, raw data, etc.). In at least one embodiment, two or more examples of inferencing using application orchestration system 6528 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 6528 may distribute resources (e.g., services 6420 and/or hardware 6422) based on priority paths for different inferencing tasks of AI services 6518.

In at least one embodiment, shared storage may be mounted to AI services 6518 within system 6500. In at least one embodiment, shared storage may operate as a cache (or other storage device type) and may be used to process inference requests from applications. In at least one embodiment, when an inference request is submitted, a request may be received by a set of API instances of deployment system 6406, and one or more instances may be selected (e.g., for best fit, for load balancing, etc.) to process a request. In at least one embodiment, to process a request, a request may be entered into a database, a machine learning model may be located from model registry 6424 if not already in a cache, a validation step may ensure appropriate machine learning model is loaded into a cache (e.g., shared storage), and/or a copy of a model may be saved to a cache. In at least one embodiment, a scheduler (e.g., of pipeline manager 6512)

may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 6420 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 6526, and an inference service may perform inferencing on a GPU.

In at least one embodiment, visualization services 6520 may be leveraged to generate visualizations for viewing outputs of applications and/or deployment pipeline(s) 6510. In at least one embodiment, GPUs 6522 may be leveraged by visualization services 6520 to generate visualizations. In at least one embodiment, rendering effects, such as ray-tracing, may be implemented by visualization services 6520 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 6520 may include an internal visualizer, cinematics, and/or other rendering or image processing capabilities or functionality (e.g., ray tracing, rasterization, internal optics, etc.).

In at least one embodiment, hardware 6422 may include GPUs 6522, AI system 6524, cloud 6526, and/or any other hardware used for executing training system 6404 and/or deployment system 6406. In at least one embodiment, GPUs 6522 (e.g., NVIDIA's TESLA and/or QUADRO GPUs) may include any number of GPUs that may be used for executing processing tasks of compute services 6516, AI services 6518, visualization services 6520, other services, and/or any of features or functionality of software 6418. For example, with respect to AI services 6518, GPUs 6522 may be used to perform pre-processing on imaging data (or other data types used by machine learning models), post-processing on outputs of machine learning models, and/or to perform inferencing (e.g., to execute machine learning models). In at least one embodiment, cloud 6526, AI system 6524, and/or other components of system 6500 may use GPUs 6522. In at least one embodiment, cloud 6526 may include a GPU-optimized platform for deep learning tasks. In at least one embodiment, AI system 6524 may use GPUs, and cloud 6526—or at least a portion tasked with deep learning or inferencing—may be executed using one or more AI systems 6524. As such, although hardware 6422 is illustrated as discrete components, this is not intended to be limiting, and any components of hardware 6422 may be combined with, or leveraged by, any other components of hardware 6422.

In at least one embodiment, AI system 6524 may include a purpose-built computing system (e.g., a super-computer or an HPC) configured for inferencing, deep learning, machine learning, and/or other artificial intelligence tasks. In at least one embodiment, AI system 6524 (e.g., NVIDIA's DGX) may include GPU-optimized software (e.g., a software stack) that may be executed using a plurality of GPUs 6522, in addition to CPUs, RAM, storage, and/or other components, features, or functionality. In at least one embodiment, one or more AI systems 6524 may be implemented in cloud 6526 (e.g., in a data center) for performing some or all of AI-based processing tasks of system 6500.

In at least one embodiment, cloud 6526 may include a GPU-accelerated infrastructure (e.g., NVIDIA's NGC) that may provide a GPU-optimized platform for executing processing tasks of system 6500. In at least one embodiment, cloud 6526 may include an AI system(s) 6524 for performing one or more of AI-based tasks of system 6500 (e.g., as a hardware abstraction and scaling platform). In at least one embodiment, cloud 6526 may integrate with application orchestration system 6528 leveraging multiple GPUs to enable seamless scaling and load balancing between and among applications and services 6420. In at least one embodiment, cloud 6526 may tasked with executing at least some of services 6420 of system 6500, including compute services 6516, AI services 6518, and/or visualization services 6520, as described herein. In at least one embodiment, cloud 6526 may perform small and large batch inference (e.g., executing NVIDIA's TENSOR RT), provide an accelerated parallel computing API and platform 6530 (e.g., NVIDIA's CUDA), execute application orchestration system 6528 (e.g., KUBERNETES), provide a graphics rendering API and platform (e.g., for ray-tracing, 2D graphics, 3D graphics, and/or other rendering techniques to produce higher quality cinematics), and/or may provide other functionality for system 6500.

In at least one embodiment, in an effort to preserve patient confidentiality (e.g., where patient data or records are to be used off-premises), cloud 6526 may include a registry—such as a deep learning container registry. In at least one embodiment, a registry may store containers for instantiations of applications that may perform pre-processing, post-processing, or other processing tasks on patient data. In at least one embodiment, cloud 6526 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

FIG. 66 includes an example illustration of a deployment pipeline 6510A for processing imaging data, in accordance with at least one embodiment. In at least one embodiment, system 6500—and specifically deployment system 6406—may be used to customize, update, and/or integrate deployment pipeline(s) 6510A into one or more production environments. In at least one embodiment, deployment pipeline 6510A of FIG. 66 includes a non-limiting example of a deployment pipeline 6510A that may be custom defined by a particular user (or team of users) at a facility (e.g., at a hospital, clinic, lab, research environment, etc.). In at least one embodiment, to define deployment pipelines 6510A for a CT scanner 6602, a user may select—from a container registry, for example—one or more applications that perform specific functions or tasks with respect to imaging data generated by CT scanner 6602. In at least one embodiment, applications may be applied to deployment pipeline 6510A as containers that may leverage services 6420 and/or hardware 6422 of system 6500. In addition, deployment pipeline 6510A may include additional processing tasks or applications that may be implemented to prepare data for use by applications (e.g., DICOM adapter 6502B and DICOM reader 6606 may be used in deployment pipeline 6510A to prepare data for use by CT reconstruction 6608, organ segmentation 6610, etc.). In at least one embodiment, deployment pipeline 6510A may be customized or selected for consistent deployment, one time use, or for another frequency or interval. In at least one embodiment, a user may desire to have CT reconstruction 6608 and organ segmentation 6610 for several subjects over a specific interval, and thus may deploy pipeline 6510A for that period of time. In at least one embodiment, a user may select, for each request from system 6500, applications that a user wants to perform processing on that data for that request. In at least one embodiment, deployment pipeline 6510A may be adjusted at any interval and, because of adaptability and scalability of a container structure within system 6500, this may be a seamless process.

In at least one embodiment, deployment pipeline 6510A of FIG. 66 may include CT scanner 6602 generating imaging data of a patient or subject. In at least one embodiment, imaging data from CT scanner 6602 may be stored on a PACS server(s) 6604 associated with a facility housing CT scanner 6602. In at least one embodiment, PACS server(s) 6604 may include software and/or hardware components that may directly interface with imaging modalities (e.g., CT scanner 6602) at a facility. In at least one embodiment, DICOM adapter 6502B may enable sending and receipt of DICOM objects using DICOM protocols. In at least one embodiment, DICOM adapter 6502B may aid in preparation or configuration of DICOM data from PACS server(s) 6604 for use by deployment pipeline 6510A. In at least one embodiment, once DICOM data is processed through DICOM adapter 6502B, pipeline manager 6512 may route data through to deployment pipeline 6510A. In at least one embodiment, DICOM reader 6606 may extract image files and any associated metadata from DICOM data (e.g., raw sinogram data, as illustrated in visualization 6616A). In at least one embodiment, working files that are extracted may be stored in a cache for faster processing by other applications in deployment pipeline 6510A. In at least one embodiment, once DICOM reader 6606 has finished extracting and/or storing data, a signal of completion may be communicated to pipeline manager 6512. In at least one embodiment, pipeline manager 6512 may then initiate or call upon one or more other applications or containers in deployment pipeline 6510A.

In at least one embodiment, CT reconstruction 6608 application and/or container may be executed once data (e.g., raw sinogram data) is available for processing by CT reconstruction 6608 application. In at least one embodiment, CT reconstruction 6608 may read raw sinogram data from a cache, reconstruct an image file out of raw sinogram data (e.g., as illustrated in visualization 6616B), and store resulting image file in a cache. In at least one embodiment, at completion of reconstruction, pipeline manager 6512 may be signaled that reconstruction task is complete. In at least one embodiment, once reconstruction is complete, and a reconstructed image file may be stored in a cache (or other storage device), organ segmentation 6610 application and/or container may be triggered by pipeline manager 6512. In at least one embodiment, organ segmentation 6610 application and/or container may read an image file from a cache, normalize or convert an image file to format suitable for inference (e.g., convert an image file to an input resolution of a machine learning model), and run inference against a normalized image. In at least one embodiment, to run inference on a normalized image, organ segmentation 6610 application and/or container may rely on services 6420, and pipeline manager 6512 and/or application orchestration system 6528 may facilitate use of services 6420 by organ segmentation 6610 application and/or container. In at least one embodiment, for example, organ segmentation 6610 application and/or container may leverage AI services 6518 to perform inference on a normalized image, and AI services 6518 may leverage hardware 6422 (e.g., AI system 6524) to execute AI services 6518. In at least one embodiment, a result of an inference may be a mask file (e.g., as illustrated in visualization 6616C) that may be stored in a cache (or other storage device).

In at least one embodiment, once applications that process DICOM data and/or data extracted from DICOM data have completed processing, a signal may be generated for pipeline manager 6512. In at least one embodiment, pipeline manager 6512 may then execute DICOM writer 6612 to read results from a cache (or other storage device), package results into a DICOM format (e.g., as DICOM output 6614) for use by users at a facility who generated a request. In at least one embodiment, DICOM output 6614 may then be transmitted to DICOM adapter 6502B to prepare DICOM output 6614 for storage on PACS server(s) 6604 (e.g., for viewing by a DICOM viewer at a facility). In at least one embodiment, in response to a request for reconstruction and segmentation, visualizations 6616B and 6616C may be generated and available to a user for diagnoses, research, and/or for other purposes.

Although illustrated as consecutive application in deployment pipeline 6510A, CT reconstruction 6608 and organ segmentation 6610 applications may be processed in parallel in at least one embodiment. In at least one embodiment, where applications do not have dependencies on one another, and data is available for each application (e.g., after DICOM reader 6606 extracts data), applications may be executed at a same time, substantially at a same time, or with some overlap. In at least one embodiment, where two or more applications require similar services 6420, a scheduler of system 6500 may be used to load balance and distribute compute or processing resources between and among various applications. In at least one embodiment, in some embodiments, parallel computing platform 6530 may be used to perform parallel processing for applications to decrease run-time of deployment pipeline 6510A to provide real-time results.

Figure 67A:
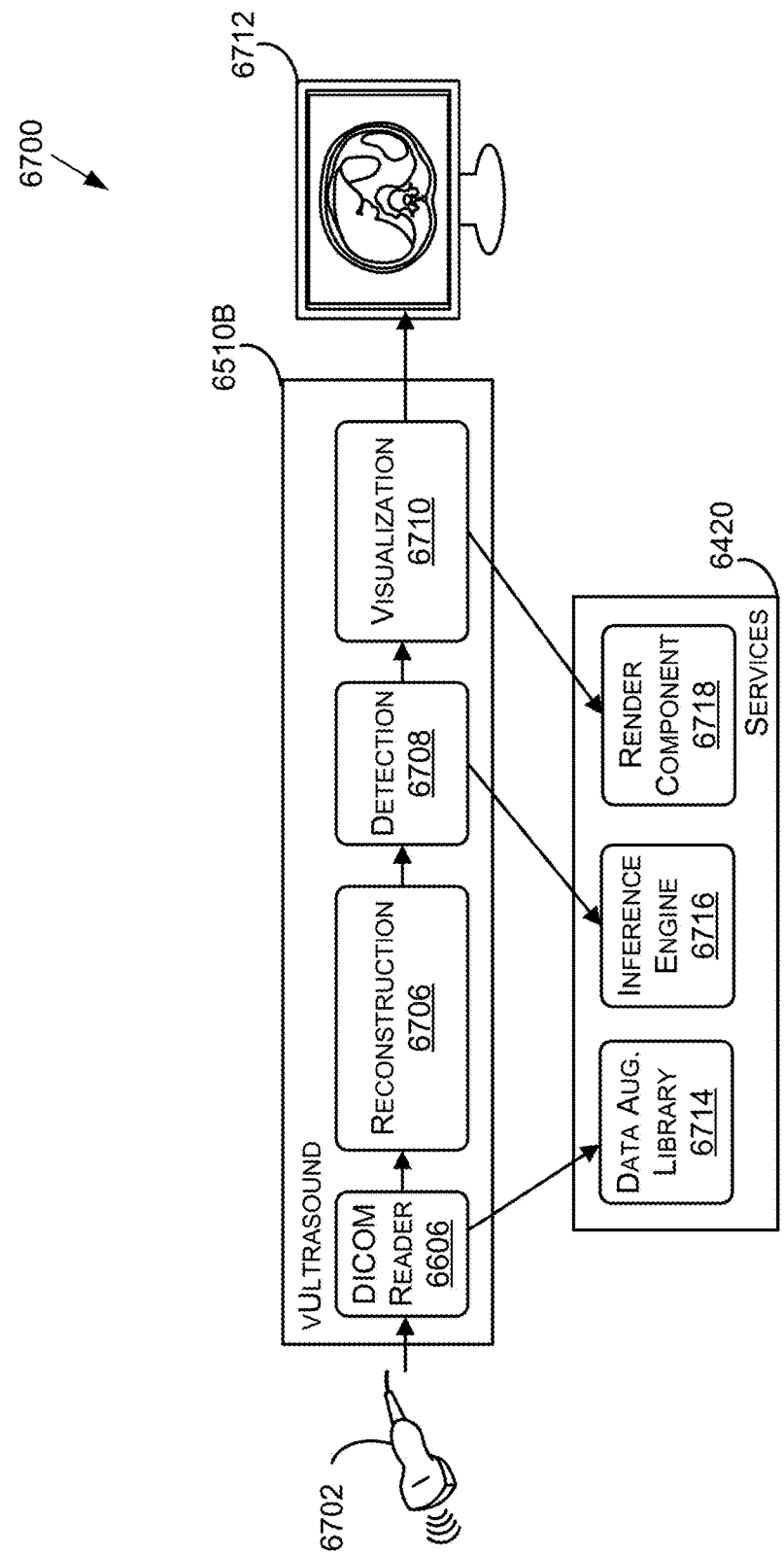
FIG. 67A includes an example data flow diagram of a virtual instrument supporting an ultrasound device, in accordance with at least one embodiment.
Figure 67B:
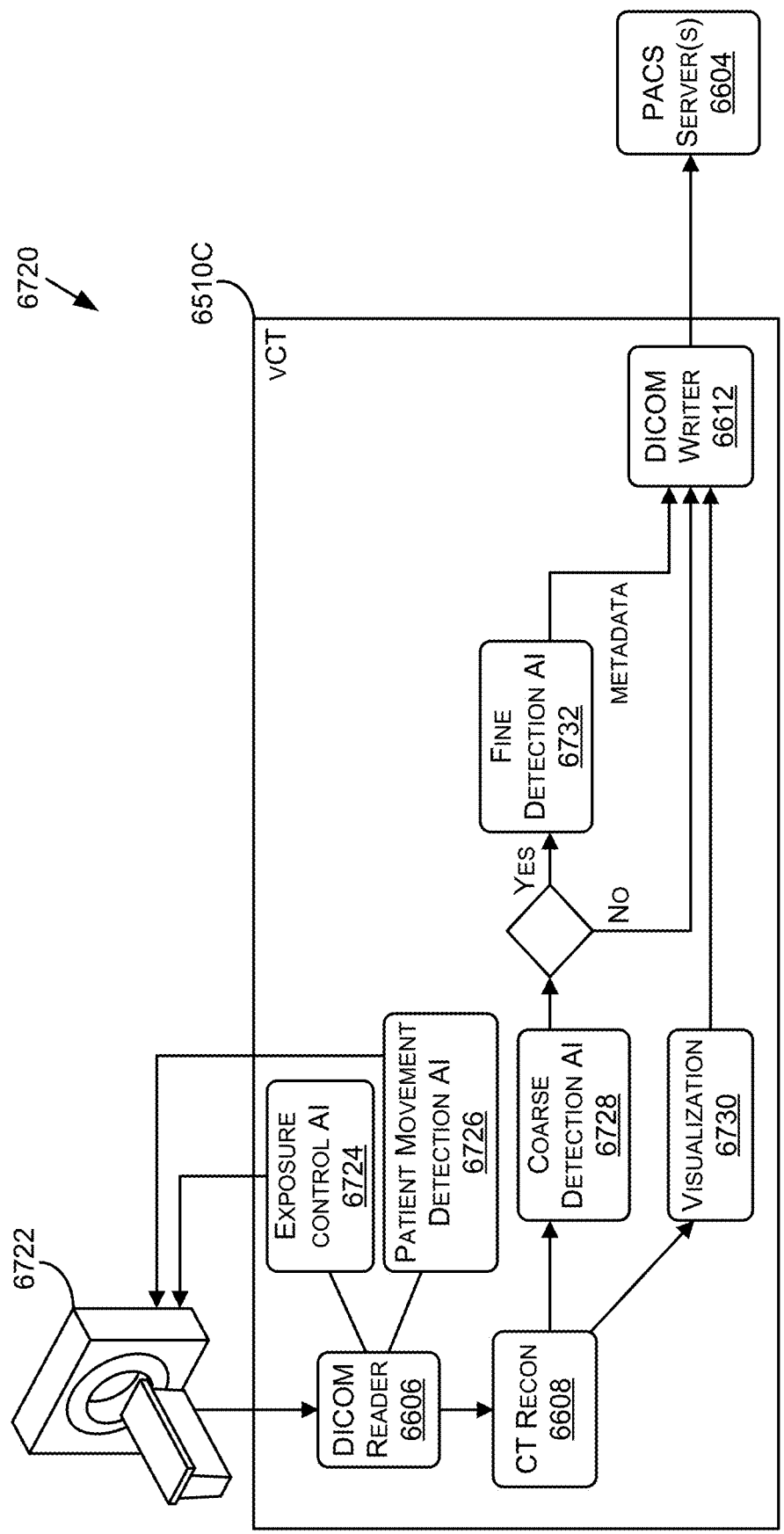
FIG. 67B includes an example data flow diagram of a virtual instrument supporting an CT scanner, in accordance with at least one embodiment.

In at least one embodiment, and with reference to FIGS. 67A-67B, deployment system 6406 may be implemented as one or more virtual instruments to perform different functionalities—such as image processing, segmentation, enhancement, AI, visualization, and inferencing—with imaging devices (e.g., CT scanners, X-ray machines, MRI machines, etc.), sequencing devices, genomics devices, and/or other device types. In at least one embodiment, system 6500 may allow for creation and provision of virtual instruments that may include a software-defined deployment pipeline 6510 that may receive raw/unprocessed input data generated by a device(s) and output processed/reconstructed data. In at least one embodiment, deployment pipelines 6510 (e.g., 6510A and 6510B) that represent virtual instruments may implement intelligence into a pipeline, such as by leveraging machine learning models, to provide containerized inference support to a system. In at least one embodiment, virtual instruments may execute any number of containers each including instantiations of applications. In at least one embodiment, such as where real-time processing is desired, deployment pipelines 6510 representing virtual instruments may be static (e.g., containers and/or applications may be set), while in other examples, container and/or applications for virtual instruments may be selected (e.g., on a per-request basis) from a pool of applications or resources (e.g., within a container registry).

In at least one embodiment, system 6500 may be instantiated or executed as one or more virtual instruments on-premise at a facility in, for example, a computing system deployed next to or otherwise in communication with a radiology machine, an imaging device, and/or another device type at a facility. In at least one embodiment, however, an on-premise installation may be instantiated or executed within a computing system of a device itself (e.g., a computing system integral to an imaging device), in a local datacenter (e.g., a datacenter on-premise), and/or in a cloud-environment (e.g., in cloud 6526). In at least one embodiment, deployment system 6406, operating as a virtual instrument, may be instantiated by a supercomputer or other HPC system in some examples. In at least one embodiment, on-premise installation may allow for high-bandwidth uses (via, for example, higher throughput local communication interfaces, such as RF over Ethernet) for real-time processing. In at least one embodiment, real-time or near real-time processing may be particularly useful where a virtual instrument supports an ultrasound device or other imaging modality where immediate visualizations are expected or required for accurate diagnoses and analyses. In at least one embodiment, a cloud-computing architecture may be capable of dynamic bursting to a cloud computing service provider, or other compute cluster, when local demand exceeds on-premise capacity or capability. In at least one embodiment, a cloud architecture, when implemented, may be tuned for training neural networks or other machine learning models, as described herein with respect to training system 6404. In at least one embodiment, with training pipelines in place, machine learning models may be continuously learn and improve as they process additional data from devices they support. In at least one embodiment, virtual instruments may be continually improved using additional data, new data, existing machine learning models, and/or new or updated machine learning models.

In at least one embodiment, a computing system may include some or all of hardware 6422 described herein, and hardware 6422 may be distributed in any of a number of ways including within a device, as part of a computing device coupled to and located proximate a device, in a local datacenter at a facility, and/or in cloud 6526. In at least one embodiment, because deployment system 6406 and associated applications or containers are created in software (e.g., as discrete containerized instantiations of applications), behavior, operation, and configuration of virtual instruments, as well as outputs generated by virtual instruments, may be modified or customized as desired, without having to change or alter raw output of a device that a virtual instrument supports.

FIG. 67A includes an example data flow diagram of a virtual instrument supporting an ultrasound device, in accordance with at least one embodiment. In at least one embodiment, deployment pipeline 6510B may leverage one or more of services 6420 of system 6500. In at least one embodiment, deployment pipeline 6510B and services 6420 may leverage hardware 6422 of a system either locally or in cloud 6526. In at least one embodiment, although not illustrated, process 6700 may be facilitated by pipeline manager 6512, application orchestration system 6528, and/or parallel computing platform 6530.

In at least one embodiment, process 6700 may include receipt of imaging data from an ultrasound device 6702. In at least one embodiment, imaging data may be stored on PACS server(s) in a DICOM format (or other format, such as RIS, CIS, REST compliant, RPC, raw, etc.), and may be received by system 6500 for processing through deployment pipeline 6510 selected or customized as a virtual instrument (e.g., a virtual ultrasound) for ultrasound device 6702. In at least one embodiment, imaging data may be received directly from an imaging device (e.g., ultrasound device 6702) and processed by a virtual instrument. In at least one embodiment, a transducer or other signal converter communicatively coupled between an imaging device and a virtual instrument may convert signal data generated by an imaging device to image data that may be processed by a virtual instrument. In at least one embodiment, raw data and/or image data may be applied to DICOM reader 6606 to extract data for use by applications or containers of deployment pipeline 6510B. In at least one embodiment, DICOM reader 6606 may leverage data augmentation library 6714 (e.g., NVIDIA's DALI) as a service 6420 (e.g., as one of compute service(s) 6516) for extracting, resizing, rescaling, and/or otherwise preparing data for use by applications or containers.

In at least one embodiment, once data is prepared, a reconstruction 6706 application and/or container may be executed to reconstruct data from ultrasound device 6702 into an image file. In at least one embodiment, after reconstruction 6706, or at a same time as reconstruction 6706, a detection 6708 application and/or container may be executed for anomaly detection, object detection, feature detection, and/or other detection tasks related to data. In at least one embodiment, an image file generated during reconstruction 6706 may be used during detection 6708 to identify anomalies, objects, features, etc. In at least one embodiment, detection 6708 application may leverage an inference engine 6716 (e.g., as one of AI service(s) 6518) to perform inference on data to generate detections. In at least one embodiment, one or more machine learning models (e.g., from training system 6404) may be executed or called by detection 6708 application.

In at least one embodiment, once reconstruction 6706 and/or detection 6708 is/are complete, data output from these application and/or containers may be used to generate visualizations 6710, such as visualization 6712 (e.g., a grayscale output) displayed on a workstation or display terminal. In at least one embodiment, visualization may allow a technician or other user to visualize results of deployment pipeline 6510B with respect to ultrasound device 6702. In at least one embodiment, visualization 6710 may be executed by leveraging a render component 6718 of system 6500 (e.g., one of visualization service(s) 6520). In at least one embodiment, render component 6718 may execute a 2D, OpenGL, or ray-tracing service to generate visualization 6712.

FIG. 67B includes an example data flow diagram of a virtual instrument supporting a CT scanner, in accordance with at least one embodiment. In at least one embodiment, deployment pipeline 6510C may leverage one or more of services 6420 of system 6500. In at least one embodiment, deployment pipeline 6510C and services 6420 may leverage hardware 6422 of a system either locally or in cloud 6526. In at least one embodiment, although not illustrated, process 6720 may be facilitated by pipeline manager 6512, application orchestration system 6528, and/or parallel computing platform 6530.

In at least one embodiment, process 6720 may include CT scanner 6722 generating raw data that may be received by DICOM reader 6606 (e.g., directly, via a PACS server 6604, after processing, etc.). In at least one embodiment, a Virtual CT (instantiated by deployment pipeline 6510C) may include a first, real-time pipeline for monitoring a patient (e.g., patient movement detection AI 6726) and/or for adjusting or optimizing exposure of CT scanner 6722 (e.g., using exposure control AI 6724). In at least one embodiment, one or more applications (e.g., 6724 and 6726) may leverage a service 6420, such as AI service(s) 6518. In at least one embodiment, outputs of exposure control AI 6724 application (or container) and/or patient movement detection AI 6726 application (or container) may be used as feedback to CT scanner 6722 and/or a technician for adjusting exposure (or other settings of CT scanner 6722) and/or informing a patient to move less.

In at least one embodiment, deployment pipeline 6510C may include a non-real-time pipeline for analyzing data generated by CT scanner 6722. In at least one embodiment, a second pipeline may include CT reconstruction 6608 application and/or container, a coarse detection AI 6728 application and/or container, a fine detection AI 6732 application and/or container (e.g., where certain results are detected by coarse detection AI 6728), a visualization 6730 application and/or container, and a DICOM writer 6612 (and/or other data type writer, such as RIS, CIS, REST compliant, RPC, raw, etc.) application and/or container. In at least one embodiment, raw data generated by CT scanner 6722 may be passed through pipelines of deployment pipeline 6510C (instantiated as a virtual CT instrument) to generate results. In at least one embodiment, results from DICOM writer 6612 may be transmitted for display and/or may be stored on PACS server(s) 6604 for later retrieval, analysis, or display by a technician, practitioner, or other user.

FIG. 68A illustrates a data flow diagram for a process 6800 to train, retrain, or update a machine learning model, in accordance with at least one embodiment. In at least one embodiment, process 6800 may be executed using, as a non-limiting example, system 6500 of FIG. 65. In at least one embodiment, process 6800 may leverage services 6420 and/or hardware 6422 of system 6500, as described herein. In at least one embodiment, refined models 6812 generated by process 6800 may be executed by deployment system 6406 for one or more containerized applications in deployment pipelines 6510.

In at least one embodiment, model training 6414 may include retraining or updating an initial model 6804 (e.g., a pre-trained model) using new training data (e.g., new input data, such as customer dataset 6806, and/or new ground truth data associated with input data). In at least one embodiment, to retrain, or update, initial model 6804, output or loss layer(s) of initial model 6804 may be reset, or deleted, and/or replaced with an updated or new output or loss layer(s). In at least one embodiment, initial model 6804 may have previously fine-tuned parameters (e.g., weights and/or biases) that remain from prior training, so training or retraining 6414 may not take as long or require as much processing as training a model from scratch. In at least one embodiment, during model training 6414, by having reset or replaced output or loss layer(s) of initial model 6804, parameters may be updated and re-tuned for a new data set based on loss calculations associated with accuracy of output or loss layer(s) at generating predictions on new, customer dataset 6806 (e.g., image data 6408 of FIG. 64).

In at least one embodiment, pre-trained models 6506 may be stored in a data store, or registry (e.g., model registry 6424 of FIG. 64). In at least one embodiment, pre-trained models 6506 may have been trained, at least in part, at one or more facilities other than a facility executing process 6800. In at least one embodiment, to protect privacy and rights of patients, subjects, or clients of different facilities, pre-trained models 6506 may have been trained, on-premise, using customer or patient data generated on-premise. In at least one embodiment, pre-trained models 6506 may be trained using cloud 6526 and/or other hardware 6422, but confidential, privacy protected patient data may not be transferred to, used by, or accessible to any components of cloud 6526 (or other off premise hardware). In at least one embodiment, where a pre-trained model 6506 is trained at using patient data from more than one facility, pre-trained model 6506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 6506 on-premise and/or off premise, such as in a datacenter or other cloud computing infrastructure.

In at least one embodiment, when selecting applications for use in deployment pipelines 6510, a user may also select machine learning models to be used for specific applications. In at least one embodiment, a user may not have a model for use, so a user may select a pre-trained model 6506 to use with an application. In at least one embodiment, pre-trained model 6506 may not be optimized for generating accurate results on customer dataset 6806 of a facility of a user (e.g., based on patient diversity, demographics, types of medical imaging devices used, etc.). In at least one embodiment, prior to deploying pre-trained model 6506 into deployment pipeline 6510 for use with an application(s), pre-trained model 6506 may be updated, retrained, and/or fine-tuned for use at a respective facility.

In at least one embodiment, a user may select pre-trained model 6506 that is to be updated, retrained, and/or fine-tuned, and pre-trained model 6506 may be referred to as initial model 6804 for training system 6404 within process 6800. In at least one embodiment, customer dataset 6806 (e.g., imaging data, genomics data, sequencing data, or other data types generated by devices at a facility) may be used to perform model training 6414 (which may include, without limitation, transfer learning) on initial model 6804 to generate refined model 6812. In at least one embodiment, ground truth data corresponding to customer dataset 6806 may be generated by training system 6404. In at least one embodiment, ground truth data may be generated, at least in part, by clinicians, scientists, doctors, practitioners, at a facility (e.g., as labeled clinic data 6412 of FIG. 64).

In at least one embodiment, AI-assisted annotation 6410 may be used in some examples to generate ground truth data. In at least one embodiment, AI-assisted annotation 6410 (e.g., implemented using an AI-assisted annotation SDK) may leverage machine learning models (e.g., neural networks) to generate suggested or predicted ground truth data for a customer dataset. In at least one embodiment, user 6810 may use annotation tools within a user interface (a graphical user interface (GUI)) on computing device 6808.

In at least one embodiment, user 6810 may interact with a GUI via computing device 6808 to edit or fine-tune annotations or auto-annotations. In at least one embodiment, a polygon editing feature may be used to move vertices of a polygon to more accurate or fine-tuned locations.

In at least one embodiment, once customer dataset 6806 has associated ground truth data, ground truth data (e.g., from AI-assisted annotation, manual labeling, etc.) may be used by during model training 6414 to generate refined model 6812. In at least one embodiment, customer dataset 6806 may be applied to initial model 6804 any number of times, and ground truth data may be used to update parameters of initial model 6804 until an acceptable level of accuracy is attained for refined model 6812. In at least one embodiment, once refined model 6812 is generated, refined model 6812 may be deployed within one or more deployment pipelines 6510 at a facility for performing one or more processing tasks with respect to medical imaging data.

In at least one embodiment, refined model 6812 may be uploaded to pre-trained models 6506 in model registry 6424 to be selected by another facility. In at least one embodiment, his process may be completed at any number of facilities such that refined model 6812 may be further refined on new datasets any number of times to generate a more universal model.

FIG. 68B is an example illustration of a client-server architecture 6832 to enhance annotation tools with pre-trained annotation models, in accordance with at least one embodiment. In at least one embodiment, AI-assisted annotation tools 6836 may be instantiated based on a client-server architecture 6832. In at least one embodiment, annotation tools 6836 in imaging applications may aid radiologists, for example, identify organs and abnormalities. In at least one embodiment, imaging applications may include software tools that help user 6810 to identify, as a non-limiting example, a few extreme points on a particular organ of interest in raw images 6834 (e.g., in a 3D MM or CT scan) and receive auto-annotated results for all 2D slices of a particular organ. In at least one embodiment, results may be stored in a data store as training data 6838 and used as (for example and without limitation) ground truth data for training. In at least one embodiment, when computing device 6808 sends extreme points for AI-assisted annotation 6410, a deep learning model, for example, may receive this data as input and return inference results of a segmented organ or abnormality. In at least one embodiment, pre-instantiated annotation tools, such as AI-Assisted Annotation Tool 6836B in FIG. 68B, may be enhanced by making API calls (e.g., API Call 6844) to a server, such as an Annotation Assistant Server 6840 that may include a set of pre-trained models 6842 stored in an annotation model registry, for example. In at least one embodiment, an annotation model registry may store pre-trained models 6842 (e.g., machine learning models, such as deep learning models) that are pre-trained to perform AI-assisted annotation on a particular organ or abnormality. In at least one embodiment, these models may be further updated by using training pipelines 6504. In at least one embodiment, pre-installed annotation tools may be improved over time as new labeled clinic data 6412 is added.

Inference and/or training logic 3515 are used to perform inferencing and/or training operations associated with one or more embodiments. Details regarding inference and/or training logic 3515 are provided herein in conjunction with FIGS. 35A and/or 35B.

Figure 69:
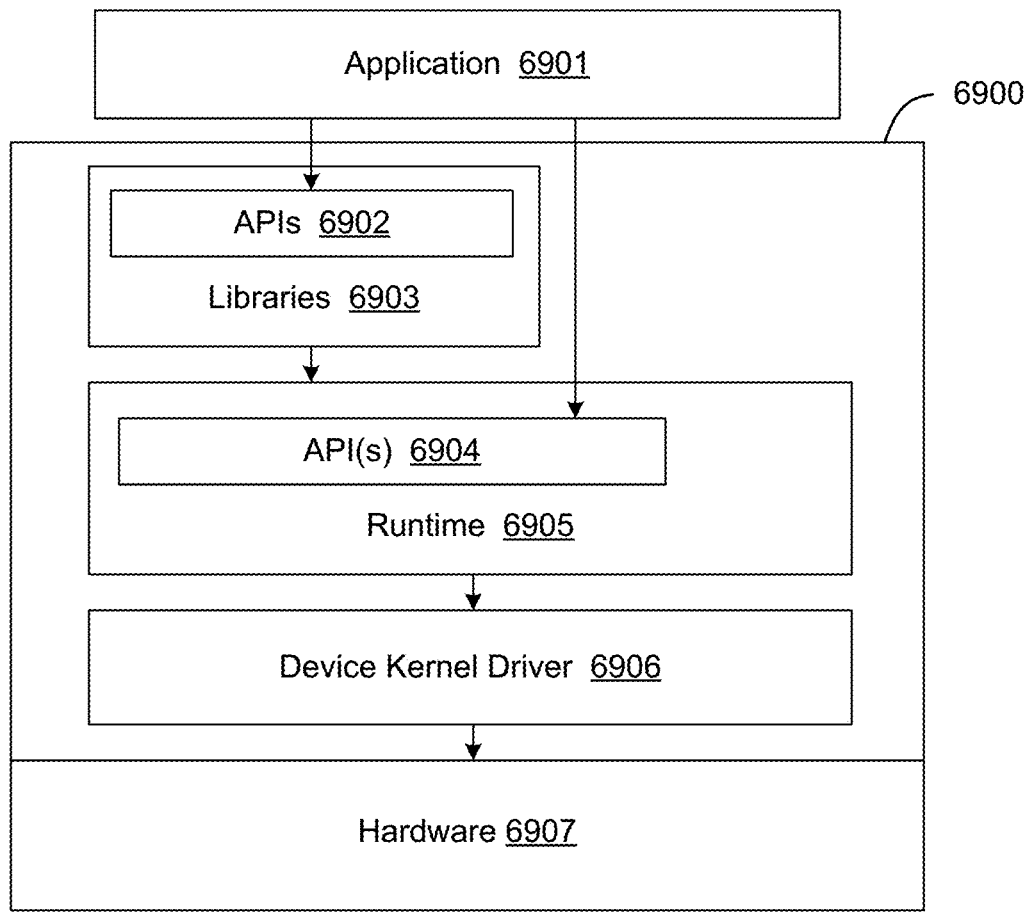
FIG. 69 illustrates a software stack of a programming platform, in accordance with at least one embodiment.

FIG. 69 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 6900 of a programming platform provides an execution environment for an application 6901. In at least one embodiment, application 6901 may include any computer software capable of being launched on software stack 6900. In at least one embodiment, application 6901 may include, but is not limited to, an artificial intelligence ("AI")/machine learning ("ML") application, a high performance computing ("HPC") application, a virtual desktop infrastructure ("VDI"), or a data center workload.

In at least one embodiment, application 6901 and software stack 6900 run on hardware 6907. Hardware 6907 may include one or more GPUs, CPUs, FPGAs, AI engines, and/or other types of compute devices that support a programming platform, in at least one embodiment. In at least one embodiment, such as with CUDA, software stack 6900 may be vendor specific and compatible with only devices from particular vendor(s). In at least one embodiment, such as in with OpenCL, software stack 6900 may be used with devices from different vendors. In at least one embodiment, hardware 6907 includes a host connected to one more devices that can be accessed to perform computational tasks via application programming interface ("API") calls. A device within hardware 6907 may include, but is not limited to, a GPU, FPGA, AI engine, or other compute device (but may also include a CPU) and its memory, as opposed to a host within hardware 6907 that may include, but is not limited to, a CPU (but may also include a compute device) and its memory, in at least one embodiment.

In at least one embodiment, software stack 6900 of a programming platform includes, without limitation, a number of libraries 6903, a runtime 6905, and a device kernel driver 6906. Each of libraries 6903 may include data and programming code that can be used by computer programs and leveraged during software development, in at least one embodiment. In at least one embodiment, libraries 6903 may include, but are not limited to, pre-written code and subroutines, classes, values, type specifications, configuration data, documentation, help data, and/or message templates. In at least one embodiment, libraries 6903 include functions that are optimized for execution on one or more types of devices. In at least one embodiment, libraries 6903 may include, but are not limited to, functions for performing mathematical, deep learning, and/or other types of operations on devices. In at least one embodiment, libraries 7003 are associated with corresponding APIs 7002, which may include one or more APIs, that expose functions implemented in libraries 7003.

In at least one embodiment, application 6901 is written as source code that is compiled into executable code, as discussed in greater detail below in conjunction with FIG. 74. Executable code of application 6901 may run, at least in part, on an execution environment provided by software stack 6900, in at least one embodiment. In at least one embodiment, during execution of application 6901, code may be reached that needs to run on a device, as opposed to a host. In such a case, runtime 6905 may be called to load and launch requisite code on a device, in at least one embodiment. In at least one embodiment, runtime 6905 may include any technically feasible runtime system that is able to support execution of application S01.

In at least one embodiment, runtime 6905 is implemented as one or more runtime libraries associated with corresponding APIs, which are shown as API(s) 6904. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 6904 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 6906 is configured to facilitate communication with an underlying device. In at least one embodiment, device kernel driver 6906 may provide low-level functionalities upon which APIs, such as API(s) 6904, and/or other software relies. In at least one embodiment, device kernel driver 6906 may be configured to compile intermediate representation ("IR") code into binary code at runtime. For CUDA, device kernel driver 6906 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 6906 to compile IR code at runtime.

Figure 70:
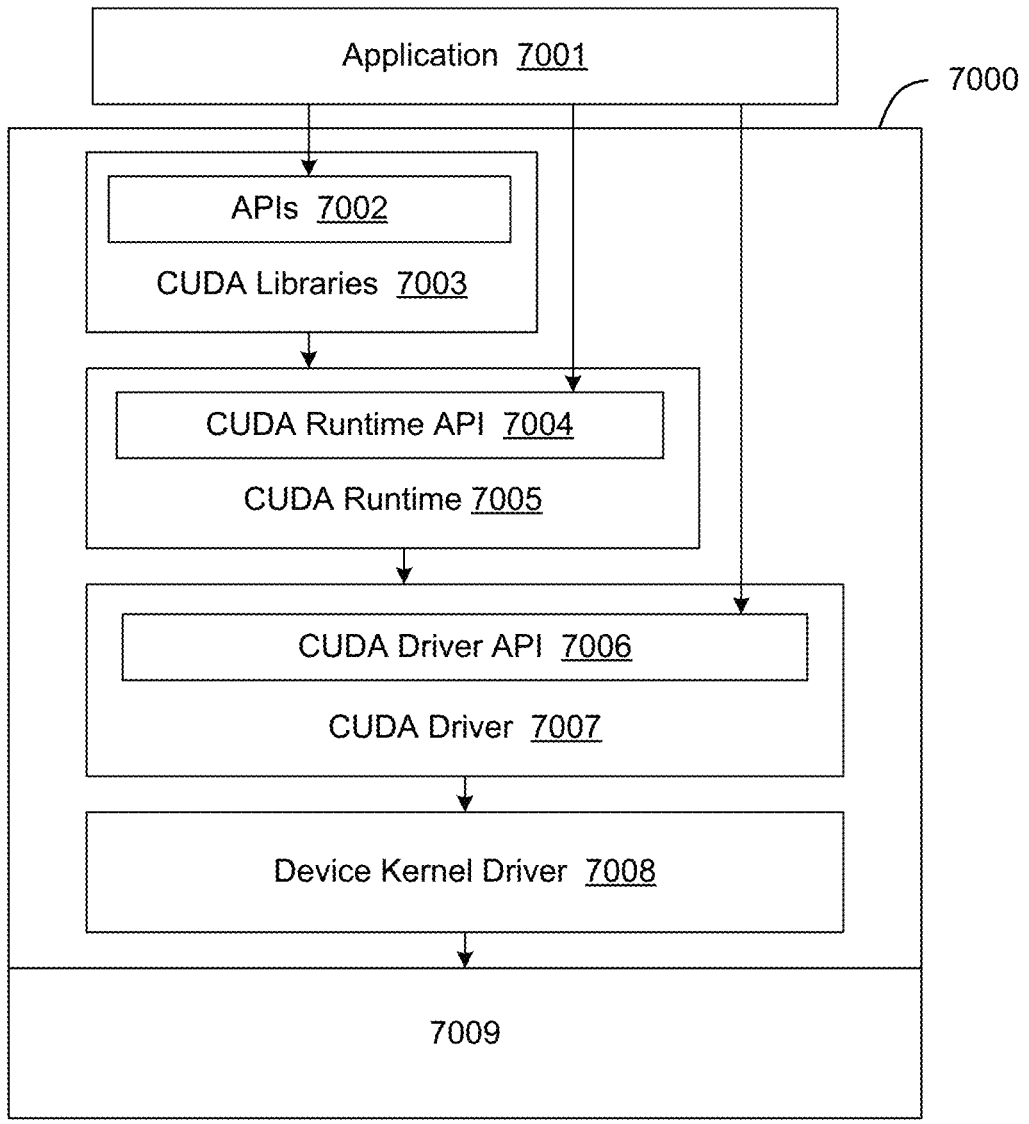
FIG. 70 illustrates a CUDA implementation of a software stack of FIG. 69, in accordance with at least one embodiment.

FIG. 70 illustrates a CUDA implementation of software stack 6900 of FIG. 69, in accordance with at least one embodiment. In at least one embodiment, a CUDA software stack 7000, on which an application 7001 may be launched, includes CUDA libraries 7003, a CUDA runtime 7005, a CUDA driver 7007, and a device kernel driver 7008. In at least one embodiment, CUDA software stack 7000 executes on hardware 7009, which may include a GPU that supports CUDA and is developed by NVIDIA Corporation of Santa Clara, CA.

In at least one embodiment, application 7001, CUDA runtime 7005, and device kernel driver 7008 may perform similar functionalities as application 6901, runtime 6905, and device kernel driver 6906, respectively, which are described above in conjunction with FIG. 69. In at least one embodiment, CUDA driver 7007 includes a library (libcuda.so) that implements a CUDA driver API 7006. Similar to a CUDA runtime API 7004 implemented by a CUDA runtime library (cudart), CUDA driver API 7006 may, without limitation, expose functions for memory management, execution control, device management, error handling, synchronization, and/or graphics interoperability, among other things, in at least one embodiment. In at least one embodiment, CUDA driver API 7006 differs from CUDA runtime API 7004 in that CUDA runtime API 7004 simplifies device code management by providing implicit initialization, context (analogous to a process) management, and module (analogous to dynamically loaded libraries) management. In contrast to high-level CUDA runtime API 7004, CUDA driver API 7006 is a low-level API providing more fine-grained control of a device, particularly with respect to contexts and module loading, in at least one embodiment. In at least one embodiment, CUDA driver API 7006 may expose functions for context management that are not exposed by CUDA runtime API 7004. In at least one embodiment, CUDA driver API 7006 is also language-independent and supports, e.g., OpenCL in addition to CUDA runtime API 7004. Further, in at least one embodiment, development libraries, including CUDA runtime 7005, may be considered as separate from driver components, including user-mode CUDA driver 7007 and kernel-mode device driver 7008 (also sometimes referred to as a "display" driver).

In at least one embodiment, CUDA libraries 7003 may include, but are not limited to, mathematical libraries, deep learning libraries, parallel algorithm libraries, and/or signal/image/video processing libraries, which parallel computing applications such as application 7001 may utilize. In at least one embodiment, CUDA libraries 7003 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 7003 may include deep learning libraries such as a cuDNN library of primitives for deep neural networks and a TensorRT platform for high-performance deep learning inference, among others.

Figure 71:
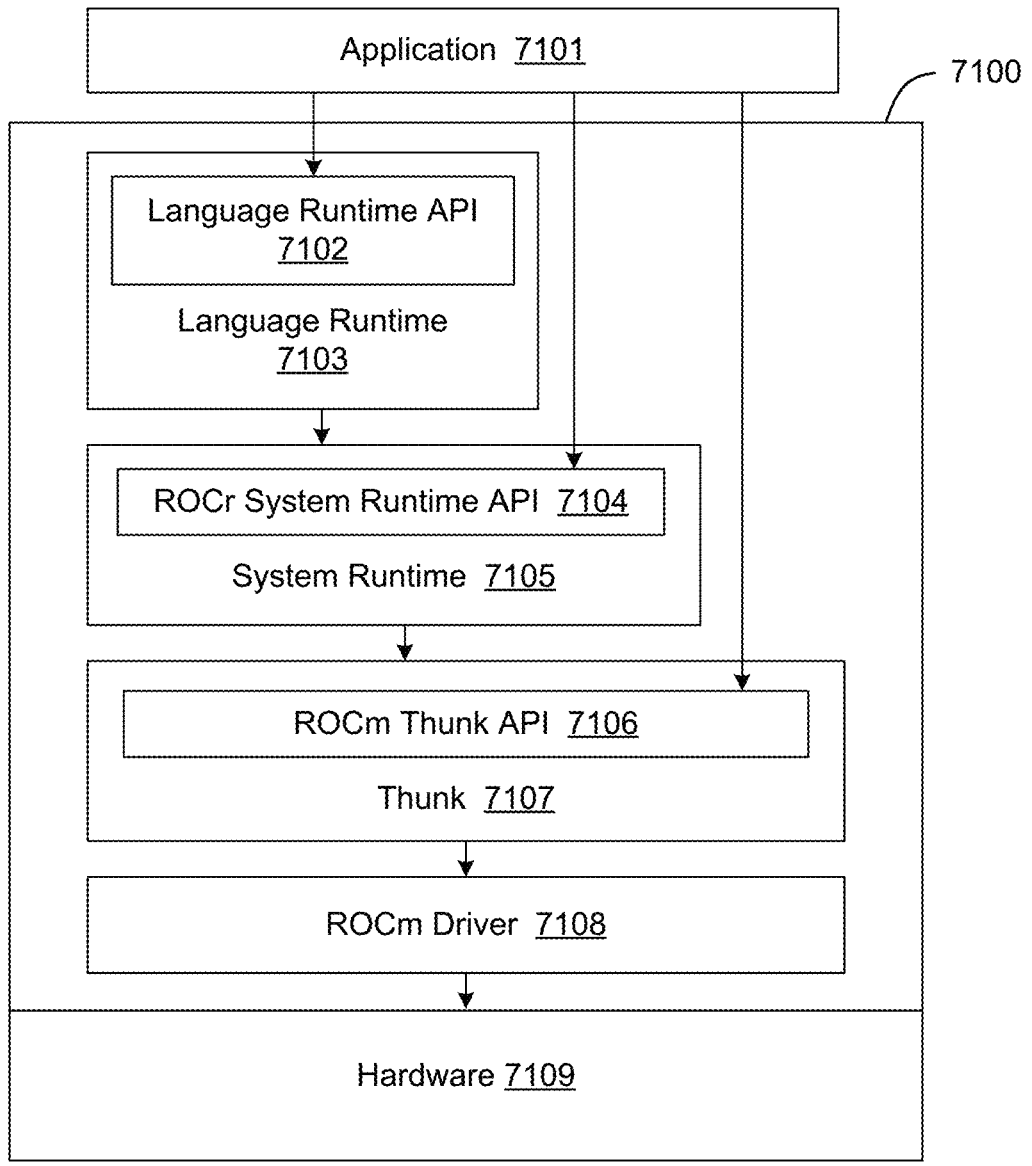
FIG. 71 illustrates a ROCm implementation of a software stack of FIG. 69, in accordance with at least one embodiment.

FIG. 71 illustrates a ROCm implementation of software stack 6900 of FIG. 69, in accordance with at least one embodiment. In at least one embodiment, a ROCm software stack 7100, on which an application 7101 may be launched, includes a language runtime 7103, a system runtime 7105, a thunk 7107, a ROCm kernel driver 7108, and a device kernel driver 7109. In at least one embodiment, ROCm software stack 7100 executes on hardware 7110, which may include a GPU that supports ROCm and is developed by AMD Corporation of Santa Clara, CA.

In at least one embodiment, application 7101 may perform similar functionalities as application 6901 discussed above in conjunction with FIG. 69. In addition, language runtime 7103 and system runtime 7105 may perform similar functionalities as runtime 6905 discussed above in conjunction with FIG. 69, in at least one embodiment. In at least one embodiment, language runtime 7103 and system runtime 7105 differ in that system runtime 7105 is a language-independent runtime that implements a ROCr system runtime API 7104 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 7105, language runtime 7103 is an implementation of a language-specific runtime API 7102 layered on top of ROCr system runtime API 7104, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 7004 discussed above in conjunction with FIG. 70, such as functions for memory management, execution control, device management, error handling, and synchronization, among other things.

In at least one embodiment, thunk (ROCt) 7107 is an interface that can be used to interact with underlying ROCm driver 7108. In at least one embodiment, ROCm driver 7108 is a ROCk driver, which is a combination of an AMDGPU driver and a HAS kernel driver (amdkfd). In at least one embodiment, AMDGPU driver is a device kernel driver for GPUs developed by AMD that performs similar functionalities as device kernel driver 6906 discussed above in conjunction with FIG. 69. In at least one embodiment, HAS kernel driver is a driver permitting different types of processors to share system resources more effectively via hardware features.

In at least one embodiment, various libraries (not shown) may be included in ROCm software stack 7100 above language runtime 7103 and provide functionality similarity to CUDA libraries 7003, discussed above in conjunction with FIG. 70. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 72:
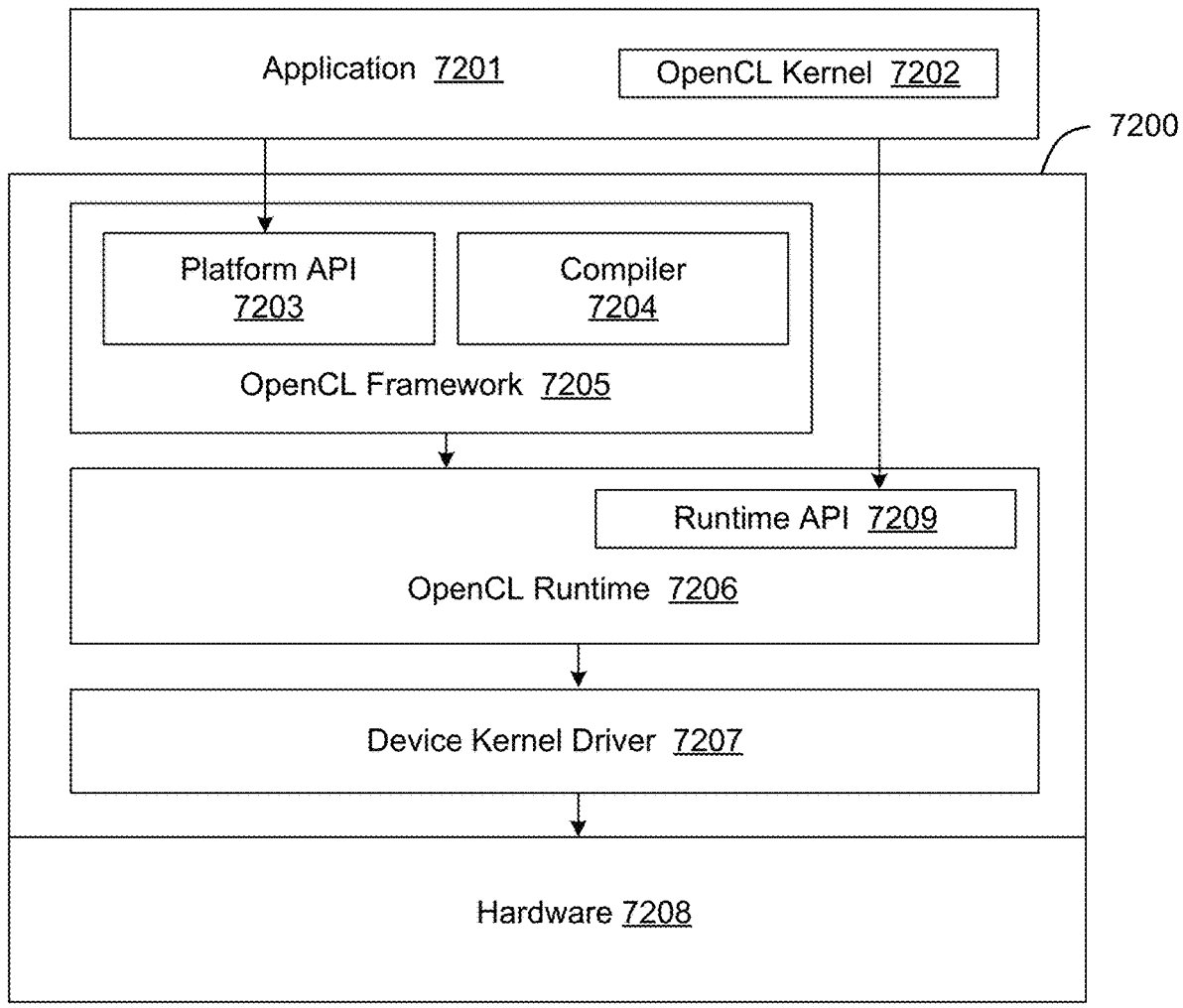
FIG. 72 illustrates an OpenCL implementation of a software stack of FIG. 69, in accordance with at least one embodiment.

FIG. 72 illustrates an OpenCL implementation of software stack 6900 of FIG. 69, in accordance with at least one embodiment. In at least one embodiment, an OpenCL software stack 7200, on which an application 7201 may be launched, includes an OpenCL framework 7205, an OpenCL runtime 7206, and a driver 7207. In at least one embodiment, OpenCL software stack 7200 executes on hardware 7009 that is not vendor-specific. As OpenCL is supported by devices developed by different vendors, specific OpenCL drivers may be required to interoperate with hardware from such vendors, in at least one embodiment.

In at least one embodiment, application 7201, OpenCL runtime 7206, device kernel driver 7207, and hardware 7208 may perform similar functionalities as application 6901, runtime 6905, device kernel driver 6906, and hardware 6907, respectively, that are discussed above in conjunction with FIG. 69. In at least one embodiment, application 7201 further includes an OpenCL kernel 7202 with code that is to be executed on a device.

In at least one embodiment, OpenCL defines a "platform" that allows a host to control devices connected to a host. In at least one embodiment, an OpenCL framework provides a platform layer API and a runtime API, shown as platform API 7203 and runtime API 7209. In at least one embodiment, runtime API 7209 uses contexts to manage execution of kernels on devices. In at least one embodiment, each identified device may be associated with a respective context, which runtime API 7209 may use to manage command queues, program objects, and kernel objects, share memory objects, among other things, for that device. In at least one embodiment, platform API 7203 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 7204 is also included in OpenCL framework 7205. Source code may be compiled offline prior to executing an application or online during execution of an application, in at least one embodiment. In contrast to CUDA and ROCm, OpenCL applications in at least one embodiment may be compiled online by compiler 7204, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

Figure 73:
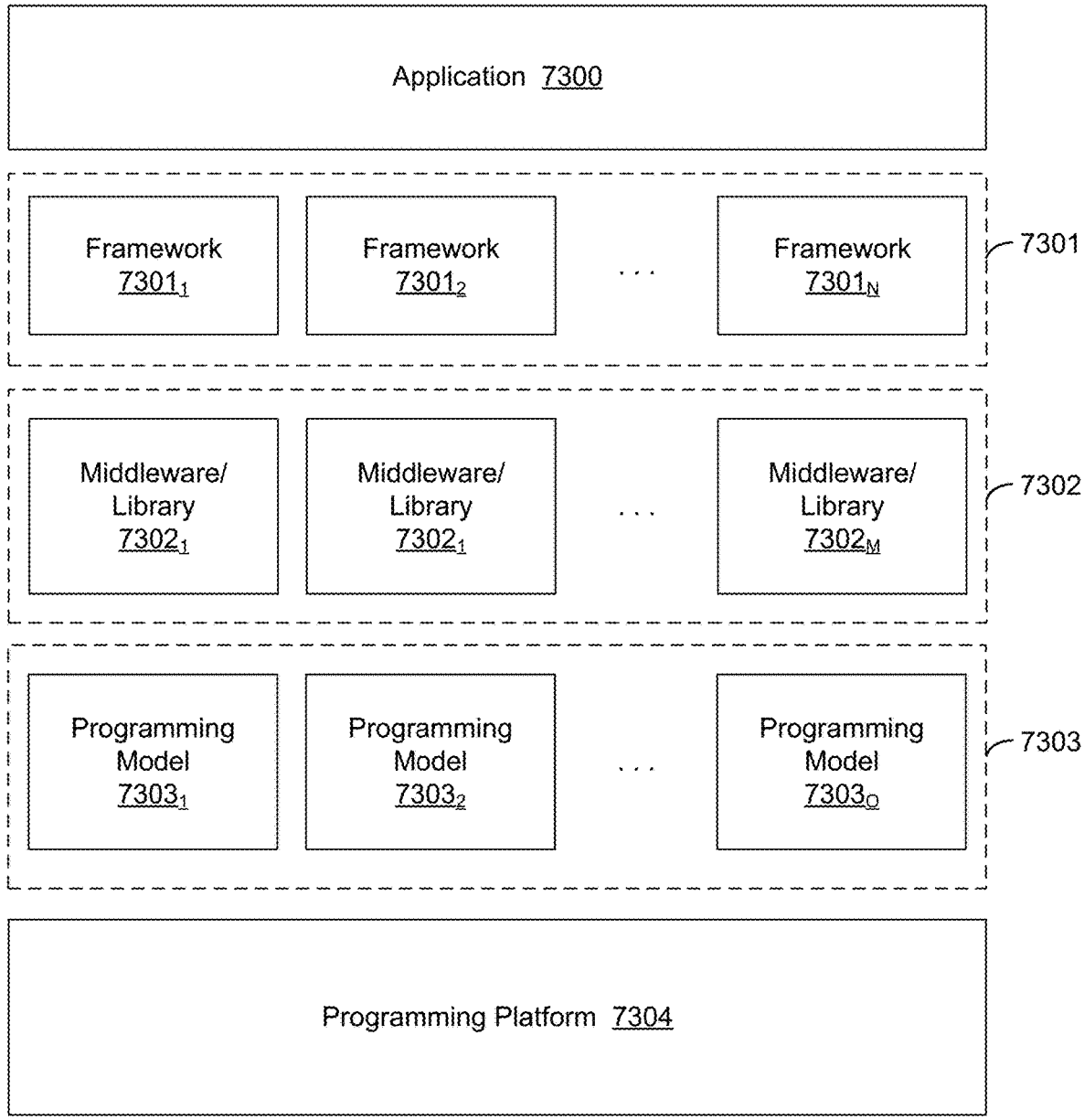
FIG. 73 illustrates software that is supported by a programming platform, in accordance with at least one embodiment.

FIG. 73 illustrates software that is supported by a programming platform, in accordance with at least one embodiment. In at least one embodiment, a programming platform 7304 is configured to support various programming models 7303, middlewares and/or libraries 7302, and frameworks 7301 that an application 7300 may rely upon. In at least one embodiment, application 7300 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 7304 may be one of a CUDA, ROCm, or OpenCL platform described above in conjunction with FIG. 70, FIG. 71, and FIG. 72, respectively. In at least one embodiment, programming platform 7304 supports multiple programming models 7303, which are abstractions of an underlying computing system permitting expressions of algorithms and data structures. Programming models 7303 may expose features of underlying hardware in order to improve performance, in at least one embodiment. In at least one embodiment, programming models 7303 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 7302 provide implementations of abstractions of programming models 7304. In at least one embodiment, such libraries include data and programming code that may be used by computer programs and leveraged during software development. In at least one embodiment, such middlewares include software that provides services to applications beyond those available from programming platform 7304. In at least one embodiment, libraries and/or middlewares 7302 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 7302 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 7301 depend on libraries and/or middlewares 7302. In at least one embodiment, each of application frameworks 7301 is a software framework used to implement a standard structure of application software. An AI/ML application may be implemented using a framework such as Caffe, Caffe2, TensorFlow, Keras, PyTorch, or MxNet deep learning frameworks, in at least one embodiment.

Figure 74:
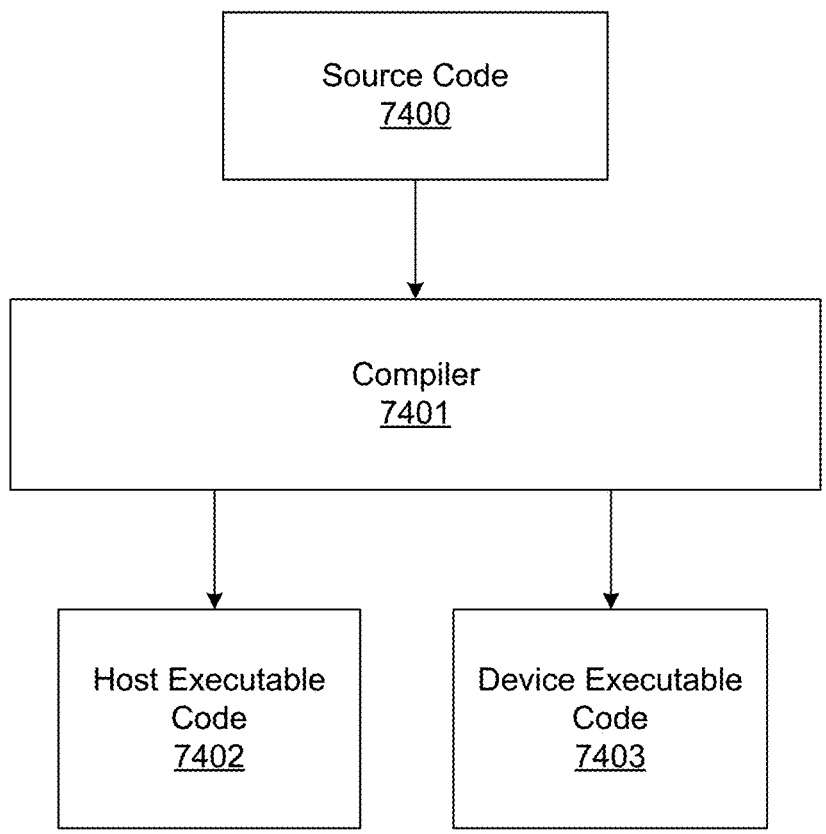
FIG. 74 illustrates compiling code to execute on programming platforms of FIGS. 69-72, in accordance with at least one embodiment.

FIG. 74 illustrates compiling code to execute on one of programming platforms of FIGS. 69-72, in accordance with at least one embodiment. In at least one embodiment, a compiler 7401 receives source code 7400 that includes both host code as well as device code. In at least one embodiment, complier 7401 is configured to convert source code 7400 into host executable code 7402 for execution on a host and device executable code 7403 for execution on a device. In at least one embodiment, source code 7400 may either be compiled offline prior to execution of an application, or online during execution of an application.

In at least one embodiment, source code 7400 may include code in any programming language supported by compiler 7401, such as C++, C, Fortran, etc. In at least one embodiment, source code 7400 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 7400 may include multiple source code files, rather than a single-source file, into which host code and device code are separated.

In at least one embodiment, compiler 7401 is configured to compile source code 7400 into host executable code 7402 for execution on a host and device executable code 7403 for execution on a device. In at least one embodiment, compiler 7401 performs operations including parsing source code 7400 into an abstract system tree (AST), performing optimizations, and generating executable code. In at least one embodiment in which source code 7400 includes a single-source file, compiler 7401 may separate device code from host code in such a single-source file, compile device code and host code into device executable code 7403 and host executable code 7402, respectively, and link device executable code 7403 and host executable code 7402 together in a single file.

In at least one embodiment, host executable code 7402 and device executable code 7403 may be in any suitable format, such as binary code and/or IR code. In a case of CUDA, host executable code 7402 may include native object code and device executable code 7403 may include code in PTX intermediate representation, in at least one embodiment. In a case of ROCm, both host executable code 7402 and device executable code 7403 may include target binary code, in at least one embodiment.

Figure 75:
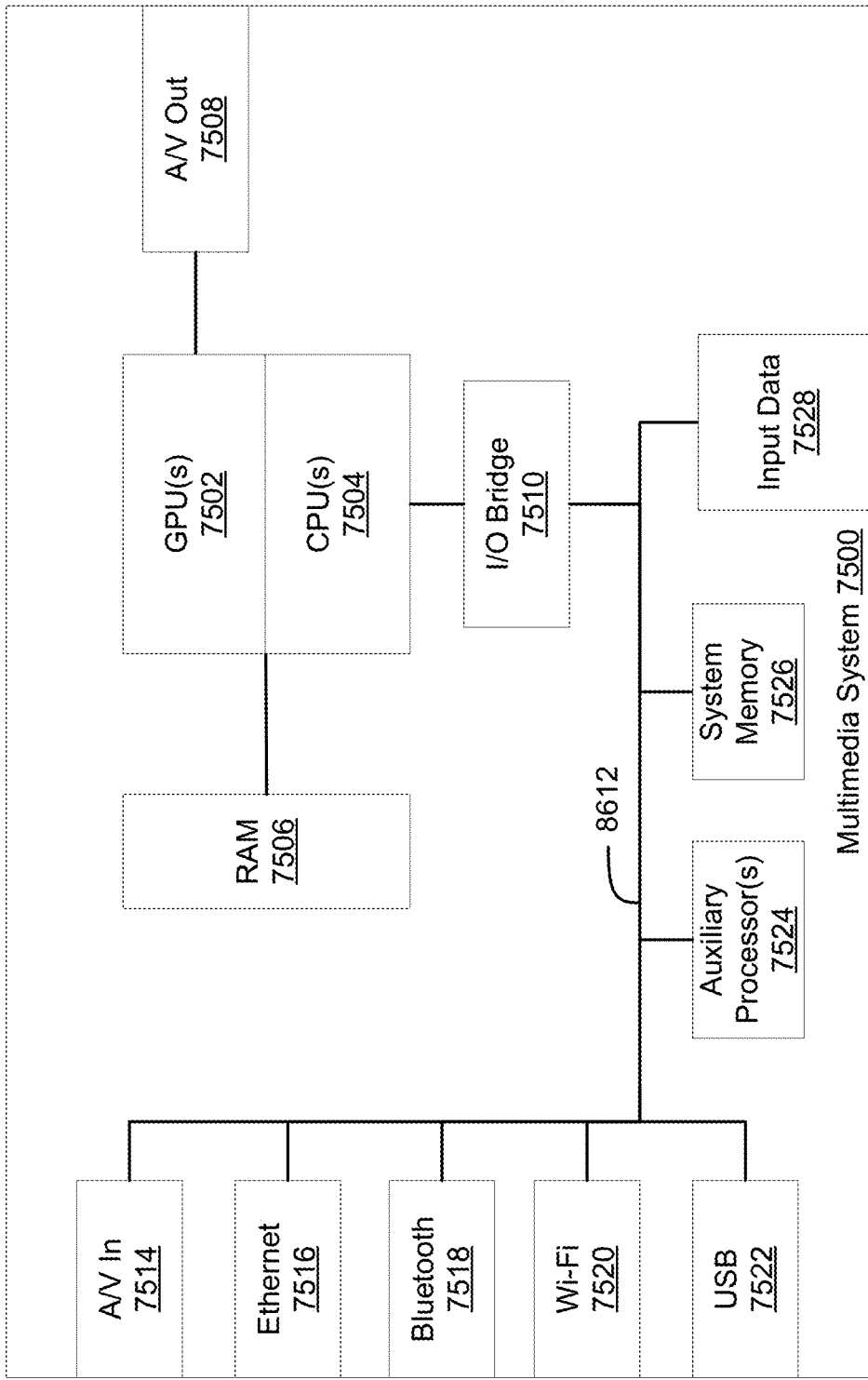
FIG. 75 illustrates a multimedia system, in accordance with at least one embodiment.

FIG. 75 illustrates a multimedia system, according to at least one embodiment. In at least one embodiment, a multimedia system is referred to as a gaming system, multimedia console, gaming console, and/or variations thereof. In at least one embodiment, FIG. 75 illustrates an overall system architecture of a computer game processing apparatus.

In at least one embodiment, multimedia system 7500 comprises graphics processing units (GPUs) 7502. In at least one embodiment, GPU(s) 7502, optionally in conjunction with CPU(s) 7504, generates video images and audio for output via audio/video (A/V) output 7508. In at least one embodiment, audio is generated in conjunction with or instead by an audio processor. In at least one embodiment, GPU(s) 7502 utilize a video encoder/video codec (e.g., coder/decoder) to form a video processing pipeline for graphics processing. In at least one embodiment, data is provided from GPU(s) 7502 to a video encoder/video codec and output to A/V output 7508 for transmission to a display. In at least one embodiment, GPU(s) 7502 is connected to one or more memory controllers to facilitate access to various types of memory, such as random access memory (RAM) 7506.

In at least one embodiment, GPU(s) 7502 is part of a processing unit comprising central processing units (CPUs)

7504. In at least one embodiment, GPU(s) 7502 and CPU(s) 7504 are part of an accelerated processing unit (APU). In at least one embodiment, CPU(s) 7504 comprise at least a level 1 cache, level 2 cache, and memory. In at least one embodiment, a level 1 cache and a level 2 cache temporarily store data and reduce a number of memory access cycles. In at least one embodiment, CPU(s) 7504 comprise at least one or more cores and one or more level caches. In at least one embodiment, memory of CPU(s) 7504 store executable code that is loaded during a boot process, such as when multimedia system 7500 is powered on.

In at least one embodiment, GPU(s) 7502 and CPU(s) 7504 communicate with bus 7512, optionally via input/output (I/O) bridge 7510, which may be a discreet component or part of GPU(s) 7502 and CPU(s) 7504. In at least one embodiment, data storage components such as system memory 7526, and input data 7528 are connected to bus 7512. In at least one embodiment, RAM 7506 also communicates with bus 7512. In at least one embodiment, auxiliary processor(s) 7524 are connected to bus 7512. In at least one embodiment, auxiliary processor(s) 7524 are provided to run or support one or more software, software applications, operating systems, and/or variations thereof executed in connection with multimedia system 7500.

In at least one embodiment, system memory 7526 stores application data that is loaded during a boot process. In at least one embodiment, input data 7528 comprises a DVD/CD drive, Blu-ray drive, hard drive, or other removable media drive. In at least one embodiment, input data 7528 is external or internal to multimedia system 7500. In at least one embodiment, application data is accessed via input data 7528 for execution, playback, and/or variations thereof. In at least one embodiment, input data 7528 is connected to I/O bridge 7510 via bus 7512.

In at least one embodiment, one or more components of multimedia system 7500 are connected via one or more buses, including serial and parallel buses, a memory bus, a peripheral bus, and a processor or local bus using various bus architectures, such as Peripheral Components Interconnects (PCI) bus, PCI-Express bus, and/or variations thereof. In at least one embodiment, multimedia system 7500 communicates with peripheral devices as appropriate via an audio/visual (A/V) input port 7514, Ethernet port 7516, Bluetooth wireless link 7518, Wi-Fi wireless link 7520, or one or more universal serial bus (USB) ports 7522. In at least one embodiment, audio and video are output via A/V output 7508, such as an HDMI port.

In at least one embodiment, video and optionally audio of multimedia system 7500 are output to one or more display devices through A/V output 7508. In at least one embodiment, display devices include devices such as a television, electronic display, computer monitor, and/or variations thereof. In at least one embodiment, video is presented in various forms, such as stereoscopic. In at least one embodiment, audio is presented through one or more audio devices in one of a number of formats such as stereo, 5.1 surround sound or 7.1 surround sound. In at least one embodiment, video and audio is presented to a head mounted display unit, such as a virtual reality device, worn by a user.

In at least one embodiment, upon boot of multimedia system 7500, application data is loaded from system memory 7526 into one or more memory and/or caches of CPU(s) 7504 and executed on CPU(s) 7504. In at least one embodiment, an application presents a graphical user interface that provides a user experience when navigating to different services available on multimedia system 7500. In at least one embodiment, applications, media, and/or variations thereof of input data 7528 are launched or played from input data 7528 to provide additional functionalities, applications, media, and/or variations thereof to multimedia system 7500. In at least one embodiment, multimedia system 7500 is configured to execute an executable program associated with a computer game in accordance with application data from system memory 7526 and input data 7528.

Figure 76:
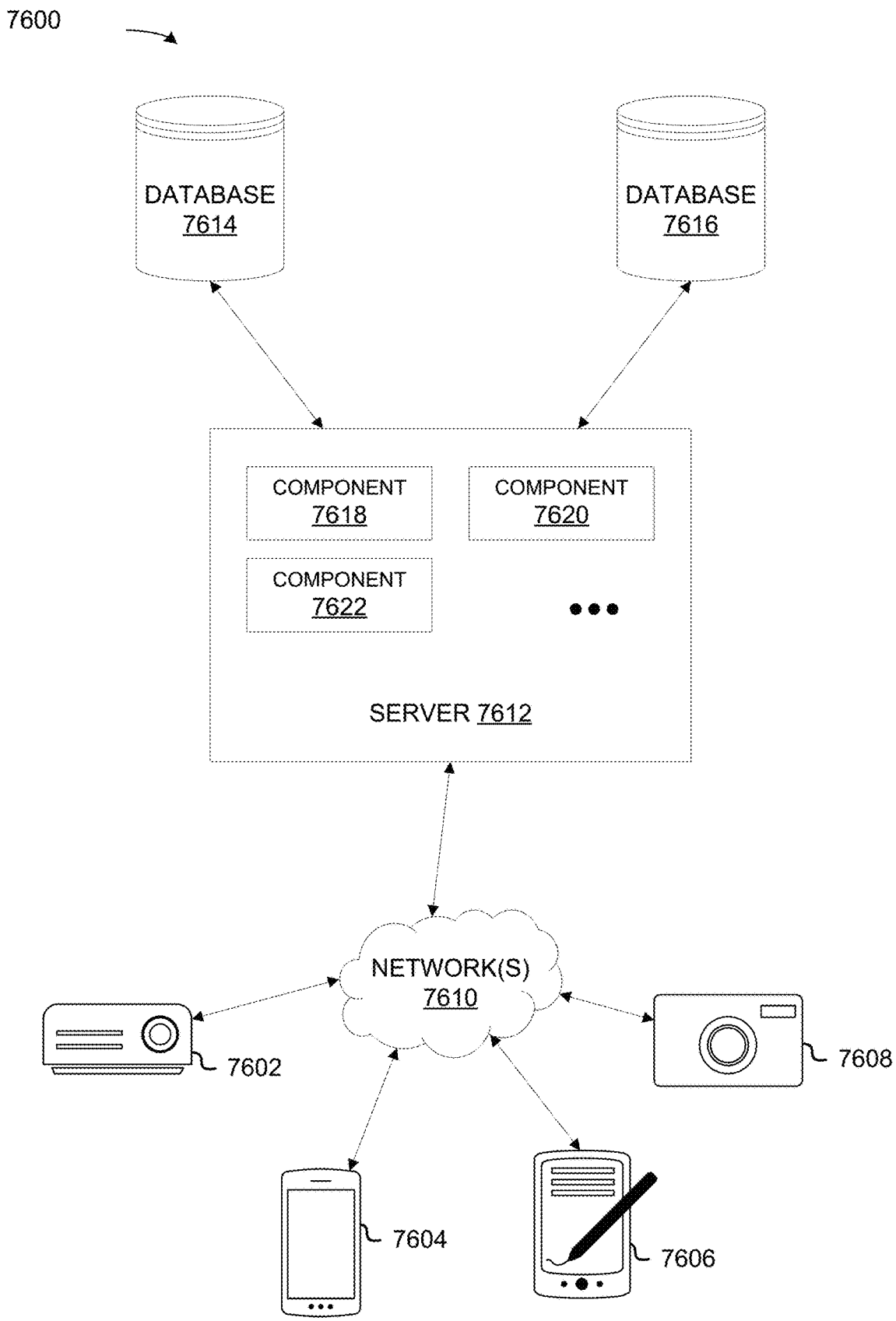
FIG. 76 illustrates a distributed system, in accordance with at least one embodiment.

FIG. 76 illustrates a distributed system 7600, in accordance with at least one embodiment. In at least one embodiment, distributed system 7600 includes one or more client computing devices 7602, 7604, 7606, and 7608, which are configured to execute and operate a client application such as a web browser, proprietary client, and/or variations thereof over one or more network(s) 7610. In at least one embodiment, server 7612 may be communicatively coupled with remote client computing devices 7602, 7604, 7606, and 7608 via network 7610.

In at least one embodiment, server 7612 may be adapted to run one or more services or software applications such as services and applications that may manage session activity of single sign-on (SSO) access across multiple data centers. In at least one embodiment, server 7612 may also provide other services or software applications can include non-virtual and virtual environments. In at least one embodiment, these services may be offered as web-based or cloud services or under a Software as a Service (SaaS) model to users of client computing devices 7602, 7604, 7606, and/or 7608. In at least one embodiment, users operating client computing devices 7602, 7604, 7606, and/or 7608 may in turn utilize one or more client applications to interact with server 7612 to utilize services provided by these components. In at least one embodiment, distributed system 7600 performs process 900 (see FIG. 9A) or process 906 (see FIG. 9B).

In at least one embodiment, software components 7618, 7620 and 7622 of system 7600 are implemented on server 7612. In at least one embodiment, one or more components of system 7600 and/or services provided by these components may also be implemented by one or more of client computing devices 7602, 7604, 7606, and/or 7608. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 7600. The embodiment shown in FIG. 76 is thus one example of a distributed system for implementing an embodiment system and is not intended to be limiting.

In at least one embodiment, client computing devices 7602, 7604, 7606, and/or 7608 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 7610. Although distributed system 7600 in FIG. 76 is shown with four client computing devices, any number of client computing devices may be supported. Other devices, such as devices with sensors, etc., may interact with server 7612.

In at least one embodiment, network(s) 7610 in distributed system 7600 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 7610 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 7612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 7612 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 7612 using software defined networking. In at least one embodiment, server 7612 may be adapted to run one or more services or software applications. In at least one embodiment, server 7612 comprises one or more hardware and/or software components that implement a neural network such as those described in connection with FIG. 77-FIG. 81. In at least one embodiment, server 7612 comprises one or more neural networks, which are referred to as deep learning super sampling networks, which generate high quality versions of input frames (e.g., rendered frames of a computer graphics program, such as a video game program).

In at least one embodiment, server 7612 may run any operating system, as well as any commercially available server operating system. In at least one embodiment, server 7612 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 7612 may include one or more applications to analyze and consolidate data feeds and/or event updates received from users of client computing devices 7602, 7604, 7606, and 7608. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 7612 may also include one or more applications to display data feeds and/or real-time events via one or more display devices of client computing devices 7602, 7604, 7606, and 7608.

In at least one embodiment, distributed system 7600 may also include one or more databases 7614 and 7616. In at least one embodiment, databases may provide a mechanism for storing information such as user interactions information, usage patterns information, adaptation rules information, and other information. In at least one embodiment, databases 7614 and 7616 may reside in a variety of locations. In at least one embodiment, one or more of databases 7614 and 7616 may reside on a non-transitory storage medium local to (and/or resident in) server 7612. In at least one embodiment, databases 7614 and 7616 may be remote from server 7612 and in communication with server 7612 via a network-based or dedicated connection. In at least one embodiment, databases 7614 and 7616 may reside in a storage-area network (SAN). In at least one embodiment, any necessary files for performing functions attributed to server 7612 may be stored locally on server 7612 and/or remotely, as appropriate. In at least one embodiment, databases 7614 and 7616 may include relational databases, such as databases that are adapted to store, update, and retrieve data in response to SQL-formatted commands.

Figure 77:
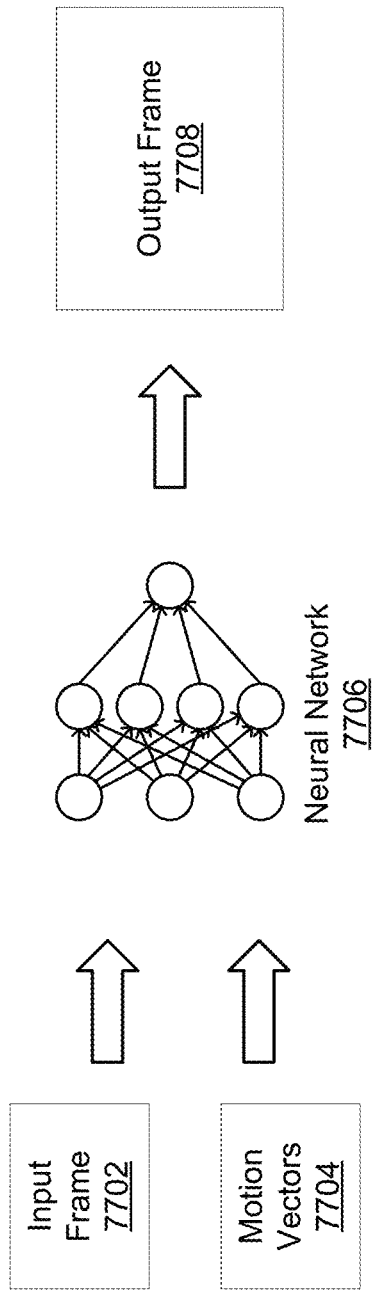
FIG. 77 illustrates a super sampling neural network, in accordance with at least one embodiment.

FIG. 77 illustrates a super sampling neural network, in accordance with at least one embodiment. In at least one embodiment, a neural network 7706 is referred to as a super sampling neural network, deep learning super sampling (DLSS) network, super sampling network, and/or variations thereof. In at least one embodiment, an input frame 7702 and motion vectors 7704 are processed by a neural network 7706 to generate an output frame 7708. In at least one embodiment, neural networks such as those described in connection with FIG. 77-81 are DLSS networks. In at least one embodiment, neural network 7706 is used to perform part of process 900 (see FIG. 9A) or process 906 (see FIG. 9B), e.g., if a rendered or provided image is part of DLSS in image processing.

In at least one embodiment, an input frame 7702 is an image. In at least one embodiment, an input frame 7702 is a computer generated image that is generated by one or more computer graphics programs or software. In at least one embodiment, an input frame 7702 is an image that is captured from one or more image capturing devices, such as a camera. In at least one embodiment, an input frame 7702 is a frame of a set of frames of a video. In at least one embodiment, an input frame 7702 is a frame of a video that is captured from one or more video capturing devices, such as a video camera. In at least one embodiment, an input frame 7702 is a frame of a computer generated video that is generated by one or more computer graphics programs or software.

In at least one embodiment, an input frame 7702 is a render of a two-dimensional (2D) model. In at least one embodiment, an input frame 7702 is a render of a three-dimensional (3D) model. In at least one embodiment, an input frame 7702 is generated by a rendering computer program, which is a computer program comprising executable instructions that, when executed, generate images based at least in part on a scene. In at least one embodiment, a scene refers to a 2D or 3D model. In at least one embodiment, a scene is defined by various characteristics, such as geometry, viewpoint, texture, lighting, shading, and/or variations thereof. In at least one embodiment, a computer program obtains a scene and generates an image of a scene through use of one or more rendering algorithms. In at least one embodiment, an input frame 7702 is an image generated through use of one or more light transport modelling techniques. In at least one embodiment, an input frame 7702 is generated through one or more rasterization techniques. In at least one embodiment, an input frame 7702 is generated through one or more ray casting techniques. In at least one embodiment, an input frame 7702 is generated through one or more ray tracing techniques.

In at least one embodiment, an input frame 7702 is a frame generated by a video game program. In at least one embodiment, a video game program is executed by one or more computing devices that comprise graphics hardware that generate real-time computer graphics. In at least one embodiment, an input frame 7702 is a frame that is generated in real-time. In at least one embodiment, an input frame 7702 is a frame that is pre-rendered. In at least one embodiment, an input frame 7702 is a frame of a video game that is displayed on one or more computer graphics display hardware, such as a video display device, mobile device, virtual reality headset, and/or variations thereof. In at least one embodiment, a video game program is executing and generates a 3D scene, in which an input frame 7702 is a render of a 3D scene. In at least one embodiment, an input frame 7702 is a frame that is rendered by a rendering device with various hardware and software constraints, such as graphics hardware limitations, memory limitations, and/or variations thereof.

In at least one embodiment, a neural network 7706 is a neural network that obtains an input frame and generates an output frame. In at least one embodiment, a neural network 7706 is a convolutional autoencoder network. In at least one embodiment, a neural network 7706 is a neural network that generates a higher quality version of an input frame. In at least one embodiment, qualities of a frame include resolution and aliasing, in which a high quality frame has a high resolution and minimal aliasing. In at least one embodiment, a neural network 7706 obtains an input frame, and generates an output frame with a higher resolution and lower aliasing than an input frame. In at least one embodiment, a neural network 7706 processes frames in near real-time. In at least one embodiment, near real-time processing refers to processing in which inputs are processed within a time interval from which inputs are generated. In at least one embodiment, a neural network 7706 processes input frames in near real-time such that input frames are processed within a time interval from which they are generated and/or rendered. In at least one embodiment, a neural network 7706 processes an input frame into an output frame within a time interval such that output frames are available from input frames with minimal latency. In at least one embodiment, minimal latency refers to latency that is at or below a defined latency time interval threshold. In at least one embodiment, output frames that are available from input frames with minimal latency are available within a defined time interval, which can be any suitable value, such as seconds, fractions of a second, and/or variations thereof. In at least one embodiment, a neural network 7706 obtains a frame of a video game and generates a high resolution, minimally aliased output frame. In at least one embodiment, a neural network 7706 is trained using various neural network training techniques such as those described in connection with FIG. 78. In at least one embodiment, output frames are generated at a rate which can be perceived as continuous motion for a human being, which may refer to frame rates over a certain threshold. In at least one embodiment, output frames are generated at a target rate at or over 20 frames per second (fps) including or not limited to 23.976 fps, 24 fps, 25 fps, 29.97 fps, 30 fps, 48 fps, 50 fps, 59.94 fps, 60 fps, 90 fps, 120 fps, 240 fps, and any other suitable target frame rate. In at least one embodiment, a computer system may lack computing resources to continuously render high quality frames at a target frame rate (e.g., 4 k resolution at 60 fps) and instead render lower-resolution frames which are super-sampled using neural network 7706 to achieve said target frame (e.g., render 1080p resolution at 60 fps and super-sample to 4 k resolution).

In at least one embodiment, a neural network 7706 obtains an input frame 7702. In at least one embodiment, a neural network 7706 obtains an input frame 7702 from a video game program executing on one or more computing devices, such as a video game console, computer, mobile device, and/or variations thereof. In at least one embodiment, a computer program, such as a video game program, computer graphics program, rendering program, and/or variations thereof, provides an input frame 7702 to a neural network 7706 through one or more interfaces, such as transmitted through one or more computer networks, transferred through one or more data transfer interfaces, and/or variations thereof. In at least one embodiment, a neural network 7706 obtains an input frame 7702, which is an image generated by a video game program. In at least one embodiment, a neural network 7706 obtains an input frame 7702 and associated motion vectors 7704, which indicate direction objects in a scene (e.g., a scene depicted in an input frame 7702) are moving. In at least one embodiment, a motion vector is a vector that represents an entity in a frame based on a position of an entity in a previous frame. In at least one embodiment, a motion vector indicates a motion or direction of movement of an entity of a frame of a scene. In at least one embodiment, motion vectors 7704 comprise a collection of one or more motion vectors that indicate motions or directions of movement of entities and/or objects of an input frame 7702. In at least one embodiment, a program such as a video game program generates both input frame 7702 and motion vectors 7704.

In at least one embodiment, a neural network 7706 obtains an input frame 7702 and motion vectors 7704, and generates an output frame 7708. In at least one embodiment, a neural network 7706 generates an output frame 7708 from an input frame 7702 and/or associated motion vectors 7704. In at least one embodiment, a neural network 7706 is trained using a high quality version of an input frame 7702, in which trained neural network 7706 generates an output frame 7708 to match a high quality version of input frame 7702. In at least one embodiment, an output frame 7708 is an upscaled/higher resolution version of an input frame 7702. In at least one embodiment, an output frame 7708 is a higher resolution version of an input frame 7702. In at least one embodiment, an output frame 7708 has a lower degree of aliasing than an input frame 7702. In at least one embodiment, an output frame 7708 is a higher quality representation of an input frame 7702. In at least one embodiment, a neural network 7706 obtains an input frame 7702, which is a real-time render of a scene of a video game, and associated motion vectors 7704, and generates an output frame 7708, which is a high quality version of an input frame 7702.

Figure 78:
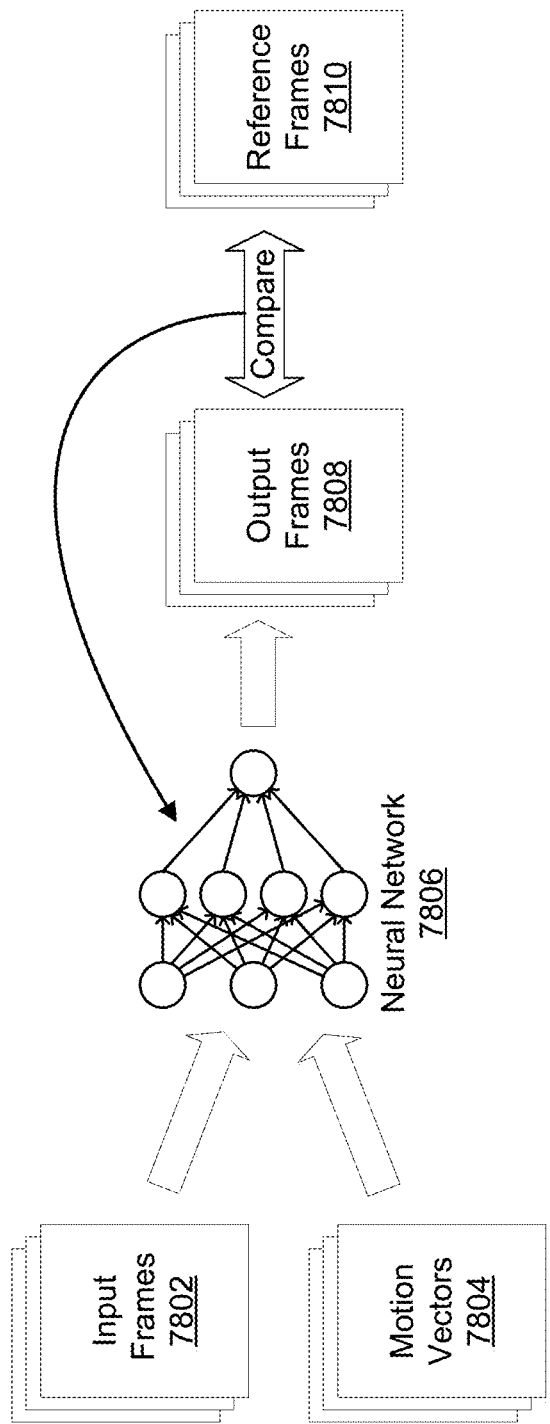
FIG. 78 illustrates an architecture of a super sampling neural network, in accordance with at least one embodiment.

FIG. 78 illustrates an architecture of a super sampling neural network, in accordance with at least one embodiment. In at least one embodiment, a neural network 7806 is referred to as a super sampling neural network, DLSS network, super sampling network, and/or variations thereof. In at least one embodiment, a neural network 7806 is trained to generate output frames 7808 from input frames 7802 and motion vectors 7804. In at least one embodiment, as part of training a neural network 7806, output frames 7808 generated by a neural network 7806 are compared with reference frames 7810 to update neural network 7806.

In at least one embodiment, input frames 7802 are input frames in accordance with those described in connection with FIG. 77. In at least one embodiment, input frames 7802 comprise one or more images, referred to as frames. In at least one embodiment, input frames 7802 comprise one or more images captured from one or more image and/or video capturing devices. In at least one embodiment, input frames 7802 comprise one or more renders of a scene. In at least one embodiment, input frames 7802 comprise frames generated by a video game program. In at least one embodiment, a video game program is executed by one or more computing devices that comprise graphics hardware that generate real-time computer graphics. In at least one embodiment, input frames 7802 are frames that are pre-rendered. In at least one embodiment, a video game program is executing and generates a 3D scene, in which input frames 7802 comprise renders of a 3D scene. In at least one embodiment, input frames 7802 are frames that are rendered by a rendering device with various hardware and software constraints, such as graphics hardware limitations, memory limitations, and/or variations thereof. In at least one embodiment, input frames 7802 are frames that are rendered with minimal post processing techniques, such as anti-aliasing (e.g., input frames 7802 comprise frames that are rendered with a little to no degree of anti-aliasing).

In at least one embodiment, post processing techniques for rendered frames include techniques and effects such as, but not limited to: ambient occlusion (e.g., horizon based ambient occlusion (HBAO), screen space ambient occlusion (SSAO)), anti-aliasing (e.g., fast approximate anti-aliasing (FXAA), super-sample anti-aliasing (SSAA), multi-sampling anti-aliasing (MSAA), temporal anti-aliasing (TXAA)), bloom, blur (e.g., depth of field, motion blur), cel shading, chromatic aberration, color correction, gamma correction, high dynamic range rendering, particle effects, shading, shadow mapping, sharpening, un-sharpening, upscaling, texture filtering (e.g., point, linear, bilinear, trilinear, anisotropic), and/or variations thereof. In at least one embodiment, input frames 7802 are frames that are rendered with little to no post processing techniques and/or effects.

In at least one embodiment, motion vectors 7804 are a set of one or more vectors that indicate directions of movement of objects of frames of input frames 7802. In at least one embodiment, a motion vector is a vector that represents an entity in a frame based on a position of an entity in a previous frame. In at least one embodiment, a motion vector indicates a motion or direction of movement of an entity of a frame of a scene. In at least one embodiment, motion vectors 7804 are generated by a program that rendered input frames 7802 and correspond to input frames 7802, in which a first set of motion vectors of motion vectors 7804 corresponds to a first frame of input frames 7802 and indicates motion of objects and/or entities depicted in a first frame of input frames 7802. In at least one embodiment, a first set of motion vectors of motion vectors 7804 corresponds to a first frame of input frames 7802 and indicates motion of objects of a first frame of input frames 7802 (e.g., directions and/or locations of where objects of a first frame of input frames 7802 will potentially be or move to in a subsequent frame of input frames 7802). In at least one embodiment, motion vectors 7804 comprise motion vectors generated by a video game program. In at least one embodiment, a video game program is executing and generates a 3D scene, in which motion vectors 7804 comprise vectors indicating movement of objects and/or entities of a 3D scene.

In at least one embodiment, reference frames 7810 comprise one or more images, referred to as frames. In at least one embodiment, reference frames 7810 correspond to input frames 7802 (e.g., each frame of reference frames 7810 corresponds to a frame of input frames 7802). In at least one embodiment, reference frames 7810 comprise one or more renders of a scene. In at least one embodiment, reference frames 7810 comprise frames generated by a video game program. In at least one embodiment, reference frames 7810 are frames that are rendered with various post processing techniques and/or effects. In at least one embodiment, reference frames 7810 are higher quality versions of input frames 7802. In at least one embodiment, a first frame of input frames 7802 is rendered from a scene using minimal post processing techniques and/or effects, and a first frame of reference frames 7810 is rendered from a same scene using post processing techniques and/or effects. In at least one embodiment, reference frames 7810 are frames rendered using 64×super sampling (64×SS).

In at least one embodiment, reference frames 7810 are frames rendered by one or more super computing devices, such as those described in connection with FIG. 38. In at least one embodiment, input frames 7802 and reference frames 7810 are frames rendered from a same computer graphics application or program (e.g., a same video game program). In at least one embodiment, reference frames 7810 and motion vectors are generated by one or more rendering devices, in which input frames 7802 and motion vectors 7804 are obtained from generated reference frames 7810 and motion vectors through one or more processes, such as downscaling generated reference frames 7810 and/or motion vectors to obtain input frames 7802 and motion vectors 7804, removing one or more post processing techniques and/or effects from generated reference frames 7810 and/or motion vectors to obtain input frames 7802 and motion vectors 7804, and variations thereof. In at least one embodiment, one or more rendering devices generate input frames 7802, motion vectors 7804, and/or reference frames 7810 from a particular computer graphics application or program (e.g., a video game program).

In at least one embodiment, a neural network 7806 is trained to process input frames 7802 and motion vectors 7804, and generate output frames 7808 that closely approximate or match corresponding reference frames 7810. In at least one embodiment, one or more rendering devices, through one or more computer graphics applications or programs, generate and store input frames 7802, motion vectors 7804, and reference frames 7810, in which one or more systems retrieve stored input frames 7802, motion vectors 7804, and reference frames 7810 to train a neural network 7806. In at least one embodiment, a neural network 7806 is a convolutional autoencoder network. In at least one embodiment, a neural network 7806 is trained using frames and/or motion vectors from a particular computer graphics application or program (e.g., a video game program) and is usable to generate frames for a particular computer graphics application or program. In at least one embodiment, a neural network 7806 is trained to generate high quality versions of input frames 7802 (e.g., upscaled/higher resolution frames, anti-aliased frames) as output frames 7808. In at least one embodiment, a neural network 7806 is trained to upscale and anti-alias frames of input frames 7802 as output frames 7808. In at least one embodiment, a neural network 7806 utilizes motion vectors 7804 to generate output frames 7808. In at least one embodiment, a neural network 7806 generates a first output frame of output frames 7808 from input frames 7802 and motion vectors 7804, generates a second output frame of output frames 7808 from a first output frame of output frames 7808, input frames 7802, and motion vectors 7804, and so on for subsequent output frames of output frames 7808. In at least one embodiment, a neural network 7806 applies sets of motion vectors from motion vectors 7804 to frames of output frames 7808 to generate subsequent frames of output frames 7808. In at least one embodiment, a neural network 7806 utilizes motion vectors 7804 as part of one or more temporal feedback processes that apply motion vectors to output frames to generate subsequent output frames.

In at least one embodiment, output frames 7808 are higher quality versions of input frames 7802, which can refer to various qualities, such as higher resolution, higher degrees of various post processing techniques and/or effects, and/or variations thereof. In at least one embodiment, a video game program is executing in connection with one or more computer graphics hardware, in which a frame is rendered and input to a neural network 7806, in which neural network 7806 generates a corresponding higher quality frame (e.g., an upscaled and/or anti-aliased frame). In at least one embodiment, a neural network 7806 is trained to output frames (e.g., output frames 7808) with various post processing techniques and/or effects from frames (e.g., input frames 7802) with minimal post processing techniques and/or effects. In at least one embodiment, a neural network 7806 obtains a frame and corresponding motion vectors, such as a frame and motion vectors of input frames 7802 and motion vectors 7804, respectively, and generates a corresponding high quality output frame, such as a frame of output frames 7808 (e.g., a frame with various post processing techniques and/or effects, such as an upscaled frame, an anti-aliased frame, an upscaled and anti-aliased frame, and/or variations thereof). In at least one embodiment, a neural network 7806 obtains an input frame (e.g., a frame of input frames 7802), a previous output frame (e.g., a previously generated output frame of output frames 7808), and motion vectors (e.g., motion vectors of motion vectors 7804), and generates an output frame (e.g., a subsequent output frame of output frames 7808).

In at least one embodiment, a neural network 7806 is trained and/or updated by comparing generated output frames 7808 with reference frames 7810. In at least one embodiment, a neural network 7806 is trained and used in connection with FIG. 77. In at least one embodiment, a neural network 7806 is trained or otherwise updated by one or more systems using a training framework such as a PyTorch, TensorFlow, Boost, Caffe, Microsoft Cognitive Toolkit/CNTK, MXNet, Chainer, Keras, Deeplearning4j, or any suitable training framework. In at least one embodiment, a neural network 7806 is trained by comparing output frames 7808 with reference frames 7810, determining differences between output frames 7808 and reference frames 7810, and utilizing determined differences to update weights and other components of neural network 7806 such that differences between output frames 7808 and reference frames 7810 are minimized.

In at least one embodiment, training is performed at least in a supervised, partially supervised, and/or unsupervised manner. In at least one embodiment, a neural network 7806 is trained to match input frames 7802 to reference frames 7810. In at least one embodiment, a neural network 7806 is trained by one or more systems that cause neural network 7806 to produce an output frame of output frames 7808 from a frame of input frames 7802, and measure a difference between an output frame of output frames 7808 and a corresponding frame of reference frames 7810. In at least one embodiment, a neural network 7806 is trained by one or more systems that cause neural network 7806 to obtain a frame of input frames 7802 and perform one or more neural network image processing/generation/rendering operations (e.g., generate new pixels, modify existing pixels) to generate an output frame of output frames 7808, compare an output frame of output frames 7808 with a corresponding frame of reference frames 7810, and adjust weights of neural network 7806 based at least in part on a comparison of an output frame of output frames 7808 with a corresponding frame of reference frames 7810. In at least one embodiment, a frame of output frames 7808 is compared with a frame of reference frames 7810 by comparing pixels of both frames with each other. In at least one embodiment, frames are compared by comparing pixel characteristics of frames (e.g., pixel intensity, pixel brightness, pixel color, pixel contrast) and measuring differences in pixel characteristics (e.g., differences in pixel intensity, pixel brightness, pixel color, pixel contrast between pixels of frames). In at least one embodiment, a neural network 7806 is trained using one or more back propagation processes in connection with one or more loss functions. In at least one embodiment, a neural network 7806 is trained using various techniques described herein such as those described in connection with FIG. 36.

Figure 79:
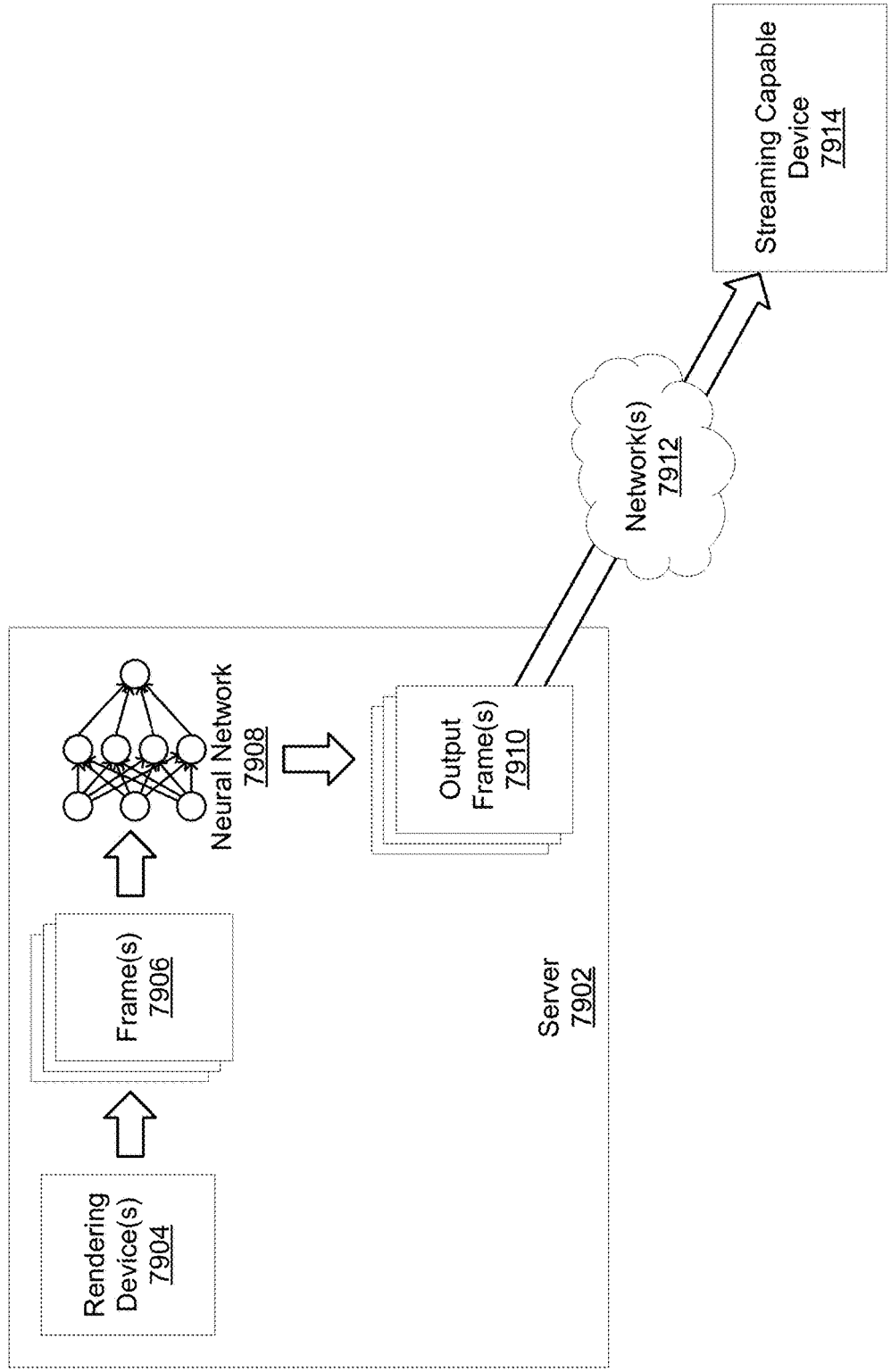
FIG. 79 illustrates an example of streaming using a super sampling neural network, in accordance with at least one embodiment.

FIG. 79 illustrates an example of streaming using a super sampling neural network, in accordance with at least one embodiment. In at least one embodiment, a neural network 7908 processes frame(s) 7906 generated by rendering device(s) 7904 to generate output frame(s) 7910, which are streamed via network(s) 7912 to a streaming capable device 7914. In at least one embodiment, a neural network 7908 is referred to as a DLSS network, super sampling neural network, super sampling network, and/or variations thereof. In at least one embodiment, a neural network 7908 is trained using techniques such as those described in connection with FIG. 78. In at least one embodiment, neural network 7208 is used in process 900 (see FIG. 9A) or process 906 (see FIG. 9B), e.g., as part of DLSS computing or image rendering.

In at least one embodiment, a server 7902 is a collection of one or more computer hardware and/or software components. In at least one embodiment, a server 7902 provides various functionalities to other programs or devices, referred to as clients. In at least one embodiment, a server 7902 provides streaming services. In at least one embodiment, streaming services refer to services that provide streaming media to a user. In at least one embodiment, streaming media refers to multimedia (e.g., video, audio) that is constantly received by and presented to a user while being delivered by a provider. In at least one embodiment, a server 7902 provides video game streaming services. In at least one embodiment, a server 7902 provides services in which frames of a video game are constantly received by and presented to a user while being delivered/generated by a server 7902. In at least one embodiment, a server 7902 comprises rendering device(s) 7904. In at least one embodiment, a server 7902 comprises one or more hardware and/or software components that implement a neural network 7908. In at least one embodiment, a server 7902 comprises one or more data storage components (e.g., hard drives) that provide storage and processing of frame(s) 7906 and output frame(s) 7910.

In at least one embodiment, rendering device(s) 7904 comprise one or more computer graphics rendering hardware and/or software components. In at least one embodiment, rendering device(s) 7904 comprise one or more graphics processing units. In at least one embodiment, rendering device(s) 7904 comprise one or more computing devices that generate and/or render graphics. In at least one embodiment, rendering device(s) 7904 comprise one or more computing devices that generate renders from a video game. In at least one embodiment, rendering device(s) 7904 render frames of a video game or other computer graphics program. In at least one embodiment, rendering device(s) 7904, using input data from a computer graphics program (e.g., a video game program), renders frame(s) 7906.

In at least one embodiment, frame(s) 7906 are frames rendered by rendering device(s) 7904. In at least one embodiment, frame(s) 7906 are associated with motion vectors that indicate directions of movement of objects of frame(s) 7906. In at least one embodiment, frame(s) 7906 and associated motion vectors are generated by rendering device(s) 7904. In at least one embodiment, frame(s) 7906 comprise frames generated by a particular video game program. In at least one embodiment, a video game program is executed by one or more computing devices that comprise graphics hardware (e.g., rendering device(s) 7904) that generate real-time computer graphics. In at least one embodiment, a video game program is executing and generates a 3D scene, in which frame(s) 7906 comprise renders of a 3D scene. In at least one embodiment, frame(s) 7906 are frames that are rendered by a rendering device with various hardware and software constraints, such as graphics hardware limitations, memory limitations, and/or variations thereof. In at least one embodiment, frame(s) 7906 are frames that are rendered with minimal post processing techniques, such as anti-aliasing (e.g., frame(s) 7906 comprise frames that are rendered with a little to no degree of anti-aliasing).

In at least one embodiment, a neural network 7908 comprises one or more neural networks that generate high quality frames from input frames. In at least one embodiment, a neural network 7908 is trained using frames from a particular computer graphics application or program (e.g., a video game program) and is usable to generate frames for a particular computer graphics application or program. In at least one embodiment, a neural network 7908 is trained to generate high quality versions of frame(s) 7906 (e.g., upscaled/higher resolution frames, anti-aliased frames). In at least one embodiment, a neural network 7908 is trained to upscale and anti-alias frames of frame(s) 7906. In at least one embodiment, a video game program is executing in connection with one or more computer graphics hardware, in which a frame is rendered and input to a neural network 7908 (e.g., frame(s) 7906 are rendered by rendering device(s) 7904 and input to neural network 7908), in which neural network 7908 generates a corresponding higher quality frame (e.g., an upscaled and/or anti-aliased frame). In at least one embodiment, a neural network 7908 is trained to output frames with various post processing techniques and/or effects from frames with minimal post processing techniques and/or effects. In at least one embodiment, a neural network 7908 obtains a frame and corresponding motion vectors, and generates a corresponding high quality output frame (e.g., a frame with various post processing techniques and/or effects, such as an upscaled frame, an anti-aliased frame, an upscaled and anti-aliased frame, and/or variations thereof). In at least one embodiment, a neural network 7908 obtains frame(s) 7906 and motion vectors and generates output frame(s) 7910. In at least one embodiment, a neural network 7908 utilizes one or more temporal feedback processes that process output frames of output frame(s) 7910 in connection with frame(s) 7906 and associated motion vectors to generate subsequent frames of output frame(s) 7910.

In at least one embodiment, output frame(s) 7910 correspond to frame(s) 7906 (e.g., each frame of output frame(s) 7910 corresponds to a frame of frame(s) 7906). In at least one embodiment, output frame(s) 7910 are frames that are generated with various post processing techniques and/or effects. In at least one embodiment, output frame(s) 7910 are higher quality versions of frame(s) 7906. In at least one embodiment, output frame(s) 7910 comprise upscaled (e.g., higher resolution) and/or anti-aliased versions of frame(s) 7906.

In at least one embodiment, network(s) 7912 comprise any suitable computer communication network, such as Internet. In at least one embodiment, network(s) 7912 are cryptographically protected, encrypted, or otherwise secured. In at least one embodiment, network(s) 7912 comprise one or more computer network communication channels in which data is transmitted and received. In at least one embodiment, network(s) 7912 provide methods of communication between a server 7902 and a streaming capable device 7914. In at least one embodiment, output frame(s) 7910 are transmitted from a server 7902 via network(s) 7912 to a streaming capable device 7914.

In at least one embodiment, a streaming capable device 7914 is a computing device that is capable of receiving multimedia through one or more networks. In at least one embodiment, a streaming capable device 7914 is a device with limited graphics rendering capabilities that is unable to render frames such as output frame(s) 7910, but is able to access a server 7902 via network(s) 7912 to obtain output frame(s) 7910. In at least one embodiment, a streaming capable device 7914 is a streaming capable computing device such that streaming capable device 7914 comprises various hardware and/or software components that constantly receive and/or obtain multimedia from one or more networks. In at least one embodiment, a streaming capable device 7914 is a computing device such as a mobile phone, laptop, computer, gaming console, tablet, and/or variations thereof. In at least one embodiment, a streaming capable device 7914 comprises one or more computer networking components, such as various receivers, transmitters, and/or transceivers, which obtain and process multimedia transmitted through one or more networks. In at least one embodiment, a streaming capable device 7914 is operable by one or more users. In at least one embodiment, a streaming capable device 7914 receives output frame(s) 7910 through network(s) 7912. In at least one embodiment, a streaming capable device 7914 receives output frame(s) 7910 in connection with one or more programs executing on streaming capable device 7914 that display and/or process output frame(s) 7910.

In at least one embodiment, a streaming capable device 7914 comprises one or more software programs and/or applications that processes obtained output frame(s) 7910 and provides output frame(s) 7910 to be viewed (e.g., via an electronic visual display of streaming capable device 7914) and/or interacted with (e.g., via various user input hardware of streaming capable device 7914) by one or more users. In at least one embodiment, a streaming capable device 7914 comprises one or more electronic visual display hardware, such as a liquid crystal display (LCD), light-emitting diode (LED) display, and/or variations thereof, and one or more user input hardware, such as computer mouse, keyboard, gaming controller, and/or variations thereof, in which users utilize to interact with one or more software programs and/or applications executing on streaming capable device 7914. In at least one embodiment, a streaming capable device 7914 provides indications of user input to a server 7902 via network(s) 7912, in which frame(s) 7906 are generated by rendering device(s) 7904 based at least in part on user input.

In at least one embodiment, a video game program is executing on a server 7902, where frame(s) 7906 are frames of a video game program, in which frame(s) 7906 are rendered by rendering device(s) 7904, and processed and transmitted as output frame(s) 7910 to a streaming capable device 7914, in which a user interacts with streaming capable device 7914 in connection with output frame(s) 7910 (e.g., output frame(s) 7910 are frames of a video game program requiring interaction, in which a user inputs interaction to streaming capable device 7914), in which user interactions are transmitted to server 7902 to a video game program to determine how subsequent frames of a video game program are to be rendered by rendering device(s) 7904. In at least one embodiment, frame(s) 7906 are rendered based at least in part on input from a user in connection with a streaming capable device 7914, and processed by a neural network 7908 to generate output frame(s) 7910, in which output frame(s) 7910 are transmitted to streaming capable device 7914, in which further user input is received by streaming capable device 7914 and transmitted to server 7902 to generate subsequent frames, which are then processed by neural network 7908 and transmitted to streaming capable device 7914, and so on for subsequent frames and subsequent user input.

Figure 80:
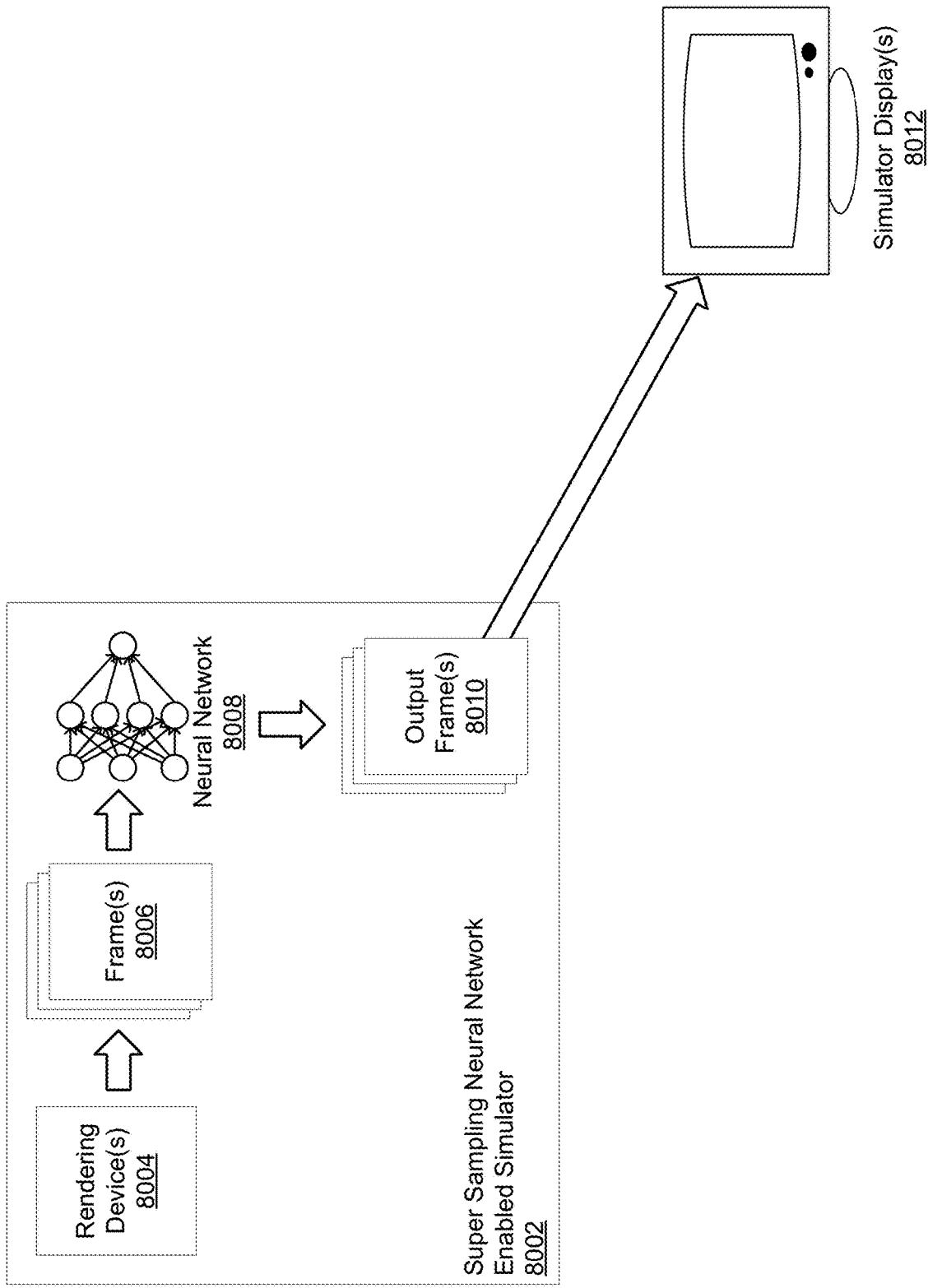
FIG. 80 illustrates an example of simulation using a super sampling neural network, in accordance with at least one embodiment.

FIG. 80 illustrates an example of simulation using a super sampling neural network, in accordance with at least one embodiment. In at least one embodiment, a neural network 8008 processes frame(s) 8006 generated by rendering device(s) 8004 to generate output frame(s) 8010, which are output to simulator display(s) 8012. In at least one embodiment, a neural network 8008 is referred to as a DLSS network, super sampling neural network, super sampling network, and/or variations thereof. In at least one embodiment, a neural network 8008 is trained using techniques such as those described in connection with FIG. 78.

In at least one embodiment, a super sampling neural network enabled simulator 8002 is a collection of one or more computer hardware and/or software components. In at least one embodiment, a super sampling neural network enabled simulator 8002 comprises rendering device(s) 8004. In at least one embodiment, a super sampling neural network enabled simulator 8002 comprises one or more hardware and/or software components that implement a neural network 8008. In at least one embodiment, a super sampling neural network enabled simulator 8002 comprises one or more data storage components (e.g., hard drives) that provide storage and processing of frame(s) 8006 and output frame(s) 8010.

In at least one embodiment, a super sampling neural network enabled simulator 8002 is a simulator device, such as a flight simulator, driving simulator, and/or variations thereof, that executes various simulator programs, such as flight simulator programs, driving simulator programs, and/or variations thereof. In at least one embodiment, a flight simulator is a device that artificially re-creates aircraft flight and an environment in which it flies. In at least one embodiment, a flight simulator, through execution of a flight simulator program, simulates various aspects of flight, such as physics of how aircraft fly, how aircraft react to applications of various flight controls, effects of other aircraft systems, and effects of factors such as turbulence, air density, wind shear, cloud, precipitation, weather, and/or variations thereof, on aircraft. In at least one embodiment, a flight simulator (e.g., a super sampling neural network enabled simulator 8002) comprises one or more hardware components that simulate an aircraft, such as hardware of a cockpit of an aircraft, that allow user interaction with a flight simulator (e.g., hardware components comprise various user input devices, such as a steering wheel, controller, joystick, buttons, switches, levers, and/or variations thereof). In at least one embodiment, a flight simulator comprises one or more displays (e.g., simulator display(s) 8012) that users interact with in connection with hardware of a flight simulator to simulate various aspects of flight. In at least one embodiment, a driving simulator is a device that artificially recreates motor vehicle movement and an environment in which it moves. In at least one embodiment, a driving simulator, through execution of a driving simulator program, simulates various aspects of operation of a motor vehicle, such as physics of a motor vehicle, how a motor vehicle reacts to applications of various motor vehicle controls, effects of other motor vehicle systems, and effects of factors such as environmental changes, wind, weather, and/or variations thereof, on motor vehicles. In at least one embodiment, a driving simulator (e.g., a super sampling neural network enabled simulator 8002) comprises one or more hardware components that simulate a motor vehicle, such as hardware of a driver seat of a motor vehicle, that allow user interaction with a driving simulator (e.g., hardware components comprise various user input devices, such as a steering wheel, pedals, controller, joystick, buttons, switches, levers, and/or variations thereof). In at least one embodiment, a driving simulator comprises one or more displays (e.g., simulator display(s) 8012) that users interact with in connection with hardware of a driving simulator to simulate various aspects of driving or other motor vehicle operation. In at least one embodiment, simulator display(s) 8012 are displays of a super sampling neural network enabled simulator 8002.

In at least one embodiment, rendering device(s) 8004 comprise one or more computer graphics rendering hardware and/or software components. In at least one embodiment, rendering device(s) 8004 comprise one or more graphics processing units. In at least one embodiment, rendering device(s) 8004 comprise one or more computing devices that generate and/or render graphics. In at least one embodiment, rendering device(s) 8004 comprise one or more computing devices that generate renders from a computer graphics program, such as a video game, simulation program, simulation video game, and/or variations thereof. In at least one embodiment, rendering device(s) 8004, using input data from a computer graphics program (e.g., a simulation program), renders frame(s) 8006.

In at least one embodiment, frame(s) 8006 are frames rendered by rendering device(s) 8004. In at least one embodiment, frame(s) 8006 are associated with motion vectors that indicate directions of movement of objects of frame(s) 8006. In at least one embodiment, frame(s) 8006 and associated motion vectors are generated by rendering device(s) 8004. In at least one embodiment, frame(s) 8006 comprise frames generated by a particular simulation program, such as a flight simulator program, driving simulator program, and/or variations thereof. In at least one embodiment, a simulation program is executed by one or more computing devices that comprise graphics hardware (e.g., rendering device(s) 8004) that generate real-time computer graphics. In at least one embodiment, a simulation program is executing and generates a 3D scene, in which frame(s) 8006 comprise renders of a 3D scene. In at least one embodiment, frame(s) 8006 are frames that are rendered with minimal post processing techniques, such as antialiasing (e.g., frame(s) 8006 comprise frames that are rendered with a little to no degree of anti-aliasing).

In at least one embodiment, a neural network 8008 comprises one or more neural networks that generate high quality frames from input frames. In at least one embodiment, a neural network 8008 is trained using frames from a particular computer graphics application or program (e.g., a simulation program) and is usable to generate frames for a particular computer graphics application or program. In at least one embodiment, a neural network 8008 is trained to generate high quality versions of frame(s) 8006 (e.g., upscaled/higher resolution frames, anti-aliased frames). In at least one embodiment, a simulation program is executing in connection with one or more computer graphics hardware, in which a frame is rendered and input to a neural network 8008 (e.g., frame(s) 8006 are rendered by rendering device(s) 8004 and input to neural network 8008), in which neural network 8008 generates a corresponding higher quality frame (e.g., an upscaled and/or anti-aliased frame). In at least one embodiment, a neural network 8008 is trained to output frames with various post processing techniques and/ or effects from frames with minimal post processing techniques and/or effects. In at least one embodiment, a neural network 8008 obtains a frame and corresponding motion vectors, and generates a corresponding high quality output frame (e.g., a frame with various post processing techniques and/or effects, such as an upscaled/higher resolution frame, an anti-aliased frame, an upscaled and anti-aliased frame, and/or variations thereof). In at least one embodiment, a neural network 8008 obtains frame(s) 8006 and/or motion vectors and generates output frame(s) 8010. In at least one embodiment, a neural network 8008 utilizes one or more temporal feedback processes that process output frames of output frame(s) 8010 in connection with frame(s) 8006 and associated motion vectors to generate subsequent frames of output frame(s) 8010.

In at least one embodiment, output frame(s) 8010 correspond to frame(s) 8006 (e.g., each frame of output frame(s) 8010 corresponds to a frame of frame(s) 8006). In at least one embodiment, output frame(s) 8010 are frames that are generated with various post processing techniques and/or effects. In at least one embodiment, output frame(s) 8010 are higher quality versions of frame(s) 8006. In at least one embodiment, output frame(s) 8010 comprise upscaled and/ or anti-aliased versions of frame(s) 8006. In at least one embodiment, output frame(s) 8010 are displayed on simulator display(s) 8012 as part of operation of one or more simulators (e.g., super sampling neural network enabled simulator 8002), such as a flight simulator that executes a flight simulator program, a driving simulator that executes a driving simulator program, and/or variations thereof. In at least one embodiment, a user is operating a super sampling neural network enabled simulator 8002 and performs one or more actions, through one or more user input devices, based at least in part on output frame(s) 8010 displayed on simulator display(s) 8012.

Figure 81:
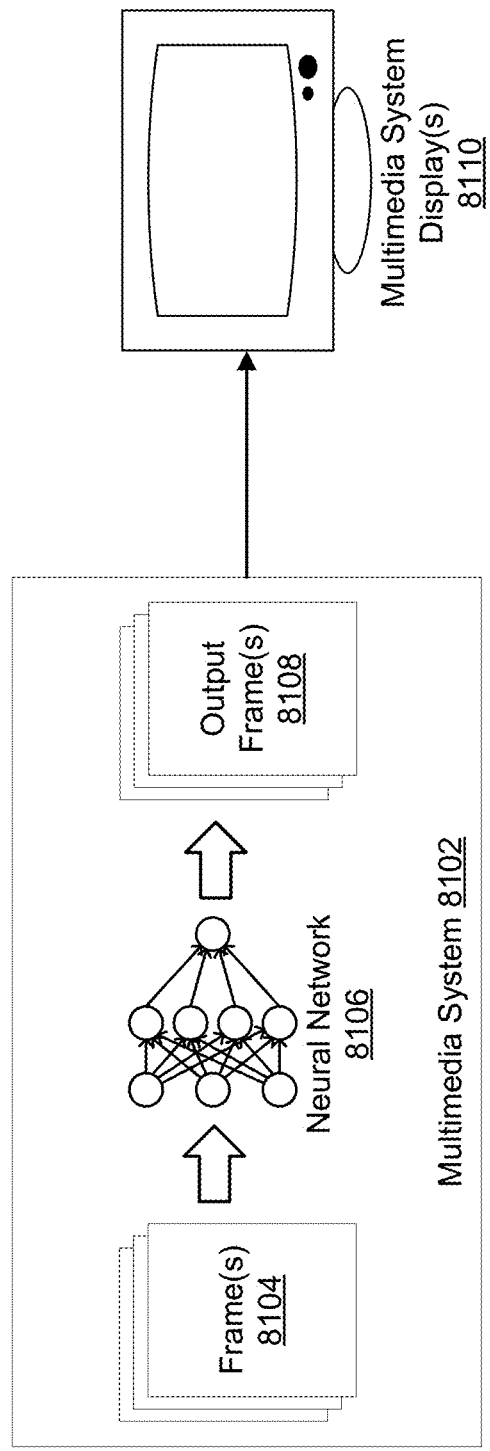
FIG. 81 illustrates an example of a device using a super sampling neural network, in accordance with at least one embodiment.

FIG. 81 illustrates an example of a device using a super sampling neural network, in accordance with at least one embodiment. In at least one embodiment, a neural network 8106 processes frame(s) 8104 generated by a multimedia system 8102 to generate output frame(s) 8108, which are output to multimedia system display(s) 8110. In at least one embodiment, a neural network 8106 is referred to as a DLSS network, super sampling neural network, super sampling network, and/or variations thereof. In at least one embodiment, a neural network 8106 is trained using techniques such as those described in connection with FIG. 78.

In at least one embodiment, a multimedia system 8102 is a collection of one or more computer hardware and/or software components. In at least one embodiment, a multimedia system 8102 comprises one or more rendering devices. In at least one embodiment, a multimedia system 8102 comprises one or more hardware and/or software components that implement a neural network 8106. In at least one embodiment, a multimedia system 8102 comprises one or more data storage components (e.g., hard drives) that provide storage and processing of frame(s) 8104 and output frame(s) 8108. In at least one embodiment, a multimedia system 8102 is a gaming console, such as those described in accordance with FIG. 75. In at least one embodiment, a multimedia system 8102 is any suitable computing device that processes multimedia, such as a computer, tablet, gaming device, gaming console, mobile device, and/or variations thereof. In at least one embodiment, multimedia system display(s) 8110 are one or more electronic visual display hardware that display data (e.g., multimedia, video games) from a multimedia system 8102. In at least one embodiment, multimedia system display(s) 8110 are displays of a multimedia system 8102.

In at least one embodiment, a multimedia system 8102 comprises one or more computer graphics rendering hardware and/or software components. In at least one embodiment, a multimedia system 8102 comprises one or more graphics processing units. In at least one embodiment, a multimedia system 8102 comprises one or more computing devices that generate and/or render graphics. In at least one embodiment, a multimedia system 8102 comprises one or more processors that execute various programs, such as video game programs, software applications, software programs, and/or variations thereof. In at least one embodiment, a multimedia system 8102 comprises one or more computing devices that generate renders from a computer graphics program, such as a video game. In at least one embodiment, a multimedia system 8102, using input data from a computer graphics program executing on multimedia system 8102 (e.g., a video game program), renders frame(s) 8104. In at least one embodiment, a multimedia system 8102 comprises one or more hardware components that allow user interaction with a multimedia system 8102 (e.g., hardware components comprise various user input devices, such as controllers, joysticks, buttons, switches, levers, and/or variations thereof). In at least one embodiment, a multimedia system 8102 is connected to one or more user input devices that allow users to interact with various programs executing on a multimedia system 8102 (e.g., video game programs).

In at least one embodiment, frame(s) 8104 are frames rendered by a multimedia system 8102. In at least one embodiment, frame(s) 8104 are associated with motion vectors that indicate directions of movement of objects of frame(s) 8104. In at least one embodiment, frame(s) 8104 and associated motion vectors are generated by a multimedia system 8102. In at least one embodiment, frame(s) 8104 comprise frames generated by a particular video game program. In at least one embodiment, a video game program is executed by one or more computing devices that comprise graphics hardware (e.g., a multimedia system 8102) that generate real-time computer graphics. In at least one embodiment, a video game program is executing and generates a 3D scene, in which frame(s) 8104 comprise renders of a 3D scene. In at least one embodiment, frame(s) 8104 are frames that are rendered with minimal post processing techniques, such as anti-aliasing (e.g., frame(s) 8104 comprise frames that are rendered with a little to no degree of anti-aliasing).

In at least one embodiment, a neural network 8106 comprises one or more neural networks that generate high quality frames from input frames. In at least one embodiment, a neural network 8106 is trained using frames from a particular computer graphics application or program (e.g., a video game program) and is usable to generate frames for a particular computer graphics application or program. In at least one embodiment, a neural network 8106 is trained to generate high quality versions of frame(s) 8104 (e.g., upscaled/higher resolution frames, anti-aliased frames). In at least one embodiment, a video game program is executing in connection with one or more computer graphics hardware, in which a frame is rendered and input to a neural network 8106 (e.g., frame(s) 8104 are rendered by a multimedia system 8102 and input to neural network 8106), in which neural network 8106 generates a corresponding higher quality frame (e.g., an upscaled/higher resolution and/or anti-aliased frame). In at least one embodiment, a neural network 8106 is trained to output frames with various post processing techniques and/or effects from frames with minimal post processing techniques and/or effects. In at least one embodiment, a neural network 8106 obtains a frame and corresponding motion vectors, and generates a corresponding high quality output frame (e.g., a frame with various post processing techniques and/or effects, such as an upscaled/higher resolution frame, an anti-aliased frame, an upscaled and anti-aliased frame, and/or variations thereof). In at least one embodiment, a neural network 8106 obtains frame(s) 8104 and/or motion vectors and generates output frame(s) 8108. In at least one embodiment, a neural network 8106 utilizes one or more temporal feedback processes that process output frames of output frame(s) 8108 in connection with frame(s) 8104 and associated motion vectors to generate subsequent frames of output frame(s) 8108.

In at least one embodiment, output frame(s) 8108 correspond to frame(s) 8104 (e.g., each frame of output frame(s) 8108 corresponds to a frame of frame(s) 8104). In at least one embodiment, output frame(s) 8108 are frames that are generated with various post processing techniques and/or effects. In at least one embodiment, output frame(s) 8108 are higher quality versions of frame(s) 8104. In at least one embodiment, output frame(s) 8108 comprise upscaled and/or anti-aliased versions of frame(s) 8104. In at least one embodiment, a neural network 8106 constantly generates output frames of output frame(s) 8108 as frames of frame(s) 8104 are rendered by a multimedia system 8102. In at least one embodiment, output frame(s) 8108 are displayed on multimedia display(s) 8110 as part of operation of one or more video game programs. In at least one embodiment, a user is operating a multimedia system 8102 and performs one or more actions, through one or more user input devices, based at least in part on output frame(s) 8108 displayed on multimedia display(s) 8110.

At least one embodiment of the disclosure can be described in view of the following clauses:

Clause 1: A computer-implemented method for generating a texture, the method comprising:
receiving a texture including two or more pixels;
computing a texture energy value for the texture based on an energy function,
wherein the energy function is based on a distance between a pair of pixels of the two or more pixels, and one or more configurable parameters,
wherein the texture energy value is based on a summation of pixel energy values for pixels in the texture,
wherein a pixel energy value for each pixel in the pair of pixels comprises a non-zero value as a result of at least one of: the pair of pixels being in a same multi-dimensional layer, or the pair of pixels having identical coordinates at different temporal slices;
swapping positions of pixels from pairs of pixels in the texture until the texture energy value reaches a minimum energy value based on the energy function; and
generating an output texture including output pixels based on the texture with minimum energy value to be applied to image data.

Clause 2: the computer-implemented method of Clause 1, wherein the texture is a white noise texture.

Clause 3: the computer-implemented method according to any one of the preceding Clauses, wherein the energy function is further based on one or more sample values associated with the pair of pixels.

Clause 4: the computer-implemented method according to any one of the preceding Clauses, wherein at least one pixel of the two or more pixels corresponds to at least one of: one or more vectors, one or more points on a mesh, or one or more objects with more than three dimensions, and wherein the output texture is to be applied to image data that includes vectors, points on a mesh, or objects with more than three dimensions.

Clause 5: the computer-implemented method according to any one of the preceding Clauses, wherein prior to computing the energy value for the texture, the method further comprising:
sampling one or more pixels corresponding to the image data, wherein each pixel corresponds to a random variable, wherein the sampling one or more pixels corresponds to determining a value for a probability density function for a pixel, and wherein the sampling includes reducing a variance of samples by skewing samples towards regions of higher energy based on the energy function.

Clause 6: the computer-implemented method according to any one of the preceding Clauses, wherein the one or more configurable parameters comprises a first configurable parameter and a second configurable parameter, the first configurable parameter comprising a Gaussian value, and the second configurable parameter comprising a different Gaussian value from the first configurable parameter.

Clause 7: the computer-implemented method according to any one of the preceding Clauses, the method further comprising:
prior to computing the energy value for the texture, sampling one or more pixels corresponding to the image data, wherein each pixel corresponds to a random variable, wherein the sampling one or more pixels comprises at least one of: determining a value for a probability density function for a pixel, or performing non-uniform sampling.

Clause 8: the computer-implemented method according to any one of the preceding Clauses, further comprising:
applying a low discrepancy sequence to the output texture to add an additional dimension to each output pixel.

Clause 9: the computer-implemented method of claim 1, further comprising:
inputting one or more scalar output pixel values into a space-filling curve function to output one or more pixel values that are vectors.

Clause 10: the computer-implemented method according to any one of the preceding Clauses, further comprising:
stratifying the texture into strata over time;
calculating a stratification score based on a number of pixel values in each stratum in which a pixel of the pair of pixels is located; and
rejecting a swap of pixels if the swap increases the stratification score.

Clause 11: the computer-implemented method according to any one of the preceding Clauses, further comprising:
applying a low pass filter to the image data.

Clause 12: the computer-implemented method according to any one of the preceding Clauses, wherein swapping further comprises selecting two or more random pairs of pixels to swap.

Clause 13: a processor comprising:
one or more processing units to perform a plurality of operations including:
receiving a texture including two or more pixels;
computing a texture energy value for the texture based on an energy function,
wherein the energy function is based on a distance between a pair of pixels of the two or more pixels, and one or more configurable parameters,
wherein the texture energy value is based on a summation of pixel energy values for pixels in the texture,
wherein a pixel energy value for each pixel in the pair of pixels comprises a non-zero value as a result of at least one of: the pair of pixels being in a same multi-dimensional layer, or the pair of pixels having identical coordinates at different temporal slices;
swapping positions of pixels from pairs of pixels in the texture until the texture energy value reaches a minimum energy value based on the energy function;
generating an output texture including output pixels based on the texture with minimum energy value to be applied to image data; and
rendering an output image over multiple frames based on applying the texture to the one or more images.

Clause 14: the processor of Clause 13, wherein sampling one or more pixels corresponding to the image data, wherein each pixel corresponds to a random variable, wherein the sampling one or more pixels corresponds to determining a value for a probability density function for a pixel, and wherein the sampling includes reducing a variance of samples by skewing samples towards regions of higher energy based on the energy function.

Clause 15: the processor of Clause 13 or 14, wherein the texture is a white noise texture.

Clause 16: the processor of any one of the Clauses 13-15, wherein the pixels correspond to vectors, points on a mesh, or objects with more than three dimensions, and wherein the output texture is to be applied to image data that includes vectors, points on a mesh, or objects with more than three dimensions.

Clause 17: the processor of any one of the Clauses 13-16, wherein the operations further comprise:
sampling one or more pixels corresponding to the image data, wherein each pixel corresponds to a random variable, wherein the sampling one or more pixels corresponds to determining a value for a probability density function for a pixel, and wherein the sampling includes reducing a variance of samples by skewing cosine-weighted samples towards regions of higher energy based on the energy function.

Clause 18: the processor of any one of the Clauses 13-17, wherein the operations further comprise:
applying a rank-1 lattice to add an additional dimension to the output texture.

Clause 19: the processor of any one of the Clauses 13-18, wherein the operations further comprise:
inputting output pixel values that are scalar into a space-filling curve function to output pixel values that are vectors.

Clause 20: a computer-readable storage medium having stored thereon one or more instructions, which if performed by one or more processors, cause one or more processors to perform operations comprising:
receiving a texture including two or more pixels;
computing a texture energy value for the texture based on an energy function,
wherein the energy function is based on a distance between a pair of pixels of the two or more pixels, and one or more configurable parameters,
wherein the texture energy value is based on a summation of pixel energy values for pixels in the texture,
wherein a pixel energy value for each pixel in the pair of pixels comprises a non-zero value as a result of at least one of: the pair of pixels being in a same multi-dimensional layer, or the pair of pixels having identical coordinates at different temporal slices;
swapping positions of pixels within pairs of pixels in the texture until the texture reaches a minimum energy value based on the energy function; and
generating an output texture including output pixels based on the texture with minimum energy value to be applied to image data.

Clause 21: the computer-readable storage medium of Clause 20, wherein a texture is stratified through time, and further comprising rejecting a pixel swap based on a number of pixel values found in strata of the texture.

Clause 22: the computer-readable storage medium of Clause 20 or 21, wherein the texture includes a temporal dimension.

Clause 23: the computer-readable storage medium of any one of the Clauses 20-22, further comprising:
sampling one or more pixels corresponding to the image data, wherein each pixel corresponds to a random variable, wherein the sampling one or more pixels corresponds to determining a value for a probability density function for a pixel, and wherein the sampling includes reducing a variance of the samples by skewing samples towards regions of greater light reflection based on the energy function.

Clause 24: the computer-readable storage medium of any one of the Clauses 20-23, wherein the operations further comprise:
setting the energy value of a pixel to a zero value if the pixel and another pixel are not in a same two-dimensional layer or do not have identical coordinates.

Clause 25: the computer-readable storage medium of any one of the Clauses 20-24, wherein the one or more configurable parameters comprises a first configurable parameter and a second configurable parameter, the first configurable parameter comprising an energy fall-off parameter corresponding to how energy dissipates from a pixel, and the second configurable parameter corresponding to a normal distribution of energy.

Clause 26: the computer-readable storage medium of any one of the Clauses 20-25, further comprising:
inputting one or more scalar output pixel values into a space-filling curve function to one or more output pixel values that are vectors.

Clause 27: the computer-readable storage medium of any one of the Clauses 20-25, wherein the operations further comprise:
applying a low pass filter to the image data.

Clause 28: the computer-readable storage medium of any one of the Clauses 20-27, wherein a number of swaps corresponds to a width, height, and depth of the texture.

Clause 29: the computer-readable storage medium of any one of the Clauses 20-28, wherein the energy function has a non-zero value as a result of the pair of pixels having identical z coordinates.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 41, computer programs in form of machine-readable executable code or computer control logic algorithms are stored in main memory 4104 and/or secondary storage. Computer programs, if executed by one or more processors, enable system 4100 to perform various functions in accordance with at least one embodiment. In at least one embodiment, memory 4104, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 4102, parallel processing system 4112, an integrated circuit capable of at least a portion of capabilities of both CPU 4102, parallel processing system 4112, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 4100 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 4112 includes, without limitation, a plurality of parallel processing units ("PPUs") 4114 and associated memories 4116. In at least one embodiment, PPUs 4114 are connected to a host processor or other peripheral devices via an interconnect 4118 and a switch 4120 or multiplexer. In at least one embodiment, parallel processing system 4112 distributes computational tasks across PPUs 4114 which can be parallelizable—for example, as part of distribution of computational tasks across multiple graphics processing unit ("GPU") thread blocks. In at least one embodiment, memory is shared and accessible (e.g., for read and/or write access) across some or all of PPUs 4114, although such shared memory may incur performance penalties relative to use of local memory and registers resident to a PPU 4114. In at least one embodiment, operation of PPUs 4114 is synchronized through use of a command such as syncthreads( ) wherein all threads in a block (e.g., executed across multiple PPUs 4114) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances. Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method for generating a texture, the method comprising:
   computing a texture energy value for a texture based on two or more pixel energy values at different temporal slices;
   swapping positions of two or more pixels in the texture until the texture energy value reaches a minimum energy value based on an energy function; and
   generating an output texture including output pixels based on the texture with minimum energy value to be applied to an instance of image data.

2. The computer-implemented method of claim 1, wherein the texture is a blue noise texture.

3. The computer-implemented method of claim 1, wherein the energy function is further based on a distance between a pair of pixels of the two or more pixels.

4. The computer-implemented method of claim 1, wherein the texture energy value is based on a summation of pixel energy values for all pixels in the texture.

5. The computer-implemented method of claim 1, wherein prior to computing the texture energy value for the texture, the computer-implemented method further comprising:
   sampling one or more pixels corresponding to the image data,
   wherein each pixel corresponds to a random variable,
   wherein the sampling of the one or more pixels includes determining a value for a probability density function for a pixel, and
   wherein the sampling includes reducing a variance of samples by skewing samples towards regions of higher energy based on the energy function.

6. The computer-implemented method of claim 1, wherein the energy function is based on a distance between a pair of pixels of the two or more pixels and one or more configurable parameters.

7. The computer-implemented method of claim 1, wherein the texture is initially created with non-uniform random sampling.

8. The computer-implemented method of claim 1, further comprising: setting an energy value of a pixel to a zero value if the pixel and another pixel are not in a same multi-dimensional layer or do not have identical coordinates.

9. The computer-implemented method of claim 1, further comprising:
   stratifying the texture into strata over time;
   calculating a stratification score based on a number of pixel values in each stratum in which a pixel of a pair of pixels is located; and
   rejecting a swap of pixels if the swap increases the stratification score.

10. The computer-implemented method of claim 1, further comprising:
    calculating a number of swaps based on a width of the texture in each of the two or more pixels, a height of the texture in each of the two or more pixels, and a depth of the texture in each of the two or more pixels.

11. A processor comprising:
    one or more circuits to:
    compute a texture energy value for a texture based on two or more pixel energy values at different temporal slices;
    swap positions of two or more pixels in the texture until the texture energy value reaches a minimum energy value based on an energy function; and
    generate an output texture including output pixels based on the texture with minimum energy value to be applied to an instance of image data.

12. The processor of claim 11, wherein the texture is a blue noise texture.

13. The processor of claim 11, wherein the energy function has a non-zero value as a result of a pair of pixels having identical z coordinates.

14. The processor of claim 11, wherein the one or more circuits are to obtain samples by sampling one or more pixels corresponding to the image data, wherein each pixel corresponds to a random variable, wherein the sampling of the one or more pixels includes determining a value for a probability density function for a pixel, and wherein the sampling includes reducing a variance of the samples by skewing cosine-weighted samples towards regions of higher energy based on the energy function.

15. The processor of claim 11, wherein the texture energy value is based on a summation of pixel energy values for all pixels in the texture.

16. The processor of claim 11, wherein the one or more circuits are to:
    calculate a number of swaps based on a width of the texture in each of the two or more pixels, a height of the texture in each of the two or more pixels, and a depth of the texture in each of the two or more pixels.

17. A non-transitory computer-readable storage medium having stored thereon one or more instructions, which if performed by one or more processors, cause one or more processors to perform operations comprising:
    computing a texture energy value for a texture based on two or more pixel energy values at different temporal slices;
    swapping positions of two or more pixels in the texture until the texture reaches a minimum energy value based on an energy function; and
    generating an output texture including output pixels based on the texture with minimum energy value to be applied to image data.

18. The non-transitory computer-readable storage medium of claim 17, wherein the texture is a blue noise texture.

19. The non-transitory computer-readable storage medium of claim 17, wherein the energy function is further based on a distance between a pair of pixels of the two or more pixels.

20. The non-transitory computer-readable storage medium of claim 17, wherein the texture energy value is based on a summation of pixel energy values for all pixels in the texture.

\* \* \* \* \*